United States Patent

Veselova et al.

(10) Patent No.: US 11,675,757 B2
(45) Date of Patent: Jun. 13, 2023

(54) MAINTAINING ROW DURABILITY DATA IN DATABASE SYSTEMS

(71) Applicant: Ocient Holdings LLC, Chicago, IL (US)

(72) Inventors: Anna Veselova, Chicago, IL (US); Ravi V. Khadiwala, Bartlett, IL (US); George Kondiles, Chicago, IL (US)

(73) Assignee: Ocient Holdings LLC, Chicago, IL (US)

( * ) Notice: Subject to any disclaimer, the term of this patent is extended or adjusted under 35 U.S.C. 154(b) by 123 days.

(21) Appl. No.: 17/215,527

(22) Filed: Mar. 29, 2021

(65) Prior Publication Data

US 2022/0138168 A1 May 5, 2022

Related U.S. Application Data

(60) Provisional application No. 63/107,080, filed on Oct. 29, 2020.

(51) Int. Cl.
*G06F 16/00* (2019.01)
*G06F 16/215* (2019.01)
*G06F 16/28* (2019.01)
*G06F 16/2453* (2019.01)
*G06F 16/25* (2019.01)

(52) U.S. Cl.
CPC ...... *G06F 16/215* (2019.01); *G06F 16/24532* (2019.01); *G06F 16/258* (2019.01); *G06F 16/285* (2019.01)

(58) Field of Classification Search
None
See application file for complete search history.

(56) References Cited

U.S. PATENT DOCUMENTS

| 5,548,770 A | 8/1996 | Bridges |
|---|---|---|
| 6,230,200 B1 | 5/2001 | Forecast |
| 6,633,772 B2 | 10/2003 | Ford |
| 7,499,907 B2 | 3/2009 | Brown |
| 7,908,242 B1 | 3/2011 | Achanta |
| 2001/0051949 A1 | 12/2001 | Carey |

(Continued)

OTHER PUBLICATIONS

A new high performance fabric for HPC, Michael Feldman, May 2016, Intersect360 Research.

(Continued)

*Primary Examiner* — Bai D Vu
(74) *Attorney, Agent, or Firm* — Garlick & Markison; Bruce E. Stuckman; Katherine C. Stuckman

(57) ABSTRACT

A database system operates by: receiving a plurality of row data associated with a first data source; identifying a subset of row data from the plurality of row data that includes only ones of the plurality of row data that compare favorably to maintained row durability data; generating at least one page from ones of the plurality of row data included in the subset of row data; storing the at least one page in long term storage; generating updated row durability data indicating a least favorably ordered row number of a plurality of row numbers corresponding to the subset of row data based on storing the at least one page in long term storage; and updating the maintained row durability data to indicate the least favorably ordered row number of the updated row durability data.

20 Claims, 70 Drawing Sheets

(56) References Cited

U.S. PATENT DOCUMENTS

| | | |
|---|---|---|
| 2002/0032676 A1 | 3/2002 | Reiner |
| 2004/0162853 A1 | 8/2004 | Brodersen |
| 2008/0133456 A1 | 6/2008 | Richards |
| 2009/0063893 A1 | 3/2009 | Bagepalli |
| 2009/0183167 A1 | 7/2009 | Kupferschmidt |
| 2010/0082577 A1 | 4/2010 | Mirchandani |
| 2010/0241646 A1 | 9/2010 | Friedman |
| 2010/0274983 A1 | 10/2010 | Murphy |
| 2010/0312756 A1 | 12/2010 | Zhang |
| 2011/0219169 A1 | 9/2011 | Zhang |
| 2012/0109888 A1 | 5/2012 | Zhang |
| 2012/0151118 A1 | 6/2012 | Flynn |
| 2012/0185866 A1 | 7/2012 | Couvee |
| 2012/0254252 A1 | 10/2012 | Jin |
| 2012/0311246 A1 | 12/2012 | McWilliams |
| 2013/0332484 A1 | 12/2013 | Gajic |
| 2014/0047095 A1 | 2/2014 | Breternitz |
| 2014/0136510 A1 | 5/2014 | Parkkinen |
| 2014/0188841 A1 | 7/2014 | Sun |
| 2015/0205607 A1 | 7/2015 | Lindholm |
| 2015/0244804 A1 | 8/2015 | Warfield |
| 2015/0248366 A1 | 9/2015 | Bergsten |
| 2015/0293966 A1 | 10/2015 | Cai |
| 2015/0310045 A1 | 10/2015 | Konik |
| 2016/0034547 A1 | 2/2016 | Lerios |
| 2018/0047002 A1* | 2/2018 | Vermeulen .............. G06F 16/25 |

OTHER PUBLICATIONS

Alechina, N. (2006-2007) B-Trees. School of Computer Science, University of Nottingham, http://www.cs.nottac.uk/~psznza/G5BADS06/lecture13-print.pdf. 41 pages.

Amazon DynamoDB: ten things you really should know, Nov. 13, 2015, Chandan Patra, http://cloudacademy. .com/blog/amazon-dynamodb-ten-thing.

An Inside Look at Google BigQuery, by Kazunori Sato, Solutions Architect, Cloud Solutions team, Google Inc., 2012.

Big Table, a NoSQL massively parallel table, Paul Krzyzanowski, Nov. 2011, https://www.cs.rutgers.edu/pxk/417/notes/contentlbigtable.html.

Distributed Systems, Fall2012, Mohsen Taheriyan, http://www-scf.usc.edu/-csci572120011Spring/presentations/Taheriyan.pptx.

International Searching Authority; International Search Report and Written Opinion; International Application No. PCT/US2017/054773; dated Feb. 13, 2018; 17 pgs.

International Searching Authority; International Search Report and Written Opinion; International Application No. PCT/US2017/054784; dated Dec. 28, 2017; 10 pgs.

International Searching Authority; International Search Report and Written Opinion; International Application No. PCT/US2017/066145; dated Mar. 5, 2018; 13 pgs.

International Searching Authority; International Search Report and Written Opinion; International Application No. PCT/US2017/066169; dated Mar. 6, 2018; 15 pgs.

International Searching Authority; International Search Report and Written Opinion; International Application No. PCT/US2018/025729; dated Jun. 27, 2018; 9 pgs.

International Searching Authority; International Search Report and Written Opinion; International Application No. PCT/US2018/034859; dated Oct. 30, 2018; 8 pgs.

MapReduce: Simplified Data Processing on Large Clusters, OSDI 2004, Jeffrey Dean and Sanjay Ghemawat, Google, Inc., 13 pgs.

Rodero-Merino, L.; Storage of Structured Data: Big Table and HBase, New Trends in Distributed Systems, MSc Software and Systems, Distributed Systems Laboratory; Oct. 17, 2012; 24 pages.

Step 2: Examine the data model and implementation details, 2016, Amazon Web Services, Inc., http://docs.aws.amazon.com/amazondynamodb/latestldeveloperguide!Ti . . . .

* cited by examiner database system 10

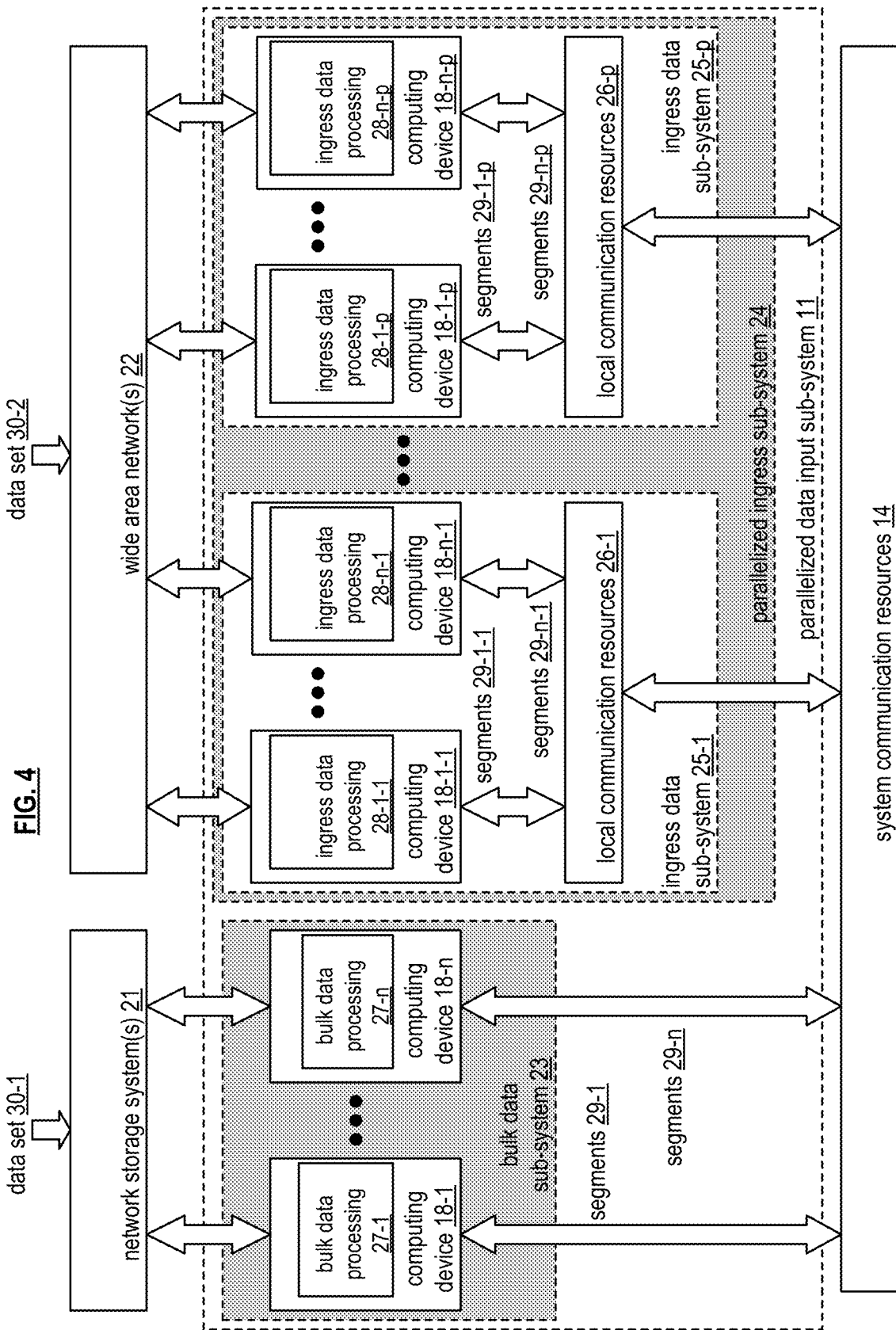

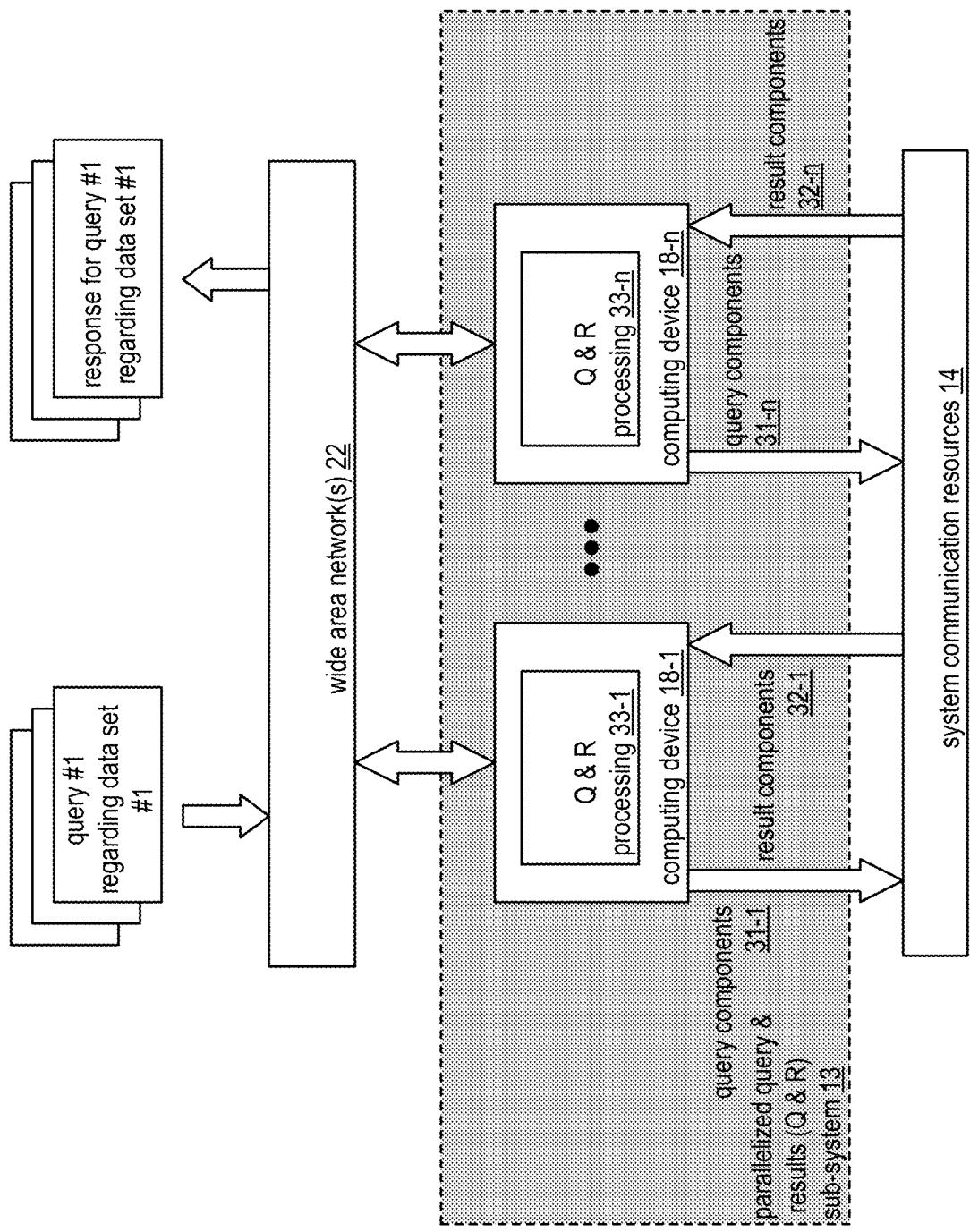

computing device 18 computing device 18 computing device 18 node 37 node 37 node 37 data set

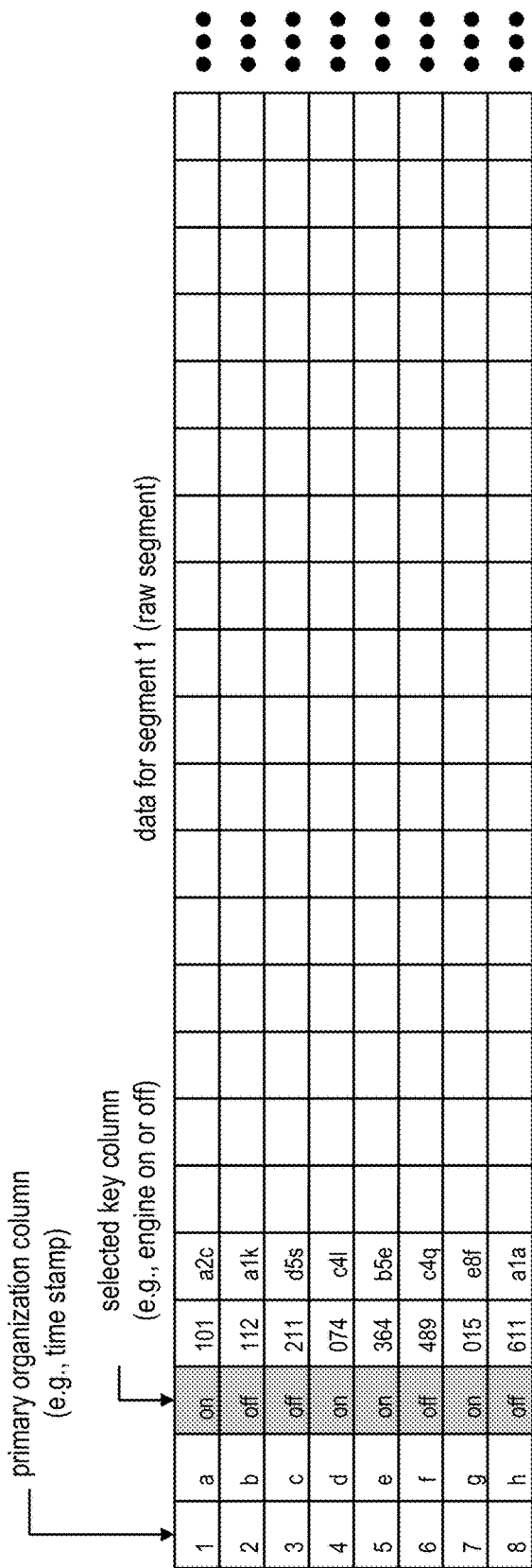
FIG. 18
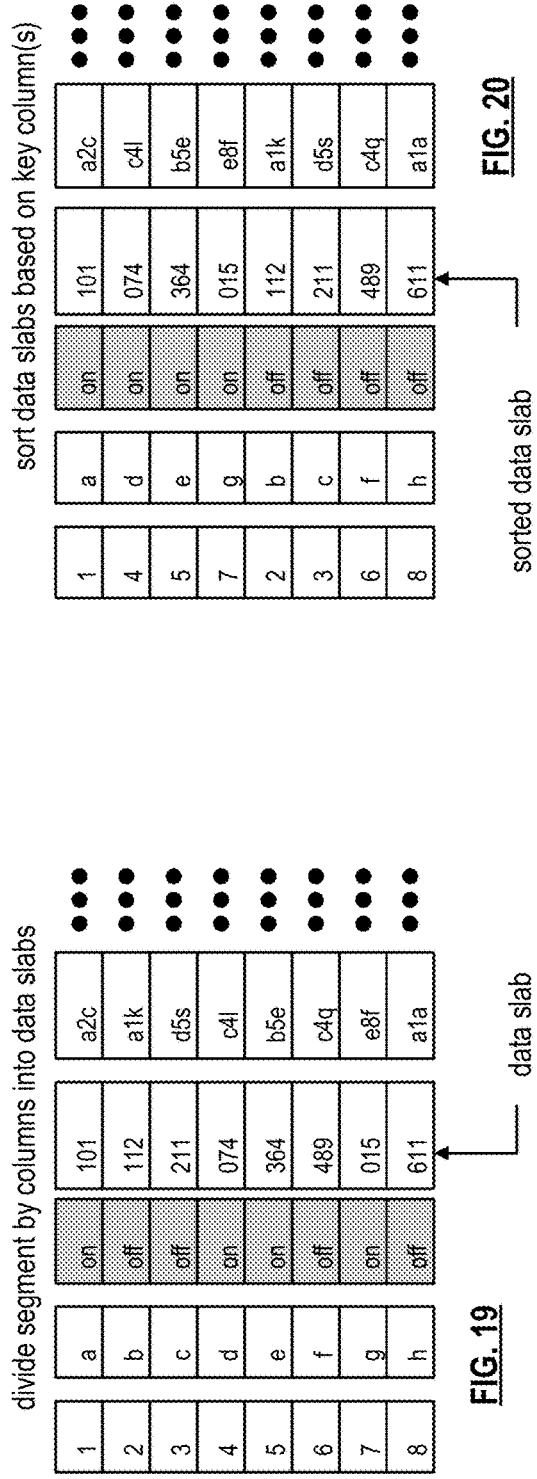
FIG. 19
FIG. 20 database system 10 record processing and storage system 2505 record processing and storage system 2505 segment generator 2517 record processing and storage system 2505 row deduplication module 3050

2505 row deduplication module 3050 row deduplication module 3050

2505

2505

2505

2505

US 11,675,757 B2

MAINTAINING ROW DURABILITY DATA IN DATABASE SYSTEMS

CROSS-REFERENCE TO RELATED APPLICATIONS

The present U.S. Utility patent application claims priority pursuant to 35 U.S.C. § 119(e) to U.S. Provisional Application No. 63/107,080, entitled "MAINTAINING ROW DURABILITY DATA IN DATABASE SYSTEMS", filed Oct. 29, 2020, which is hereby incorporated herein by reference in its entirety and made part of the present U.S. Utility patent application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not Applicable.

BACKGROUND OF THE INVENTION

Technical Field of the Invention

This invention relates generally to computer networking and more particularly to database system and operation.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function.

Of the many applications a computer can perform, a database system is one of the largest and most complex applications. In general, a database system stores a large amount of data in a particular way for subsequent processing. In some situations, the hardware of the computer is a limiting factor regarding the speed at which a database system can process a particular function. In some other instances, the way in which the data is stored is a limiting factor regarding the speed of execution. In yet some other instances, restricted co-process options are a limiting factor regarding the speed of execution.

BRIEF DESCRIPTION OF THE SEVERAL VIEWS OF THE DRAWING(S)

FIG. 4 is a schematic block diagram of an embodiment of a parallelized data input sub-system in accordance with the present invention;

FIG. 5 is a schematic block diagram of an embodiment of a parallelized query and response (Q&R) sub-system in accordance with the present invention;

FIGS. 15-23 are schematic block diagrams of an example of processing a table or data set for storage in the database system in accordance with the present invention;

DETAILED DESCRIPTION OF THE INVENTION

Figure 1:
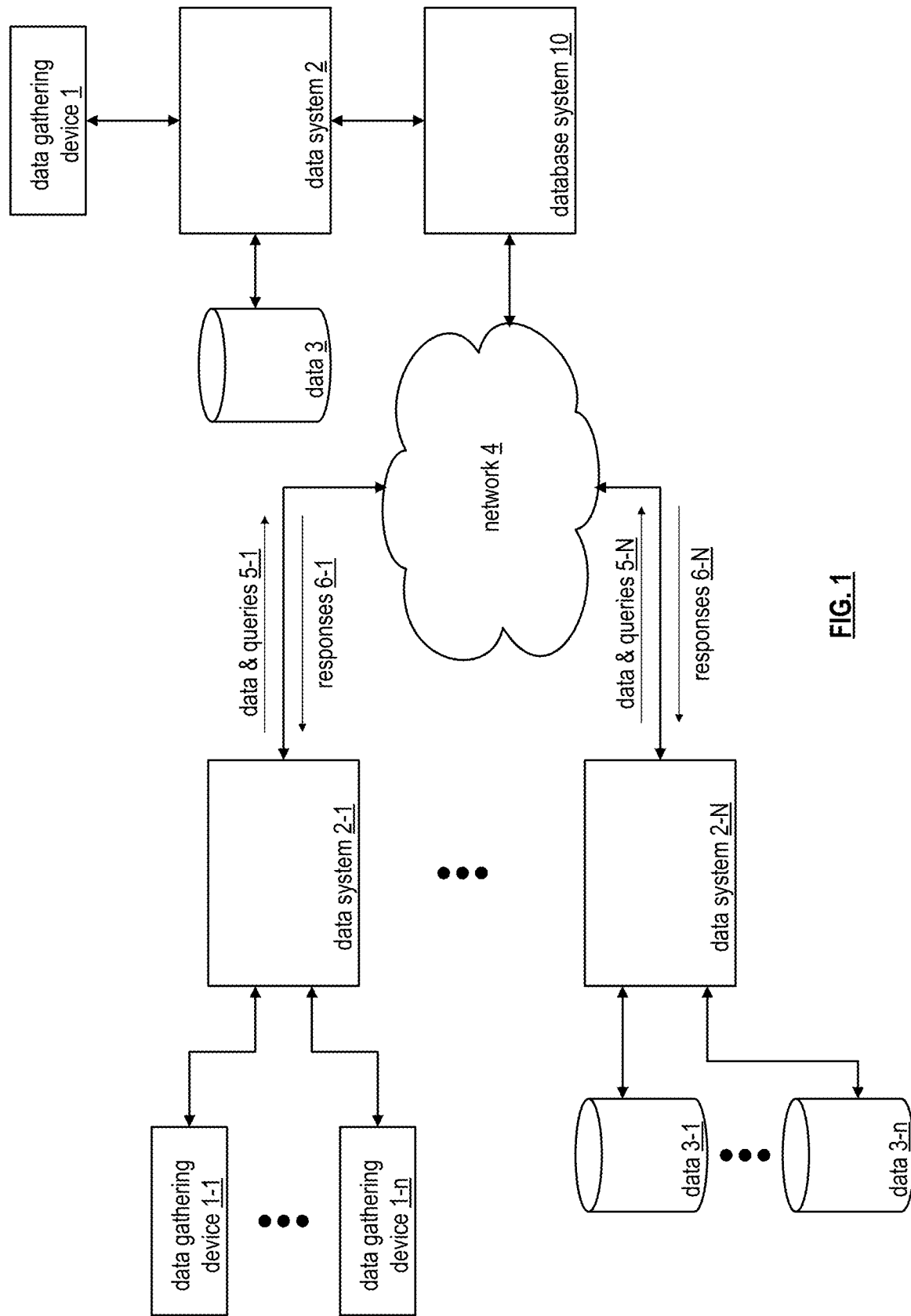
FIG. 1 is a schematic block diagram of an embodiment of a large scale data processing network that includes a database system in accordance with the present invention.

FIG. 1 is a schematic block diagram of an embodiment of a large-scale data processing network that includes data gathering devices (1, 1-1 through 1-*n*), data systems (2, 2-1 through 2-N), data storage systems (3, 3-1 through 3-*n*), a network 4, and a database system 10. The data gathering devices are computing devices that collect a wide variety of data and may further include sensors, monitors, measuring instruments, and/or other instrument for collecting data. The data gathering devices collect data in real-time (i.e., as it is happening) and provides it to data system 2-1 for storage and real-time processing of queries 5-1 to produce responses 6-1. As an example, the data gathering devices are computing in a factory collecting data regarding manufacturing of one or more products and the data system is evaluating queries to determine manufacturing efficiency, quality control, and/or product development status.

The data storage systems 3 store existing data. The existing data may originate from the data gathering devices or other sources, but the data is not real time data. For example, the data storage system stores financial data of a bank, a credit card company, or like financial institution. The data system 2-N processes queries 5-N regarding the data stored in the data storage systems to produce responses 6-N.

Data system 2 processes queries regarding real time data from data gathering devices and/or queries regarding non-real time data stored in the data storage system 3. The data system 2 produces responses in regard to the queries. Storage of real time and non-real time data, the processing of queries, and the generating of responses will be discussed with reference to one or more of the subsequent figures.

Figure 1A:
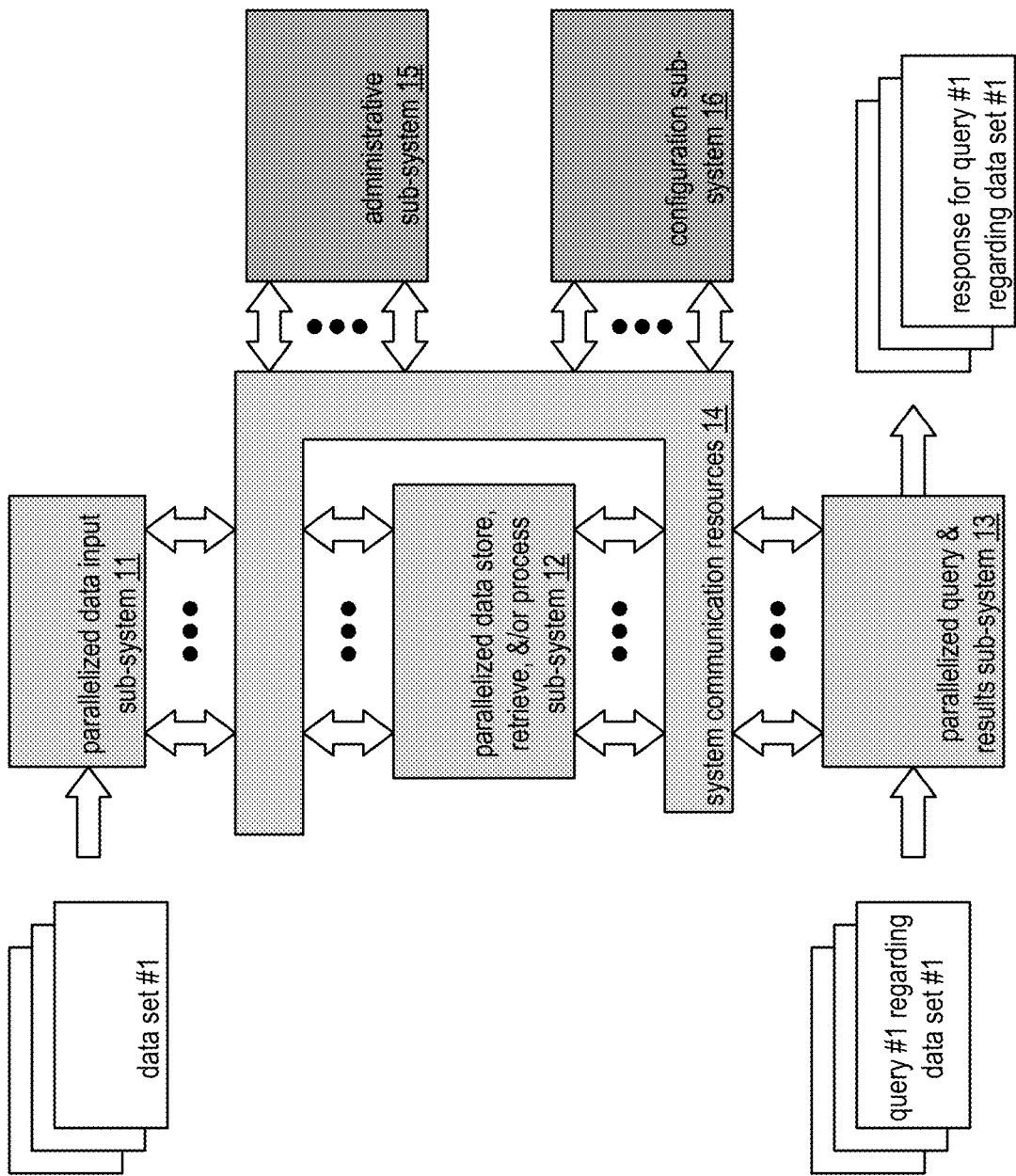
FIG. 1A is a schematic block diagram of an embodiment of a database system in accordance with the present invention.

FIG. 1A is a schematic block diagram of an embodiment of a database system 10 that includes a parallelized data input sub-system 11, a parallelized data store, retrieve, and/or process sub-system 12, a parallelized query and response sub-system 13, system communication resources 14, an administrative sub-system 15, and a configuration sub-system 16. The system communication resources 14 include one or more of wide area network (WAN) connections, local area network (LAN) connections, wireless connections, wireline connections, etc. to couple the sub-systems 11, 12, 13, 15, and 16 together.

Each of the sub-systems 11, 12, 13, 15, and 16 include a plurality of computing devices; an example of which is discussed with reference to one or more of FIGS. 7-9. Hereafter, the parallelized data input sub-system 11 may be also be referred to as a data input sub-system, the parallelized data store, retrieve, and/or process sub-system may be also be referred to as a data storage and processing sub-system, and the parallelized query and response sub-system 13 may be also be referred to as a query and results sub-system.

In an example of operation, the parallelized data input sub-system 11 receives a data set (e.g., a table) that includes a plurality of records. A record includes a plurality of data fields. As a specific example, the data set includes tables of data from a data source. For example, a data source includes one or more computers. As another example, the data source is a plurality of machines. As yet another example, the data source is a plurality of data mining algorithms operating on one or more computers.

As is further discussed with reference to FIG. 15, the data source organizes its records of the data set into a table that includes rows and columns. The columns represent data fields of data for the rows. Each row corresponds to a record of data. For example, a table include payroll information for a company's employees. Each row is an employee's payroll record. The columns include data fields for employee name, address, department, annual salary, tax deduction information, direct deposit information, etc.

The parallelized data input sub-system 11 processes a table to determine how to store it. For example, the parallelized data input sub-system 11 divides the data set into a plurality of data partitions. For each partition, the parallelized data input sub-system 11 divides it into a plurality of data segments based on a segmenting factor. The segmenting factor includes a variety of approaches divide a partition into segments. For example, the segment factor indicates a number of records to include in a segment. As another example, the segmenting factor indicates a number of segments to include in a segment group. As another example, the segmenting factor identifies how to segment a data partition based on storage capabilities of the data store and processing sub-system. As a further example, the segmenting factor indicates how many segments for a data partition based on a redundancy storage encoding scheme.

As an example of dividing a data partition into segments based on a redundancy storage encoding scheme, assume that it includes a 4 of 5 encoding scheme (meaning any 4 of 5 encoded data elements can be used to recover the data). Based on these parameters, the parallelized data input sub-system 11 divides a data partition into 5 segments: one corresponding to each of the data elements).

The parallelized data input sub-system 11 restructures the plurality of data segments to produce restructured data segments. For example, the parallelized data input sub-system 11 restructures records of a first data segment of the plurality of data segments based on a key field of the plurality of data fields to produce a first restructured data segment. The key field is common to the plurality of records. As a specific example, the parallelized data input sub-system 11 restructures a first data segment by dividing the first data segment into a plurality of data slabs (e.g., columns of a segment of a partition of a table). Using one or more of the columns as a key, or keys, the parallelized data input sub-system 11 sorts the data slabs. The restructuring to produce the data slabs is discussed in greater detail with reference to FIG. 4 and FIGS. 16-18. The parallelized data input sub-system 11 also generates storage instructions regarding how sub-system 12 is to store the restructured data segments for efficient processing of subsequently received queries regarding the stored data. For example, the storage instructions include one or more of: a naming scheme, a request to store, a memory resource requirement, a processing resource requirement, an expected access frequency level, an expected storage duration, a required maximum access latency time, and other requirements associated with storage, processing, and retrieval of data.

A designated computing device of the parallelized data store, retrieve, and/or process sub-system 12 receives the restructured data segments and the storage instructions. The designated computing device (which is randomly selected, selected in a round robin manner, or by default) interprets the storage instructions to identify resources (e.g., itself, its components, other computing devices, and/or components thereof) within the computing device's storage cluster. The designated computing device then divides the restructured data segments of a segment group of a partition of a table into segment divisions based on the identified resources and/or the storage instructions. The designated computing device then sends the segment divisions to the identified resources for storage and subsequent processing in accordance with a query. The operation of the parallelized data store, retrieve, and/or process sub-system 12 is discussed in greater detail with reference to FIG. 6.

The parallelized query and response sub-system 13 receives queries regarding tables (e.g., data sets) and processes the queries prior to sending them to the parallelized data store, retrieve, and/or process sub-system 12 for execution. For example, the parallelized query and response sub-system 13 generates an initial query plan based on a data processing request (e.g., a query) regarding a data set (e.g., the tables). Sub-system 13 optimizes the initial query plan based on one or more of the storage instructions, the engaged resources, and optimization functions to produce an optimized query plan.

For example, the parallelized query and response sub-system 13 receives a specific query no. 1 regarding the data set no. 1 (e.g., a specific table). The query is in a standard query format such as Open Database Connectivity (ODBC), Java Database Connectivity (JDBC), and/or SPARK. The query is assigned to a node within the parallelized query and response sub-system 13 for processing. The assigned node identifies the relevant table, determines where and how it is stored, and determines available nodes within the parallelized data store, retrieve, and/or process sub-system 12 for processing the query.

In addition, the assigned node parses the query to create an abstract syntax tree. As a specific example, the assigned node converts an SQL (Standard Query Language) statement into a database instruction set. The assigned node then validates the abstract syntax tree. If not valid, the assigned node generates a SQL exception, determines an appropriate correction, and repeats. When the abstract syntax tree is validated, the assigned node then creates an annotated abstract syntax tree. The annotated abstract syntax tree includes the verified abstract syntax tree plus annotations regarding column names, data type(s), data aggregation or not, correlation or not, sub-query or not, and so on.

The assigned node then creates an initial query plan from the annotated abstract syntax tree. The assigned node optimizes the initial query plan using a cost analysis function (e.g., processing time, processing resources, etc.) and/or other optimization functions. Having produced the optimized query plan, the parallelized query and response sub-system 13 sends the optimized query plan to the parallelized data store, retrieve, and/or process sub-system 12 for execution. The operation of the parallelized query and response sub-system 13 is discussed in greater detail with reference to FIG. 5.

The parallelized data store, retrieve, and/or process sub-system 12 executes the optimized query plan to produce resultants and sends the resultants to the parallelized query and response sub-system 13. Within the parallelized data store, retrieve, and/or process sub-system 12, a computing device is designated as a primary device for the query plan (e.g., optimized query plan) and receives it. The primary device processes the query plan to identify nodes within the parallelized data store, retrieve, and/or process sub-system 12 for processing the query plan. The primary device then sends appropriate portions of the query plan to the identified nodes for execution. The primary device receives responses from the identified nodes and processes them in accordance with the query plan.

The primary device of the parallelized data store, retrieve, and/or process sub-system 12 provides the resulting response (e.g., resultants) to the assigned node of the parallelized query and response sub-system 13. For example, the assigned node determines whether further processing is needed on the resulting response (e.g., joining, filtering, etc.). If not, the assigned node outputs the resulting response as the response to the query (e.g., a response for query no. 1 regarding data set no. 1). If, however, further processing is determined, the assigned node further processes the resulting response to produce the response to the query. Having received the resultants, the parallelized query and response sub-system 13 creates a response from the resultants for the data processing request.

Figure 2:
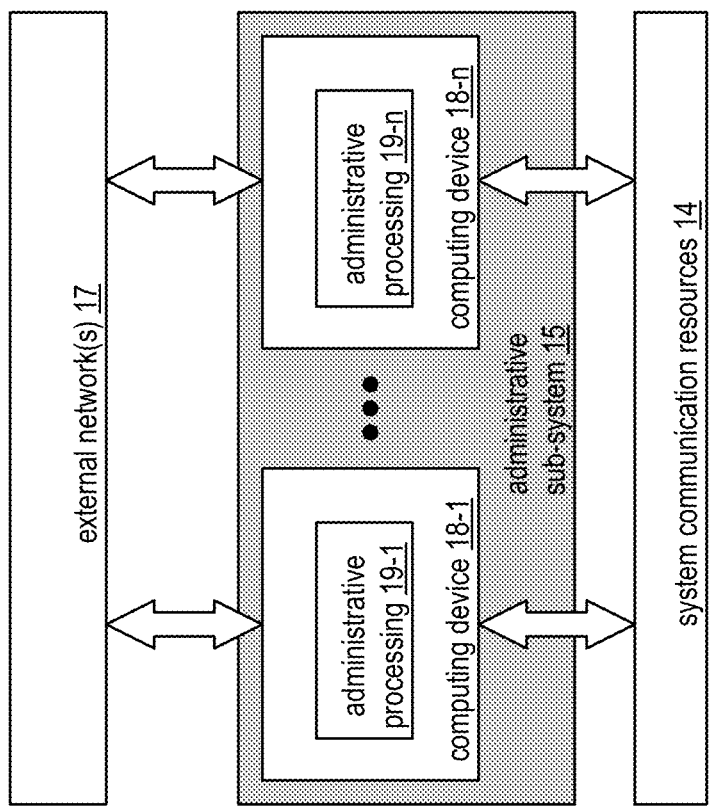
FIG. 2 is a schematic block diagram of an embodiment of an administrative sub-system in accordance with the present invention.

FIG. 2 is a schematic block diagram of an embodiment of the administrative sub-system 15 of FIG. 1A that includes one or more computing devices 18-1 through 18-n. Each of the computing devices executes an administrative processing function utilizing a corresponding administrative processing of administrative processing 19-1 through 19-n (which includes a plurality of administrative operations) that coordinates system level operations of the database system. Each computing device is coupled to an external network 17, or networks, and to the system communication resources 14 of FIG. 1A.

As will be described in greater detail with reference to one or more subsequent figures, a computing device includes a plurality of nodes and each node includes a plurality of processing core resources. Each processing core resource is capable of executing at least a portion of an administrative operation independently. This supports lock free and parallel execution of one or more administrative operations.

The administrative sub-system 15 functions to store metadata of the data set described with reference to FIG. 1A. For example, the storing includes generating the metadata to include one or more of an identifier of a stored table, the size of the stored table (e.g., bytes, number of columns, number of rows, etc.), labels for key fields of data segments, a data type indicator, the data owner, access permissions, available storage resources, storage resource specifications, software for operating the data processing, historical storage information, storage statistics, stored data access statistics (e.g., frequency, time of day, accessing entity identifiers, etc.) and any other information associated with optimizing operation of the database system 10.

Figure 3:
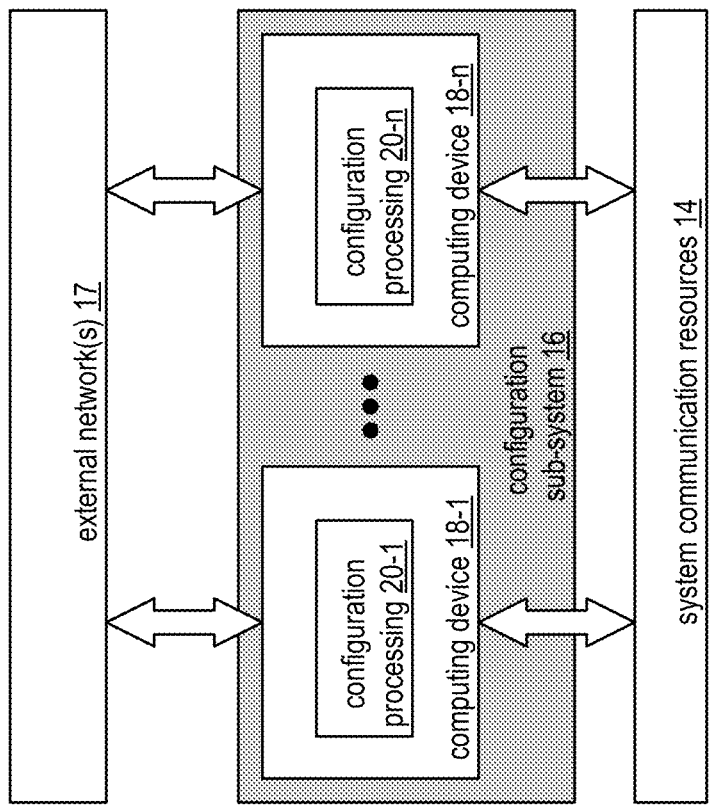
FIG. 3 is a schematic block diagram of an embodiment of a configuration sub-system in accordance with the present invention.

FIG. 3 is a schematic block diagram of an embodiment of the configuration sub-system 16 of FIG. 1A that includes one or more computing devices 18-1 through 18-n. Each of the computing devices executes a configuration processing function 20-1 through 20-n (which includes a plurality of configuration operations) that coordinates system level configurations of the database system. Each computing device is coupled to the external network 17 of FIG. 2, or networks, and to the system communication resources 14 of FIG. 1A.

FIG. 4 is a schematic block diagram of an embodiment of the parallelized data input sub-system 11 of FIG. 1A that includes a bulk data sub-system 23 and a parallelized ingress sub-system 24. The bulk data sub-system 23 includes a plurality of computing devices 18-1 through 18-n. A computing device includes a bulk data processing function (e.g., 27-1) for receiving a table from a network storage system 21 (e.g., a server, a cloud storage service, etc.) and processing it for storage as generally discussed with reference to FIG. 1A.

The parallelized ingress sub-system 24 includes a plurality of ingress data sub-systems 25-1 through 25-p that each include a local communication resource of local communication resources 26-1 through 26-p and a plurality of computing devices 18-1 through 18-n. A computing device executes an ingress data processing function (e.g., 28-1) to receive streaming data regarding a table via a wide area network 22 and processing it for storage as generally discussed with reference to FIG. 1A. With a plurality of ingress data sub-systems 25-1 through 25-p, data from a plurality of tables can be streamed into the database system 10 at one time.

In general, the bulk data processing function is geared towards receiving data of a table in a bulk fashion (e.g., the table exists and is being retrieved as a whole, or portion thereof). The ingress data processing function is geared towards receiving streaming data from one or more data sources (e.g., receive data of a table as the data is being generated). For example, the ingress data processing function is geared towards receiving data from a plurality of machines in a factory in a periodic or continual manner as the machines create the data.

FIG. 5 is a schematic block diagram of an embodiment of a parallelized query and results sub-system 13 that includes a plurality of computing devices 18-1 through 18-n. Each of the computing devices executes a query (Q) & response (R) processing function 33-1 through 33-n. The computing devices are coupled to the wide area network 22 to receive queries (e.g., query no. 1 regarding data set no. 1) regarding tables and to provide responses to the queries (e.g., response for query no. 1 regarding the data set no. 1). For example, a computing device (e.g., 18-1) receives a query, creates an initial query plan therefrom, and optimizes it to produce an optimized plan. The computing device then sends components (e.g., one or more operations) of the optimized plan to the parallelized data store, retrieve, &/or process sub-system 12.

Processing resources of the parallelized data store, retrieve, &/or process sub-system 12 processes the components of the optimized plan to produce results components 32-1 through 32-n. The computing device of the Q&R sub-system 13 processes the result components to produce a query response.

The Q&R sub-system 13 allows for multiple queries regarding one or more tables to be processed concurrently. For example, a set of processing core resources of a computing device (e.g., one or more processing core resources) processes a first query and a second set of processing core resources of the computing device (or a different computing device) processes a second query.

As will be described in greater detail with reference to one or more subsequent figures, a computing device includes a plurality of nodes and each node includes multiple processing core resources such that a plurality of computing devices includes pluralities of multiple processing core resources A processing core resource of the pluralities of multiple processing core resources generates the optimized query plan and other processing core resources of the pluralities of multiple processing core resources generates other optimized query plans for other data processing requests. Each processing core resource is capable of executing at least a portion of the Q & R function. In an embodiment, a plurality of processing core resources of one or more nodes executes the Q & R function to produce a response to a query. The processing core resource is discussed in greater detail with reference to FIG. 13.

Figure 6:
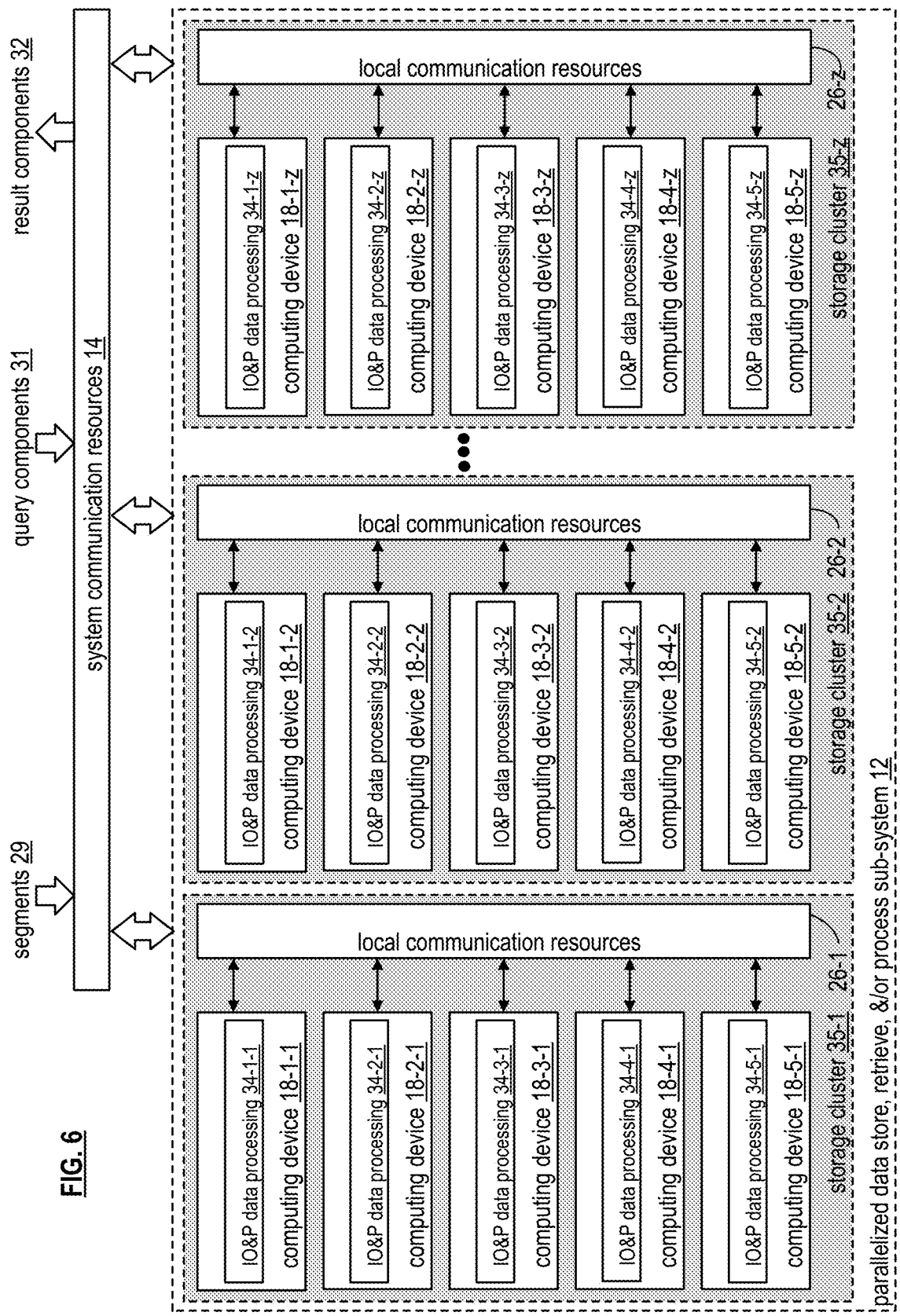
FIG. 6 is a schematic block diagram of an embodiment of a parallelized data store, retrieve, and/or process (IO& P) sub-system in accordance with the present invention.

FIG. 6 is a schematic block diagram of an embodiment of a parallelized data store, retrieve, and/or process sub-system 12 that includes a plurality of computing devices, where each computing device includes a plurality of nodes and each node includes multiple processing core resources. Each processing core resource is capable of executing at least a portion of the function of the parallelized data store, retrieve, and/or process sub-system 12. The plurality of computing devices is arranged into a plurality of storage clusters. Each storage cluster includes a number of computing devices.

In an embodiment, the parallelized data store, retrieve, and/or process sub-system 12 includes a plurality of storage clusters 35-1 through 35-z. Each storage cluster includes a corresponding local communication resource 26-1 through 26-z and a number of computing devices 18-1 through 18-5. Each computing device executes an input, output, and processing (TO &P) processing function 34-1 through 34-5 to store and process data.

The number of computing devices in a storage cluster corresponds to the number of segments (e.g., a segment group) in which a data partitioned is divided. For example, if a data partition is divided into five segments, a storage cluster includes five computing devices. As another example, if the data is divided into eight segments, then there are eight computing devices in the storage clusters.

To store a segment group of segments 29 within a storage cluster, a designated computing device of the storage cluster interprets storage instructions to identify computing devices (and/or processing core resources thereof) for storing the segments to produce identified engaged resources. The designated computing device is selected by a random selection, a default selection, a round-robin selection, or any other mechanism for selection.

The designated computing device sends a segment to each computing device in the storage cluster, including itself. Each of the computing devices stores their segment of the segment group. As an example, five segments 29 of a segment group are stored by five computing devices of storage cluster 35-1. The first computing device 18-1-1 stores a first segment of the segment group; a second computing device 18-2-1 stores a second segment of the segment group; and so on. With the segments stored, the computing devices are able to process queries (e.g., query components from the Q&R sub-system 13) and produce appropriate result components.

While storage cluster 35-1 is storing and/or processing a segment group, the other storage clusters 35-2 through 35-n are storing and/or processing other segment groups. For example, a table is partitioned into three segment groups. Three storage clusters store and/or process the three segment groups independently. As another example, four tables are independently storage and/or processed by one or more storage clusters. As yet another example, storage cluster 35-1 is storing and/or processing a second segment group while it is storing/or and processing a first segment group.

Figure 7:
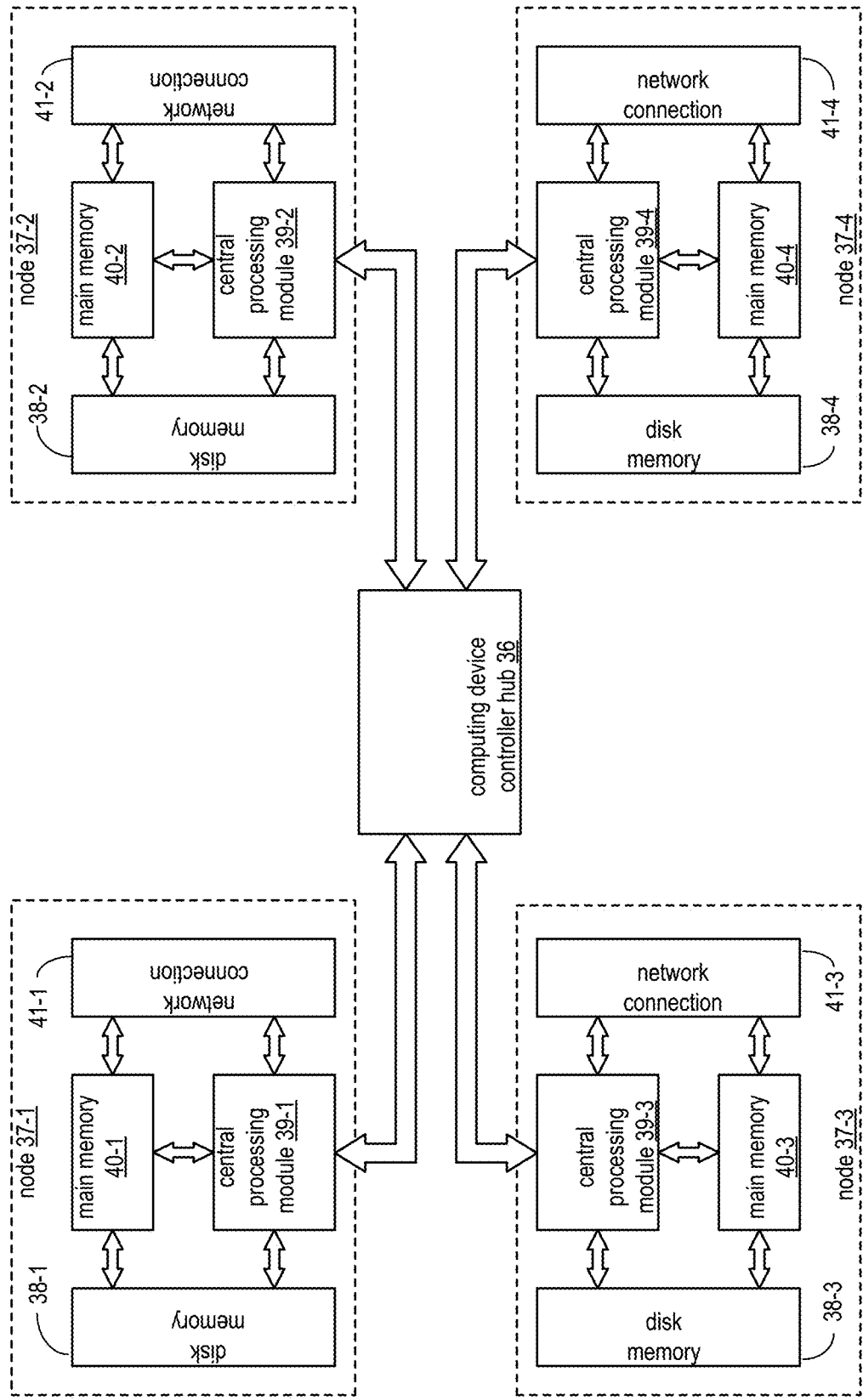
FIG. 7 is a schematic block diagram of an embodiment of a computing device in accordance with the present invention.

FIG. 7 is a schematic block diagram of an embodiment of a computing device 18 that includes a plurality of nodes 37-1 through 37-4 coupled to a computing device controller hub 36. The computing device controller hub 36 includes one or more of a chipset, a quick path interconnect (QPI), and an ultra path interconnection (UPI). Each node 37-1 through 37-4 includes a central processing module 39-1 through 39-4, a main memory 40-1 through 40-4 (e.g., volatile memory), a disk memory 38-1 through 38-4 (non-volatile memory), and a network connection 41-1 through 41-4. In an alternate configuration, the nodes share a network connection, which is coupled to the computing device controller hub 36 or to one of the nodes as illustrated in subsequent figures.

In an embodiment, each node is capable of operating independently of the other nodes. This allows for large scale parallel operation of a query request, which significantly reduces processing time for such queries. In another embodiment, one or more node function as co-processors to share processing requirements of a particular function, or functions.

Figure 8:
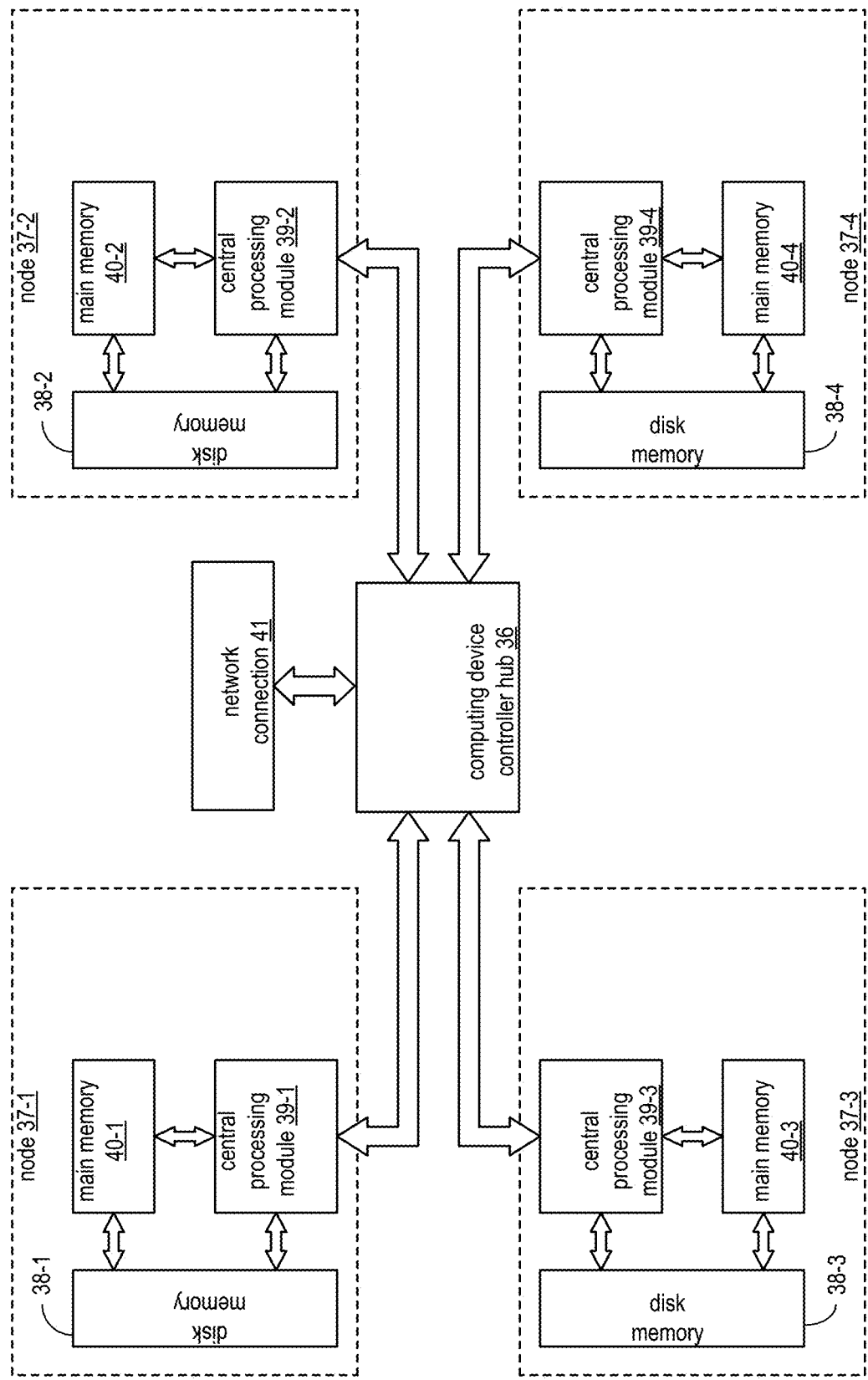
FIG. 8 is a schematic block diagram of another embodiment of a computing device in accordance with the present invention.

FIG. 8 is a schematic block diagram of another embodiment of a computing device is similar to the computing device of FIG. 7 with an exception that it includes a single network connection 41, which is coupled to the computing device controller hub 36. As such, each node coordinates with the computing device controller hub to transmit or receive data via the network connection.

Figure 9:
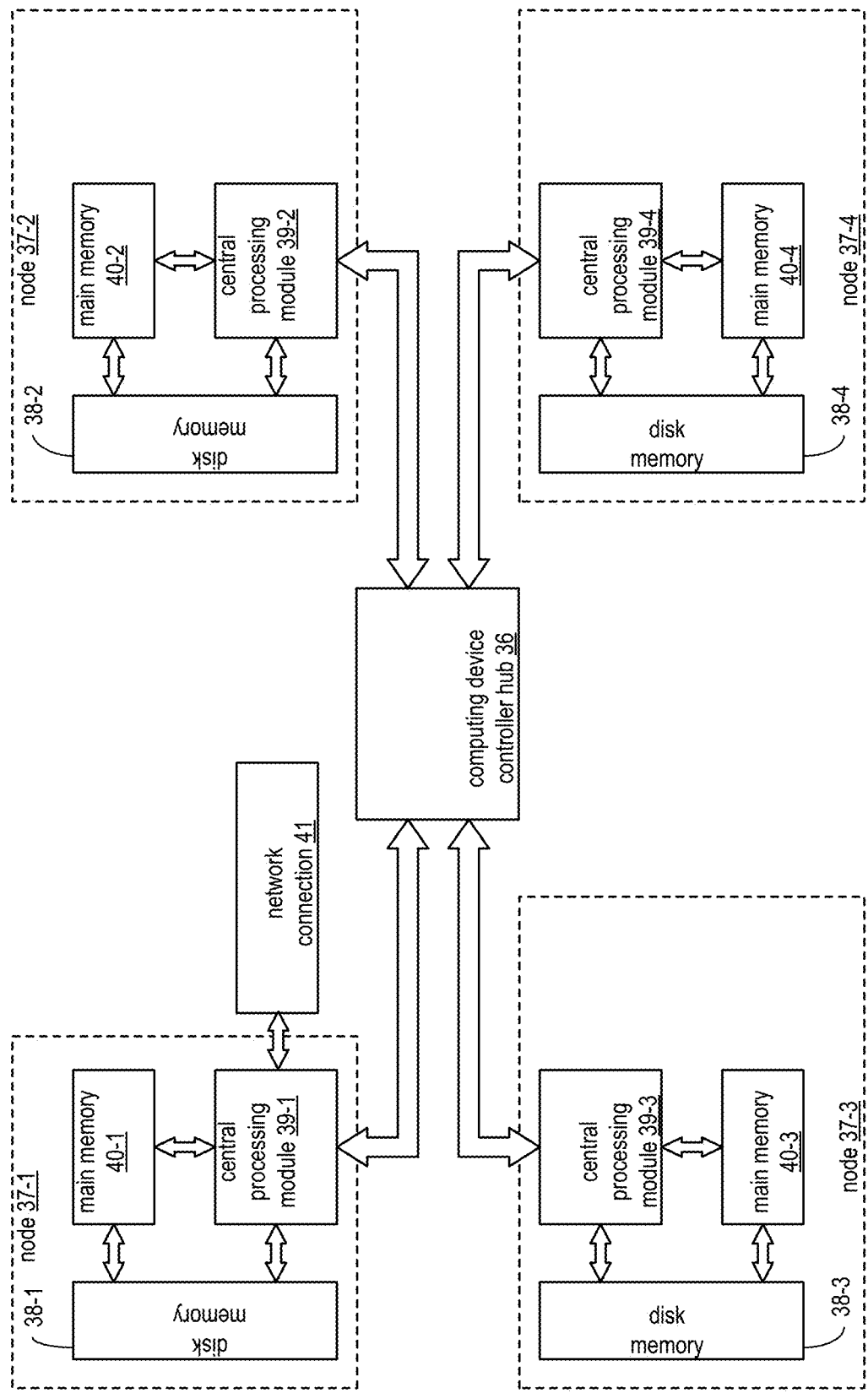
FIG. 9 is a schematic block diagram of another embodiment of a computing device in accordance with the present invention.

FIG. 9 is a schematic block diagram of another embodiment of a computing device is similar to the computing device of FIG. 7 with an exception that it includes a single network connection 41, which is coupled to a central processing module of a node (e.g., to central processing module 39-1 of node 37-1). As such, each node coordinates with the central processing module via the computing device controller hub 36 to transmit or receive data via the network connection.

Figure 10:
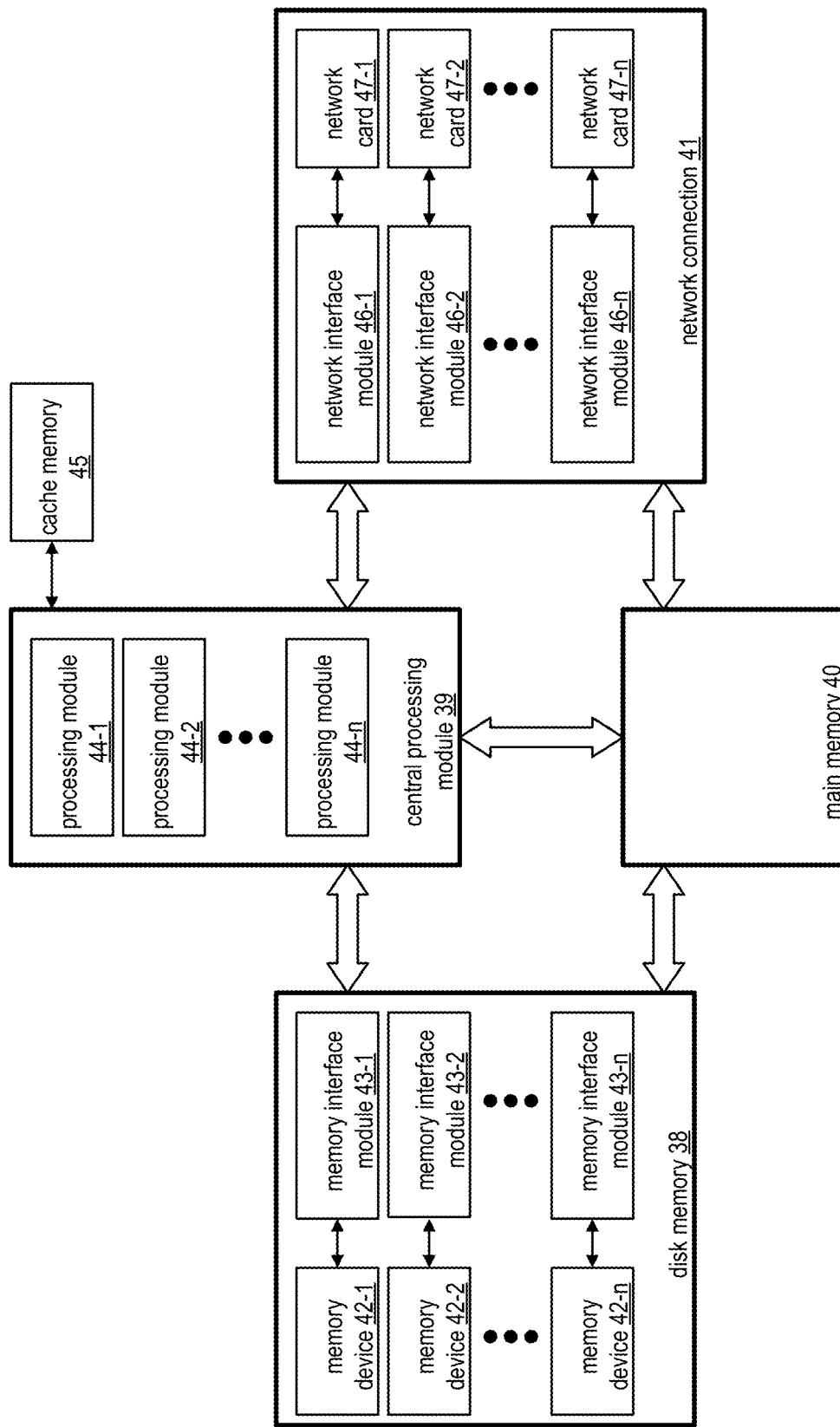
FIG. 10 is a schematic block diagram of an embodiment of a node of a computing device in accordance with the present invention.

FIG. 10 is a schematic block diagram of an embodiment of a node 37 of computing device 18. The node 37 includes the central processing module 39, the main memory 40, the disk memory 38, and the network connection 41. The main memory 40 includes read only memory (RAM) and/or other form of volatile memory for storage of data and/or operational instructions of applications and/or of the operating system. The central processing module 39 includes a plurality of processing modules 44-1 through 44-n and an associated one or more cache memory 45. A processing module is as defined at the end of the detailed description.

The disk memory 38 includes a plurality of memory interface modules 43-1 through 43-n and a plurality of memory devices 42-1 through 42-n (e.g., non-volatile memory). The memory devices 42-1 through 42-n include, but are not limited to, solid state memory, disk drive memory, cloud storage memory, and other non-volatile memory. For each type of memory device, a different memory interface module 43-1 through 43-n is used. For example, solid state memory uses a standard, or serial, ATA (SATA), variation, or extension thereof, as its memory interface. As another example, disk drive memory devices use a small computer system interface (SCSI), variation, or extension thereof, as its memory interface.

In an embodiment, the disk memory 38 includes a plurality of solid state memory devices and corresponding memory interface modules. In another embodiment, the disk memory 38 includes a plurality of solid state memory devices, a plurality of disk memories, and corresponding memory interface modules.

The network connection 41 includes a plurality of network interface modules 46-1 through 46-n and a plurality of network cards 47-1 through 47-n. A network card includes a wireless LAN (WLAN) device (e.g., an IEEE 802.11n or another protocol), a LAN device (e.g., Ethernet), a cellular device (e.g., CDMA), etc. The corresponding network interface modules 46-1 through 46-n include a software driver for the corresponding network card and a physical connection that couples the network card to the central processing module 39 or other component(s) of the node.

The connections between the central processing module 39, the main memory 40, the disk memory 38, and the network connection 41 may be implemented in a variety of ways. For example, the connections are made through a node controller (e.g., a local version of the computing device controller hub 36). As another example, the connections are made through the computing device controller hub 36.

Figure 11:
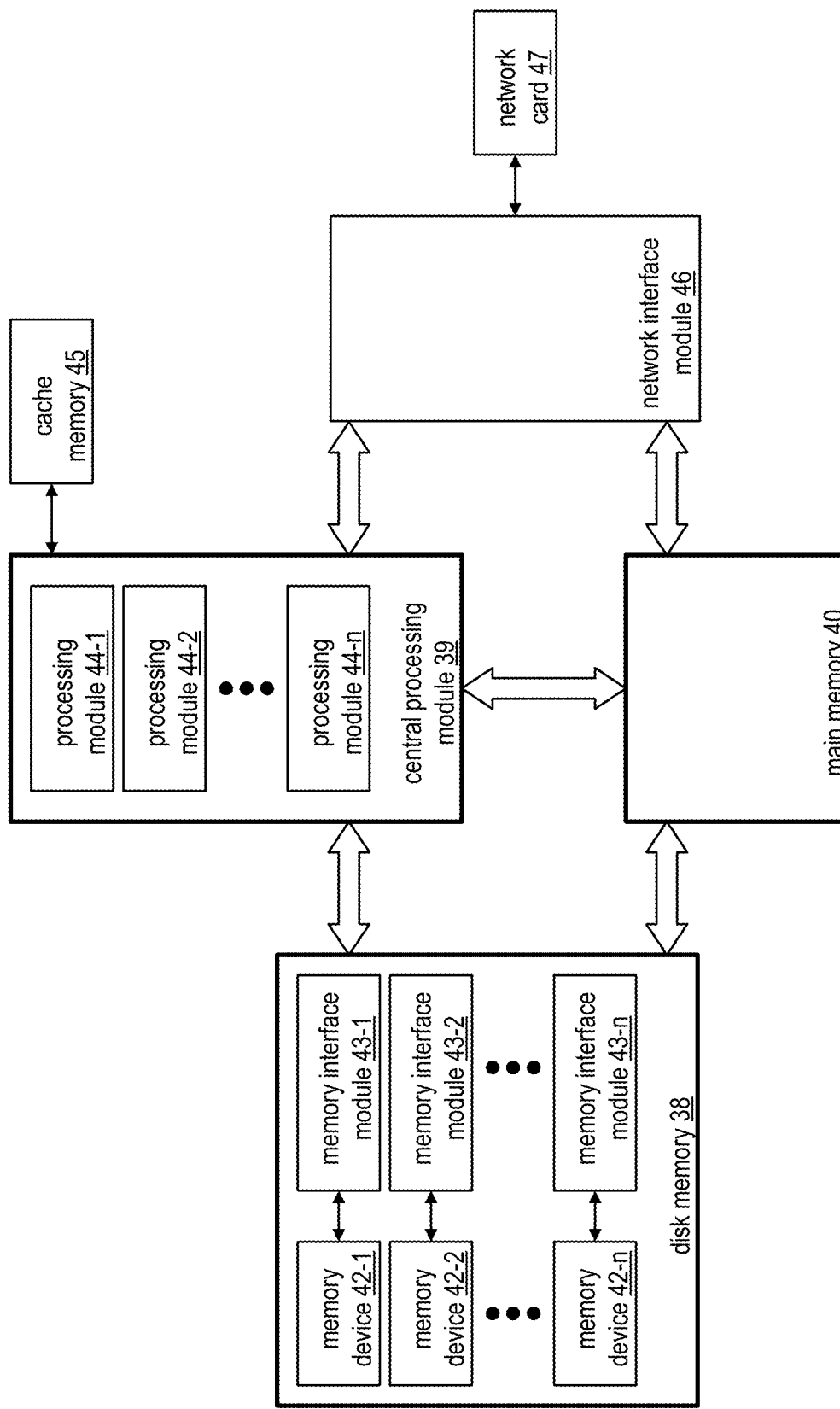
FIG. 11 is a schematic block diagram of an embodiment of a node of a computing device in accordance with the present invention.

FIG. 11 is a schematic block diagram of an embodiment of a node 37 of a computing device 18 that is similar to the node of FIG. 10, with a difference in the network connection. In this embodiment, the node 37 includes a single network interface module 46 and a corresponding network card 47 configuration.

Figure 12:
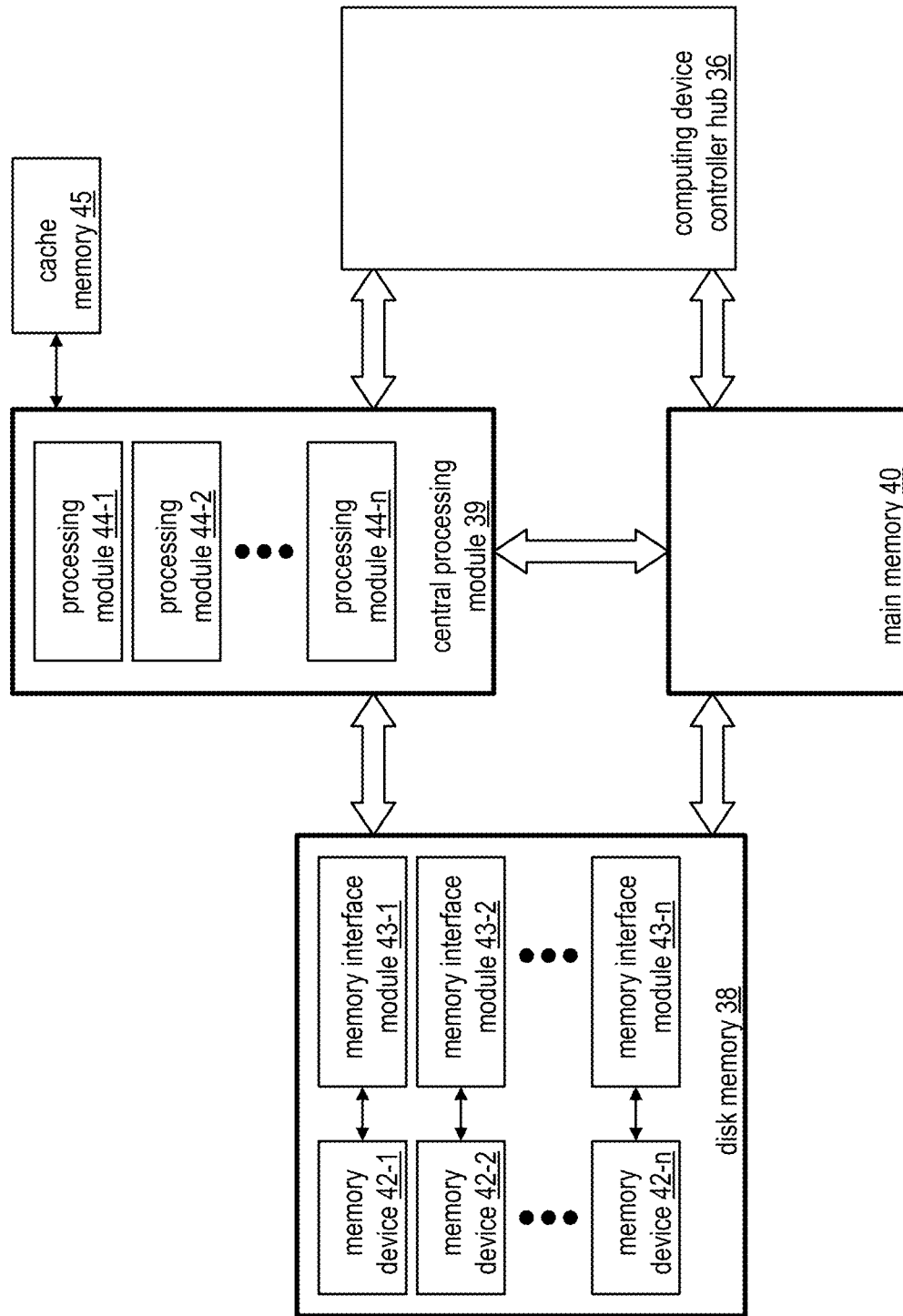
FIG. 12 is a schematic block diagram of an embodiment of a node of a computing device in accordance with the present invention.

FIG. 12 is a schematic block diagram of an embodiment of a node 37 of a computing device 18 that is similar to the node of FIG. 10, with a difference in the network connection. In this embodiment, the node 37 connects to a network connection via the computing device controller hub 36.

Figure 13:
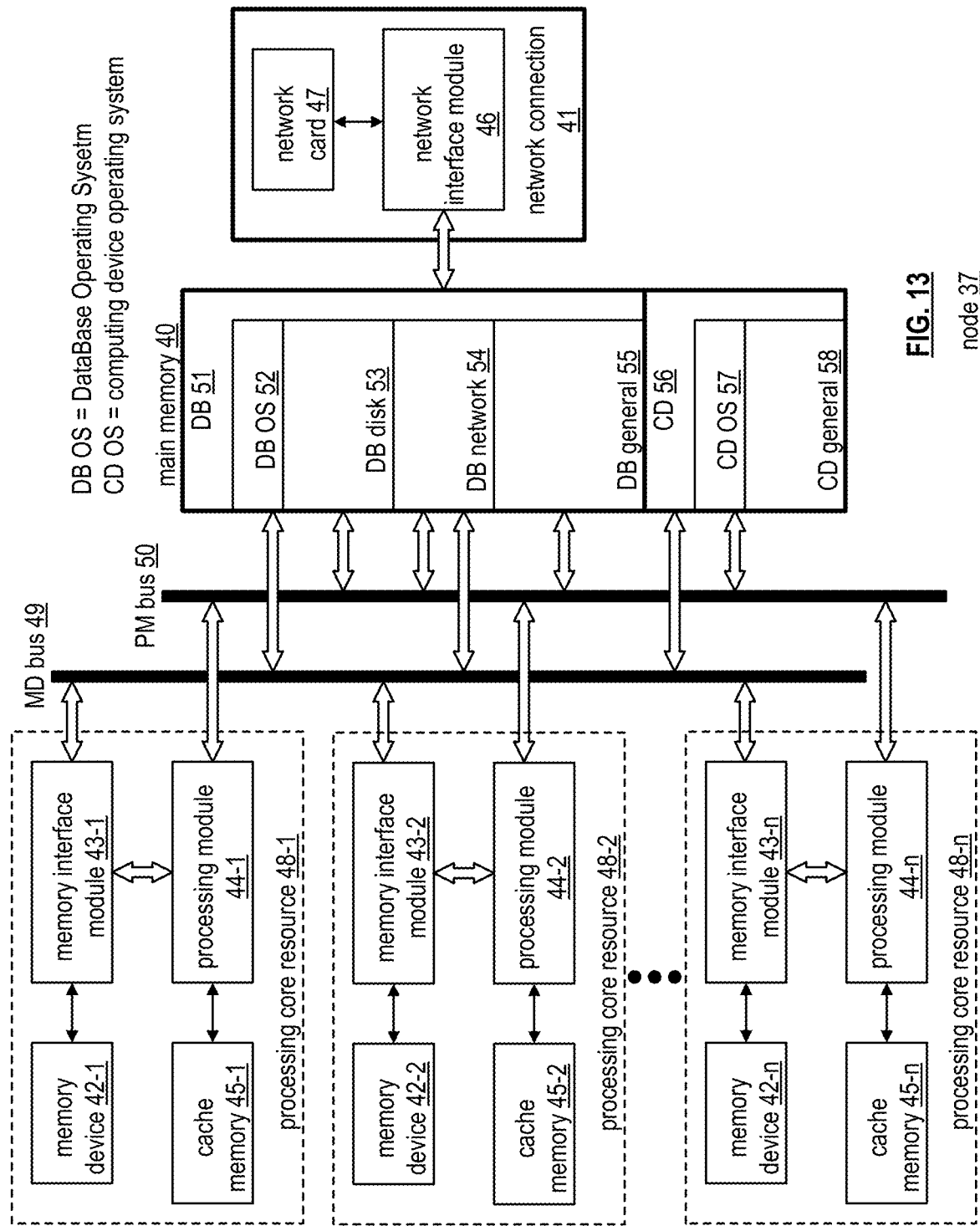
FIG. 13 is a schematic block diagram of an embodiment of a node of a computing device in accordance with the present invention.

FIG. 13 is a schematic block diagram of another embodiment of a node 37 of computing device 18 that includes processing core resources 48-1 through 48-n, a memory device (MD) bus 49, a processing module (PM) bus 50, a main memory 40 and a network connection 41. The network connection 41 includes the network card 47 and the network interface module 46 of FIG. 10. Each processing core resource 48 includes a corresponding processing module 44-1 through 44-n, a corresponding memory interface module 43-1 through 43-n, a corresponding memory device 42-1 through 42-n, and a corresponding cache memory 45-1 through 45-n. In this configuration, each processing core resource can operate independently of the other processing core resources. This further supports increased parallel operation of database functions to further reduce execution time.

The main memory 40 is divided into a computing device (CD) 56 section and a database (DB) 51 section. The database section includes a database operating system (OS) area 52, a disk area 53, a network area 54, and a general area 55. The computing device section includes a computing device operating system (OS) area 57 and a general area 58. Note that each section could include more or less allocated areas for various tasks being executed by the database system.

In general, the database OS 52 allocates main memory for database operations. Once allocated, the computing device OS 57 cannot access that portion of the main memory 40. This supports lock free and independent parallel execution of one or more operations.

Figure 14:
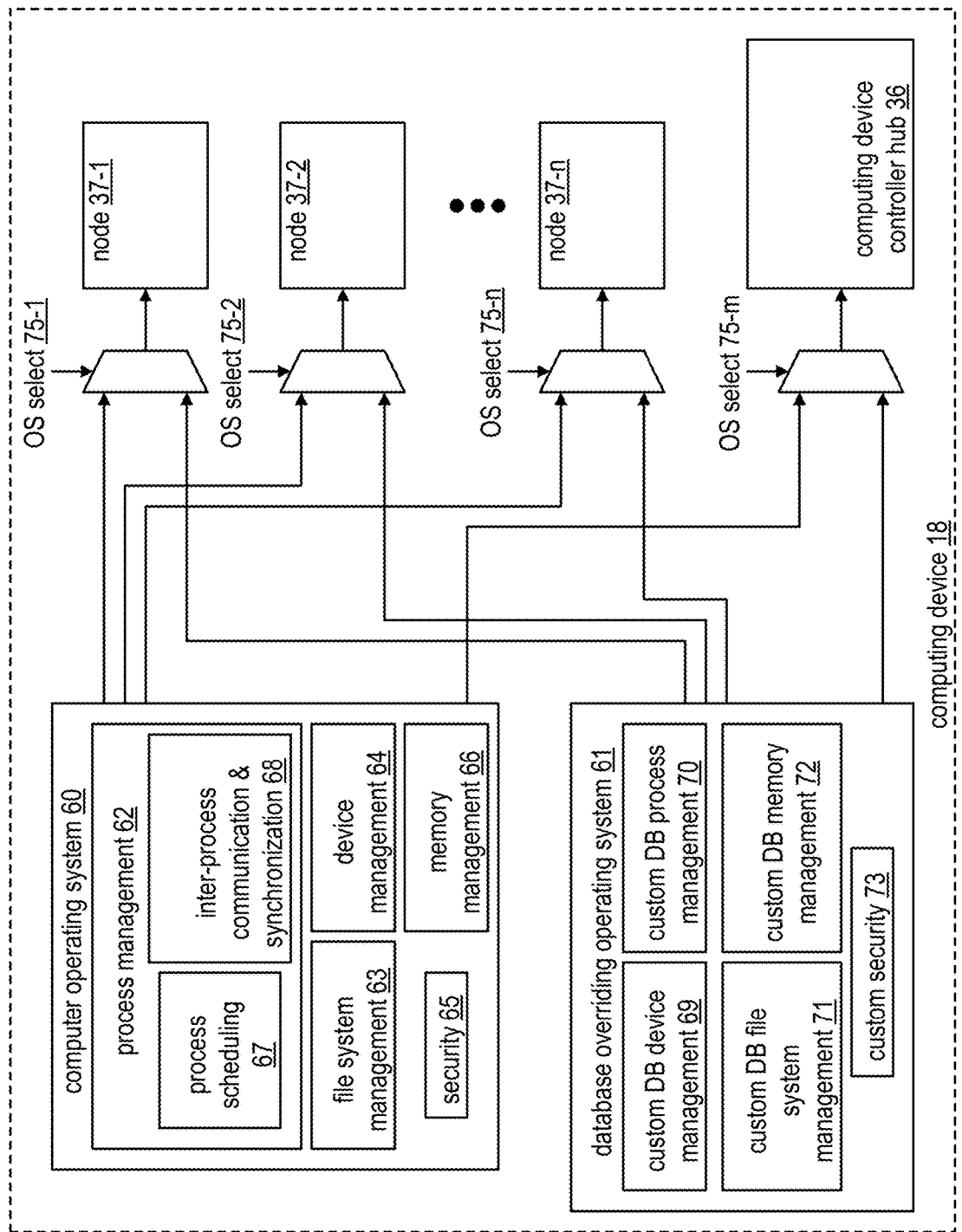
FIG. 14 is a schematic block diagram of an embodiment of operating systems of a computing device in accordance with the present invention.

FIG. 14 is a schematic block diagram of an embodiment of operating systems of a computing device 18. The computing device 18 includes a computer operating system 60 and a database overriding operating system (DB OS) 61. The computer OS 60 includes process management 62, file system management 63, device management 64, memory management 66, and security 65. The processing management 62 generally includes process scheduling 67 and inter-process communication and synchronization 68. In general, the computer OS 60 is a conventional operating system used by a variety of types of computing devices. For example, the computer operating system is a personal computer operating system, a server operating system, a tablet operating system, a cell phone operating system, etc.

The database overriding operating system (DB OS) 61 includes custom DB device management 69, custom DB process management 70 (e.g., process scheduling and/or inter-process communication & synchronization), custom DB file system management 71, custom DB memory management 72, and/or custom security 73. In general, the database overriding OS 61 provides hardware components of a node for more direct access to memory, more direct access to a network connection, improved independency, improved data storage, improved data retrieval, and/or improved data processing than the computing device OS.

In an example of operation, the database overriding OS 61 controls which operating system, or portions thereof, operate with each node and/or computing device controller hub of a computing device (e.g., via OS select 75-1 through 75-*n* when communicating with nodes 37-1 through 37-*n* and via OS select 75-*m* when communicating with the computing device controller hub 36). For example, device management of a node is supported by the computer operating system, while process management, memory management, and file system management are supported by the database overriding operating system. To override the computer OS, the database overriding OS provides instructions to the computer OS regarding which management tasks will be controlled by the database overriding OS. The database overriding OS also provides notification to the computer OS as to which sections of the main memory it is reserving exclusively for one or more database functions, operations, and/or tasks. One or more examples of the database overriding operating system are provided in subsequent figures.

Figure 15:
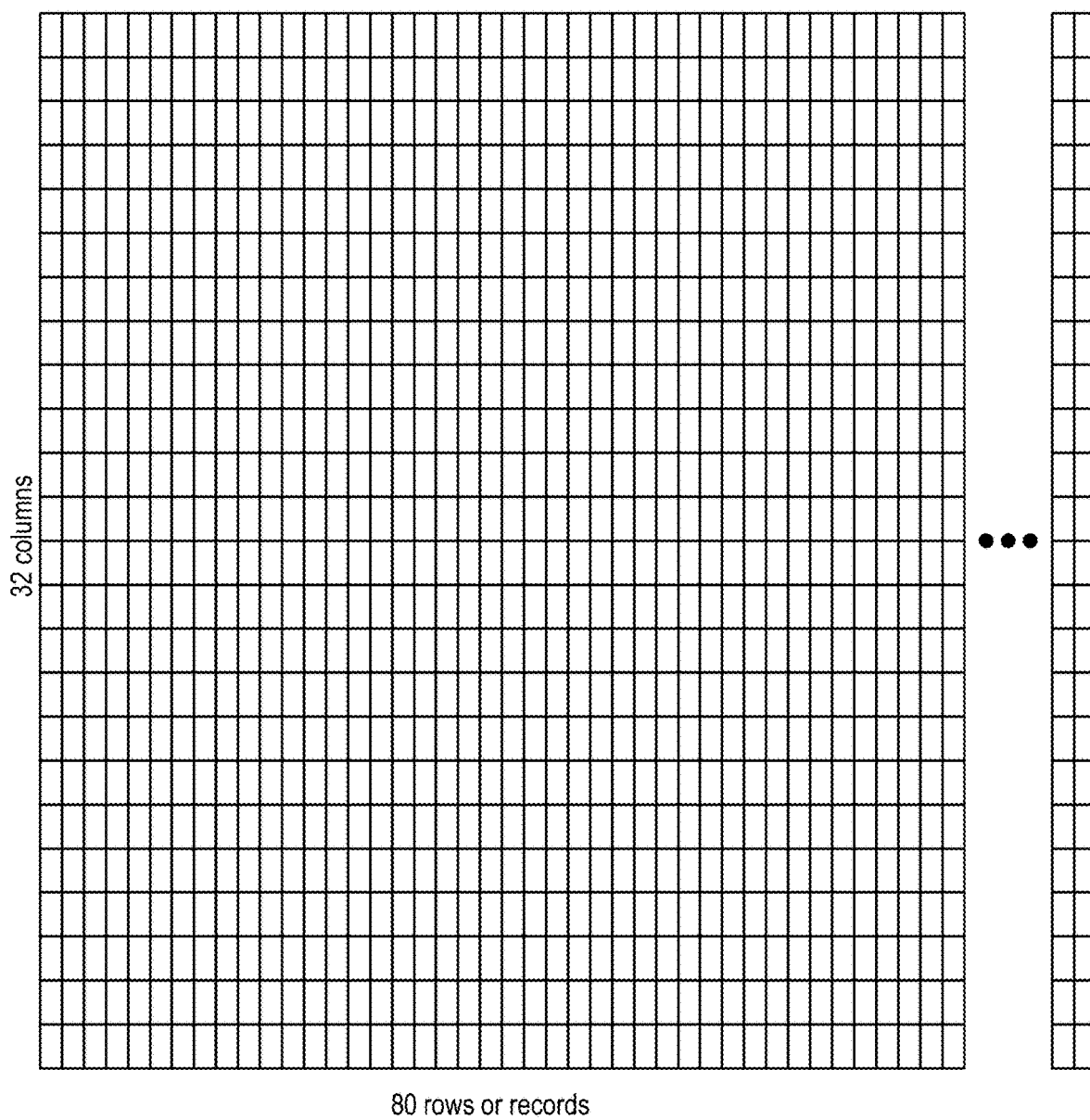

FIGS. 15-23 are schematic block diagrams of an example of processing a table or data set for storage in the database system 10. FIG. 15 illustrates an example of a data set or table that includes 32 columns and 80 rows, or records, that is received by the parallelized data input-subsystem. This is a very small table, but is sufficient for illustrating one or more concepts regarding one or more aspects of a database system. The table is representative of a variety of data ranging from insurance data, to financial data, to employee data, to medical data, and so on.

Figure 16:
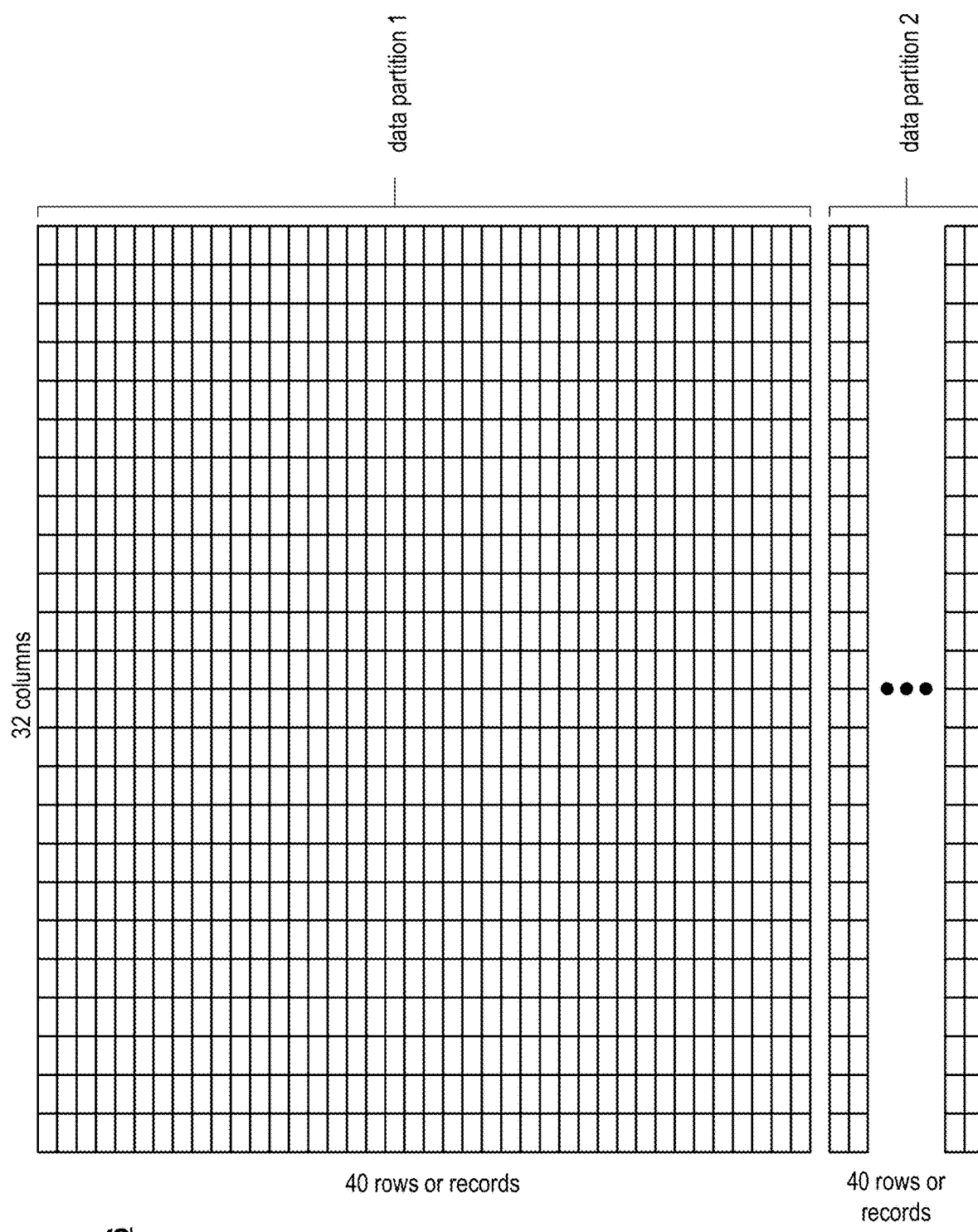

FIG. 16 illustrates an example of the parallelized data input-subsystem dividing the data set into two partitions. Each of the data partitions includes 40 rows, or records, of the data set. In another example, the parallelized data input-subsystem divides the data set into more than two partitions. In yet another example, the parallelized data input-subsystem divides the data set into many partitions and at least two of the partitions have a different number of rows.

Figure 17:
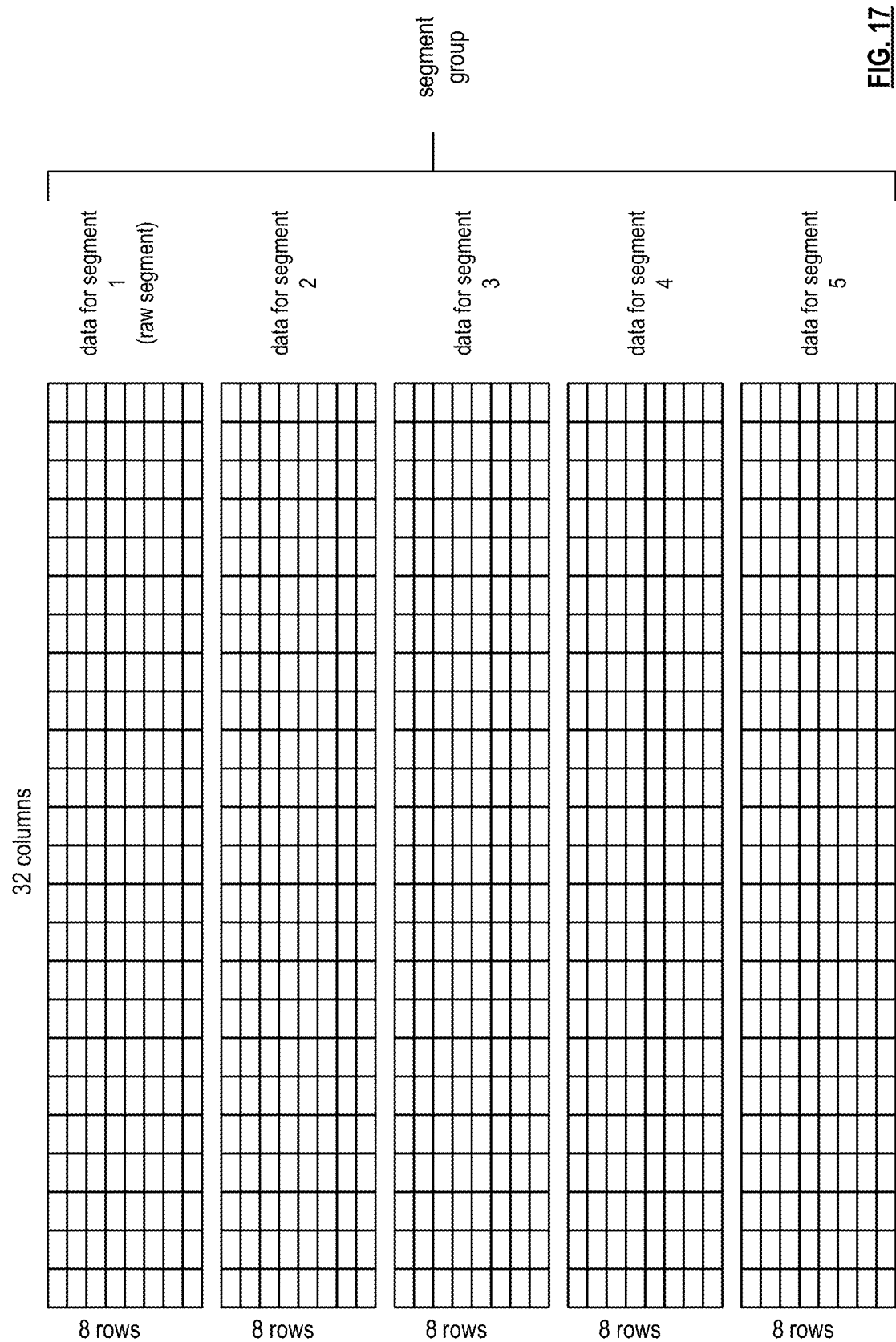

FIG. 17 illustrates an example of the parallelized data input-subsystem dividing a data partition into a plurality of segments to form a segment group. The number of segments in a segment group is a function of the data redundancy encoding. In this example, the data redundancy encoding is single parity encoding from four data pieces; thus, five segments are created. In another example, the data redundancy encoding is a two parity encoding from four data pieces; thus, six segments are created. In yet another example, the data redundancy encoding is single parity encoding from seven data pieces; thus, eight segments are created.

FIG. 18 illustrates an example of data for segment 1 of the segments of FIG. 17. The segment is in a raw form since it has not yet been key column sorted. As shown, segment 1 includes 8 rows and 32 columns. The third column is selected as the key column and the other columns stored various pieces of information for a given row (i.e., a record). The key column may be selected in a variety of ways. For example, the key column is selected based on a type of query (e.g., a query regarding a year, where a data column is selected as the key column). As another example, the key column is selected in accordance with a received input command that identified the key column. As yet another example, the key column is selected as a default key column (e.g., a date column, an ID column, etc.)

As an example, the table is regarding a fleet of vehicles. Each row represents data regarding a unique vehicle. The first column stores a vehicle ID, the second column stores make and model information of the vehicle. The third column stores data as to whether the vehicle is on or off. The remaining columns store data regarding the operation of the vehicle such as mileage, gas level, oil level, maintenance information, routes taken, etc.

With the third column selected as the key column, the other columns of the segment are to be sorted based on the key column. Prior to sorted, the columns are separated to form data slabs. As such, one column is separated out to form one data slab.

FIG. 19 illustrates an example of the parallelized data input-subsystem dividing segment 1 of FIG. 18 into a plurality of data slabs. A data slab is a column of segment 1. In this figure, the data of the data slabs has not been sorted. Once the columns have been separated into data slabs, each data slab is sorted based on the key column. Note that more than one key column may be selected and used to sort the data slabs based on two or more other columns.

FIG. 20 illustrates an example of the parallelized data input-subsystem sorting the each of the data slabs based on the key column. In this example, the data slabs are sorted based on the third column which includes data of "on" or "off". The rows of a data slab are rearranged based on the key column to produce a sorted data slab. Each segment of the segment group is divided into similar data slabs and sorted by the same key column to produce sorted data slabs.

Figure 21:
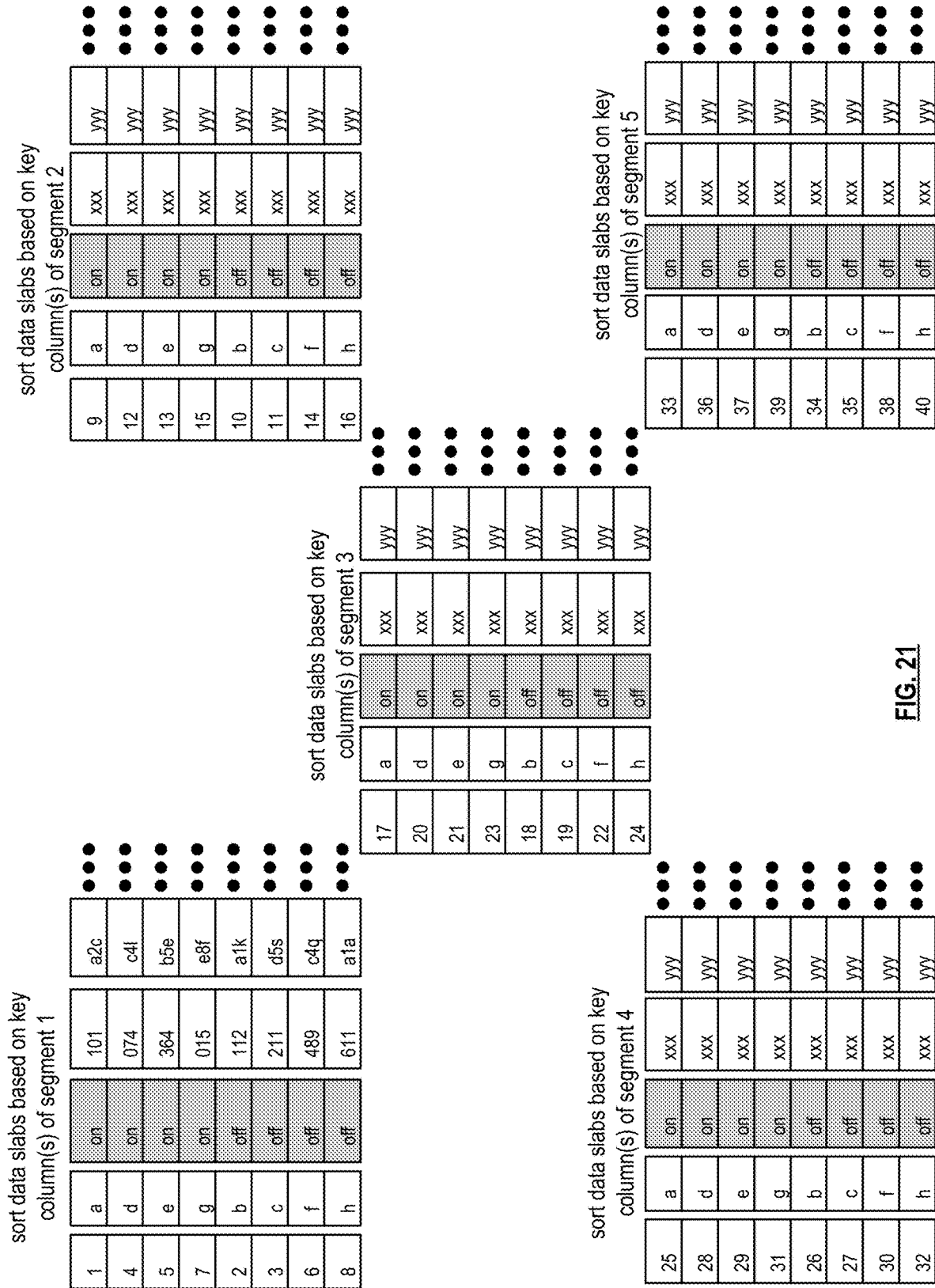

FIG. 21 illustrates an example of each segment of the segment group sorted into sorted data slabs. The similarity of data from segment to segment is for the convenience of illustration. Note that each segment has its own data, which may or may not be similar to the data in the other sections.

Figure 22:
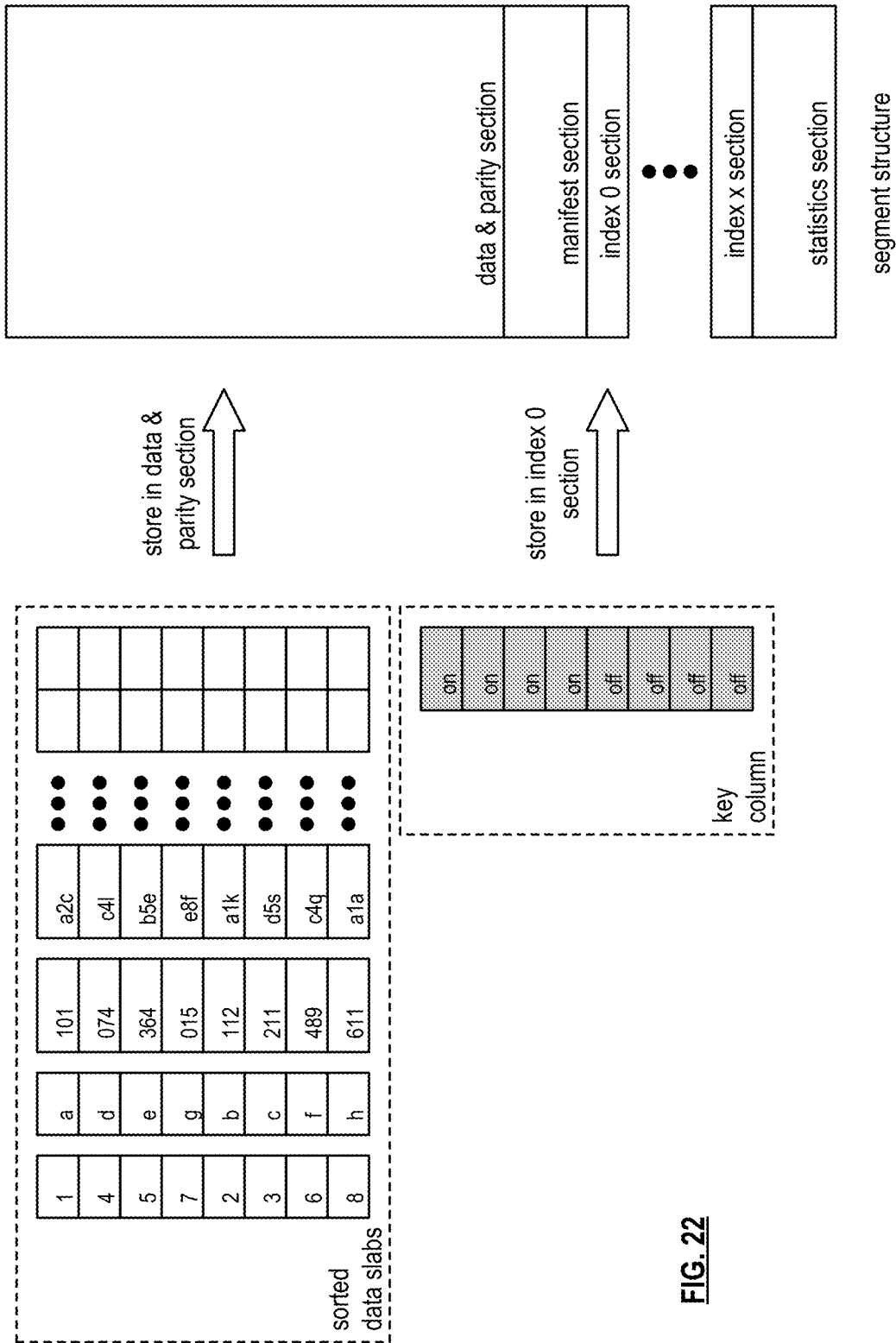

FIG. 22 illustrates an example of a segment structure for a segment of the segment group. The segment structure for a segment includes the data & parity section, a manifest section, one or more index sections, and a statistics section. The segment structure represents a storage mapping of the data (e.g., data slabs and parity data) of a segment and associated data (e.g., metadata, statistics, key column(s), etc.) regarding the data of the segment. The sorted data slabs of FIG. 16 of the segment are stored in the data & parity section of the segment structure. The sorted data slabs are stored in the data & parity section in a compressed format or as raw data (i.e., non-compressed format). Note that a segment structure has a particular data size (e.g., 32 Giga-Bytes) and data is stored within in coding block sizes (e.g., 4 Kilo-Bytes).

Before the sorted data slabs are stored in the data & parity section, or concurrently with storing in the data & parity section, the sorted data slabs of a segment are redundancy encoded. The redundancy encoding may be done in a variety of ways. For example, the redundancy encoding is in accordance with RAID 5, RAID 6, or RAID 10. As another example, the redundancy encoding is a form of forward error encoding (e.g., Reed Solomon, Trellis, etc.). As another example, the redundancy encoding utilizes an erasure coding scheme. An example of redundancy encoding is discussed in greater detail with reference to one or more of FIGS. 29-36.

The manifest section stores metadata regarding the sorted data slabs. The metadata includes one or more of, but is not limited to, descriptive metadata, structural metadata, and/or administrative metadata. Descriptive metadata includes one or more of, but is not limited to, information regarding data such as name, an abstract, keywords, author, etc. Structural metadata includes one or more of, but is not limited to, structural features of the data such as page size, page ordering, formatting, compression information, redundancy encoding information, logical addressing information, physical addressing information, physical to logical addressing information, etc. Administrative metadata includes one or more of, but is not limited to, information that aids in managing data such as file type, access privileges, rights management, preservation of the data, etc.

The key column is stored in an index section. For example, a first key column is stored in index #0. If a second key column exists, it is stored in index #1. As such, for each key column, it is stored in its own index section. Alternatively, one or more key columns are stored in a single index section.

The statistics section stores statistical information regarding the segment and/or the segment group. The statistical information includes one or more of, but is not limited, to number of rows (e.g., data values) in one or more of the sorted data slabs, average length of one or more of the sorted data slabs, average row size (e.g., average size of a data value), etc. The statistical information includes information regarding raw data slabs, raw parity data, and/or compressed data slabs and parity data.

Figure 23:
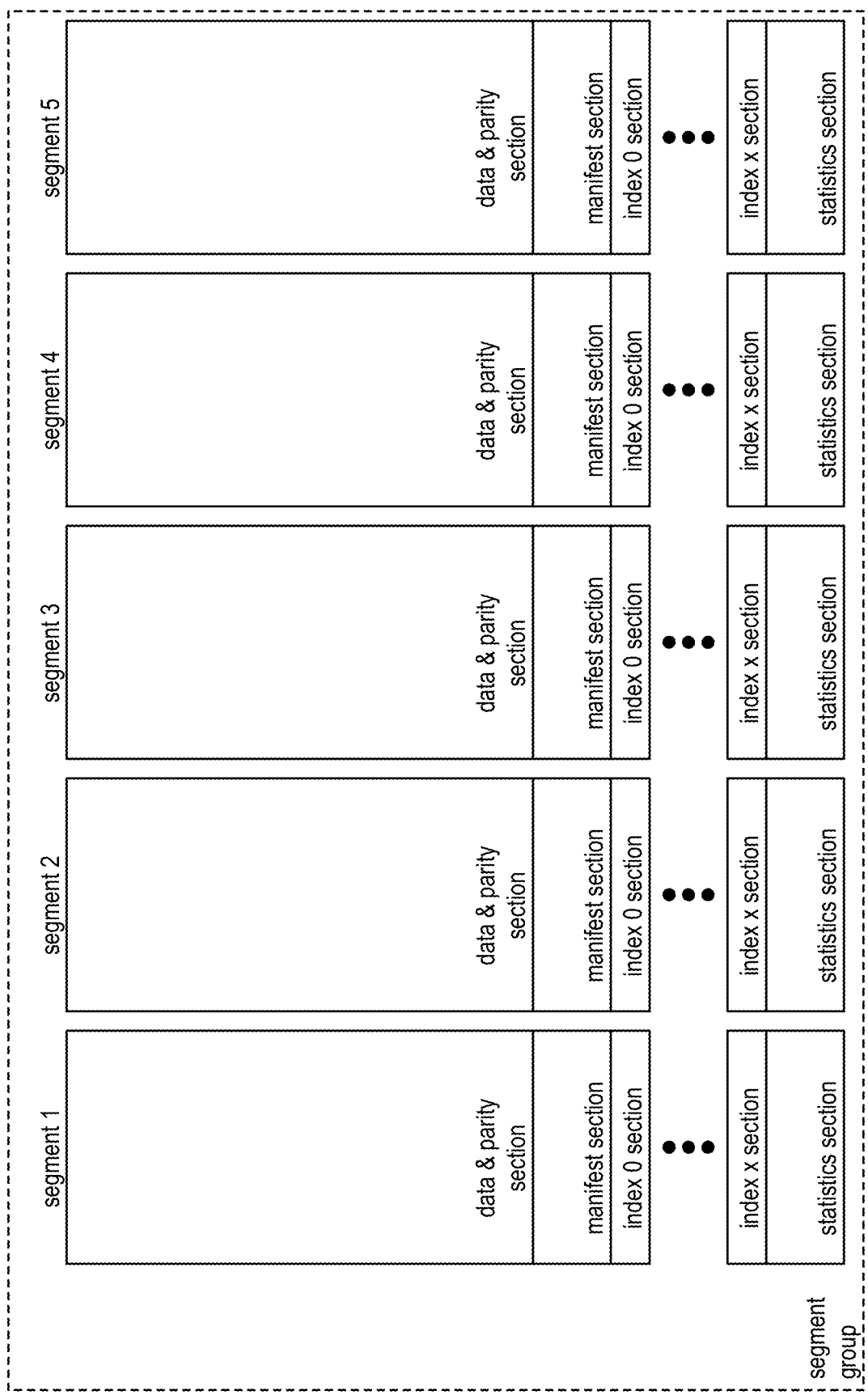

FIG. 23 illustrates the segment structures for each segment of a segment group having five segments. Each segment includes a data & parity section, a manifest section, one or more index sections, and a statistic section. Each segment is targeted for storage in a different computing device of a storage cluster. The number of segments in the segment group corresponds to the number of computing devices in a storage cluster. In this example, there are five computing devices in a storage cluster. Other examples include more or less than five computing devices in a storage cluster.

Figure 24A:
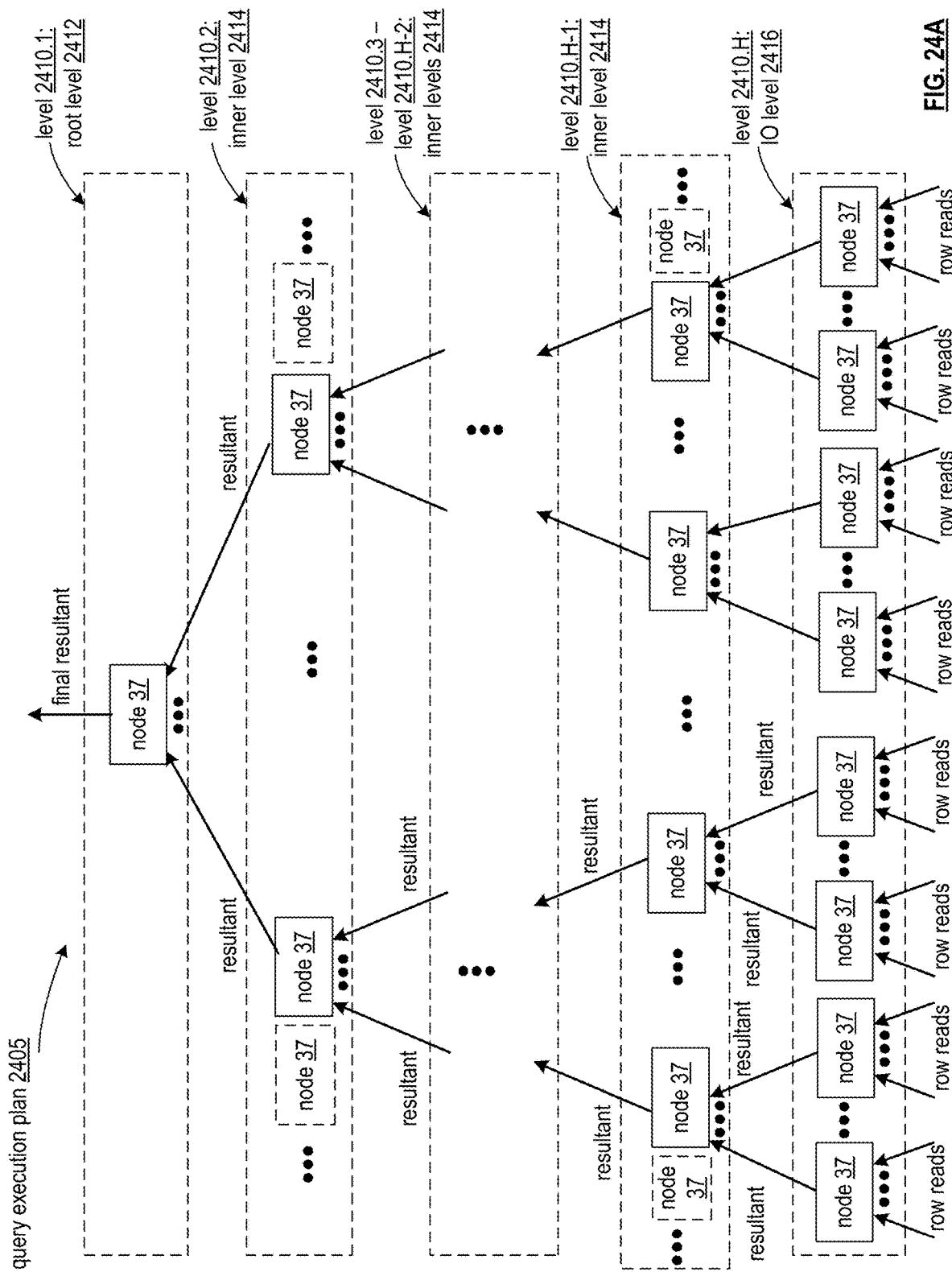
FIG. 24A is a schematic block diagram of a query execution plan implemented via a plurality of nodes in accordance with various embodiments of the present invention.

FIG. 24A illustrates an example of a query execution plan 2405 implemented by the database system 10 to execute one or more queries by utilizing a plurality of nodes 37. Each node 37 can be utilized to implement some or all of the plurality of nodes 37 of some or all computing devices 18-1-18-n, for example, of the of the parallelized data store, retrieve, and/or process sub-system 12, and/or of the parallelized query and results sub-system 13. The query execution plan can include a plurality of levels 2410. In this example, a plurality of H levels in a corresponding tree structure of the query execution plan 2405 are included. The plurality of levels can include a top, root level 2412; a bottom, IO level 2416, and one or more inner levels 2414. In some embodiments, there is exactly one inner level 2414, resulting in a tree of exactly three levels 2410.1, 2410.2, and 2410.3, where level 2410.H corresponds to level 2410.3. In such embodiments, level 2410.2 is the same as level 2410.H-1, and there are no other inner levels 2410.3-2410.H-2. Alternatively, any number of multiple inner levels 2414 can be implemented to result in a tree with more than three levels.

This illustration of query execution plan 2405 illustrates the flow of execution of a given query by utilizing a subset of nodes across some or all of the levels 2410. In this illustration, nodes 37 with a solid outline are nodes involved in executing a given query. Nodes 37 with a dashed outline are other possible nodes that are not involved in executing the given query, but could be involved in executing other queries in accordance with their level of the query execution plan in which they are included.

Each of the nodes of IO level 2416 can be operable to, for a given query, perform the necessary row reads for gathering corresponding rows of the query. These row reads can correspond to the segment retrieval to read some or all of the rows of retrieved segments determined to be required for the given query. Thus, the nodes 37 in level 2416 can include any nodes 37 operable to retrieve segments for query execution from its own storage or from storage by one or more other nodes; to recover segment for query execution via other segments in the same segment grouping by utilizing the redundancy error encoding scheme; and/or to determine which exact set of segments is assigned to the node for retrieval to ensure queries are executed correctly.

IO level 2416 can include all nodes in a given storage cluster 35 and/or can include some or all nodes in multiple storage clusters 35, such as all nodes in a subset of the storage clusters 35-1-35-z and/or all nodes in all storage clusters 35-1-35-z. For example, all nodes 37 and/or all currently available nodes 37 of the database system 10 can be included in level 2416. As another example, IO level 2416 can include a proper subset of nodes in the database system, such as some or all nodes that have access to stored segments and/or that are included in a segment set 35. In some cases, nodes 37 that do not store segments included in segment sets, that do not have access to stored segments, and/or that are not operable to perform row reads are not included at the IO level, but can be included at one or more inner levels 2414 and/or root level 2412.

The query executions discussed herein by nodes in accordance with executing queries at level 2416 can include retrieval of segments; extracting some or all necessary rows from the segments with some or all necessary columns; and sending these retrieved rows to a node at the next level 2410.H-1 as the query resultant generated by the node 37. For each node 37 at IO level 2416, the set of raw rows retrieved by the node 37 can be distinct from rows retrieved from all other nodes, for example, to ensure correct query execution. The total set of rows and/or corresponding columns retrieved by nodes 37 in the IO level for a given query can be dictated based on the domain of the given query, such as one or more tables indicated in one or more SELECT statements of the query, and/or can otherwise include all data blocks that are necessary to execute the given query.

Each inner level 2414 can include a subset of nodes 37 in the database system 10. Each level 2414 can include a distinct set of nodes 37 and/or some or more levels 2414 can include overlapping sets of nodes 37. The nodes 37 at inner levels are implemented, for each given query, to execute queries in conjunction with operators for the given query. For example, a query operator execution flow can be generated for a given incoming query, where an ordering of execution of its operators is determined, and this ordering is utilized to assign one or more operators of the query operator execution flow to each node in a given inner level 2414 for execution. For example, each node at a same inner level can be operable to execute a same set of operators for a given query, in response to being selected to execute the given query, upon incoming resultants generated by nodes at a directly lower level to generate its own resultants sent to a next higher level. In particular, each node at a same inner level can be operable to execute a same portion of a same query operator execution flow for a given query. In cases where there is exactly one inner level, each node selected to execute a query at a given inner level performs some or all of the given query's operators upon the raw rows received as resultants from the nodes at the IO level, such as the entire query operator execution flow and/or the portion of the query operator execution flow performed upon data that has already been read from storage by nodes at the IO level. In some cases, some operators beyond row reads are also performed by the nodes at the IO level. Each node at a given inner level 2414 can further perform a gather function to collect, union, and/or aggregate resultants sent from a previous level, for example, in accordance with one or more corresponding operators of the given query.

The root level 2412 can include exactly one node for a given query that gathers resultants from every node at the top-most inner level 2414. The node 37 at root level 2412 can perform additional query operators of the query and/or can otherwise collect, aggregate, and/or union the resultants from the top-most inner level 2414 to generate the final resultant of the query, which includes the resulting set of rows and/or one or more aggregated values, in accordance with the query, based on being performed on all rows required by the query. The root level node can be selected from a plurality of possible root level nodes, where different root nodes are selected for different queries. Alternatively, the same root node can be selected for all queries.

As depicted in FIG. 24A, resultants are sent by nodes upstream with respect to the tree structure of the query execution plan as they are generated, where the root node generates a final resultant of the query. While not depicted in FIG. 24A, nodes at a same level can share data and/or send resultants to each other, for example, in accordance with operators of the query at this same level dictating that data is sent between nodes.

In some cases, the IO level 2416 always includes the same set of nodes 37, such as a full set of nodes and/or all nodes that are in a storage cluster 35 that stores data required to process incoming queries. In some cases, the lowest inner level corresponding to level 2410.H-1 includes at least one node from the IO level 2416 in the possible set of nodes. In such cases, while each selected node in level 2410.H-1 is depicted to process resultants sent from other nodes 37 in FIG. 24A, each selected node in level 2410.H-1 that also operates as a node at the IO level further performs its own row reads in accordance with its query execution at the IO level, and gathers the row reads received as resultants from other nodes at the IO level with its own row reads for processing via operators of the query. One or more inner levels 2414 can also include nodes that are not included in IO level 2416, such as nodes 37 that do not have access to stored segments and/or that are otherwise not operable and/or selected to perform row reads for some or all queries.

The node 37 at root level 2412 can be fixed for all queries, where the set of possible nodes at root level 2412 includes only one node that executes all queries at the root level of the query execution plan. Alternatively, the root level 2412 can similarly include a set of possible nodes, where one node selected from this set of possible nodes for each query and where different nodes are selected from the set of possible nodes for different queries. In such cases, the nodes at inner level 2410.2 determine which of the set of possible root nodes to send their resultant to. In some cases, the single node or set of possible nodes at root level 2412 is a proper subset of the set of nodes at inner level 2410.2, and/or is a proper subset of the set of nodes at the IO level 2416. In cases where the root node is included at inner level 2410.2, the root node generates its own resultant in accordance with inner level 2410.2, for example, based on multiple resultants received from nodes at level 2410.3, and gathers its resultant that was generated in accordance with inner level 2410.2 with other resultants received from nodes at inner level 2410.2 to ultimately generate the final resultant in accordance with operating as the root level node.

In some cases where nodes are selected from a set of possible nodes at a given level for processing a given query, the selected node must have been selected for processing this query at each lower level of the query execution tree. For example, if a particular node is selected to process a node at a particular inner level, it must have processed the query to generate resultants at every lower inner level and the IO level. In such cases, each selected node at a particular level will always use its own resultant that was generated for processing at the previous, lower level, and will gather this resultant with other resultants received from other child nodes at the previous, lower level. Alternatively, nodes that have not yet processed a given query can be selected for processing at a particular level, where all resultants being gathered are therefore received from a set of child nodes that do not include the selected node.

The configuration of query execution plan 2405 for a given query can be determined in a downstream fashion, for example, where the tree is formed from the root downwards. Nodes at corresponding levels are determined from configuration information received from corresponding parent nodes and/or nodes at higher levels, and can each send configuration information to other nodes, such as their own child nodes, at lower levels until the lowest level is reached. This configuration information can include assignment of a particular subset of operators of the set of query operators that each level and/or each node will perform for the query. The execution of the query is performed upstream in accordance with the determined configuration, where IO reads are performed first, and resultants are forwarded upwards until the root node ultimately generates the query result.

Figure 24B:
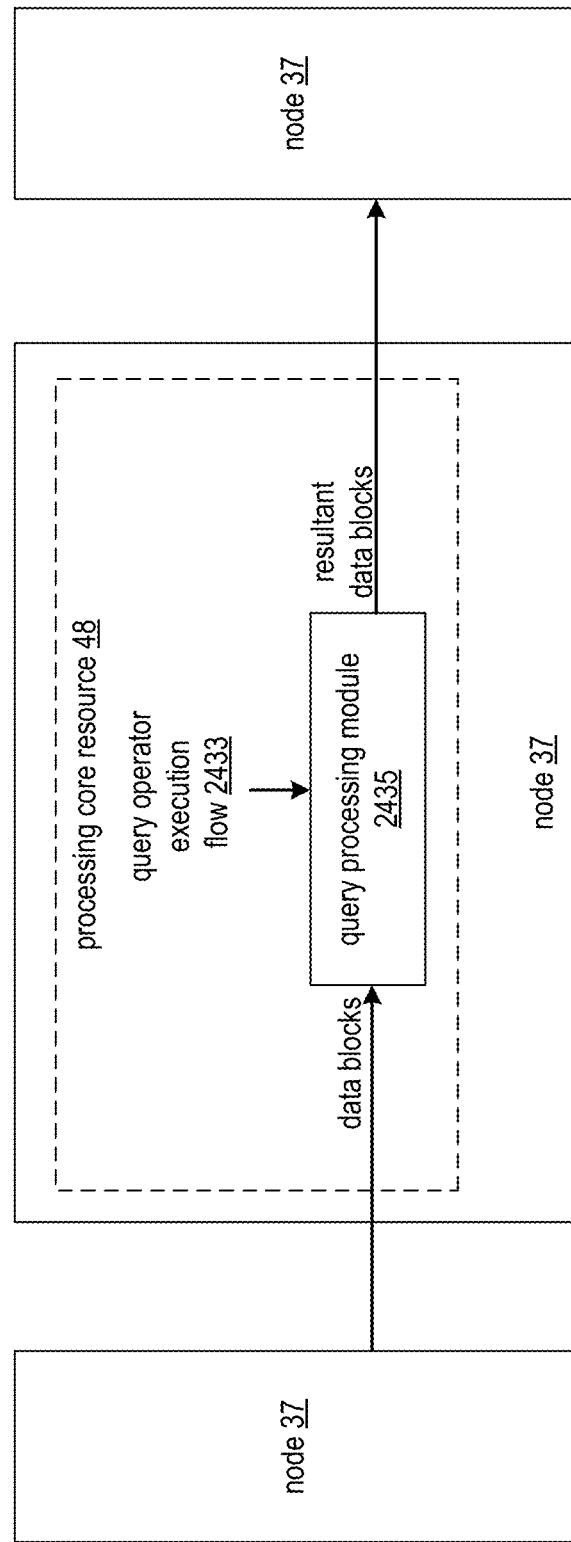
FIGS. 24B-24D are schematic block diagrams of embodiments of a node that implements a query processing module in accordance with various embodiments of the present invention.

FIG. 24B illustrates an embodiment of a node 37 executing a query in accordance with the query execution plan 2405 by implementing a query processing module 2435. The query processing module 2435 can operable to execute a query operator execution flow 2433 determined by the node 37, where the query operator execution flow 2433 corresponds to the entirety of processing of the query upon incoming data assigned to the corresponding node 37 in accordance with its role in the query execution plan 2405. This embodiment of node 37 that utilizes a query processing module 2435 can be utilized to implement some or all of the plurality of nodes 37 of some or all computing devices 18-1-18-n, for example, of the of the parallelized data store, retrieve, and/or process sub-system 12, and/or of the parallelized query and results sub-system 13.

As used herein, execution of a particular query by a particular node 37 can correspond to the execution of the portion of the particular query assigned to the particular node in accordance with full execution of the query by the plurality of nodes involved in the query execution plan 2405. This portion of the particular query assigned to a particular node can correspond to execution plurality of operators indicated by a query operator execution flow 2433. In particular, the execution of the query for a node 37 at an inner level 2414 and/or root level 2412 corresponds to generating a resultant by processing all incoming resultants received from nodes at a lower level of the query execution plan 2405 that send their own resultants to the node 37. The execution of the query for a node 37 at the IO level corresponds to generating all resultant data blocks by retrieving and/or recovering all segments assigned to the node 37.

Thus, as used herein, a node 37's full execution of a given query corresponds to only a portion of the query's execution across all nodes in the query execution plan 2405. In particular, a resultant generated by an inner level node 37's execution of a given query may correspond to only a portion of the entire query result, such as a subset of rows in a final result set, where other nodes generate their own resultants to generate other portions of the full resultant of the query. In such embodiments, a plurality of nodes at this inner level can fully execute queries on different portions of the query domain independently in parallel by utilizing the same query operator execution flow 2433. Resultants generated by each of the plurality of nodes at this inner level 2414 can be gathered into a final result of the query, for example, by the node 37 at root level 2412 if this inner level is the top-most inner level 2414 or the only inner level 2414. As another example, resultants generated by each of the plurality of nodes at this inner level 2414 can be further processed via additional operators of a query operator execution flow 2433 being implemented by another node at a consecutively higher inner level 2414 of the query execution plan 2405, where all nodes at this consecutively higher inner level 2414 all execute their own same query operator execution flow 2433.

As discussed in further detail herein, the resultant generated by a node 37 can include a plurality of resultant data blocks generated via a plurality of partial query executions. As used herein, a partial query execution performed by a node corresponds to generating a resultant based on only a subset of the query input received by the node 37. In particular, the query input corresponds to all resultants generated by one or more nodes at a lower level of the query execution plan that send their resultants to the node. However, this query input can correspond to a plurality of input data blocks received over time, for example, in conjunction with the one or more nodes at the lower level processing their own input data blocks received over time to generate their resultant data blocks sent to the node over time. Thus, the resultant generated by a node's full execution of a query can include a plurality of resultant data blocks, where each resultant data block is generated by processing a subset of all input data blocks as a partial query execution upon the subset of all data blocks via the query operator execution flow 2433.

As illustrated in FIG. 24B, the query processing module 2435 can be implemented by a single processing core resource 48 of the node 37. In such embodiments, each one of the processing core resources 48-1-48-n of a same node 37 can be executing at least one query concurrently via their own query processing module 2435, where a single node 37 implements each of set of operator processing modules 2435-1-2435-n via a corresponding one of the set of processing core resources 48-1-48-n. A plurality of queries can be concurrently executed by the node 37, where each of its processing core resources 48 can each independently execute at least one query within a same temporal period by utilizing a corresponding at least one query operator execution flow 2433 to generate at least one query resultant corresponding to the at least one query.

Figure 25A:
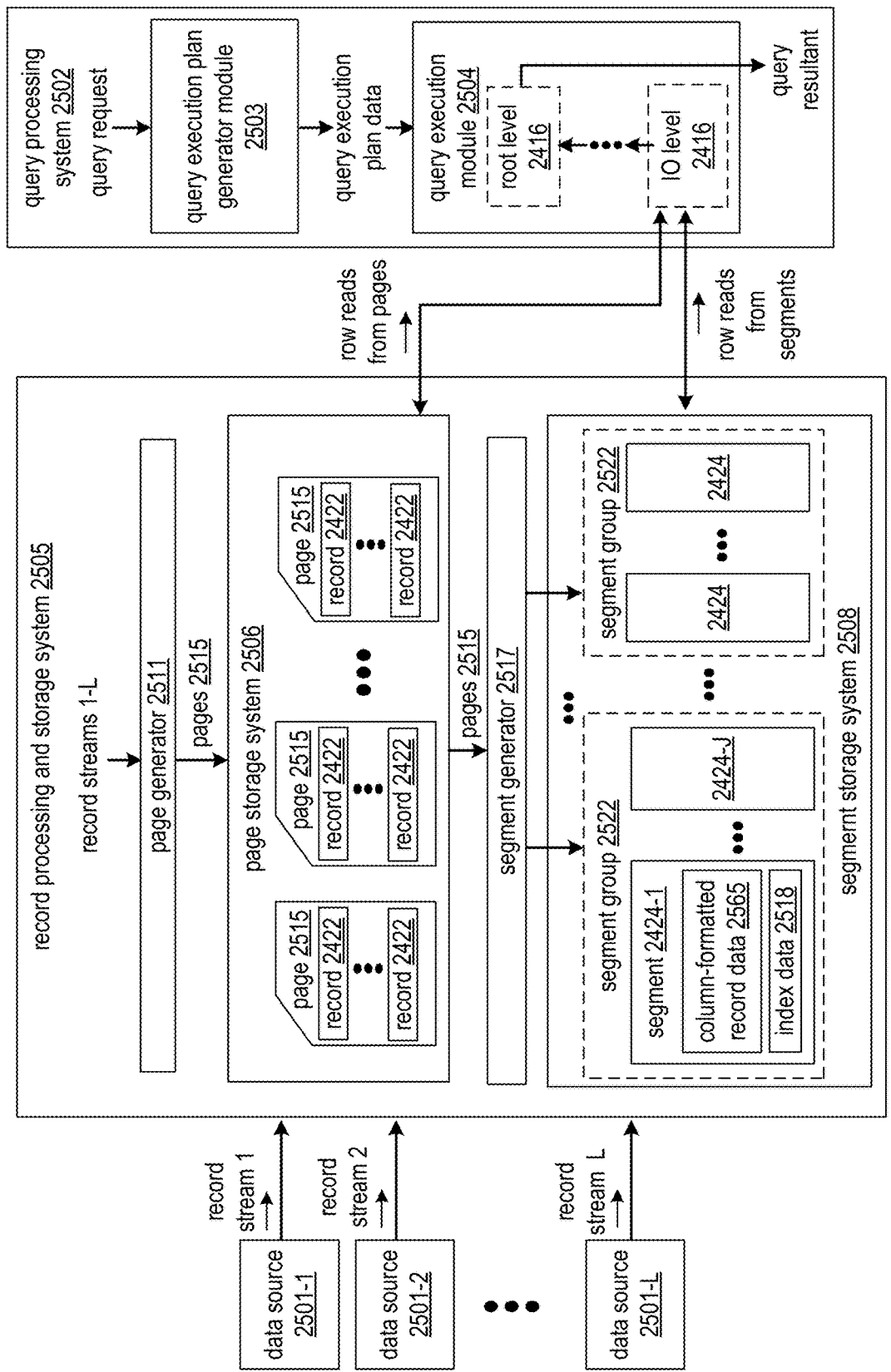
FIGS. 25A-25B are schematic block diagrams of embodiments of a database system that includes a record processing and storage system in accordance with various embodiments of the present invention.
Figure 25B:
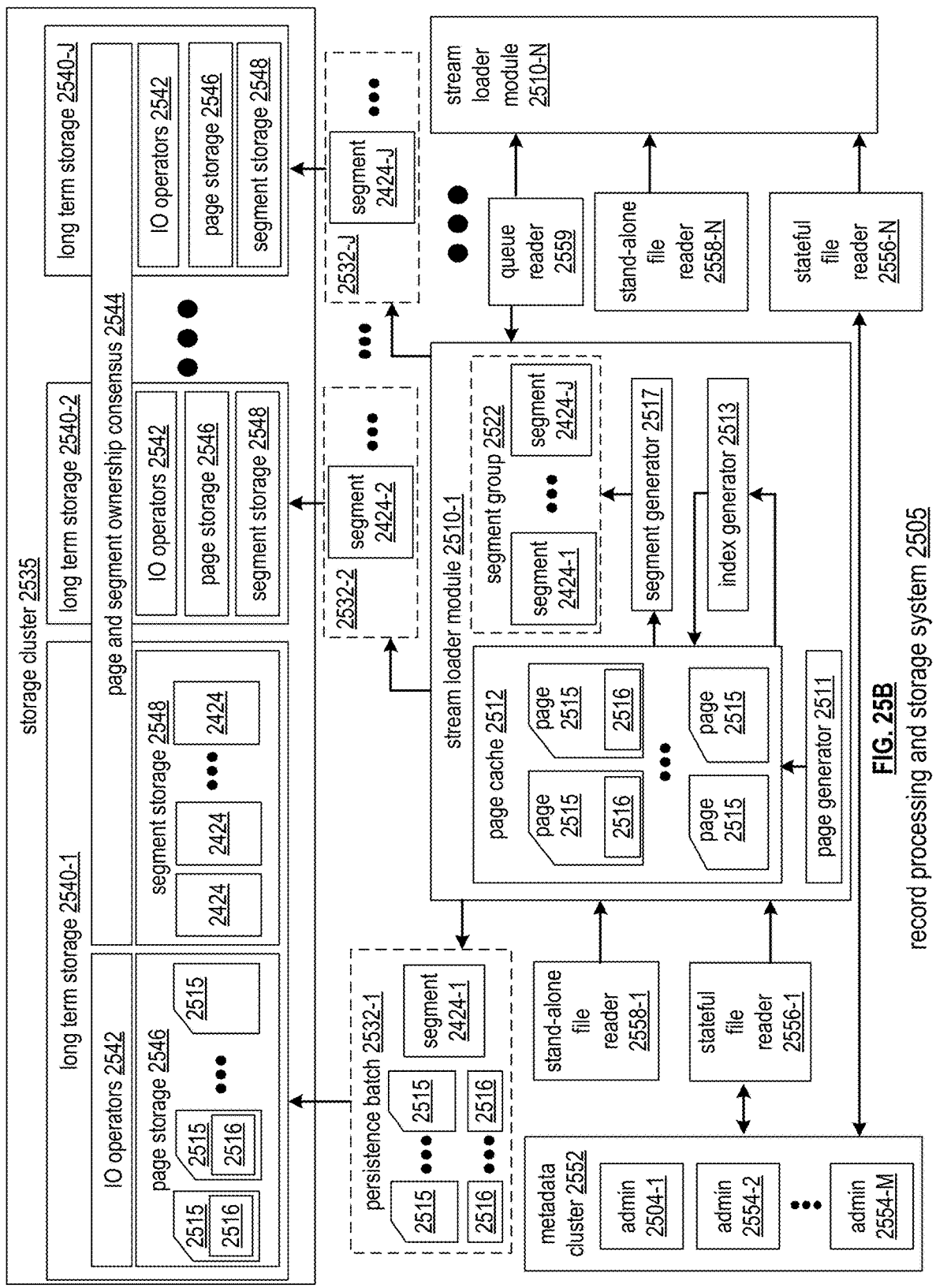
Figure 25C:
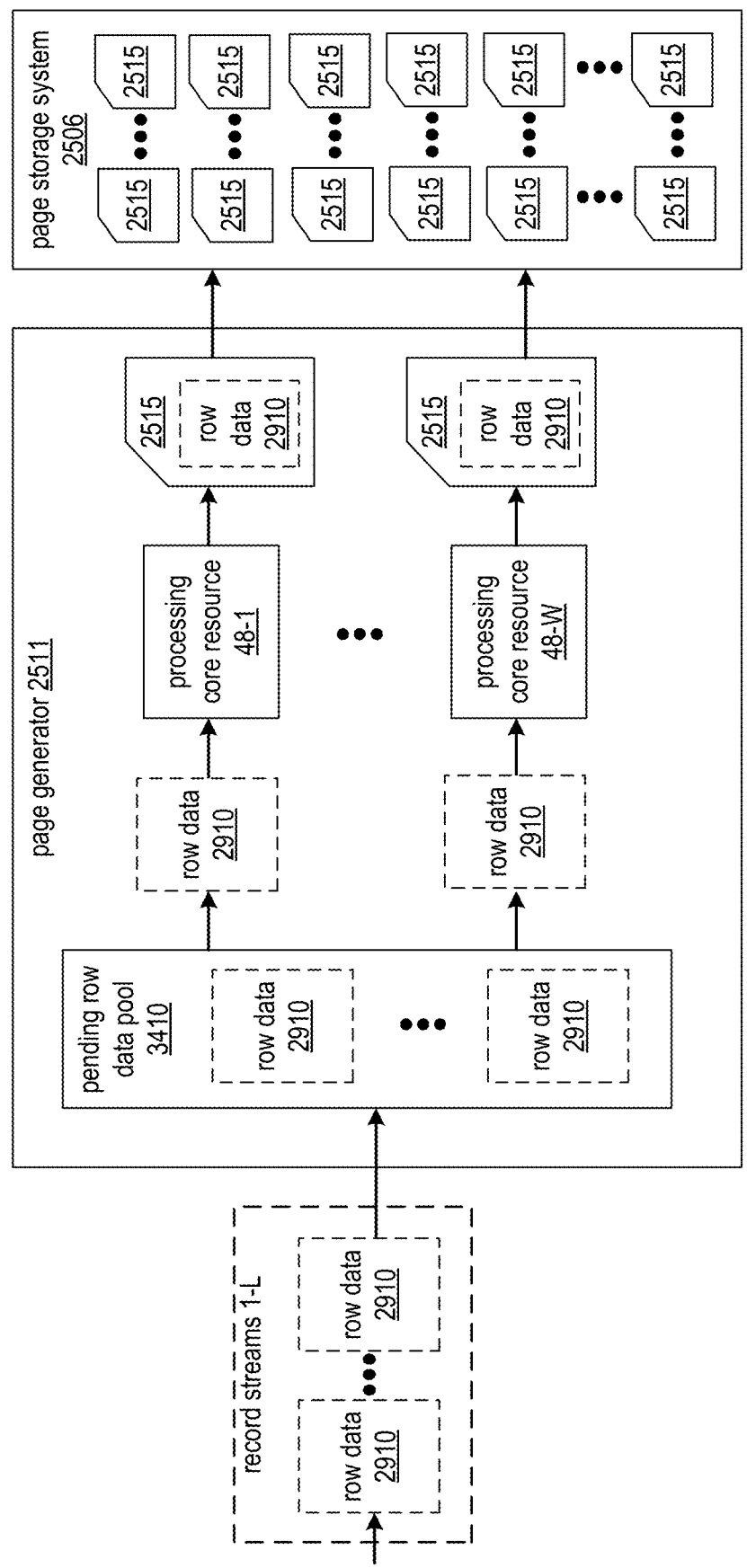
FIG. 25C is a is a schematic block diagrams of an embodiment of a page generator in accordance with various embodiments of the present invention.

FIG. 25C illustrates a particular example of a node 37 at the IO level 2416 of the query execution plan 2405 of FIG. 24A. A node 37 can utilize its own memory resources, such as some or all of its disk memory 38 and/or some or all of its main memory 40 to implement at least one memory drive 2425 that stores a plurality of segments 2424. Memory drives 2425 of a node 37 can be implemented, for example, by utilizing disk memory 38 and/or main memory 40. In particular, a plurality of distinct memory drives 2425 of a node 37 can be implemented via the plurality of memory devices 42-1-42-n of the node 37's disk memory 38.

Each segment 2424 stored in memory drive 2425 can be generated as discussed previously in conjunction with FIGS. 15-23. A plurality of records 2422 can be included in and/or extractable from the segment, for example, where the plurality of records 2422 of a segment 2424 correspond to a plurality of rows designated for the particular segment 2424 prior to applying the redundancy storage coding scheme as illustrated in FIG. 17. The records 2422 can be included in data of segment 2424, for example, in accordance with a column-format and/or another structured format. Each segments 2424 can further include parity data 2426 as discussed previously to enable other segments 2424 in the same segment group to be recovered via applying a decoding function associated with the redundancy storage coding scheme, such as a RAID scheme and/or erasure coding scheme, that was utilized to generate the set of segments of a segment group.

Thus, in addition to performing the first stage of query execution by being responsible for row reads, nodes 37 can be utilized for database storage, and can each locally store a set of segments in its own memory drives 2425. In some cases, a node 37 can be responsible for retrieval of only the records stored in its own one or more memory drives 2425 as one or more segments 2424. Executions of queries corresponding to retrieval of records stored by a particular node 37 can be assigned to that particular node 37. In other embodiments, a node 37 does not use its own resources to store segments. A node 37 can access its assigned records for retrieval via memory resources of another node 37 and/or via other access to memory drives 2425, for example, by utilizing system communication resources 14.

The query processing module 2435 of the node 37 can be utilized to read the assigned by first retrieving or otherwise accessing the corresponding redundancy-coded segments 2424 that include the assigned records its one or more memory drives 2425. Query processing module 2435 can include a record extraction module 2438 that is then utilized to extract or otherwise read some or all records from these segments 2424 accessed in memory drives 2425, for example, where record data of the segment is segregated from other information such as parity data included in the segment and/or where this data containing the records is converted into row-formatted records from the column-formatted row data stored by the segment. Once the necessary records of a query are read by the node 37, the node can further utilize query processing module 2435 to send the retrieved records all at once, or in a stream as they are retrieved from memory drives 2425, as data blocks to the next node 37 in the query execution plan 2405 via system communication resources 14 or other communication channels.

Figure 24C:
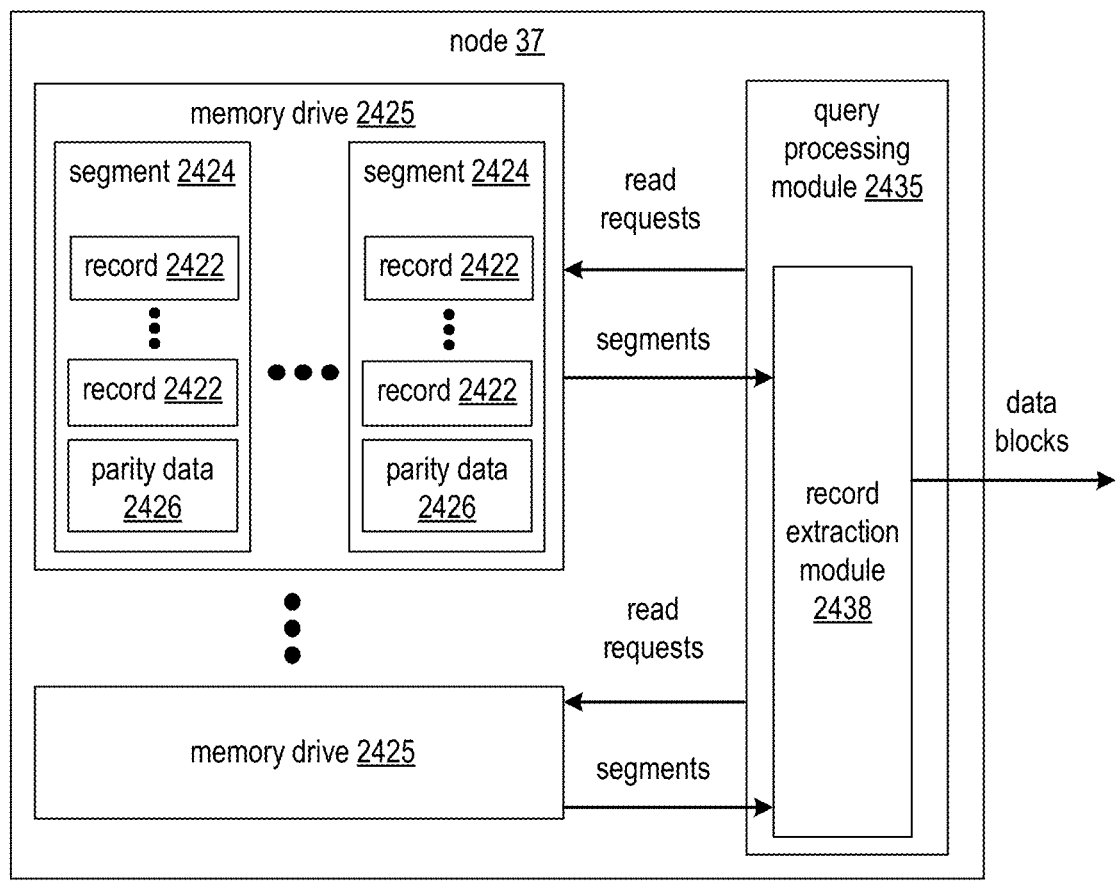
Figure 24D:
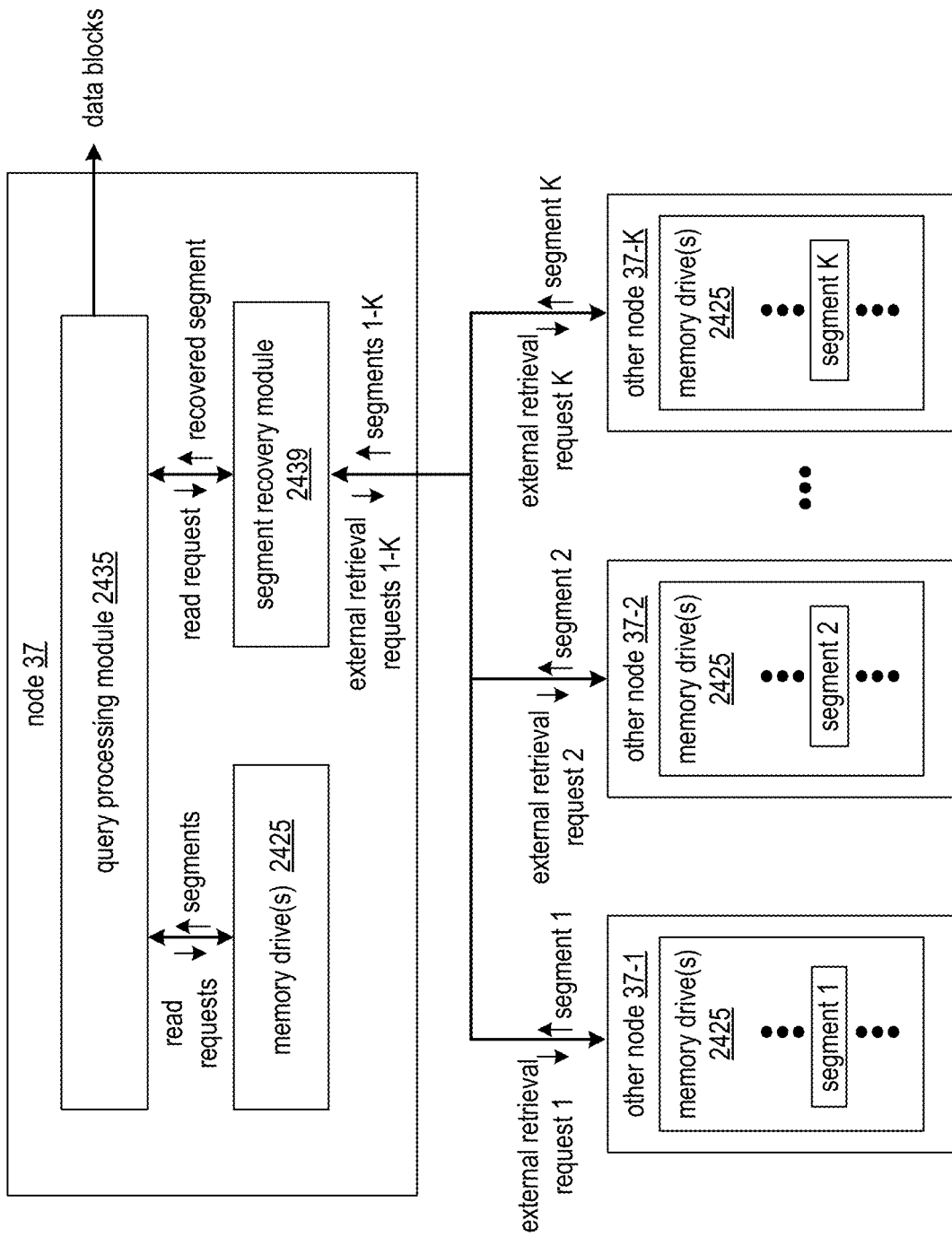

FIG. 24D illustrates an embodiment of a node 37 that implements a segment recovery module 2439 to recover some or all segments that are assigned to the node for retrieval, in accordance with processing one or more queries, that are unavailable. Some or all features of the node 37 of FIG. 24D can be utilized to implement the node 37 of FIGS. 24B and 24C, and/or can be utilized to implement one or more nodes 37 of the query execution plan 2405 of FIG. 24A, such as nodes 37 at the IO level 2416. A node 37 may store segments on one of its own memory drives 2425 that becomes unavailable, or otherwise determines that a segment assigned to the node for execution of a query is unavailable for access via a memory drive the node 37 accesses via system communication resources 14. The segment recovery module 2439 can be implemented via at least one processing module of the node 37, such as resources of central processing module 39. The segment recovery module 2439 can retrieve the necessary number of segments 1-K in the same segment group as an unavailable segment from other nodes 37, such as a set of other nodes 37-1-37-K that store segments in the same storage cluster 35. Using system communication resources 14 or other communication channels, a set of external retrieval requests 1-K for this set of segments 1-K can be sent to the set of other nodes 37-1-37-K, and the set of segments can be received in response. This set of K segments can be processed, for example, where a decoding function is applied based on the redundancy storage coding scheme utilized to generate the set of segments in the segment group and/or parity data of this set of K segments is otherwise utilized to regenerate the unavailable segment. The necessary records can then be extracted from the unavailable segment, for example, via the record extraction module 2438, and can be sent as data blocks to another node 37 for processing in conjunction with other records extracted from available segments retrieved by the node 37 from its own memory drives 2425.

Note that the embodiments of node 37 discussed herein can be configured to execute multiple queries concurrently by communicating with nodes 37 in the same or different tree configuration of corresponding query execution plans and/or by performing query operations upon data blocks and/or read records for different queries. In particular, incoming data blocks can be received from other nodes for multiple different queries in any interleaving order, and a plurality of operator executions upon incoming data blocks for multiple different queries can be performed in any order, where output data blocks are generated and sent to the same or different next node for multiple different queries in any interleaving order. IO level nodes can access records for the same or different queries any interleaving order. Thus, at a given point in time, a node 37 can have already begun its execution of at least two queries, where the node 37 has also not yet completed its execution of the at least two queries.

A query execution plan 2405 can guarantee query correctness based on assignment data sent to or otherwise communicated to all nodes at the IO level ensuring that the set of required records in query domain data of a query, such as one or more tables required to be accessed by a query, are accessed exactly one time: if a particular record is accessed multiple times in the same query and/or is not accessed, the query resultant cannot be guaranteed to be correct. Assignment data indicating segment read and/or record read assignments to each of the set of nodes 37 at the IO level can be generated, for example, based on being mutually agreed upon by all nodes 37 at the IO level via a consensus protocol executed between all nodes at the IO level and/or distinct groups of nodes 37 such as individual storage clusters 35. The assignment data can be generated such that every record in the database system and/or in query domain of a particular query is assigned to be read by exactly one node 37. Note that the assignment data may indicate that a node 37 is assigned to read some segments directly from memory as illustrated in FIG. 24C and is assigned to recover some segments via retrieval of segments in the same segment group from other nodes 37 and via applying the decoding function of the redundancy storage coding scheme as illustrated in FIG. 24D.

Assuming all nodes 37 read all required records and send their required records to exactly one next node 37 as designated in the query execution plan 2405 for the given query, the use of exactly one instance of each record can be guaranteed. Assuming all inner level nodes 37 process all the required records received from the corresponding set of nodes 37 in the IO level 2416, via applying one or more query operators assigned to the node in accordance with their query operator execution flow 2433, correctness of their respective partial resultants can be guaranteed. This correctness can further require that nodes 37 at the same level intercommunicate by exchanging records in accordance with JOIN operations as necessary, as records received by other nodes may be required to achieve the appropriate result of a JOIN operation. Finally, assuming the root level node receives all correctly generated partial resultants as data blocks from its respective set of nodes at the penultimate, highest inner level 2414 as designated in the query execution plan 2405, and further assuming the root level node appropriately generates its own final resultant, the correctness of the final resultant can be guaranteed.

In some embodiments, each node 37 in the query execution plan can monitor whether it has received all necessary data blocks to fulfill its necessary role in completely generating its own resultant to be sent to the next node 37 in the query execution plan. A node 37 can determine receipt of a complete set of data blocks that was sent from a particular node 37 at an immediately lower level, for example, based on being numbered and/or have an indicated ordering in transmission from the particular node 37 at the immediately lower level, and/or based on a final data block of the set of data blocks being tagged in transmission from the particular node 37 at the immediately lower level to indicate it is a final data block being sent. A node 37 can determine the required set of lower level nodes from which it is to receive data blocks based on its knowledge of the query execution plan 2405 of the query. A node 37 can thus conclude when complete set of data blocks has been received each designated lower level node in the designated set as indicated by the query execution plan 2405. This node 37 can therefore determine itself that all required data blocks have been processed into data blocks sent by this node 37 to the next node 37 and/or as a final resultant if this node 37 is the root node. This can be indicated via tagging of its own last data block, corresponding to the final portion of the resultant generated by the node, where it is guaranteed that all appropriate data was received and processed into the set of data blocks sent by this node 37 in accordance with applying its own query operator execution flow 2433.

In some embodiments, if any node 37 determines it did not receive all of its required data blocks, the node 37 itself cannot fulfill generation of its own set of required data blocks. For example, the node 37 will not transmit a final data block tagged as the "last" data block in the set of outputted data blocks to the next node 37, and the next node 37 will thus conclude there was an error and will not generate a full set of data blocks itself. The root node, and/or these intermediate nodes that never received all their data and/or never fulfilled their generation of all required data blocks, can independently determine the query was unsuccessful. In some cases, the root node, upon determining the query was unsuccessful, can initiate re-execution of the query by re-establishing the same or different query execution plan 2405 in a downward fashion as described previously, where the nodes 37 in this re-established query execution plan 2405 execute the query accordingly as though it were a new query. For example, in the case of a node failure that caused the previous query to fail, the new query execution plan 2405 can be generated to include only available nodes where the node that failed is not included in the new query execution plan 2405.

FIG. 25A illustrates an embodiment of a database system 10 that implements a record processing and storage system 2505. The record processing and storage system 2505 can be operable to generate and store the segments 2424 discussed previously by utilizing a segment generator 2517 to convert sets of row-formatted records 2422 into column-formatted record data 2565. These row-formatted records 2422 can correspond to rows of a database table with populated column values of the table, for example, where each record 2422 corresponds to a single row as illustrated in FIG. 15. For example, the segment generator 2517 can generate the segments 2424 in accordance with the process discussed in conjunction with FIGS. 15-23. The segments 2424 can be generated to include index data 2518, which can include a plurality of index sections such as the index sections 0-X illustrated in FIG. 23. The segments 2424 can optionally be generated to include other metadata, such as the manifest section and/or statistics section illustrated in FIG. 23.

The generated segments 2424 can be stored in a segment storage system 2508 for access in query executions. For example, the records 2422 can be extracted from generated segments 2424 in various query executions performed by via a query processing system 2502 of the database system 10, for example, as discussed in FIGS. 25A-25D. In particular, the segment storage system 2508 can be implemented by utilizing the memory drives 2425 of a plurality of IO level nodes 27 that are operable to store segments. As discussed previously, nodes 37 at the IO level 2416 can store segments 2424 in their memory drives 2425 as illustrated in FIG. 24C. These nodes can perform IO operations in accordance with query executions by reading rows from these segments 2424 and/or by recovering segments based on receiving segments from other nodes as illustrated in FIG. 24D. The records 2422 can be extracted from the column-formatted record data 2565 for these IO operations of query executions by utilizing the index data 2518 of the corresponding segment 2424.

To enhance the performance of query executions via access to segments 2424 to read records 2422 in this fashion, the sets of rows included in each segment are ideally clustered well. In the ideal case, rows sharing the same cluster key are stored together in the same segment or same group of segments. For example, rows having matching values of key columns(s) of FIG. 18 utilized to sort the rows into groups for conversion into segments are ideally stored in the same segments. As used herein, a cluster key can be implemented as any one or more columns, such as key columns(s) of FIG. 18, that are utilized to cluster records into segment groups for segment generation. As used herein, more favorable levels of clustering correspond to more rows with same or similar cluster keys being stored in the same segments, while less favorable levels of clustering correspond to less rows with same or similar cluster keys being stored in the same segments. More favorable levels of clustering can achieve more efficient query performance. In particular, query filtering parameters of a given query can specify particular sets of records with particular cluster keys be accessed, and if these records are stored together, fewer segments, memory drives, and/or nodes need to be accessed and/or utilized for the given query.

These favorable levels of clustering can be hard to achieve when relying upon the incoming ordering of records in record streams 1-L from a set of data sources 2501-1-2501-L. No assumptions can necessarily be made about the clustering, with respect to the cluster key, of rows presented by external sources as they are received in the data stream. For example, the cluster key value of a given row received at a first time $t_1$ gives no information about the cluster key value of a row received at a second time $t_2$ after $t_1$. It would therefore be unideal to frequently generate segments by performing a clustering process to group the most recently received records by cluster key. In particular, because records received within a given time frame from a particular data source may not be related and have many different cluster key values, the resulting record groups utilized to generate segments would render unfavorable levels of clustering.

To achieve more favorable levels of clustering, the record processing and storage system 2505 implements a page generator 2511 and a page storage system 2506 to store a plurality of pages 2515. The page generator 2511 is operable to generate pages 2515 from incoming records 2422 of record streams 1-L, for example, as is discussed in further detail in conjunction with FIG. 25C. Each page 2515 generated by the page generator 2511 can include a set of records, for example, in their original row format and/or in a data format as received from data sources 2501-1-2501-L. Once generated, the pages 2515 can be stored in a page storage system 2506, which can be implemented via memory drives and/or cache memory of one or more computing devices 18, such as some or all of the same or different nodes 37 storing segments 2424 as part of the segment storage system 2508.

This generation and storage of pages 2515 stored by can serve as temporary storage of the incoming records as they await conversion into segments 2424. Pages 2515 can be generated and stored over lengthy periods of time, such as hours or days. During this length time frame, pages 2515 can continue to be accumulated as one or more record streams of incoming records 1-L continue to supply additional records for storage by the database system.

The plurality of pages generated and stored over this period of time can be converted into segments, for example once a sufficient amount of records have been received and stored as pages, and/or once the page storage system 2506 runs out of memory resources to store any additional pages. It can be advantageous to accumulate and store as many records as possible in pages 2515 prior to conversion to achieve more favorable levels of clustering. In particular, performing a clustering process upon a greater numbers of records, such as the greatest number of records possible can achieve more favorable levels of clustering, For example, greater numbers of records with common cluster keys are expected to be included in the total set of pages 2515 of the page storage system 2506 when the page storage system 2506 accumulates pages over longer periods of time to include a greater number of pages. In other words, delaying the grouping of rows into segments as long as possible increases the chances of having sufficient numbers of records with same and/or similar cluster keys to group together in segments. Determining when to generate segments such that the conversion from pages into segments is delayed as long as possible, and/or such that a sufficient amount of records are converted all at once to induce more favorable levels of cluster, is discussed in further detail in conjunction with FIGS. 26A-26D. Alternatively, the conversion of pages into segments can occur at any frequency, for example, where pages are converted into segments more frequently and/or in accordance with any schedule or determination in other embodiments of the record processing and storage system 2505.

This mechanism of improving clustering levels in segment generation by delaying the clustering process required for segment generation as long as possible can be further leveraged to reduce resource utilization of the record processing and storage system 2505. As the record processing and storage system 2505 is responsible for receiving records streams from data sources for storage, for example, in the scale of terabyte per second load rates, this process of generating pages from the record streams should therefore be as efficient as possible. The page generator 2511 can be further implemented to reduce resource consumption of the record processing and storage system 2505 in page generation and storage by minimizing the processing of, movement of, and/or access to records 2422 of pages 2515 once generated as they await conversion into segments.

To reduce the processing induced upon the record processing and storage system 2505 during this data ingress, sets of incoming records 2422 can be included in a corresponding page 2515 without performing any clustering or sorting. For example, as clustering assumptions cannot be made for incoming data, incoming rows can be placed into pages based on the order that they are received and/or based on any order that best conserves resources. In some embodiments, the entire clustering process is performed by the segment generator 2517 upon all stored pages all at once, where the page generator 2511 does not perform any stages of the clustering process.

In some embodiments, to further reduce the processing induced upon the record processing and storage system 2505 during this data ingress, incoming record data of data streams 1-L undergo minimal reformatting by the page generator 2511 in generating pages 2515. In some cases, the incoming data of record streams 1-L is not reformatted and is simply "placed" into a corresponding page 2515. For example, a set of records are included in given page in accordance with formatted row data received from data sources.

While delaying segment generation in this fashion improves clustering and further improves ingress efficiency, it can be unideal to wait for records to be processed into segments before they appear in query results, particularly because the most recent data may be of the most interest to end users requesting queries. The record processing and storage system 2505 can resolve this problem by being further operable to facilitate page reads in addition to segment reads in facilitating query executions.

As illustrated in FIG. 25A, a query processing system 2502 can implement a query execution plan generator module 2503 to generate query execution plan data based on a received query request. The query execution plan data can be relayed to nodes participating in the corresponding query execution plan 2405 indicated by the query execution plan data, for example, as discussed in conjunction with FIG. 24A. A query execution module 2504 can be implemented via a plurality of nodes participating in the query execution plan 2405, for example, where data blocks are propagated upwards from nodes at IO level 2416 to a root node at root level 2412 to generate a query resultant. The nodes at IO level 2416 can perform row reads to read records 2422 from segments 2424 as discussed previously and as illustrated in FIG. 24C. The nodes at IO level 2416 can further perform row reads to read records 2422 from pages 2515. For example, once records 2422 are durably stored by being stored in a page 2515, and/or by being duplicated and stored in multiple pages 2515, the record 2422 can be available to service queries, and will be accessed by nodes 37 at IO level 2416 in executing queries accordingly. This enables the availability of records 2422 for query executions more quickly, where the records need not be processed for storage in their final storage format as segments 2424 to be accessed in query requests. Execution of a given query can include utilizing a set of records stored in a combination of pages 2515 and segments 2424. An embodiment of an IO level node that stores and accesses both segments and pages is illustrated in FIG. 25E.

The record processing and storage system 2505 can be implemented utilizing the parallelized data input sub-system 11 and/or the parallelized ingress sub-system 24 of FIG. 4. The record processing and storage system 2505 can alternatively or additionally be implemented utilizing the parallelized data store, retrieve, and/or process sub-system 12 of FIG. 6. The record processing and storage system 2505 can alternatively or additionally be implemented by utilizing one or more computing devices 18 and/or by utilizing one or more nodes 37.

The record processing and storage system 2505 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the page generator 2511 and/or of the segment generator 2517 discussed herein. In some cases, one or more individual nodes 37 and/or one or more individual processing core resources 48 can be operable to perform some or all of the functionality of the record processing and storage system 2505, such as some or all of the functionality of the page generator 2511 and/or of the segment generator 2517, independently or in tandem by utilizing their own processing resources and/or memory resources.

The query processing system 2502 can be alternatively or additionally implemented utilizing the parallelized query and results sub-system 13 of FIG. 5. The query processing system 2502 can be alternatively or additionally implemented utilizing the parallelized data store, retrieve, and/or process sub-system 12 of FIG. 6. The query processing system 2502 can alternatively or additionally be implemented by utilizing one or more computing devices 18 and/or by utilizing one or more nodes 37.

The query processing system 2502 can be otherwise implemented utilizing at least one processor and at least one memory. For example, the at least one memory can store operational instructions that, when executed by the at least one processor, cause the record processing and storage system to perform some or all of the functionality described herein, such as some or all of the functionality of the query execution plan generator module 2503 and/or of the query execution module 2504 discussed herein. In some cases, one or more individual nodes 37 and/or one or more individual processing core resources 48 can be operable to perform some or all of the functionality of the query processing system 2502, such as some or all of the functionality of query execution plan generator module 2503 and/or of the query execution module 2504, independently or in tandem by utilizing their own processing resources and/or memory resources.

In some embodiments, one or more nodes 37 of the database system 10 as discussed herein can be operable to perform multiple functionalities of the database system 10 illustrated in FIG. 25A. For example, a single node can be utilized to implement the page generator 2511, the page storage system 2506, the segment generator 2517, the segment storage system 2508, the query execution plan generator module, and/or the query execution module 2504 as a node 37 at one or more levels 2410 of a query execution plan 2405. In particular, the single node can utilize different processing core resources 48 to implement different functionalities in parallel, and/or can utilize the same processing core resources 48 to implement different functionalities at different times.

Some or all data sources 2501 can implemented utilizing at least one processor and at least one memory. Some or all data sources 2501 can be external from database system 10 and/or can be included as part of database system 10. For example, the at least one memory of a data source 2501 can store operational instructions that, when executed by the at least one processor of the data source 2501, cause the data source 2501 to perform some or all of the functionality of data sources 2501 described herein. In some cases, data sources 2501 can receive application data from the database system 10 for download, storage, and/or installation. Execution of the stored application data by processing modules of data sources 2501 can cause the data sources 2501 to execute some or all of the functionality of data sources 2501 discussed herein.

In some embodiments, system communication resources 14, external network(s) 17, local communication resources 25, wide area networks 22, and/or other communication resources of database system 10 can be utilized to facilitate any transfer of data by the record processing and storage system 2505. This can include, for example: transmission of record streams 1-L from data sources 2501 to the record processing and storage system 2505; transfer of pages 2515 to page storage system 2506 once generated by the page generator 2511; access to pages 2515 by the segment generator 2517; transfer of segments 2424 to the segment storage system 2508 once generated by the segment generator 2517; communication of query execution plan data to the query execution module 2504, such as the plurality of nodes 37 of the corresponding query execution plan 2405; reading of records by the query execution module 2504, such as TO level nodes 37, via access to pages 2515 stored page storage system 2506 and/or via access to segments 2424 stored segment storage system 2508; sending of data blocks generated by nodes 37 of the corresponding query execution plan 2405 to other nodes 37 in conjunction with their execution of the query; and/or any other accessing of data, communication of data, and/or transfer of data by record processing and storage system 2505 and/or within the record processing and storage system 2505 as discussed herein.

FIG. 25B illustrates an example embodiment of the record processing and storage system 2505 of FIG. 25A. Some or all of the features illustrated and discussed in conjunction with the record processing and storage system 2505 FIG. 25B can be utilized to implement the record processing and storage system 2505 and/or any other embodiment of the record processing and storage system 2505 described herein.

The record processing and storage system 2505 can include a plurality of stream loader modules 2510-1-2510-N. Each stream loader module 2510 can be implemented via its own processing and/or memory resources. For example, each stream loader module 2510 can be implemented via its own computing device 18, via its own node 37, and/or via its own processing core resource 48. The plurality of stream loader modules 2510-1-2510-N can be implemented to perform some or all of the functionality of the record processing and storage system 2505 in a parallelized fashion.

The record processing and storage system 2505 can include queue reader 2559, a plurality of stateful file readers 2556-1-2556-N, and/or stand-alone file readers 2558-1-2558-N. For example, the queue reader 2559, a plurality of stateful file readers 2556-1-2556-N, and/or stand-alone file readers 2558-1-2558-N are utilized to enable each stream loader modules 2510 to receive one or more of the record streams 1-L received from the data sources 2501-1-2501-L as illustrated in FIG. 25A. For example, each stream loader module 2510 receives a distinct subset of the entire set of records received by the record processing and storage system 2505 at a given time.

Each stream loader module 2510 can receive records 2422 in one or more record streams via its own stateful file reader 2556 and/or stand-alone file reader 2558. Each stream loader module 2510 can optionally receive records 2422 and/or otherwise communicate with a common queue reader 2559. Each stateful file reader 2556 can communicate with a metadata cluster 2552 that includes data supplied by and/or corresponding to a plurality of administrators 2554-1-2554-M. The metadata cluster 2552 can be implemented by utilizing the administrative processing sub-system 15 and/or the configuration sub-system 16. The queue reader 2559, each stateful file reader 2556, and/or each stand-alone file reader 2558 can be implemented utilizing the parallelized ingress sub-system 24 and/or the parallelized data input sub-system 11. The metadata cluster 2552, the queue reader 2559, each stateful file reader 2556, and/or each stand-alone file reader 2558 can be implemented utilizing at least one computing device 18 and/or at least one node 37. In cases where a given stream loader module 2510 is implemented via its own computing device 18 and/or node 37, the same computing device 18 and/or node 37 can optionally be utilized to implement the stateful file reader 2556, and/or each stand-alone file reader 2558 communicating with the given stream loader module 2510.

Each stream loader module 2510 can implement its own page generator 2511, its own index generator 2513, and/or its own segment generator 2517, for example, by utilizing its own processing and/or memory resources such as the processing and/or memory resources of a corresponding computing device 18. For example, the page generator 2511 of FIG. 25A can be implemented as a plurality of page generators 2511 of a corresponding plurality of stream loader modules 2510 as illustrated in FIG. 25B. Each page generator 2511 of FIG. 25B can process its own incoming records 2422 to generate its own corresponding pages 2515.

As pages 2515 are generated by the page generator 2511 of a stream loader module 2510, they can be stored in a page cache 2512. The page cache 2512 can be implemented utilizing memory resources of the stream loader module 2510, such as memory resources of the corresponding computing device 18. For example, the page cache 2512 of each stream loader module 2010-1-2010-N can individually or collectively implement some or all of the page storage system 2506 of FIG. 25A.

The segment generator 2517 of FIG. 25A can similarly be implemented as a plurality of segment generators 2517 of a corresponding plurality of stream loader modules 2510 as illustrated in FIG. 25B. Each segment generator 2517 of FIG. 25B can generate its own set of segments 2424-1-2424-J included in one or more segment groups 2522. The segment group 2522 can be implemented as the segment group of FIG. 23, for example, where J is equal to five or another number of segments configured to be included in a segment group. In particular, J can be based on the redundancy storage encoding scheme utilized to generate the set of segments and/or to generate the corresponding parity data 2426.

The segment generator 2517 of a stream loader module 2510 can access the page cache 2512 of the stream loader module 2510 to convert the pages 2515 previously generated by the page generator 2511 into segments. In some cases, each segment generator 2517 requires access to all pages 2515 generated by the segment generator 2517 since the last conversion process of pages into segments. The page cache 2512 can optionally store all pages generated by the page generator 2511 since the last conversion process, where the segment generator 2517 accesses all of these pages generated since the last conversion process to cluster records into groups and generate segments. For example, the page cache 2512 is implemented as a write-through cache to enable all previously generated pages since the last conversion process to be accessed by the segment generator 2517 once the conversion process commences.

In some cases, each stream loader module 2510 implements its segment generator 2517 upon only the set of pages 2515 that were generated by its own page generator 2511, accessible via its own page cache 2512. In such cases, the record grouping via clustering key to create segments with the same or similar cluster keys are separately performed by each segment generator 2517 independently without coordination, where this record grouping via clustering key is performed on N distinct sets of records stored in the N distinct sets of pages generated by the N distinct page generators 2511 of the N distinct stream loader modules 2510. In such cases, despite records never being shared between stream loader modules 2510 to further improve clustering, the level of clustering of the resulting segments generated independently by each stream loader module 2510 on its own data is sufficient, for example, due to the number of records in each stream loader module's 2510 set of pages 2515 for conversion being sufficiently large to attain favorable levels of clustering.

In such embodiments, each stream loader modules 2510 can independently initiate its own conversion process of pages 2515 into segments 2424 by waiting as long as possible based on its own resource utilization, such as memory availability of its page cache 2512. Different segment generators 2517 of the different stream loader modules 2510 can thus perform their own conversion of the corresponding set of pages 2515 into segments 2424 at different times, based on when each stream loader modules 2510 independently determines to initiate the conversion process, for example, based on each independently making the determination to generate segments as discussed in conjunction with FIG. 26A. Thus, as discussed herein, the conversion process of pages into segments can correspond to a single stream loader module 2510 converting all of its pages 2515 generated by its own page generator 2511 since its own last the conversion process into segments 2424, where different stream loader modules 2510 can initiate and execute this conversion process at different times and/or with different frequency.

In other cases, it is ideal for even more favorable levels of clustering to be attained via sharing of all pages for conversion across all stream loader modules 2510. In such cases, a collective decision to initiate the conversion process can be made across some or all stream loader modules 2510, for example, based on resource utilization across all stream loader modules 2510. The conversion process can include sharing of and/or access to all pages 2515 generated via the process, where each segment generator 2517 accesses records in some or all pages 2515 generated by and/or stored by some or all other stream loader modules 2510 to perform the record grouping by cluster key. As the full set of records is utilized for this clustering instead of N distinct sets of records, the levels of clustering in resulting segments can be further improved in such embodiments. This improved level of clustering can offset the increased page movement and coordination required to facilitate page access across multiple stream loader modules 2510. As discussed herein, the conversion process of pages into segments can optionally correspond to multiple stream loader modules 2510 converting all of their collectively generated pages 2515 since their last conversion process into segments 2424 via sharing of their generated pages 2515.

An index generator 2513 can optionally be implemented by some or all stream loader modules 2510 to generate index data 2516 for some or all pages 2515 prior to their conversion into segments. The index data 2516 generated for a given page 2515 can be appended to the given page, can be stored as metadata of the given page 2515, and/or can otherwise be mapped to the given page 2515. The index data 2516 for a given page 2515 correspond to page metadata, for example, indexing records included in the corresponding page. As a particular example, the index data 2516 can include some or all of the data of index data 2518 generated for segments 2424 as discussed previously, such as index sections 0-x of FIG. 23. As another example, the index data 2516 can include indexing information utilized to determine the memory location of particular records and/or particular columns within the corresponding page 2515.

In some cases, the index data 2516 can be generated to enable corresponding pages 2515 to be processed by query IO operators utilized to read rows from pages, for example, in a same or similar fashion as index data 2518 is utilized to read rows from segments. In some cases, index probing operations can be utilized by and/or integrated within query IO operators to filter the set of rows returned in reading a page 2515 based on its index data 2516 and/or to filter the set of rows returned in reading a segment 2424 based on its index data 2518.

In some cases, index data 2516 is generated by index generator 2513 for all pages 2515, for example, as each page 2515 is generated, or at some point after each page 2515 is generated. In other cases, index data 2516 is only generated for some pages 2515, for example, where some pages do not have index data 2516 as illustrated in FIG. 25B. For example, some pages 2515 may never have corresponding index data 2516 generated prior to their conversion into segments. In some cases, index data 2516 is generated for a given page 2515 with its records are to be read in execution of a query by the query processing system 2502. For example, a node 37 at IO level 2416 can be implemented as a stream loader module 2510 and can utilize its index generator 2513 to generate index data 2516 for a particular page 2515 in response to having query execution plan data indicating that records 2422 be read the particular page from the page cache 2512 of the stream loader module in conjunction with execution of a query. The index data 2516 can be optionally stored temporarily for the life of the given query to facilitate reading of rows from the corresponding page for the given query only. The index data 2516 alternatively be stored as metadata of the page 2515 once generated, as illustrated in FIG. 25B. This enables the previously generated index data 2516 of a given page to be utilized in subsequent queries requiring reads from the given page.

As illustrated in FIG. 25B, each stream loader modules 2510 can generate and send pages 2515, corresponding index data 2516, and/or segments 2424 to long term storage 2540-1-2540-J of a particular storage cluster 2535. For example, system communication resources 14 can be utilized to facilitate sending of data from stream loader modules 2510 to storage cluster 2535 and/or to facilitate sending of data from storage cluster 2535 to stream loader modules 2510.

The storage cluster 2535 can be implemented by utilizing a storage cluster 35 of FIG. 6, where each long term storage 2540-1-2540-J is implemented by a corresponding computing device 18-1-18-J and/or by a corresponding node 37-1-37-J. In some cases, each storage cluster 35-1-35-z of FIG. 6 can receive pages 2515, corresponding index data 2516, and/or segments 2424 from its own set of stream loader modules 2510-1-2510-N, where the record processing and storage system 2505 of FIG. 25B can include z sets of stream loader modules 2510-1-2510-N that each generate pages 2515, segments 2524, and/or index data 2516 for storage in its own corresponding storage cluster 35. Embodiments of implementing a record processing and storage system 2505 via multiple storage clusters 35 is discussed in further detail in conjunction with FIGS. 30A-30C.

The processing and/or memory resources utilized to implement each long term storage 2540 can be distinct from the processing and/or memory resources utilized to implement the stream loader modules 2510. Alternatively, some stream loader modules can optionally share processing and/or memory resources long term storage 2540, for example, where a same computing device 18 and/or a same node 37 implements a particular long term storage 2540 and also implements a particular stream loader modules 2510.

Each stream loader module 2510 can generate and send the segments 2424 to long term storage 2540-1-2540-J in a set of persistence batches 2532-1-2532-J sent to the set of long term storage 2540-1-2540-J as illustrated in FIG. 25B. For example, upon generating a segment group 2522 of J segments 2424, a stream loader module 2510 can send each of the J segments in the same segment group to a different one of the set of long term storage 2540-1-2540-J in the storage cluster 2535. For example, a particular long term storage 2540 can generate recovered segments as necessary for processing queries and/or for rebuilding missing segments due to drive failure as illustrated in FIG. 24D, where the value K of FIG. 24D is less than the value J and wherein the nodes 37 of FIG. 24D are utilized to implement the long term storage 2540-1-2540-J.

As illustrated in FIG. 25B, each persistence batch 2532-1-2532-J can optionally or additionally include pages 2515 and/or their corresponding index data 2516 generated via index generator 2513. Some or all pages 2515 that are generated via a stream loader module 2510's page generator 2511 can be sent to one or more long term storage 2540-1-2540-J. For example, a particular page 2515 can be included in some or all persistence batches 2532-1-2532-J sent to multiple ones of the set of long term storage 2540-1-2540-J for redundancy storage as replicated pages stored in multiple locations for the purpose of fault tolerance. Some or all pages 2515 can be sent to storage cluster 2535 for storage prior to being converted into segments 2424 via segment generator 2517. Some or all pages 2515 can be stored by storage cluster 2535 until corresponding segments 2424 are generated, where storage cluster 2535 facilitates deletion of these pages from storage in one or more long term storage 2540-1-2540-J once these pages are converted and/or have their records 2422 successfully stored by storage cluster 2535 in segments 2424.

In some cases, a stream loader module 2510 maintains storage of pages 2515 via page cache 2512, even if they are sent to storage cluster 2535 in persistence batches 2532. This can enable the segment generator 2517 to efficiently read pages 2515 during the conversion process via reads from this local page cache 2512. This can be ideal in minimizing page movement, as pages do not need to be retrieved from long term storage 2540 for conversion into segments by stream loader modules 2510 and can instead be locally accessed via maintained storage in page cache 2512. Alternatively, a stream loader module 2510 removes pages 2515 from storage via page cache 2512 once they are determined to be successfully stored in long term storage 2540. This can be ideal in reducing the memory resources required by stream loader module 2510 to store pages, as only pages that are not yet durably stored in long term storage 2540 need be stored in page cache 2512.

Each long term storage 2540 can include its own page storage 2546 that stores received pages 2515 generated by and received from one or more stream loader modules 2010-1-2010-N, implemented utilizing memory resources of the long term storage 2540. For example, the page storage 2546 of each long term storage 2540-1-2540-J can individually or collectively implement some or all of the page storage system 2506 of FIG. 25A. The page storage 2546 can optionally store index data 2516 mapped to and/or included as metadata of its pages 2515. Each long term storage 2540 can alternatively or additionally include its own segment storage 2548 that stores segments generated by and received from one or more stream loader modules 2010-1-2010-N. For example, the segment storage 2548 of each long term storage 2540-1-2540-J can individually or collectively implement some or all of the segment storage system 2508 of FIG. 25A.

The pages 2515 stored in page storage 2546 of long term storage 2540 and/or the segments 2424 stored in segment storage 2548 of long term storage 2540 can be accessed to facilitate execution of queries. As illustrated in FIG. 25B, each long term storage 2540-1-2540-J can perform IO operators 2542 to facilitate reads of records in pages 2515 stored in their page storage 2546 and/or to facilitate reads of records in segments 2424 stored in their segment storage 2548. For example, some or all long term storage 2540-1-2540-J can be implemented as nodes 37 at the IO level 2416 of one or more query execution plans 2405. In particular, the some or all long term storage 2540-1-2540-J can be utilized to implement the query processing system 2502 by facilitating reads to stored records via IO operators 2542 in conjunction with query executions.

Note that at a given time, a given page 2515 may be stored in the page cache 2512 of the stream loader module 2510 that generated the given page 2515, and may alternatively or additionally be stored in one or more long term storage 2540 of the storage cluster 2535 based on being sent to the in one or more long term storage 2540. Furthermore, at a given time, a given record may be stored in a particular page 2515 in a page cache 2512 of a stream loader module 2510, may be stored the particular page 2515 in page storage 2546 of one or more long term storage 2540, and/or may be stored in exactly one particular segment 2424 in segment storage 2548 of one long term storage 2540.

Because records can be stored in multiple locations of storage cluster 2535, the long term storage 2540 of storage cluster 2535 can be operable to collectively store page and segment ownership consensus 2544. This can be useful in dictating which long term storage 2540 is responsible for accessing each given record stored by the storage cluster 2535 via IO operators 2542 in conjunction with query execution. In particular, as a query resultant is only guaranteed to be correct if each required record is accessed exactly once, records reads to a particular record stored in multiple locations could render a query resultant as incorrect. The page and segment ownership consensus 2544 can include one or more versions of ownership data, for example, that is generated via execution of a consensus protocol mediated via the set of long term storage 2540-1-2540-J. The page and segment ownership consensus 2544 can dictate that every record is owned by exactly one long term storage 2540 via access to either a page 2515 storing the record or a segment 2424 storing the record, but not both. The page and segment ownership consensus 2544 can indicate, for each long term storage 2540 in the storage cluster 2535, whether some or all of its pages 2515 or some or all of its segments 2424 are to be accessed in query executions, where each long term storage 2540 only accesses the pages 2515 and segments 2424 indicated in page and segment ownership consensus 2544.

In such cases, all record access for query executions performed by query execution module 2504 via nodes 37 at IO level 2416 can optionally be performed via IO operators 2542 accessing page storage 2546 and/or segment storage 2548 of long term storage 2540, as this access can guarantee reading of records exactly once via the page and segment ownership consensus 2544. For example, the long term storage 2540 can be solely responsible for durably storing the records utilized in query executions. In such embodiments, the cached and/or temporary storage of pages and/or segments of stream loader modules 2510, such as pages 2515 in page caches 2512, are not read for query executions via accesses to storage resources of stream loader modules 2510.

FIG. 25C illustrates an example embodiment of a page generator 2511. The page generator 2511 of FIG. 25C can be utilized to implement the page generator 2511 of FIG. 25A, can be utilized to implement each page generator 2511 of each stream loader module 2510 of FIG. 25B, and/or can be utilized to implement any embodiments of page generator 2511 described herein. An example embodiment of the page generator 2511 of FIG. 25C is discussed in further detail in conjunction with FIGS. 31A-31F.

A single incoming record stream, or multiple incoming record streams 1-L, can include the incoming records 2422 as a stream of row data 2910. Each row data 2910 can be transmitted as an individual packet and/or a set of packets by the corresponding data source 2501 to include a single record 2422, such as a single row of a database table. Alternatively each row data 2910 can transmitted by the corresponding data source 2501 as an individual packet and/or a set of packets to include a batched set of multiple records 2422, such as multiple rows of a database table. Row data 2910 received from the same or different data source over time can each include a same number of rows or a different number of rows, and can be sent in accordance with a particular format. Row data 2910 received from the same or different data source over time can include records with the same or different numbers of columns, with the same or different types and/or sizes of data populating its columns, and/or with the same or different row schemas. In some cases, row data 2910 is received in a stream over time for processing by a stream loader module 2510 via a stateful file reader 2556 and/or via a stand-alone file reader 2558.

Incoming rows can be stored in a pending row data pool 3410 while they await conversion into pages 2515. The pending row data pool 3410 can be implemented as an ordered queue or an unordered set. The pending row data pool 3410 can be implemented by utilizing storage resources of the record processing and storage system. For example, each stream loader module 2510 can have its own pending row data pool 3410. Alternatively, multiple stream loader modules 2510 can access the same pending row data pool 3410 that stores all incoming row data 2910, for example, by utilizing queue reader 2559.

The page generator 2511 can facilitate parallelized page generation via a plurality of processing core resources 48-1-48-W. For example, each stream loader module 2510 has its own plurality of processing core resources 48-1-48-W, where the processing core resources 48-1-48-W of a given stream loader module 2510 is implemented via the set of processing core resources 48 of one or more nodes 37 utilized to implement the given stream loader module 2510. As another example, the plurality of processing core resources 48-1-48-W are each implemented by a corresponding one of the set of each stream loader module 2510-1-2510-N, for example, where each stream loader module 2510-1-2510-N is implemented via its own processing core resources 48-1-48-W.

Over time, each processing core resource 48 can retrieve and/or can be assigned pending row data 2910 in the pending row data pool 3410. For example, when a given processing core resource 48 has finished another job, such as completed processing of another row data 2910, the processing core resource 48 can fetch a new row data 2910 for processing into a page 2515. For example, the processing core resource 48 retrieves a first ordered row data 2910 from a queue of the pending row data pool 3410, retrieves a highest priority row data 2910 from the pending row data pool 3410, retrieves an oldest row data 2910 from the pending row data pool 3410, and/or retrieves a random row data 2910 from the pending row data pool 3410. Once one processing core resource 48 retrieves and/or otherwise utilizes a particular row data 2910 for processing into a page, the particular row data 2910 is removed from the pending row data pool 3410 and/or is otherwise not available for processing by other processing core resources 48.

Each processing core resource 48 can generate pages 2515 from the row data received over time. As illustrated in FIG. 25C, the pages 2515 are depicted to include only one row data, such as a single row or multiple rows batched together in the row data 2910. For example, each page is generated directly from corresponding row data 2910. Alternatively, a page 2515 can include multiple row data 2910, for example, in sequence and/or concatenated in the page 2515. The page can include multiple row data 2910 from a single data source 2501 and/or can include multiple row data 2910 from multiple different data sources 2501. For example, the processing core resource 48 can retrieve one row data 2910 from the pending row data pool 3410 at a time, and can append each row data 2910 to a given page until the page 2515 is complete, where the processing core resource 48 appends subsequently retrieved row data 2910 to a new page. Alternatively, the processing core resource 48 can retrieve multiple row data 2910 at once, and can generate a corresponding page 2515 to include this set of multiple row data 2910.

Once a page 2515 is complete, the corresponding processing core resource 48 can facilitate storage of the page in page storage system 2506. This can include adding the page 2515 to the page cache 2512 of the corresponding stream loader module 2510. This can include facilitating sending of the page 2515 to one or more long term storage 2540 for storage in corresponding page storage 2546. Different processing core resources 48 can each facilitate storage of the page via common resources, or via designated resources specific to each processing core resources 48, of the page storage system 2506.

Figure 25D:
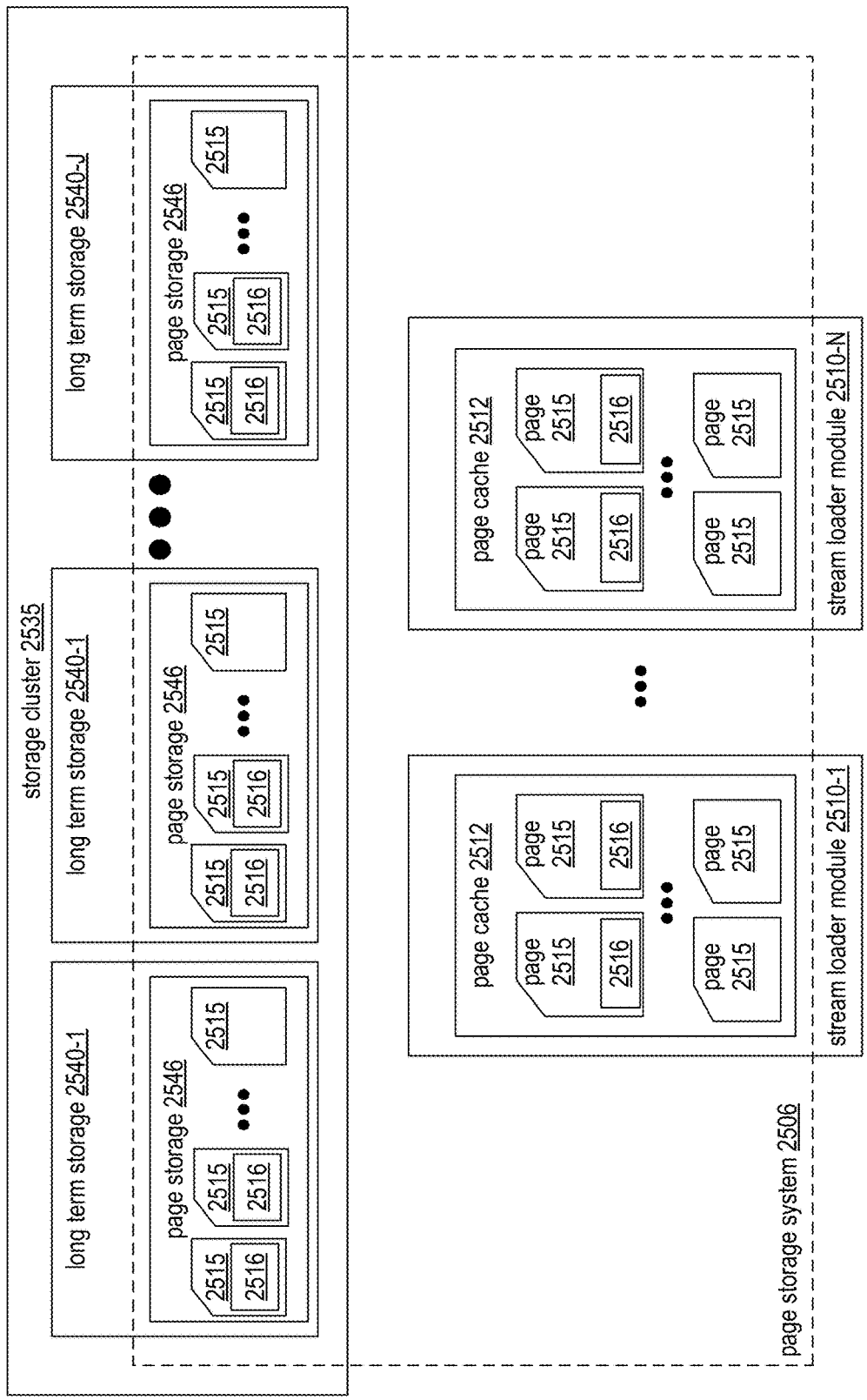
FIG. 25D is a schematic block diagrams of an embodiment of a page storage system of a record processing and storage system in accordance with various embodiments of the present invention.
Figure 25E:
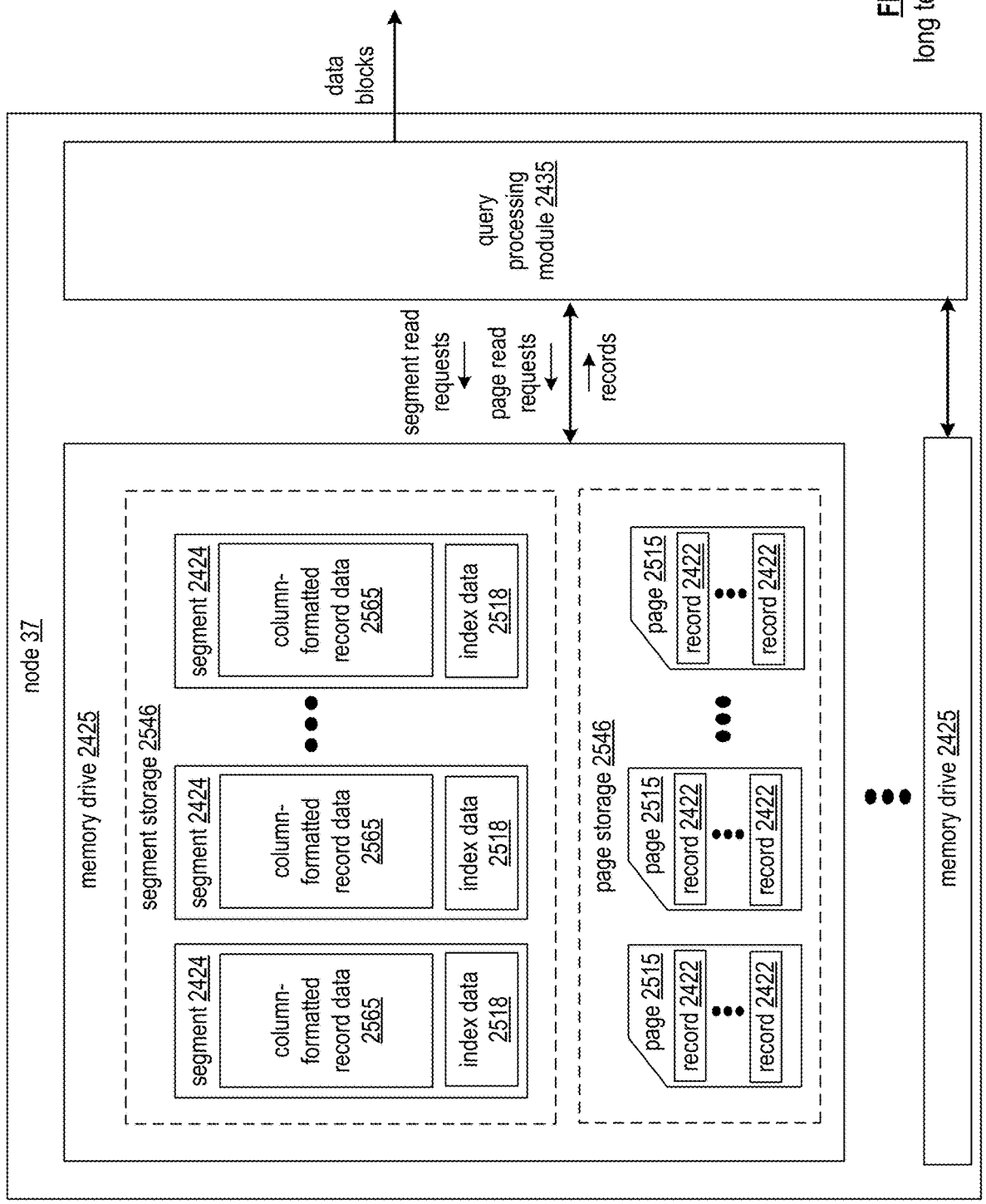
FIG. 25E is a schematic block diagrams of a node that implements a query processing module that reads records from segment storage and page storage in accordance with various embodiments of the present invention.

FIG. 25D illustrates an example embodiment of the page storage system 2605. As used herein, the page storage system 2605 can include page cache 2512 of a single stream loader module 2510; can include page caches 2512 of some or all stream loader module 2510-1-2510-N; can include page storage 2546 of a single long term storage 2540 of a storage cluster 2535; can include page storage 2546 of some or all long term storage 2540-1-2540-J of a single storage cluster 2535; can include page storage 2546 of some or all long term storage 2540-1-2540-J of multiple different storage clusters, such as some or all storage clusters 35-1-35-$z$; and/or can include any other memory resources of database system 10 that are utilized to temporarily and/or durably store pages.

FIG. 25E illustrates an example embodiment of a node 37 utilized to implement a given long term storage 2540 of FIG. 25B. The node 37 of FIG. 25E can be utilized to implement the node 37 of FIG. 25B, FIG. 25C, 25D, some or all nodes 37 at the TO level 2416 of a query execution plan 2405 of FIG. 24A, and/or any other embodiments of node 37 described herein. As illustrated a given node 37 can have its own segment storage 2548 and/or its own page storage 2546 by utilizing one or more of its own memory drives 2425. Note that while the segment storage 2548 and page storage 2546 are segregated in the depiction of a memory drives 2425, any resources of a given memory drive or set of memory drives can be allocated for and/or otherwise utilized to store either pages 2515 or segments 2424. Optionally, some particular memory drives 2425 and/or particular memory locations within a particular memory drive can be designated for storage of pages 2515, while other particular memory drives 2425 and/or other particular memory locations within a particular memory drive can be designated for storage of segments 2424.

The node 37 can utilize its query processing module 2435 to access pages and/or records in conjunction with its role in a query execution plan 2405, for example, at the TO level 2416. For example, the query processing module 2435 generates and sends segment read requests to access records stored in segments of segment storage 2548, and/or generates and sends page read requests to access records stored in pages 2515 of page storage 2546. In some cases, in executing a given query, the node 37 reads some records from segments 2424 and reads other records from pages 2515, for example, based on assignment data indicated in the page and segment ownership consensus 2544. The query processing module 2435 can generate its data blocks to include the raw row data of the read records and/or can perform other query operators to generate its output data blocks as discussed previously. The data blocks can be sent to another node 37 in the query execution plan 2405 for processing as discussed previously, such as a parent node and/or a node in a shuffle node set within the same level 2410.

Figure 26A:
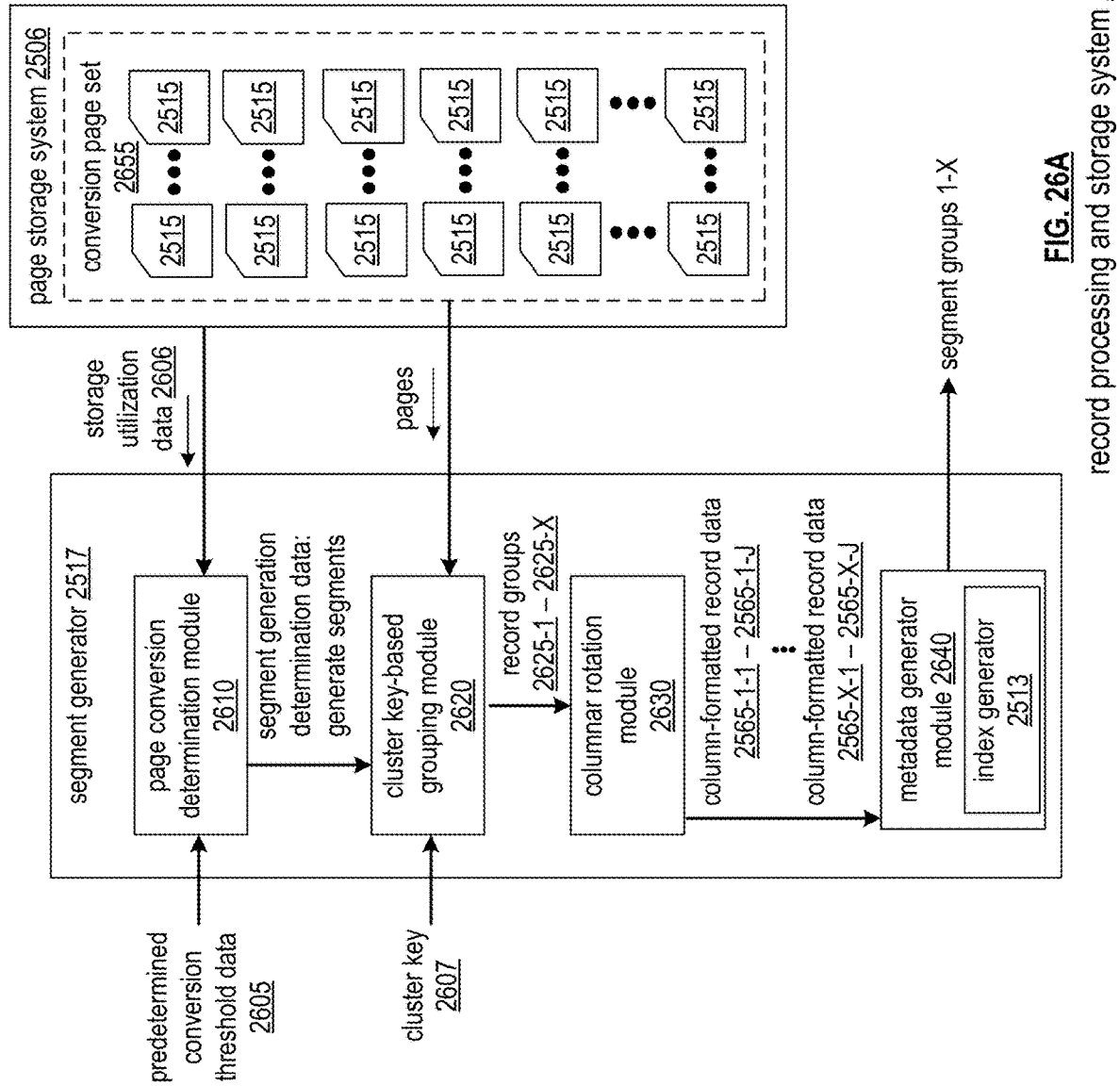
FIG. 26A is a schematic block diagram of a segment generator of a record processing and storage system in accordance with various embodiments of the present invention.

FIG. 26A illustrates an example embodiment of a segment generator 2517. The segment generator 2517 of FIG. 26A can be utilized to implement the segment generator 2517 of FIG. 25A, can be utilized to implement each segment generator 2517 of each stream loader module 2510 of FIG. 25B, and/or can be utilized to implement any embodiments of segment generator 2517 described herein.

As discussed previously, the record processing and storage system 2505 can be operable to delay the conversion of pages into segments. Rather than frequently clustering rows and converting rows into column format, movement and/or processing of rows can be minimized by delaying the clustering and conversion process required to generate segments 2424, for example, as long as possible. This delaying of the conversion process "as long as possible" can be bounded by resource availability, such as disk and/or memory capacity of the record processing and storage system 2505. In particular, the conversion process can be delayed to accumulate as many pages in the page storage system 2506 that page storage system 2506 is capable of storing.

Maximizing the delay until pages are processed as enabled by storage resources of the record processing and storage system 2505 improves the technology of database systems by improving query efficiency. In particular, delaying the decision of which rows to group together into segments as long as possible increased the chances of having many records with common cluster keys to group together, as cluster key-based groups are formed from a largest possible set of records. These more favorable levels of clustering enable queries to be performed more efficiently as discussed previously. For example, rows that need be accessed in a given query as dictated by filtering parameters of the query are more likely to be stored together, and fewer segments and/or memory locations need to be accessed.

Maximizing the delay until pages are processed as enabled by storage resources of the record processing and storage system 2505 improves the technology of database systems by improving data ingress efficiency. By placing rows directly into pages without regard for clustering as they are received, this delayed approach minimizes the number of times a row "moves" through the system, such as from disk, to memory, and/or through the processor. In particular, by delaying all clustering until segment generation for the received rows all at once, the rows are moved exactly once, to their final resting place as a segment 2424. This conserves resources of the record processing and storage system 2505, enabling higher rates of records to be received and processed for storage via data sources 2501 and thus enabling a richer, denser database to be generated over time. For example, this can enable the record processing and storage system 2505 to effectively process incoming records at a scale of terabits per second.

This delay can be accomplished via a page conversion determination module 2610 implemented by the segment generator 2517 and/or implemented via other processing resources of the record processing and storage system 2505. The page conversion determination module 2610 can be utilized to generate segment generation determination data indicating whether the conversion process of pages into segments should be commenced at a given time. For example, the page conversion determination module 2610 generates an interrupt or notification that includes the generate segment generation determination data indicating it is time to generate segments based on determining to generate segments at the given time. The page conversion determination module 2610 can otherwise trigger the commencement of converting pages into segments once it deems the conversion process appropriate, for example, based on delaying as long as possible. The segment generator 2517 can commence the conversion process accordingly in response to the segment generation determination data indicating it is time to generate segments, for example, via a cluster key-based grouping module 2620, a columnar rotation module 2630, and/or a metadata generator module 2640. The delay of converting pages into segments via the page conversion determination module 2610 and the repeating of this process over time is discussed in further detail in conjunction with the example timeline of FIG. 26B.

In some cases, the page conversion determination module 2610 optionally generates some segment generation determination data indicating it is not yet time to generate segments. In some embodiments, this information may not be communicated if it is determined that is not yet time to generate segments, where only notifications instructing the conversion process be commenced is communicated to initiate the process via cluster key-based grouping module 2620, a columnar rotation module 2630, and/or a metadata generator module 2640.

The page conversion determination module 2610 can generate segment generation determination data: in predetermined intervals; in accordance with a schedule; in response to determining a new page has been generated and stored in page storage system 2506; in response determining at least a threshold number of new pages have been generated and stored in page storage system 2506; in response to determining the storage space and/or memory utilization of page storage system 2506 has changed; in response to determining the total storage capacity of page storage system 2506 has changed; in response to determining at least one memory drive of the page storage system 2506 has failed or gone offline; in response to receiving storage utilization data from page storage system 2506; based on instruction supplied via user input, for example, via administration sub-system 15 and/or configuration sub-system 16; based on receiving a request; and/or based on another determination.

The page conversion determination module 2610 can generate its segment generation determination data based on comparing storage utilization data 2606 to predetermined conversion threshold data 2605. The storage utilization data can optionally be generated by the page storage system 2506. The record processing and storage system 2505 can indicate and/or be based on one or more storage utilization metrics indicating: an amount and/or percentage of storage resources of the page storage system 2506 that are currently being utilized to store pages 2515; an amount and/or percentage of available resources of the page storage system 2506 that are not currently being utilized to store pages 2515; a number of pages 2515 currently stored by the page storage system 2506; a data size, such as a number of bytes, of the set of pages 2515 currently stored by the page storage system 2506; an expected amount of time until storage resources of the page storage system 2506 are expected to become fully utilized for page storage based on current and/or historical data rates of record streams 1-L; current health data and/or failure data of storage resources of the page storage system 2506; an amount of time since the last conversion process was initiated and/or was completed; and/or other information regarding the storage utilization of the page storage system 2506.

In some cases, the storage utilization data 2606 can relate specifically to storage utilization of a page cache 2512 of a stream loader module 2510 of FIG. 25B, where the segment generator 2517 of FIG. 26A is implemented by the corresponding stream loader module 2510 and where the segment generator 2517 of FIG. 26A is operable to perform the conversion process only upon pages 2515 in the page cache 2512. In some cases, the storage utilization data 2606 can relate specifically to storage utilization across all page caches 2512 of all stream loader modules 2510-1-2510-N, where the page conversion determination module 2610 of FIG. 26A is implemented to dictate whether the conversion process be commenced across all corresponding stream loader modules 2510. In some cases, the storage utilization data 2606 can alternatively or include to storage utilization of page storage 2546 of one or more of the long term storage 2540-1-2540-J of FIG. 25B. The storage utilization data 2606 can relate to any combination of storage resources of page storage system 2506 as discussed in conjunction with FIG. 25D that are utilized to store a particular set of pages to be converted into segments in tandem via the conversion process performed by segment generator 2517.

The storage utilization data 2606 can be sent to and/or requested by the segment generator 2517: in predefined intervals; in accordance with scheduling data; based on the page conversion determination module 2610 determining to generate the segment generation determination data; based on a determination, notification, and/or instruction that the page conversion determination module 2610 should generate the segment generation determination data; and/or based on another determination. In some cases, some or all of the page conversion determination module 2610 is implemented via processing resources and/or memory resources of the page storage system 2506, for example, to enable the page conversion determination module 2610 to monitor and/or measure the storage utilization data 2606 of its own resources included in page storage system 2506.

The predetermined conversion threshold data 2605 can indicate one or more threshold metrics or other threshold conditions that, when met by one or more corresponding metrics of the storage utilization data 2606 at a given time, trigger the commencement of the conversion process. In particular, the page conversion determination module generates the segment generation determination data indicating that segments be generated when the at least one metric of the storage utilization data 2606 meets the threshold metrics and/or conditions of the predetermined conversion threshold data 2605 and/or otherwise compares favorably to a condition for page conversion indicated by the predetermined conversion threshold data 2605. If the none of the metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, the page conversion determination module generates the segment generation determination data indicating that segments be generated only when at least a predetermined threshold number of metrics of the storage utilization data 2606 compare favorably to the corresponding threshold metrics of the predetermined conversion threshold data 2605. In such cases, if less than the predetermined threshold number of metrics of the storage utilization data 2606 compare favorably to corresponding threshold metrics of predetermined conversion threshold data 2605, the page conversion determination module generates the segment generation determination data indicating that segments not be generated at this time, or otherwise does not generate the segment generation determination data in this case as no instruction to commence conversion need be communicated.

In some cases, there is only one metric in the storage utilization data 2606 that is compared to a corresponding metric of the predetermined conversion threshold data 2605, and the page conversion determination module generates the segment generation determination data when the metric in the storage utilization data 2606 meets or otherwise compares favorably to the corresponding metric of the predetermined conversion threshold data 2605.

As used herein, the storage utilization data 2606 compares favorably to the predetermined conversion threshold data 2605 when the conditions indicated in the predetermined conversion threshold data 2605 that dictate the conversion process be initiated are met by corresponding metrics of the storage utilization data 2606. As used herein, the storage utilization data 2606 compares unfavorably to the predetermined conversion threshold data 2605 when the conditions indicated in the predetermined conversion threshold data 2605 that dictate the conversion process be initiated are not met by corresponding metrics of the storage utilization data 2606. In some embodiments, the page conversion determination module 2610 generates the segment generation determination data indicating that segments be generated and/or otherwise indicating that the conversion process be initiated only when the storage utilization data 2606 compares favorably to the predetermined conversion threshold data 2605.

The predetermined conversion threshold data 2605 can indicate one or more conditions that trigger the conversion process such as: a total memory capacity of page storage system 2506; a threshold maximum amount and/or percentage of storage resources of the page storage system 2506 that can be utilized to store pages 2515; a threshold minimum amount and/or percentage of resources page storage system that must remain available; a threshold minimum number of pages 2515 that must be included in the set of pages for conversion; a threshold maximum number of pages 2515 that can be converted in a single conversion process; a threshold maximum and/or threshold a data size of the set of pages that can be converted in a single conversion process; a threshold minimum amount of time that storage resources of the page storage system can be expected to become fully utilized for page storage based on current and/or historical data rates of record streams 1-L; threshold requirements for health data and/or failure data of storage resources of the page storage system 2506; a threshold minimum and/or threshold maximum amount of time at which a new conversion process must commence since the last conversion process was initiated and/or was completed; and/or other information regarding the requirements and/or conditions for initiation of the conversion process.

The predetermined conversion threshold data 2605 can be received and/or configured based on user input, for example, via administrative sub-system 15 and/or via configuration sub-system 16. The predetermined conversion threshold data 2605 can alternatively or additionally be determined automatically by the record processing and storage system 2505. For example, the predetermined conversion threshold data 2605 can be determined automatically to indicate and/or be based on determining a threshold memory capacity of the page storage system 2506; based on determining a threshold amount of bytes worth of pages 2515 the page storage system 2506 can store; and/or based on determining a threshold expected and/or average amount of time that pages can be generated and stored in the page storage system 2506 by the page generator 2511 until the page storage system 2506 becomes full. Note that these thresholds can be automatically buffered to account for a threshold percentage of drive failures, a historical expected rate of drive failures, a threshold amount of additional pages data that may be stored in communication lag since the storage utilization data 2606 was sent, a threshold amount of additional pages data that may be stored in processing lag to perform some or all of the conversion process, and/or other buffering to ensure that segment generation is completed before page storage system 2506 reaches its capacity.

As another example, the predetermined conversion threshold data 2605 can be determined automatically based on determining a sufficient number of records 2422 and/or a sufficient number of pages 2515 that can achieve sufficiently favorable levels of clustering. For example, this can be based on tracking and/or measuring clustering metrics for records in previous iterations of the conversion process and/or based on analysis of the measuring clustering metrics for records in previous iterations of the process to determine and/or estimate these thresholds. The storage utilization data 2606 can also be measured and/or tracked for each of this plurality of previous conversion processes to determine average and/or estimated storage utilization metrics that rendered conversion processes with favorable levels of clustering based on the corresponding clustering metrics measured for these previous conversion processes.

The clustering metrics can be based on a total or average number and/or proportion of records in each segment that: match cluster key of at least a threshold proportion of other records in the segment, are within a threshold vector distance and/or other similarity measure from at least a threshold number of other records in the segment. The clustering metrics can alternatively or additionally be based on an average and/or total number of segments whose records have a variance and/or standard deviation of their cluster key values that compare favorably to a threshold. The clustering metrics can alternatively or additionally be determined in accordance with any other similarity metrics and/or clustering algorithms.

Once the page conversion determination module 2610 generates page generation determination data indicating that segments be generated via the conversion process, the segment generator 2517 can initiate the process of generating stored pages into segments. This can include identifying the pages for conversion in the conversion process. For example, all pages currently stored by the page storage system 2506 and awaiting their conversion into segments 2424 at the time when segment generation determination data is generated to indicating that the conversion process commence are identified for conversion. This set of pages can constitute a conversion page set 2655, where only the set of pages identified for conversion in the conversion page set 2655 are processed by segment generator 2517 for a given conversion process. For example, the record processing and storage system 2505 may continue to receive records from data sources 2501, and rather than buffering all of these records until after this conversion process is completed, additional pages can be generated at this time for storage in page storage system 2506. However, as processing of pages into segments has already commenced, these pages may not be clustered and converted during this conversion process, and can await their conversion in the next iteration of the conversion process. As another example, the page storage system 2506 may still be storing some other pages that were previously converted into segments but were not yet deleted. These pages are similarly not included in the conversion page set 2655 because their records are already included in segments via the prior conversion.

The segment generator can implement a cluster key-based grouping module 2620 to generate a plurality of record groups 2625-1-2625-X from the plurality of records 2422 included in the conversion page set 2655. The cluster key-based grouping module 2620 can receive and/or determine a cluster key 2607, which can be automatically determined by the cluster key-based grouping module 2620, can be stored in memory, can be received from another computing device, and/or can be configured via user input. The cluster key can indicate one or more columns, such as the key column(s) of FIGS. 18-22, by which the records are to be sorted and segregated into the record groups. For example, the plurality of records 2422 included in the conversion page set 2655 are sorted and/or grouped by cluster key, where records 2422 with matching cluster keys and/or similar cluster keys are grouped together in the resulting record groups 2625-1-2625-X. The record groups 2625-1-2625-X can be a fixed size, or can be dynamic in size, for example, based on including only records that have matching and/or similar cluster keys. An example of generating the record groups 2625-1-2625-X via the cluster key-based grouping module 2620 is illustrated in FIG. 26C.

The records 2422 of each record group in the set of record groups 2625-1-2625-X generated by the cluster key-based grouping module 2620 are ultimately included in one segment 2424 of a corresponding segment group in the set of segment groups 1-X generated by the segment generator 1-X. For example, segment group 1 includes a set of segments 2424-1-2424-J that include the records 2422 from record groups 2625-1, segment group 2 includes another set of segments 2424-1-2424-J that include the records 2422 from record groups 2625-2, and so on. The identified record groups 2625-1-2625-X can be converted into segments in a same or similar fashion as discussed in conjunction with FIGS. 18-23.

The record groups are processed into segments via a columnar rotation module 2630 of the segment generator 2517. Once the plurality of record groups 2625-1-2625-X are formed, the columnar rotation module 2630 can be implemented to generate column-formatted record data 2565 for each record group 2625. For example, the records 2422 of each record group are extracted from pages 2515 as row-formatted data. In particular, the records 2422 can be received from data sources 2501 as row-formatted data and/or can be stored in pages 2515 as row-formatted data. All records 2422 in the same record group 2625 are converted into column-formatted row data 2565 in accordance with a column-based format, for example, by performing a columnar rotation of the row-formatted data of the records 2422 in the given record group 2625. The column-formatted row data 2565 generated for a given record group 2625 can be divided into a set of column-formatted row data 2565-1-2565-J, for example, where the column-formatted row data 2565 is redundancy storage error encoded by the segment generator 2517 as discussed previously, and where each column-formatted row data 2565-1-2565-J is included in a corresponding segment of a set of J segments 2424 of a segment group 2522.

The final segments can be formed from the column-formatted row data 2565 to include metadata generated via a metadata generator module 2640. The metadata generator module 2640 can be operable to generate the manifest section, statistics section, and/or the set of index sections 0-$x$ for each segment as illustrated in FIG. 23. The metadata generator module 2640 can generate the index data 2518 for each segment 2424 by utilizing the same or different index generator 2513 of FIG. 25B, where index data 2518 generated for segments 2424 via the metadata generator module 2640 is the same as or similar to the index data 2516 generated for pages as discussed in conjunction with FIG. 25B. The column-formatted row data 2565 and its metadata generated via metadata generator module 2640 can be combined to form a final corresponding segment 2424.

Figure 26B:
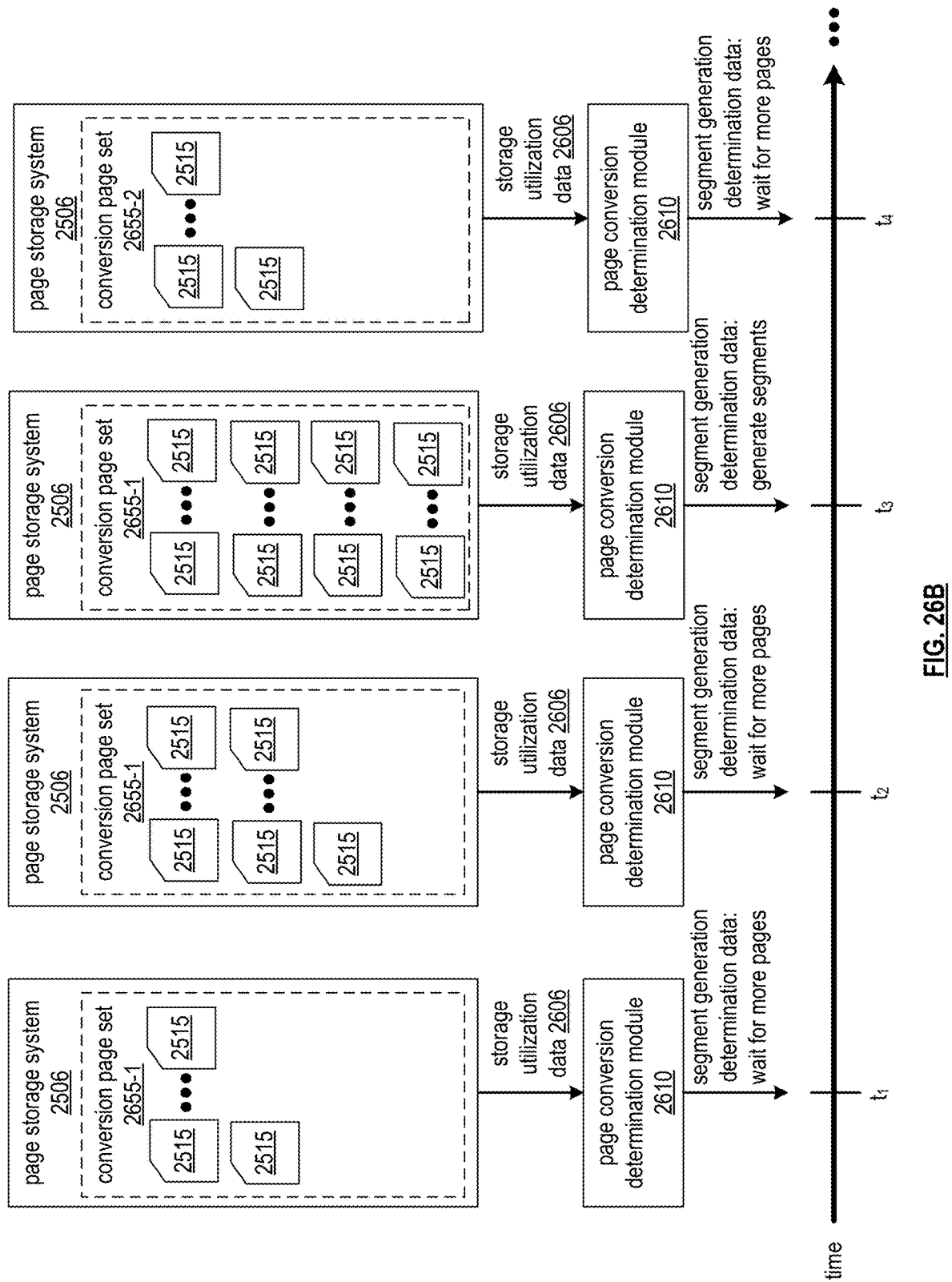
FIG. 26B is a schematic block diagram illustrating operation of a page conversion determination module over time in accordance with various embodiments of the present invention.
Figure 26C:
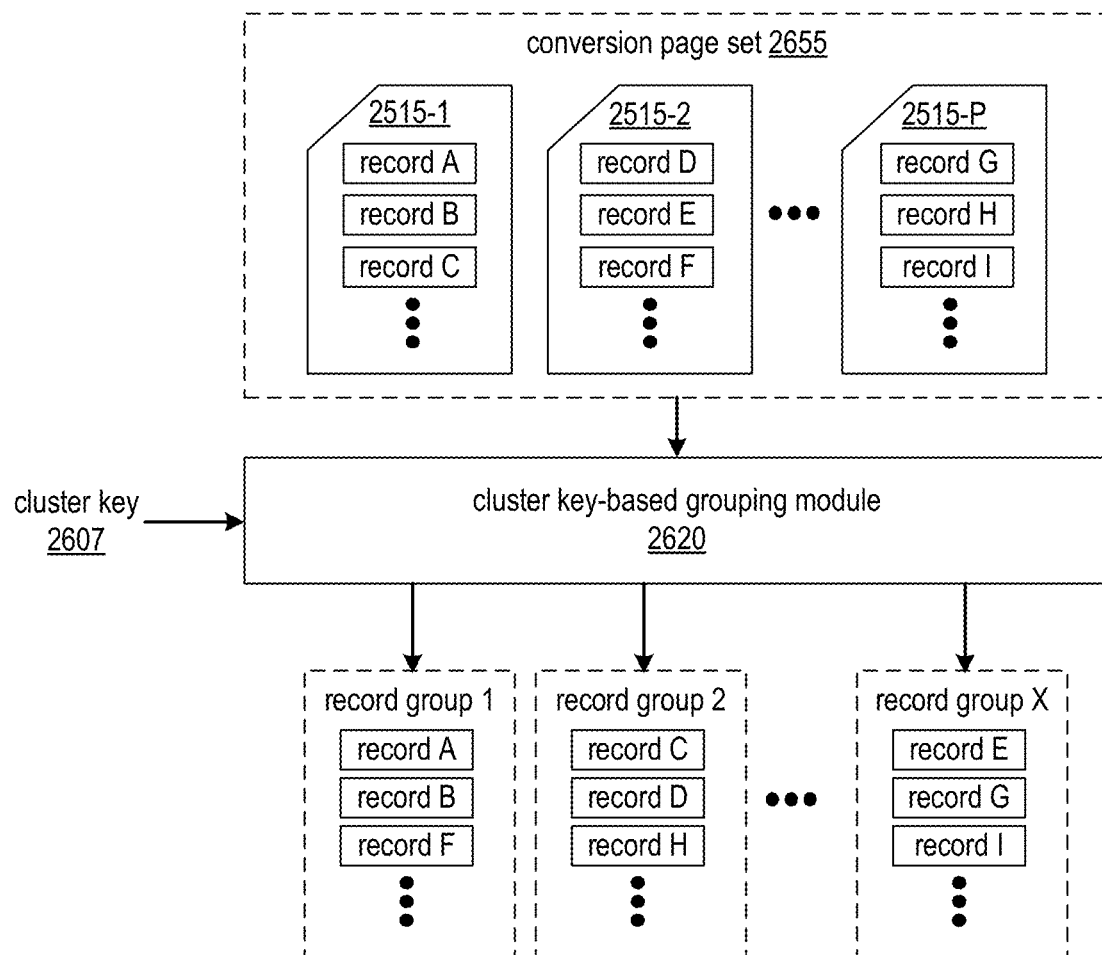
FIG. 26C is a schematic block diagram of a cluster key-based grouping module of a segment generator in accordance with various embodiments of the present invention.

FIG. 26B depicts an example timeline illustrating when the conversion process is determined to be conducted and how this process is iterated over time. The page conversion determination module 2610, and/or the determinations to delay conversion versus initiate conversion over time as illustrated in FIG. 26B, can be utilized to implement the segment generator 2517 of FIG. 26A and/or any other embodiment of the segment generator 2517 discussed herein.

First, a first conversion page set 2655-1 accumulates pages 2515 over time until the page conversion determination module 2610 determines a conversion page set 2655-1 is ready for conversion. At time $t_1$, the conversion page set 2655-1 includes a small number of pages 2515, where the storage resources of page storage system 2506 are not yet fully utilized. This small number of pages relative to the page storage capacity of page storage system 2506 renders the storage utilization data 2606 at time $t_1$ to compare unfavorably to the predetermined conversion threshold data. The segment generation determination data generated by the page conversion determination module 2610 at time $t_1$ therefore delays the conversion process, indicating to wait for more pages 2515 rather than generating segments from the current conversion page set 2655-1 at time $t_1$.

At time $t_2$, more pages 2515 have been accumulated since time $t_1$ based on additional pages having been generated by the page generator 2511 from incoming records of one or more record streams. However, the storage resources of page storage system 2506 are still not yet fully utilized at this time, causing the storage utilization data 2606 at time $t_2$ to again compare unfavorably to the predetermined conversion threshold data. The segment generation determination data generated by the page conversion determination module 2610 at time $t_2$ again delays the conversion process, indicating to wait for more pages 2515 rather than generating segments from the current conversion page set 2655-1 at time $t_2$.

At time $t_3$, even more pages 2515 have been accumulated since time $t_2$, and storage resources of page storage system 2506 are fully utilized and/or sufficiently utilized as dictated by the predetermined conversion threshold data. Thus, enough pages have been accumulated to cause storage utilization data 2606 at time $t_3$ to compare favorably to the predetermined conversion threshold data. The segment generation determination data generated by the page conversion determination module 2610 at time $t_3$ initiates the conversion process by indicating that segments be generated from the current conversion page set 2655-1 at time $t_3$.

After time $t_3$, the pages of the conversion page set 2655-1 can be flushed to other storage and/or can be removed from page storage system 2506. For example, once the segments are successfully generated from conversion page set 2655-1, the pages of conversion page set 2655-1 are deleted from page storage system 2506. The storage utilization data 2606 can indicate that more pages be accumulated for the next conversion page set 2655-2, for example, due to the storage resources of page storage system 2506 again becoming available for storing new pages once the pages of conversion page set 2655-1 are removed.

At time $t_4$, after some or all of the pages of conversion page set 2655-1 have been removed from storage by page storage system 2506, new pages have been generated and stored in page storage system 2506 for conversion in the next conversion page set 2655-2. For example, the next conversion page set 2655-2 can include some pages that were generated while the conversion process of conversion page set 2655-2 was in progress and/or while the resulting segments were being stored in to segment storage system 2508. At this time, the storage resources of page storage system 2506 are not yet fully utilized at this time, causing the storage utilization data 2606 at time $t_4$ to compare unfavorably to the predetermined conversion threshold data.

At some later time after $t_4$, enough pages are accumulated in this next conversion page set 2655-2 to cause the storage utilization data 2606 at time $t_4$ to compare favorably to the predetermined conversion threshold data and to initiate another conversion process of converting the conversion page set 2655-2 into segments. This process can continue accumulating and converting subsequent conversion page sets 2655 over time.

Note that the predetermined conversion threshold data can change over time, for example, based on different user configurations, based on changes to storage capacity of the page storage system 2506, based on adding or removal of memory devices of page storage system 2506, based on failures of page storage system 2506, based on trends in clustering levels that can be attained by different numbers of pages at different times, based on changes in amount of different data stored by the resources of the page storage system 2506, based on resource assignment changes in the record processing and storage system 2505, and/or based on other determinations made over time causing the predetermined conversion threshold data to be adjusted accordingly. For example, the predetermined conversion threshold data that triggers initiation of the conversion process for conversion page set 2655-1 at time $t_3$ can be the same as or different from the predetermined conversion threshold data that eventually triggers initiation of the conversion process for conversion page set 2655-2 at some later time after $t_4$.

FIG. 26C illustrates an example embodiment of a cluster key-based grouping module 2620 implemented by segment generator 2517. This example serves to illustrate that the grouping of sets of records in pages does not necessarily correlate with the sets of records in the record groups generated by the cluster key-based grouping module 2620. In particular, in embodiments where the pages can be generated directly from sets of incoming records as they arrive without any initial clustering, the grouping of sets of records in pages may have no bearing on the record groups generated by the cluster key-based grouping module 2620 due to the timestamp and/or receipt time of various records not necessarily having a correlation with cluster key. The embodiment of cluster key-based grouping module 2620 of FIG. 26C can be utilized to implement the segment generator 2517 of FIG. 26A and/or any other embodiment of the segment generator 2517 discussed herein.

In this example, a plurality of P pages 2515-1-2515-P of conversion page set 2655 include records received from one or more sources over time up until the page conversion determination module 2610 dictated that conversion of this conversion page set 2655 commence. The plurality of records in pages 2515-1-2515-P can be considered an unordered set of pages to be clustered into record groups. Regardless of which pages these records may belong to, records are grouped into their record groups in accordance with cluster key. In this example, records of page 2515-1 are dispersed across at least record groups 1 and 2; records of page 2515-2 are dispersed across at least record groups 1, 2, and X, and records of page 2515-P are dispersed across at least record groups 2 and X.

The value of X can be: predetermined prior to clustering, can be the same or different for different conversion page sets 2655; can be determined based on a predetermined minimum and/or maximum number of records that are included per record group; can be determined based on a predetermined minimum and/or maximum data size per record group; can be determined based on each record group having a predetermined level of clustering, for example, in accordance with at least one clustering metric, and/or can be determined based on other information. In some cases, different record groups of the set of record groups 1-X can include different numbers of records, for example, based on maximizing a clustering metric across each record group.

For example, all records with a matching cluster key, such as having one or more columns corresponding to the cluster key with matching values, can be included in a same record group. As another example, a set of records having similar cluster keys can all be included in a same record group. As another example, if the value of the cluster key can be represented as a continuous variable, numeric variable, or other variable with an inherent ordering with respect to a cluster key domain, the cluster key domain can be subdivided into a plurality of discrete intervals. In such cases, a given record group, or a given set of record groups, can include records with cluster keys having values in the same discrete interval of the cluster key domain. As another example, a record group has cluster key values that are within a predefined distance from, or otherwise compare favorably to, an average cluster key value of cluster keys within the record group. In such cases, a Euclidian distance metric, another vector distance metric, and/or any other similarity and/or distance metric can be utilized to measure distance between cluster key values of the record group. In some cases, a clustering algorithm and/or an unsupervised machine learning model can be utilized to form record groups 1-X.

FIGS. 27A-27H illustrate embodiments of a record processing and storage system 2505 that communicates row confirmation data with one or more data sources 2501 based on confirming receipt of, generating pages from, and/or storing records 2422 received from these data sources 2501. Over time, data sources 2501 can resend certain records 2422 as necessary based on row confirmation data indicating these records were not successfully received and/or stored, for example, due to failures in their transmission, failures in their storage, or failures in transmission of the corresponding row confirmation data. Due this retransmission of certain records 2422 by data sources, the record processing and storage system 2505 can further perform page deduplication as pages are generated over time to ensure that duplicated rows are removed from pages 2515 and/or will not be read from more than one page 2515.

This mechanism of both confirming that all records 2422 are successfully stored in pages and also deduplicating any records that were retransmitted over time improves database systems by ensuring that all required records 2422 will be read exactly once from pages 2515. In particular, this "exactly once" guarantee of record reads ensures that queries performed on records 2422 stored by the database system 10 are guaranteed to be correct, where each required record is included in processing queries, but is only read one time in processing queries. Furthermore, by shifting the responsibility of deduplicating rows to the record processing and storage system 2505, data sources can be conservative in their transmission of rows by sending and possibly resending rows. This improves for example, starting from a tracked transmission starting point indicator that is simple for data sources to maintain. This also further improves database systems by simplifying the processing required to confirm transmittal of records by allowing data sources to send records multiple times, while still guaranteeing these records will be deduplicated in durable storage as pages and/or as segments.

Some or all of the features and/or functionality of embodiments of the record processing and storage system 2505 discussed in conjunction with FIGS. 27A-27H can be utilized to implement the record processing and storage system 2505 of FIG. 25A and/or to implement any other embodiments of record processing and storage system 2505 discussed herein. Some or all of the features and/or functionality of embodiments of a data source 2501 discussed in conjunction with FIGS. 27A-27H can be utilized to implement some or all of the data sources 2501-1-2501-L of FIG. 25A and/or to implement any other embodiments of a data source 2501 discussed herein.

Figure 27A:
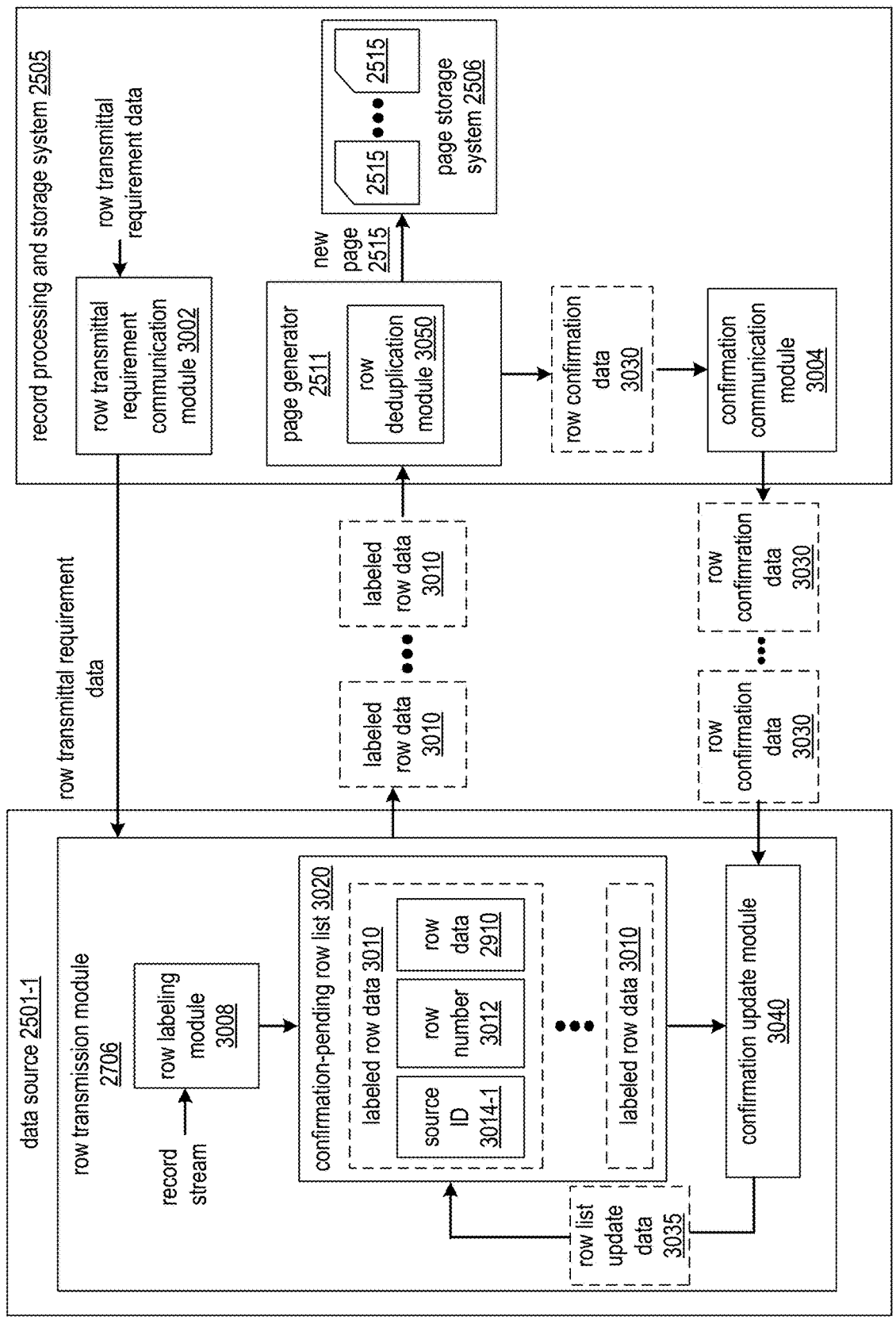
FIG. 27A is a schematic block diagram illustrating communication between a record processing and storage system and a data source in accordance with various embodiments of the present invention.

FIG. 27A illustrates such an embodiment of communication between a record processing and storage system 2505 and a particular data source 2501-1. The data source 2501 can implement a row transmission module 2706 to transmit records 2422 of a record stream to the record processing and storage system 2505 over time. The row transmission module 2706 can utilize a row labeling module 3008 to generate a stream of labeled row data 3010 for transmission from a record stream of records 2422. Each labeled row data 3010 can be generated by data source 2501 to include a data source identifier 3014, a row number 3012, and/or row data 2910. Example embodiments of labeled row data 3010 are discussed in further detail in conjunction with FIGS. 27B-27D.

The labeled row data 3010 can be generated in accordance with row transmittal requirement data. The row transmittal requirement data indicates instructions and/or rules for generating the labeled row data 3010 from a stream of records. For example, embodiments of the labeled row data 3010 described herein can be generated by data sources 2501 based on the row transmittal requirement data. In some cases, the row transmittal requirement data includes application data that is downloaded and/or installed by the data source 2501. For example, the row transmittal requirement data can be stored in memory of the data source 2501 and can include operational instructions. These operational instructions, when executed by at least one processor of the data source 2501, can cause the data source 2501 to 2501 to execute some or all of the functionality of the row labeling module 3008 and/or to execute some or all other functionality of the row transmission module 2706.

As illustrated in FIG. 27A, the row transmittal requirement data can be received from the record processing and storage system 2505 via a row transmittal requirement communication module 3002. In such cases, the row transmittal requirement data can be transmitted to one or more data sources 2501 by the record processing and storage system 2505. The record processing and storage system 2505 can determine this row transmittal requirement data, for example, based on generating the row transmittal requirement data, based on receiving the row transmittal requirement data, based on the row transmittal requirement data being configured via user input, based on retrieving the row transmittal requirement data from memory, and/or by otherwise determining the row transmittal requirement data. Alternatively, the row transmittal requirement data is otherwise determined by some or all data sources 2501, for example, where data sources 2501 determine the row transmittal requirement data based on generating the row transmittal requirement data, based on receiving the row transmittal requirement data, based on the row transmittal requirement data being configured via user input, based on retrieving the row transmittal requirement data from memory, and/or by otherwise determining the row transmittal requirement data.

The row numbers 3012 generated over time by a data source 2501 can each be distinct from all other row numbers 3012 generated by this data source 2501 to uniquely identify the corresponding row data 2910, thus enabling deduplication of row data 2910 with same row numbers 3012 from the same data source 2501. The row numbers 3012 generated over time can further maintain an ordering in accordance with an ordering scheme. In particular, the row transmission requirement data can dictate an ordering scheme that indicates rules regarding generation of and/or ordering of row numbers 3012 included in labeled row data 3010 generated by a data source 2501. For example, the row numbers 3012 for each corresponding labeled row data 3010 can be generated by the data source 2501 as a function of when the labeled row data 3010 is generated and/or as a function of the placement of the corresponding one or more rows in the record stream, in accordance with the ordering scheme. As discussed in further detail herein, adherence to such a row number ordering that is known to both the data source 2501 and the record processing and storage system 2505 can enable the data source 2501 to determine which records to retransmit to the record processing and storage system 2505, while allowing the record processing and storage system 2505 to leverage the known ordering to more easily deduplicate records included in its pages 2515.

In the examples discussed herein, the row numbers 3012 are generated as strictly increasing numeric values in each subsequently generated labeled row data 3010 from records in the record stream. In such ordering schemes, row number 3012 included in each labeled row data 3010 can be generated in accordance with a monotonically increasing function, where newer labeled row data 3010 has row numbers that are strictly greater than older labeled row data. In such ordering schemes, the row number 3012 is not necessarily required to increase in fixed intervals, where each row number 3012 can increase from a previous row number 3012 by any amount. As a particular example, the row numbers 3012 can be generated to be equal to, based on, and/or a function of the bit offset of the corresponding records 2422 in the record stream, such the bit offset of the first record or last record included in the row data 2910 of the labeled row data. As another particular example, the row numbers 3012 can be generated to be equal to, based on, and/or a function of a timestamp associated with the corresponding records in the record stream and/or associated with the generating of the corresponding labeled row data 3010.

In other embodiments, row numbers can be generated in accordance with another ordering scheme, for example, where row numbers are generated instead strictly decrease over time. Alternatively, row numbers can generated as any data type in accordance with any other ordering scheme that is known to both the data source and to the record processing and storage system 2505, for example, based on being indicated in the row transmittal requirement data sent by the record processing and storage system 2505. Row numbers can be numeric values, can be a data type that can be converted to and/or represented as numeric values, and/or can be any data type that can be compared to other values of the data type to determine an ordering. Different data sources can generate and/or increment their row numbers in the same or different fashion and/or in accordance with a same or different function, while all adhering to the same ordering scheme.

As used herein, first row data is older than second row data based on being generated before the second row data and/or based on its one or more records 2422 being received and/or generated previous to the one or more records 2422 in the record stream. In the examples discussed herein, a first row number is more favorably ordered than a second row number when the first row number is less than the second row number, based on the first row number corresponding to row data that is therefore older than the row data denoted by the second row number. In other embodiments, where the row numbers are instead generated to strictly decrease, a first row number is more favorably ordered than a second row number when the first row number is greater than the second row number, based on the first row number corresponding to row data that is therefore older than the row data denoted by the second row number. For any other types ordering and/or labeling scheme for row numbers 3012 in other embodiments, a first row number is more favorably ordered than a second row number when the first row number is otherwise determined to correspond to row data that is older than the row data denoted by the second row number in accordance with the corresponding ordering.

As labeled row data 3010 is generated from rows of the corresponding record stream over time by the row labeling module 3008, the generated labeled row data 3010 is included in a confirmation-pending row list 3020. The confirmation-pending row list 3020 can be implemented by at least one memory such as cache memory of the data source 2501 to store the labeled row data 3010 as it awaits transmission, confirmation, and possibly retransmission one or more additional times. The data source 2501 can send labeled row data 3010 included in the confirmation-pending row list 3020, for example, based on an ordering of the labeled row data 3010 in the confirmation-pending row list 3020 in accordance with row numbers 3012 and/or based on row list update data 3035 generated over time. An example embodiment of sending labeled row data 3010 from the confirmation-pending row list 3020 over time is discussed in further detail in conjunction with FIGS. 27E-27H.

In response to labeled row data 3010 received over time, the record processing and storage system 2505 can implement page generator 2511 as discussed previously to generate new pages 2515 for storage in page storage system 2506, for example, to await conversion into segments and/or to service queries as discussed previously. The page generator 2511 can further implement a row deduplication module 3050 to remove duplicated records from pages and/or to otherwise ensure that any records received in multiple labeled row data 3010 over time are read exactly once in reads to pages 2515, even if these records are stored in multiple pages 2515 generated by page generator 2511. Example embodiments of the row deduplication module 3050 of FIG. 27A are discussed in further detail in conjunction with FIGS. 28A-28D, FIGS. 29A-29B, and FIG. 30A.

As various labeled row data 3010 are received over time and/or as pages 2515 are generated over time, the record processing and storage system 2505 can generate row confirmation data 3030. The row confirmation data 3030 can indicate row data 2910 that is confirmed by the record processing and storage system 2505, where this row data 2910 that is confirmed will not need to be retransmitted by the corresponding data source 2501. The data source 2501 can receive various row confirmation data 3030 over time, and can utilize a confirmation update module 3040 to generate row list update data 3035 as each new row confirmation data is received. Each new row list update data 3035 can be applied to the confirmation-pending row list 3020 over time to update labeled row data included in the confirmation-pending row list and/or to update a transmission starting point indicator of the confirmation-pending row list.

In some cases, confirmed row data corresponds to row data that is successfully received. The record processing and storage system 2505 can generate row confirmation data indicating that one or more particular row data 2910 is successfully received based receiving this particular row data 2910 in a particular labeled row data 3010.

Alternatively or in addition, confirmed row data corresponds to row data 2910 that is successfully included in a page 2515 generated by the page generator 2511. The record processing and storage system 2505 can generate row confirmation data indicating that one or more particular row data 2910 is successfully included in a page 2515 based on generating one or more pages 2515 to include this particular row data 2910, based on deduplicating the one or more pages into a deduplicated page as discussed in further detail in conjunction with FIGS. 28A-28D, and/or based on storing these one or more pages 2515 in page storage system 2506. Ensuring the row data 2910 was successfully converted into a page before indicating this row data 2910 in row confirmation data can be ideal to account for failure that may occur after the row data 2910 is received and before the row data 2910 is included in a page 2515.

Alternatively or in addition, confirmed row data corresponds to row data 2910 that is durably stored in page storage system 2506. As used herein, a record 2422 can be considered "durably stored" if at least a threshold level of fault tolerance is attained in storing of the record. For example, after the row data 2910 is durably stored and thus is stored in accordance with the threshold level of fault tolerance, failure that would render the row data 2910 irrecoverable is not expected to occur. Because row data 2910 is only considered to be immune from expected levels of failure once it is durably stored, ensuring the row data 2910 is durably stored before indicating this row data 2910 in row confirmation data can be ideal to account for failure that may occur prior to durable storage of the row data 2910. In such cases, the processing and storage system 2505 can generate row confirmation data indicating that one or more particular row data 2910 is durably stored in the page storage system 2506 based on successfully storing one or more pages 2515 that include the particular row data 2910 durably in page storage system 2506.

In some cases, durable storage of a record requires more fault-tolerant means of storage than being stored in page cache 2512 after being generated by a page generator 2511. For example, replicating a given page 2515 into a set of replicas and storing the set of replicas in different locations to enable recovery of the given page 2515 for up to a threshold number of storage failures can render records 2422 in the given page 2515 as durably stored. As another example, records included in a page 2515 are considered durably stored when the page 2515 is successfully stored in page storage 2546 of a long term storage 2540. As another example, records included in a page 2515 are considered durably stored a threshold number of replicas of the page 2515 are successfully stored in page storage 2546 of a corresponding number of different long term storage 2540. As another example, generating a segment group 2522 from a set of records 2422 in a record group 2625 in accordance with a redundancy storage coding scheme and storing each segment 2424 of the segment group 2522 in different locations renders this set of records 2422 as durably stored.

Each row confirmation data 3030 can indicate one or more row data that is confirmed. In particular, the row confirmation data 3030 can be generated by the record processing and storage system 2505 to include or otherwise indicate one or more row numbers 3012 that correspond to row data 2910 that is designated as confirmed row data. Each row confirmation data 3030 generated by the record processing and storage system 2505 for a data source 2501 over time can indicate row numbers 3012 of any new row data that has been received since most previously generated and transmitted row confirmation data 3030 for the data source.

For example, the record processing and storage system 2505 generates the row confirmation data 3030 to indicate the row numbers 3012 included in labeled row data 3010 that include row data 2910 that is confirmed by the record processing and storage system 2505. In particular, the row confirmation data 3030 for a given data source 2501 can include and/or otherwise indicate all row numbers 3012 for all row data 2910 that was confirmed since the last generation and transmission of row confirmation data 3030 for the given data source 2501.

As another example, the record processing and storage system 2505 alternatively or additionally generates the row confirmation data 3030 to indicate a span of row numbers 3012, such as only maximum and/or minimum row number, with corresponding row data 2910 that is confirmed by the record processing and storage system 2505. In particular, the row confirmation data 3030 can indicate a span of row numbers 3012 based on row data 2910 that was most-recently confirmed and/or that was confirmed since the last generation and transmission of row confirmation data 3030. In some cases, the row confirmation data 3030 can further include a number of different row data 2910 that are included in this span of row numbers to further indicate the number of different row data 2910 that is confirmed, enabling the data source 2501 to determine whether or not all row data 2910 with row numbers 3012 in the corresponding span of row numbers 3012 were confirmed.

As another example, the record processing and storage system 2505 alternatively or additionally generates the row confirmation data 3030 to include a horizon row number, where all row data 2910 with row numbers 3012 that are more favorably ordered than the horizon row number in an ordering of the corresponding row numbers 3012 are guaranteed to be confirmed. A particular example embodiment of this horizon row number is implemented as a durability value, where all row data 2910 with row numbers 3012 that are more favorably ordered than the durability value in an ordering of the corresponding row numbers 3012 are guaranteed to be durably stored. Embodiments of a record processing and storage system 2505 that determined and communicates this durability value are discussed in further detail in conjunction with FIGS. 32A-32B.

Each row confirmation data 3030 can be generated by the page generator 2511 as illustrated in FIG. 27A. For example, the page generator 2511 generates the source's row confirmation data 3030 based on the labeled row data 3010 that it receives, that is generates pages from, that it facilitates durable storage of, and/or otherwise confirms. Alternatively, other processing resources of the record processing and storage system 2505 can be utilized to generate some or all row confirmation data 3030 the based on the labeled row data 3010 that it receives, generates pages from, durably stores, and/or otherwise confirms.

Each row confirmation data 3030 can be generated for transmission back to the corresponding data source 2501 based on: a predefined schedule of generating the row confirmation data 3030; predefined time intervals for generating the row confirmation data 3030; receiving an instruction to generate the row confirmation data 3030; determining a threshold amount of time has passed since generating the most recent row confirmation data 3030 for the data source 2501; determining a new row data with the data source's data source identifier 3014 has been confirmed, where each row confirmation data 3030 indicates one row number for one corresponding row data; determining at least a threshold number of new row data with the data source's data source identifier 3014 has been confirmed; and/or based on another determination to generate each row confirmation data 3030 over time.

A confirmation communication module 3004 of the record processing and storage system 2505 can be implemented via at least one transmitter and/or communication interface of the record processing and storage system 2505. The confirmation communication module 3004 can send each row confirmation data 3030 to the corresponding data source 2501 as it is generated by the record processing and storage system 2505.

Figure 27C:
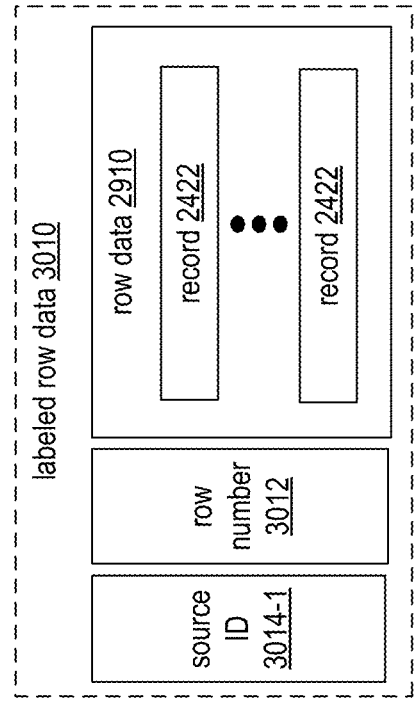
FIGS. 27B-27D are schematic block diagrams that illustrate example embodiments of labeled row data in accordance with various embodiments of the present invention.
Figure 27B:
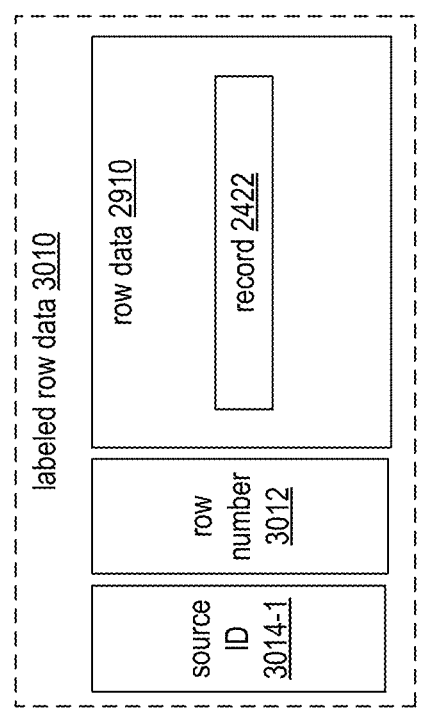
Figure 27D:
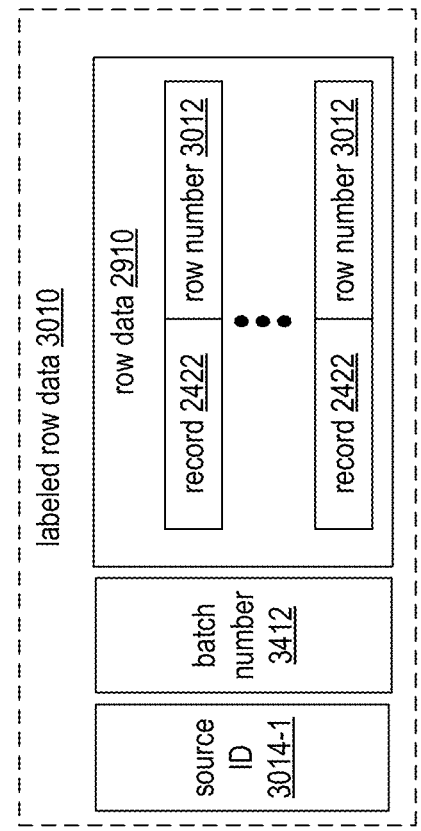

FIGS. 27B-27D illustrate example embodiments of the labeled row data 3010. Each labeled row data 3010 can be generated to include a data source identifier 3014 corresponding to the data source, for example, where each data source 2501-1-2501-L has a different data source identifier 3014 to differentiate records received from different data sources. Each labeled row data 3010 can be generated to alternatively or additionally include row data 2910, which can be implemented as the row data 2910 of FIG. 25C. The row data 2910 can otherwise a single record 2422 or a batch of multiple records 2422. Each labeled row data 3010 can be generated to alternatively or additionally include at least one row number 3012 corresponding to row data 2910.

In some cases, as illustrated in FIG. 27B, the labeled row data 3010 has row data 2910 that includes exactly one record 2422. The row number 3012 thus corresponds to the particular record 2422. When all labeled row data 3010 is generated in this fashion, each row number corresponds to exactly one particular record 2422.

In some cases, as illustrated in FIG. 27C, the labeled row data 3010 has row data 2910 that includes a set of multiple records 2422 as a batch of records. The row number 3012 can thus correspond to the batch of records in row data 2910 as a whole, where individual records 2422 optionally do not have their own row numbers 3012. In such cases, when a row number 3012 is indicated in row confirmation data 3030, the entire set of multiple records 2422 in the corresponding has row data 2910 is indicated as confirmed. In such embodiments, batches of records 2422 can be processed in tandem by the record processing and storage system to ensure that the records 2422 remain together in a batch. For example, all of the set of multiple records 2422 in given row data 2910 are included in a same page 2515. This can ensure that, when confirming a batch of records with the corresponding row number 3012, all of the set of multiple records are guaranteed to be confirmed based on being processed together. As used herein, a row number 3012 that corresponds to a set of multiple records 2422 in labeled row data 3010 in this fashion can be interchangeably be referred to as a "batch number."

In some cases, as illustrated in FIG. 27D, the labeled row data 3010 has row data 2910 that includes a set of multiple records 2422 as a batch of records with a corresponding batch number 3412 denoting the batch of records as a whole, and that also preserves individual row numbers 3012 for each record 2422. For example, the batch of records included row data 2910 as illustrated in FIG. 27C is utilized to implement the row data 2910 of FIG. 27D, where each record 2422 further is assigned its own row number 3012 as illustrated in FIG. 27B. The batch number 3412 of FIG. 27D can therefore be implemented utilizing the row number 3012 of FIG. 27C. In some cases, a separate batch number 3412 is not generated and/or included, where the batch number 3412 for the batch of rows in row data 2910 is denoted as and/or is automatically set as the lowest row number 3012 and/or the highest row number 3012 included in the corresponding batch of rows. Distinguishing each row with their own row numbers 3012 can be useful in confirming individual rows 3012, for example, in cases where portions of a batch are not able to be confirmed. Further distinguishing each batch of rows with their own batch numbers 3412 can be useful in confirming confirm and/or otherwise identifying the batch as a whole. In such embodiments, row confirmation data 3030 can be generated to indicate particular row numbers individually to denote individual records of the row confirmation data 3030 are confirmed, and/or can indicate the batch number to denote the entire set of multiple records 2422 in the corresponding has row data 2910 is confirmed. In some cases, some or all embodiments of row number 3012 discussed herein can be implemented utilizing the batch number 3412 of FIG. 27D, for example, in embodiments where the row number 3012 corresponds to a set of multiple rows, even if the labeled row data 3010 optionally includes the individual row numbers 3012 for each of the set of multiple rows as illustrated in FIG. 27D.

Figure 27E:
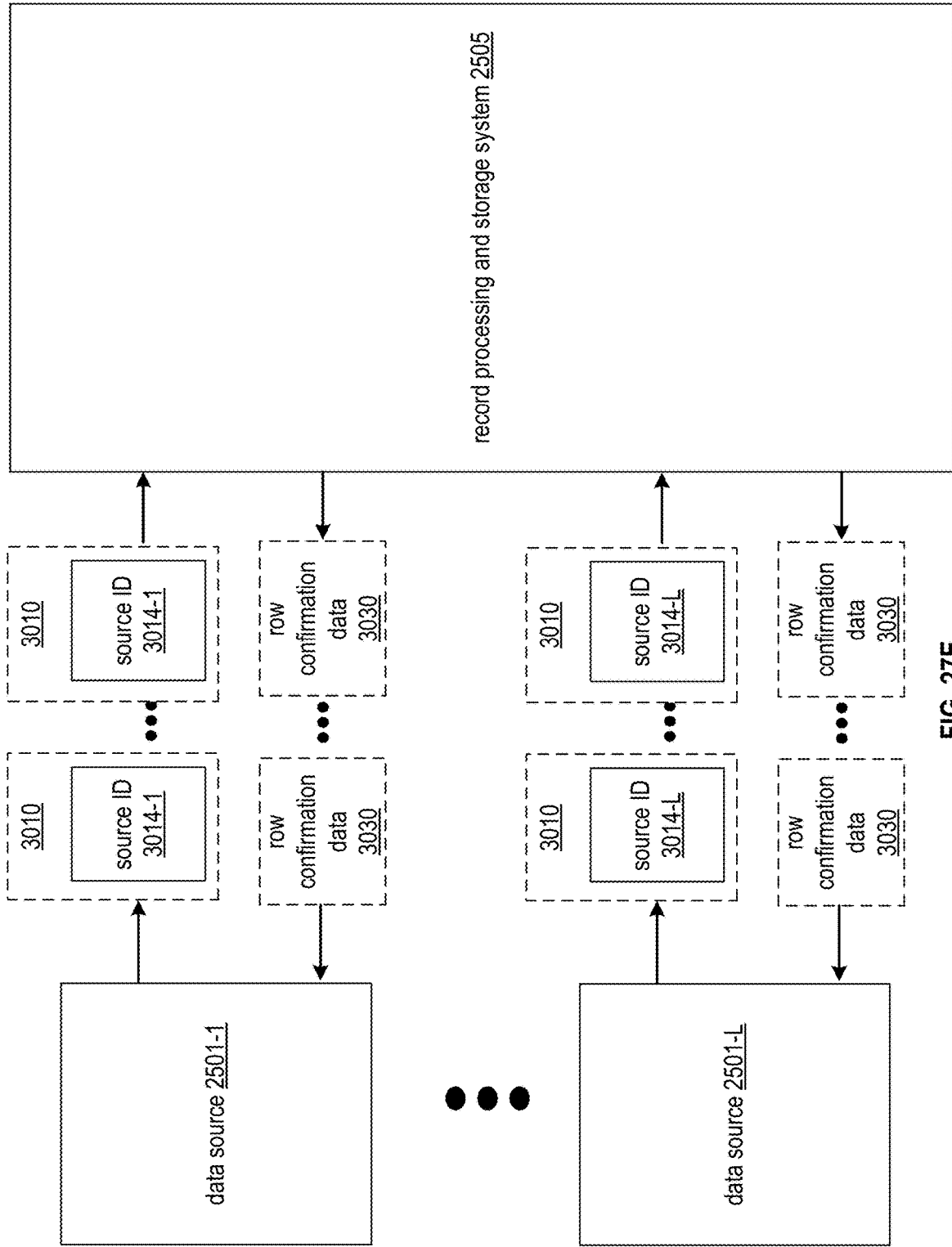
FIG. 27E is a schematic block diagram illustrating communication between a record processing and storage system and a plurality of data sources in accordance with various embodiments of the present invention.

FIG. 27E illustrates an embodiment where multiple data sources 2501 communicate with the record processing and storage system 2505 as discussed in conjunction with FIG. 27A. In embodiments with multiple data sources 2501-1-2501-L, each labeled row data 3010 generated and transmitted by a given data source 2501 indicates a same data source identifier 3014. For example, all labeled row data 3010 sent by data source 2501-1 indicates a first data source identifier 3014-1, all labeled row data 3010 sent by data source 2501-2 indicates a second source identifier 3014-2, and so on.

Different corresponding row confirmation data 3030 can be generated and transmitted to each data sources 2501-1-2501-L over time. For example, the data source identifier 3014 of confirmed row data can indicate which particular data source's row confirmation data 3030 will indicate corresponding row numbers 3012. Each row confirmation data 3030 thus indicates only row numbers for a corresponding one of a plurality of data sources to which the row confirmation data 3030 is transmitted.

Furthermore, each data source can independently generate its own row numbers to generate its labeled row data 3010, for example, in accordance with the row transmittal requirement data. Because labeled row data 3010 includes data source identifiers 3014, identical row numbers received from different data sources 2501 will not be confused and the ordering of row numbers received from each data sources 2501 can be maintained. This enables data sources to generate row numbers without coordination, while ensuring that records can be deduplicated by the record processing and storage system, for example, as discussed in further detail in conjunction with FIGS. 28A-28D. Each data source 2501 can further adhere to the same row number ordering scheme, for example, where all data sources 2501 generate their own row numbers over time that strictly increase in value.

In some cases, a same computing device and/or corresponding transmitter can implement multiple data sources 2501. For example, each data source 2501 corresponds to a different table and/or different types of records in corresponding different record streams of a same computing device and/or a same entity. A same transmitter and/or communication interface can receive and/or generate these multiple record streams, and can generate and send labeled row data for each of its record streams to the record processing and storage system 2505. In such cases, this same computing device can assign different source IDs to different labeled row data based on including records 2422 from different ones of its record streams to differentiate the different record streams.

Figure 27F:
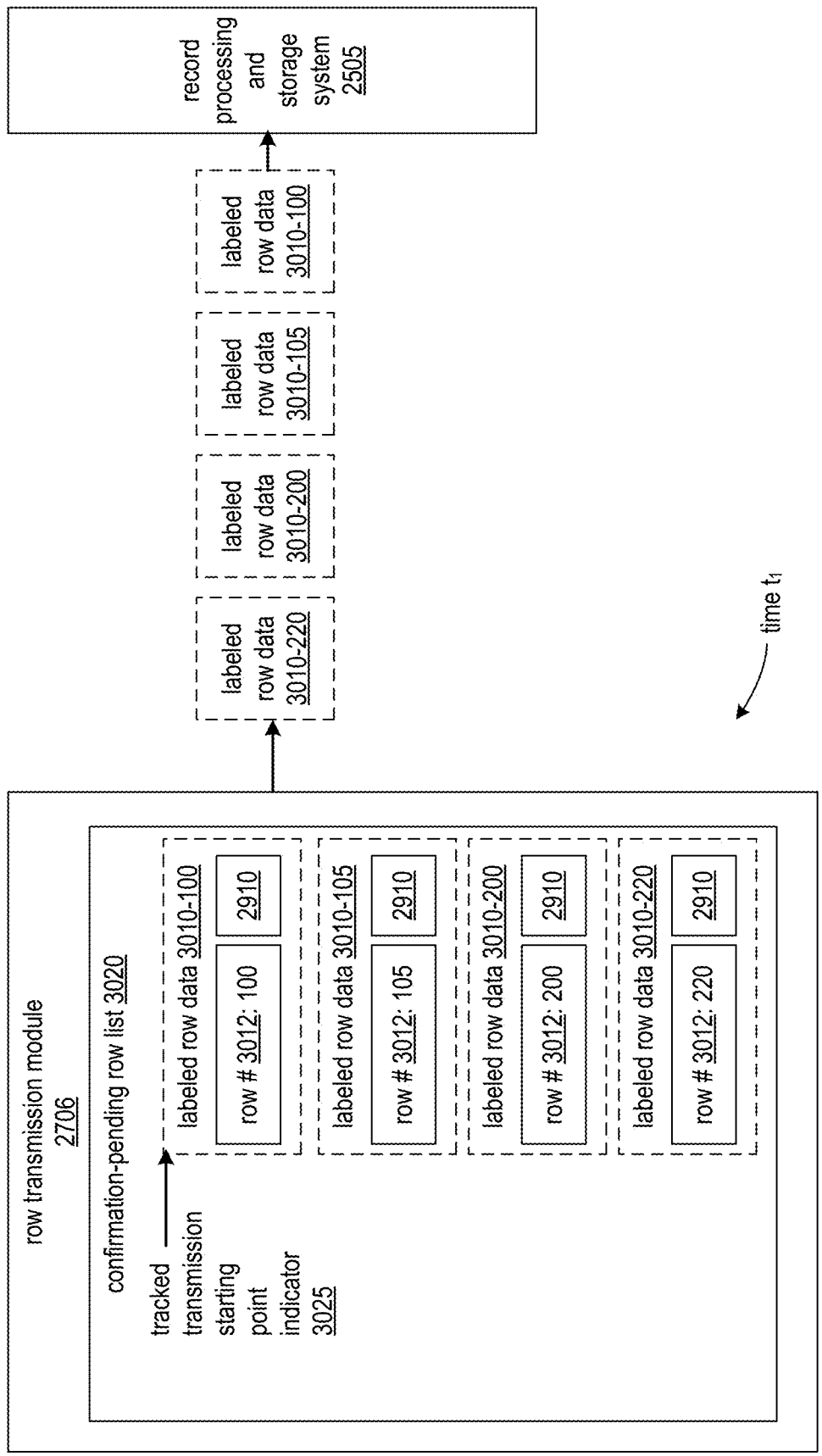
FIGS. 27F-27H are schematic block diagrams illustrating a data source that maintains a confirmation-pending row list in accordance with various embodiments of the present invention.
Figure 27G:
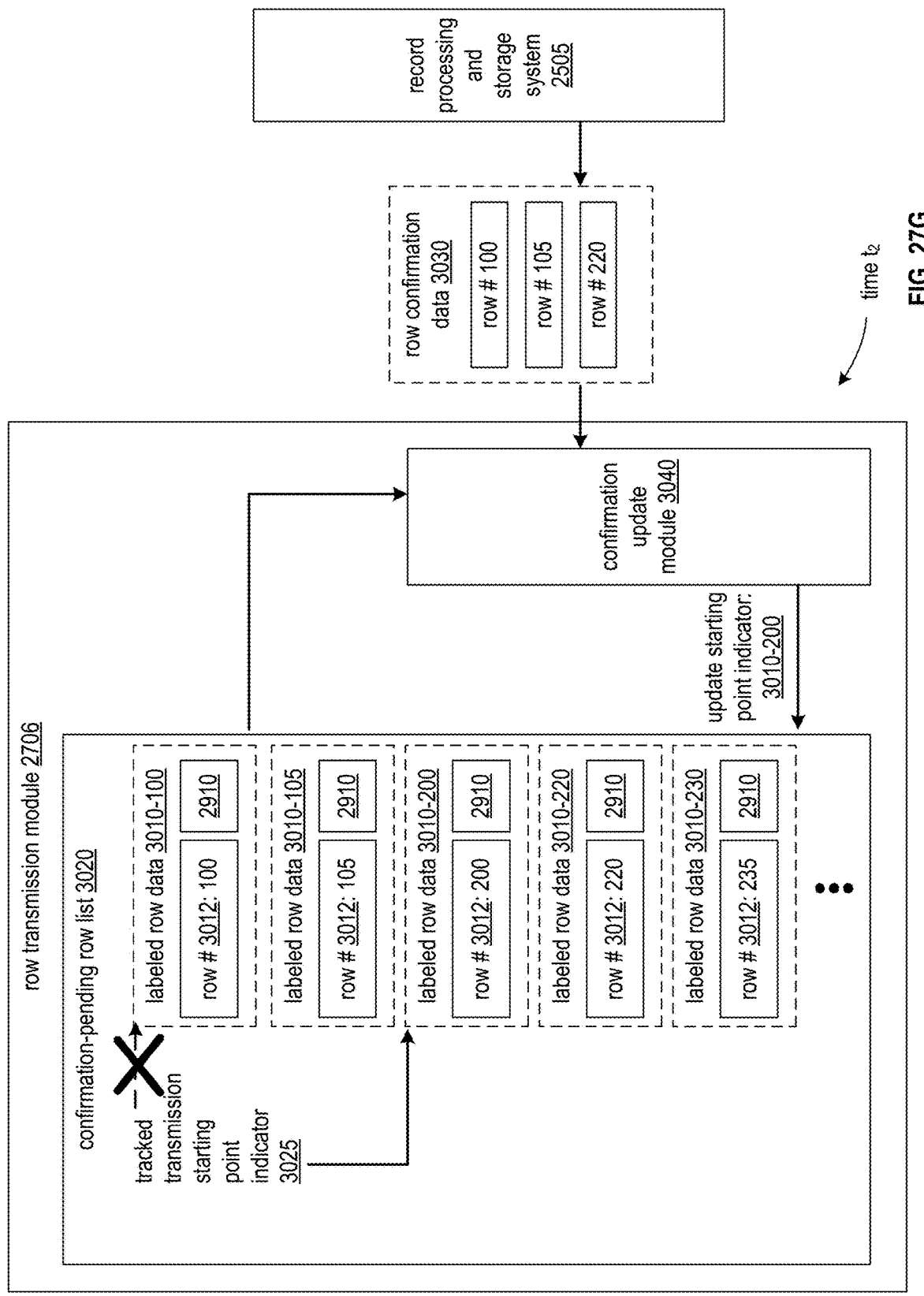
Figure 27H:
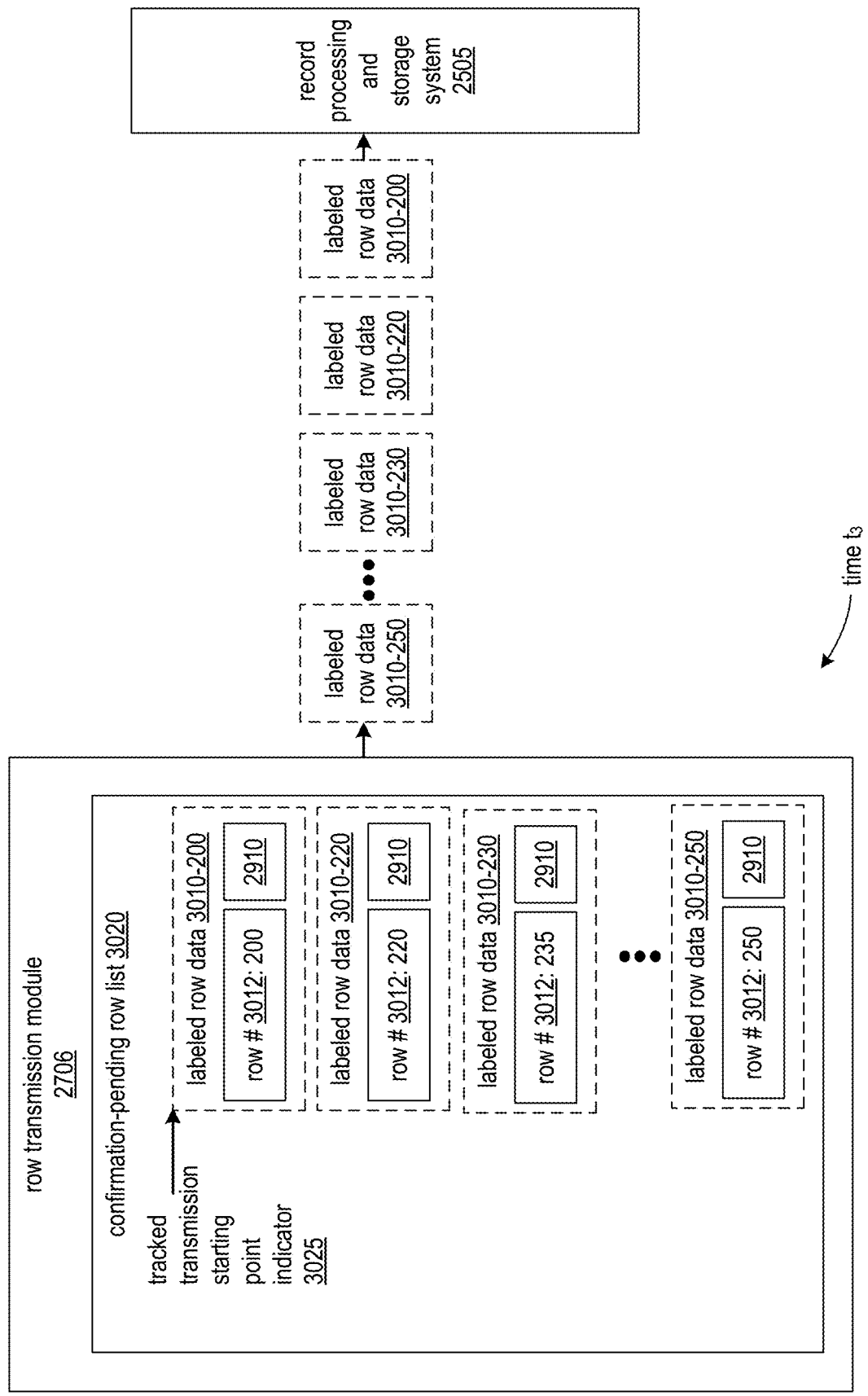

FIGS. 27F-27H illustrate an example of a row transmission module 2706 of a data source 2501 that maintains its confirmation-pending row list 3020 to send labeled row data 3010 over time. The confirmation-pending row list 3020 is updated over time based on the row confirmation data 3030 received over time from the record processing and storage system 2505.

A data source 2501 can maintain its confirmation-pending row list 3020 as a sorted list of labeled row data 3010 by row number 3012. For example, the confirmation-pending row list 3020 can be implemented as and/or based on a queue and/or priority queue that is populated with labeled row data 3010 as it its generated. The ordering of the labeled row data 3010 is in accordance with the ordering scheme utilized to generate the row numbers 3012. In this example, row numbers are generated with an ordering scheme to strictly increase over time, and thus labeled row data is sorted by row number 3012 where lower row numbers 3012 are ordered before higher row numbers 3012 based on the labeled row data 3010 with the lower row numbers 3012 having been generated prior to labeled row data 3010 with the higher row numbers 3012. At a given time, the confirmation-pending row list 3020 may include some labeled row data 3010 that has already been transmitted at least once, and/or may include other labeled row data 3010 that has not been transmitted yet.

The labeled row data 3010 is transmitted in an ordered stream over time based on their corresponding ordering in the confirmation-pending row list 3020, where the labeled row data 3010 with the most favorably ordered row data is sent first. The data source 2501 can continue to send labeled row data 3010 in accordance with a corresponding ordering in the confirmation-pending row list 3020, for example, until a predetermined number of labeled row data 3010 are transmitted and/or until row confirmation data 3030 is received to cause the confirmation-pending row list 3020 to be updated.

When row confirmation data 3030 is received, the confirmation update module 3040 can update the confirmation-pending row list 3020 to update a tracked transmission starting point indicator 3025 to indicate labeled row data 3010 in the confirmation-pending row list 3020 to become the first ordered labeled row data 3010 in the confirmation-pending row list 3020 for resuming retransmission of the labeled row data 3010 in the confirmation-pending row list 3020. This identified starting labeled row data 3010 is selected based on all other labeled row data prior to this labeled row data 3010 having been confirmed in row confirmation data 3030. For example, this identified starting labeled row data is selected to be the least favorably ordered labeled row data 3010 that meets this condition. All labeled row data 3010 with more favorably ordered row numbers than the updated tracked transmission starting point indicator 3025 can be removed from and/or ignored in the confirmation-pending row list 3020 based on being indicated as confirmed, and are not retransmitted.

In some embodiments, as illustrated in the example of FIGS. 27F-27H, only the tracked transmission starting point indicator 3025 is changed in updates to the confirmation-pending row list 3020. In such cases, one or more labeled row data 3010 after the tracked transmission starting point indicator 3025 may have been confirmed in row confirmation data 3030 and/or may otherwise already be received, stored, and/or durably stored, but it still retransmitted based on being after the a tracked transmission starting point indicator 3025 in the confirmation-pending row list 3020. This can be ideal, as the update simply involves shifting the position of the tracked transmission starting point indicator 3025, and can be easier to maintain by the data source as it queues large numbers of labeled row data 3010 for transmission at high transmission rates. This also leverages the deduplication responsibilities of the record processing and storage system by conservatively retransmitting records. In some cases, this can be further ideal by reducing the amount of information required in row confirmation data 3030. For example, the row confirmation data 3030 can be generated by the record processing and storage system 2505 in some cases to depict conservative confirmation information, and not necessarily indicate all confirmed rows.

FIG. 27F illustrates a confirmation-pending row list 3020 at a first time $t_1$. At this time, the confirmation-pending row list 3020 includes a set of labeled row data 3010-100, 3010-105, 3010-200, and 3010-220. These labels depicted in FIG. 27E are based on corresponding numbers of labeled row data 3010 in this example being equal to 100, 105, 200, and 220. Based on the tracked transmission starting point indicator 3025 indicating labeled row data 3010-100, the labeled row data 3010 is transmitted by row transmission module 2706, starting with labeled row data 3010-100 in accordance with the ordering scheme by row number, as sorted in the confirmation-pending row list 3020.

FIG. 27G illustrates this confirmation-pending row list 3020 at a second time $t_2$ after transmission of labeled row data 3010-100, 3010-105, 3010-200, and 3010-220. At this time, row confirmation data 3030 is received indicating row numbers 100, 105, and 220. Because row number 200 was not indicated in the row confirmation data 3030, labeled row data 3010-200 is identified as the new starting point by confirmation update module 3040 based on all previous labeled row data 3010 having been confirmed. This is reflected in the update to tracked transmission starting point indicator 3025 to indicate labeled row data 3010-200. In this case, labeled row data 3010-220 will be retransmitted despite having been confirmed based on more favorably ordered labeled row data 3010-200 requiring retransmission. In other embodiments, labeled row data 3010-220 is removed from the confirmation-pending row list 3020 based on having been confirmed and is not retransmitted.

FIG. 27H illustrates this confirmation-pending row list 3020 at a third time $t_3$ after the tracked transmission starting point indicator 3025 is updated. Based on the tracked transmission starting point indicator 3025 indicating labeled row data 3010-200, the row transmission module 2706 sends labeled row data, starting with labeled row data 3010-200, in accordance with the ordering. Note that labeled row data 3010-200 and labeled row data 3010-200 are retransmitted, while new labeled row data including row data 3010-230 and labeled row data 3010-250 are transmitted for the first time. This process of transmitting labeled row data 3010 over time based on the ordering of labeled row data 3010 in the confirmation-pending row list 3020 and further based on updates to the tracked transmission starting point indicator 3025 of the confirmation-pending row list 3020 over time can be continued over time.

While FIGS. 27F-27H illustrate the case where updates to confirmation-pending row list 3020 are achieved via a simple shift of a tracked transmission starting point indicator 3025, other embodiments of confirmation update module 3040 can involve other updates to the confirmation-pending row list 3020. In some cases, all labeled row data 3010 indicated in row confirmation data 3030 is removed from the confirmation-pending row list 3020, regardless of its ordering in confirmation-pending row list 3020. For example, labeled row data 3010-220 is removed from the confirmation-pending row list 3020 in updating the confirmation-pending row list 3020 based on having been confirmed in the row confirmation data 3030. This can be ideal to minimize the number of retransmissions required by the row transmission module 2706 to more quickly populate the database system 10 with new data rather than retransmitting redundant data that will be deduplicated.

In some cases where the confirmation-pending row list 3020 is updated in this fashion, the only labeled row data 3010 that need be deduplicated by the record processing and storage system 2505 corresponds to labeled row data 3010 with row numbers that were confirmed, but whose row confirmation data 3030 encountered some delay, some transmission failure, and/or was otherwise not communicated and/or processed by the corresponding data source 2501. This causes the data source to re-send this labeled row data 3010 that was actually confirmed because the data source was never made aware that this labeled row data 3010 was confirmed. This retransmitted labeled row data 3010 can be deduplicated by the record processing and storage system 2505.

Figure 27J:
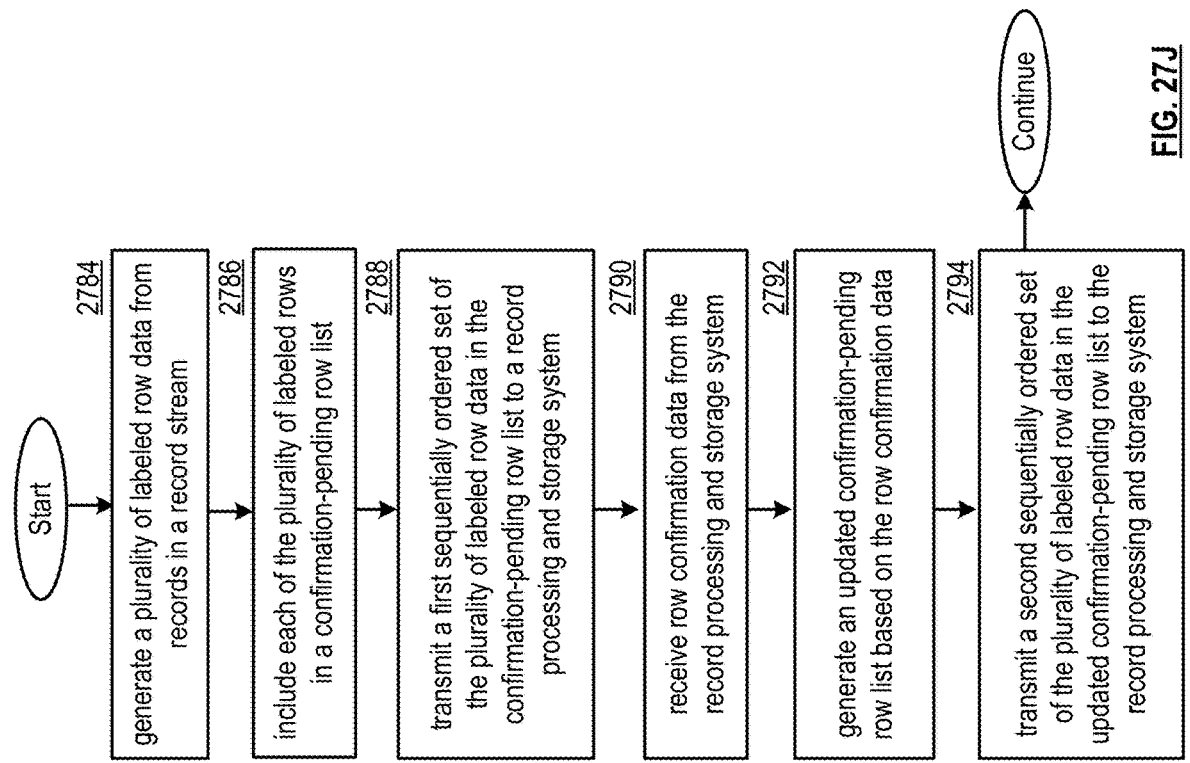
FIG. 27J is a logic diagram illustrating a method of transmitting labeled row data based on a confirmation-pending row list in accordance with various embodiments of the present invention.
Figure 27I:
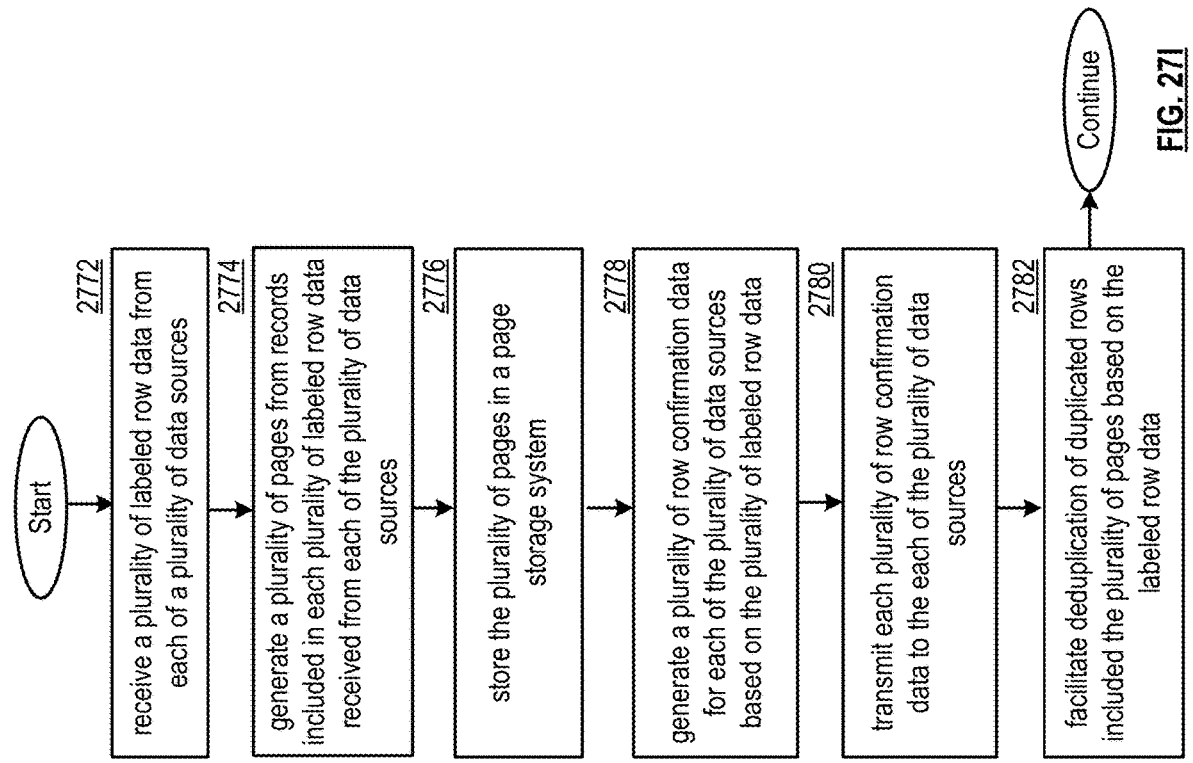
FIG. 27I is a logic diagram illustrating a method of generating pages in accordance with various embodiments of the present invention.

FIG. 27I illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 27I. Some or all of the method of FIG. 27I can be performed by the page generator 2511 and/or the page storage system 2506 of FIG. 25A. Some or all of the method of FIG. 27I can be performed by one or more stream loader modules 2510 of FIG. 25B, independently or in conjunction. Some or all of the method of FIG. 27I can be performed by the row transmittal requirement communication module 3002 of FIG. 27A, the page generator 2511 of FIG. 27A, the row deduplication module 3050 of FIG. 27A, and/or the confirmation communication module 3004 of FIG. 27A. Some or all of the steps of FIG. 27I can optionally be performed by any other processing module of the database system 10. Some or all of the steps of FIG. 27I can optionally be performed by one or more data sources 2501, for example, by utilizing the row transmission module 2706, and/or can be performed via communication with one or more data sources 2501. For example, a record processing and storage system 2505 performs the steps of FIG. 27I in conjunction with communication with a data source that performs the steps of 27J. Some or all of the steps of FIG. 27I can be performed to implement some or all of the functionality of the record processing and storage system 2505 of FIG. 25A and/or FIG. 25B. Some or all of the steps of FIG. 27I can be performed to implement some or all of the functionality of the row deduplication module 3050 of FIG. 28B, FIG. 28C, and/or FIG. 28D. Some or all steps of FIG. 27I can be performed by database system 10 in accordance with other embodiments of the database system 10 and/or nodes 37 discussed herein.

Step 2772 includes receiving a plurality of labeled row data from each of a plurality of data sources. The plurality of labeled row data can be in accordance with row transmittal requirement data, for example, where the method further includes sending the row transmittal requirement data to the plurality of data sources. Each labeled row data received from a given data source can include at least one record; a corresponding row number; and a data source identifier corresponding to the given data source. The data source can generate labeled row data over time, where each labeled row data has a corresponding row number that is strictly greater than all previous row numbers if row numbers are generated as monotonically increasing values, or that is strictly less than all previous row numbers if row numbers are generated as monotonically decreasing values.

Step 2774 includes generating a plurality of pages from records included in each plurality of labeled row data received from each of the plurality of data sources. Step 2776 includes storing the plurality of pages in a page storage system. Information regarding row numbers and/or data sources of the records included in the plurality pages can be included in page metadata stored in the plurality of pages and/or mapped to the plurality of pages. The plurality of pages can be stored in memory, such as via page storage system 2506.

Step 2778 includes generating a plurality of row confirmation data for each of the plurality of data sources based on the plurality of labeled row data. Step 2780 includes transmitting each plurality of row confirmation data to the each of the plurality of data sources. The plurality of row confirmation data confirming a set of records being were received can be generated and transmitted before and/or after the generating and storing the plurality of pages from this set of records. For example, the row confirmation data sent to a data source indicates: one or more row numbers of one or more labeled row data successfully received from the data source in step 2774; one or more row numbers of one or more labeled row data whose records are successfully included in pages generated in step 2776; and/or one or more row numbers of one or more labeled row data whose records are durably stored by the record processing and storage system.

The row confirmation data can indicate row numbers from the corresponding data source that were received and/or stored, for example, within a time frame. For example, the time frame is a fixed interval and/or corresponds to a period of time since a most recent row confirmation data of a plurality of previous row confirmation data was sent to the data source. The row confirmation data can indicate each row number whose records were received and/or stored within the time frame. The row confirmation data can alternatively or additionally indicate a maximum and/or minimum row number of a set of multiple records that were received and/or stored within the time frame. The row confirmation data can alternatively or additionally indicate a number or records received and/or stored within the time frame.

Step 2782 includes facilitating deduplication of duplicated rows included the plurality of pages based on the labeled row data. For example, the rows are deduplicated based on removing records from pages that were included in labeled row data with row numbers and same data source identifiers, indicating these records were duplicated. For example, the method can include receiving sets of labeled row data having the same row numbers and the same data identifier, indicating the corresponding records are duplicates sent by a data source in multiple transmissions. The data source can send labeled row data for a given record with the same row numbers in multiple transmissions based on receiving row confirmation data indicating that this given record was not received in one or more previous transmissions of the given record, for example, based on the row confirmation data received by the data source not indicating the row number for the given record for a time frame that the given record was transmitted by the data source.

In various embodiments, the method can further include performing query executions on records in pages that have been deduplicated in step 2782, for example, to guarantee query correctness by guaranteeing rows are included exactly once based on the deduplication. The method can further include performing a conversion process on pages that have been deduplicated in step 2782 to generate a plurality of segments for long-term storage, where no record is included in more than one segment based on the deduplication.

FIG. 27J illustrates a method for execution by a data source 2501. For example, the data source 2501 can include at least one processor and at least one memory, where the at least one memory stores operational instructions that, when executed by the at least one processor, cause the data source 2501 to execute some or all of the steps of FIG. 27J. Some of all of the method of FIG. 27J can be performed in accordance with execution of application data stored by the data source 2501, where the application data is received from and/or associated with the record processing and storage system 2505. Some or all of the method of FIG. 27J can be performed by one or more data sources 2501 of FIG. 25A. Some or all of the method of FIG. 27J can be performed by the row transmission module 2706 of FIG. 27A, for example, by implementing the row labeling module 3008, the confirmation-pending row list 3020, and/or the confirmation update module 3040. Some or all of the steps of FIG. 27J can optionally be performed by any other processing module of the database system 10. Some or all of the steps of FIG. 27J can optionally be performed by the record processing and storage system 2505, and/or can be performed via communication with the record processing and storage system 2505. For example, a data source 2501 performs the steps of FIG. 27J in conjunction with communication with a record processing and storage system 2505 that performs the steps of 27I. Some or all of the steps of FIG. 27J can be performed to implement some or all of the functionality of one or more data sources 2501 of FIG. 25A and/or FIG. 27A. Some or all steps of FIG. 27J can be performed by database system 10 in accordance with other embodiments of the database system 10 and/or nodes 37 discussed herein.

Step 2784 includes generating a plurality of labeled row data from records in a record stream. Each record row data can be generated in accordance with row transmittal requirement data, for example, where the method further includes receiving the row transmittal requirement data from a record processing and storage system and/or storing the row transmittal requirement data in memory. Each labeled row data can include at least one record of the record stream; a corresponding row number; and a data source identifier corresponding to the given data source. Row numbers can be generated for records as they are processed from the record stream, where the values of row numbers have an ordering in accordance with the ordering that they are generated for corresponding records. For example, row numbers can be numeric values generated to be monotonically increasing values and/or monotonically decreasing values in accordance with the ordering they are generated and/or the ordering of the corresponding records in the record stream. All row numbers generated by the source are different from all other row numbers generated by the source. In some cases, row numbers are generated in accordance with irregular intervals from record to record. For example, the row numbers can be generated to be equal to and/or as a function of a bit offset of corresponding records in the record stream, where different records are different data lengths based on having at least one variable-length field.

Step 2786 includes including each of the plurality of labeled rows in a confirmation-pending row list. For example, the confirmation-pending row list is an ordered list of labeled row data by row number of the labeled row data. Step 2788 includes transmitting a first sequentially ordered set of the plurality of labeled row data in the confirmation-pending row list to a record processing and storage system. A first ordered labeled row data of the first sequentially ordered set can be determined based on a tracked transmission starting point indicator maintained by the data source. The tracked transmission starting point indicator can indicate a lowest valued row number and/or first ordered row number, for example, in the case where row numbers monotonically increasing numeric values, that has not yet been confirmed in previously received row confirmation data by the record processing and storage system. A number of labeled row data for transmission and/or total data size of labeled row data for transmission can optionally be predetermined and/or received in the row transmittal requirement data. In some cases, labeled row data is sent in sequence, one at a time, where the first sequentially ordered set of the plurality of labeled row data includes all labeled row data sent prior to receiving row confirmation data in step 2790.

Step 2790 includes receiving row confirmation data from the record processing and storage system. The row confirmation data can indicate row numbers for records in the first sequentially ordered set that have been confirmed by the record processing and storage system to have been received and/or stored. For example, in response to the first sequentially ordered set of the plurality of labeled row data being transmitted by the data source in performing step 2788, the record processing and storage system receives some or all of the first sequentially ordered set of the plurality of labeled row data in performing step 2772, generates pages from some or all of the first sequentially ordered set of the plurality of labeled row data in performing step 2774, and/or stores the generated pages that include some or all of the first sequentially ordered set of the plurality of labeled row data in performing step 2776. In performing step 2778, the record processing and storage can generate row confirmation data for the data sources based on the ones of the first sequentially ordered set of the plurality of labeled row successfully received, processed and/or stored in steps 2772, 2774 and/or 2776. The data source can receive the confirmation data from the record processing and storage system in step 2790 based on the record processing and storage system transmitting this row confirmation data to the data source in performing step 2778.

Step 2792 includes generating an updated confirmation-pending row list based on the row confirmation data. For example, the tracked transmission starting point indicator can be updated based on the row confirmation data to reflect the new lowest valued row number that has not yet been confirmed in this row confirmation data or in previous row confirmation data. As another example, the updated confirmation-pending row list can be generated to remove some or all labeled row data whose row numbers are indicated in the row confirmation data. Step 2794 includes transmitting a second sequentially ordered set of the plurality of labeled row data in the updated confirmation-pending row list to the record processing and storage system. For example, at least one labeled row data in the first sequentially ordered set is included in the second sequentially ordered set based on having a corresponding row number not indicated in the row confirmation data. Steps 2788, 2790, 2792, and/or 2794 can be repeated over time each subsequent sequentially ordered set of the plurality of labeled row data.

FIGS. 28A-28D illustrate embodiments of a record processing and storage system 2505 that deduplicates pages. Some or all features and/or functionality of embodiments of record processing and storage system 2505 of FIGS. 28A-28D can be utilized to implement the record processing and storage system 2505 of FIG. 25A and/or any other embodiments of the record processing and storage system 2505 discussed herein. Some or all features and/or functionality of embodiments of row deduplication module 3050 of FIGS. 28A-28D can be utilized to implement the row deduplication module 3050 of FIG. 27A.

As discussed previously, a record processing and storage system 2505 can generate and send row confirmation data 3030 to data sources based on receiving and/or storing corresponding row data 2910. However, there is no guarantee that row confirmation data 3030 will be transmitted and received by a corresponding data source 2501 without failure. The data source 2501 will therefore retransmit labeled row data 3010 that was already received and stored by the record processing and storage system 2505 if its corresponding row confirmation data 3030 encountered a transmission error. To guarantee that records are read exactly once in query executions and/or to guarantee that records are included exactly once in segments generated from pages 2515, this retransmitted row data 2910 must be deduplicated. Furthermore, in cases where data sources 2501 more conservatively retransmits labeled row data, for example, as discussed in conjunction with in FIGS. 27F-27H, additional row data must be deduplicated. The page deduplication by the record processing and storage system of FIGS. 28A-28D improves the technology of database systems by guaranteeing records are read exactly once, even though it is possible for these records to be sent, stored, and processed more than once.

Additionally, because row data 2910 may be received and/or processed at high data rates, it is not feasible to iterate over rows individually looking for duplicate records. To reduce the processing required to identify and remove duplicate records, the ordering scheme utilized to generate row numbers 3012 in labeled row data 3010 discussed in conjunction with FIGS. 27A-27H can be leveraged to perform page deduplication based on simple comparisons of and updates to page metadata. In particular, because all row numbers 3012 generated by each given source are guaranteed to be in accordance with a same ordering scheme, the record processing and storage system 2505 can be operable to generate page metadata to include row number span data based on the row numbers 3012 included in a page, and to deduplicate pages based on comparing and/or updating row number span data included in page metadata. This improves database systems by enabling high data rates to be received and processed by reducing the processing required to perform deduplication.

Finally, as discussed previously, it is ideal to minimize data movement of records stored in pages while awaiting conversion into segments, for example, due to these high data rates of receiving and/or processing incoming data. The record processing and storage system 2505 can further be operable to deduplicate records 2422 included in pages by "ignoring" spans of row numbers that overlap with other pages during page reads. For example, records with row numbers indicated to be ignored are skipped over and/or otherwise not returned in reads to the corresponding pages. This can be achieved, for example, based on updates to the page metadata, where the corresponding records are not deleted from and/or moved from the page to avoid the any shifting of records within the page and/or to otherwise reduce data movement. This is ideal in ensuring that records are returned exactly once in reads to pages for query executions and/or for generation of segments. This improves database systems by guaranteeing the "exactly once" reads of records stored in pages via deduplication, while minimizing data movement to improve the efficiency of the database system as discussed previously. As used herein, "removing" duplicated records from pages can correspond to updating the page metadata to ensure that these "removed" records are not returned in reads to pages, even if they are maintained in storage of the page to reduce data movement. For example, page metadata is modified to remove duplicated records, while the pages themselves are not modified to remove these duplicated records.

Figure 28A:
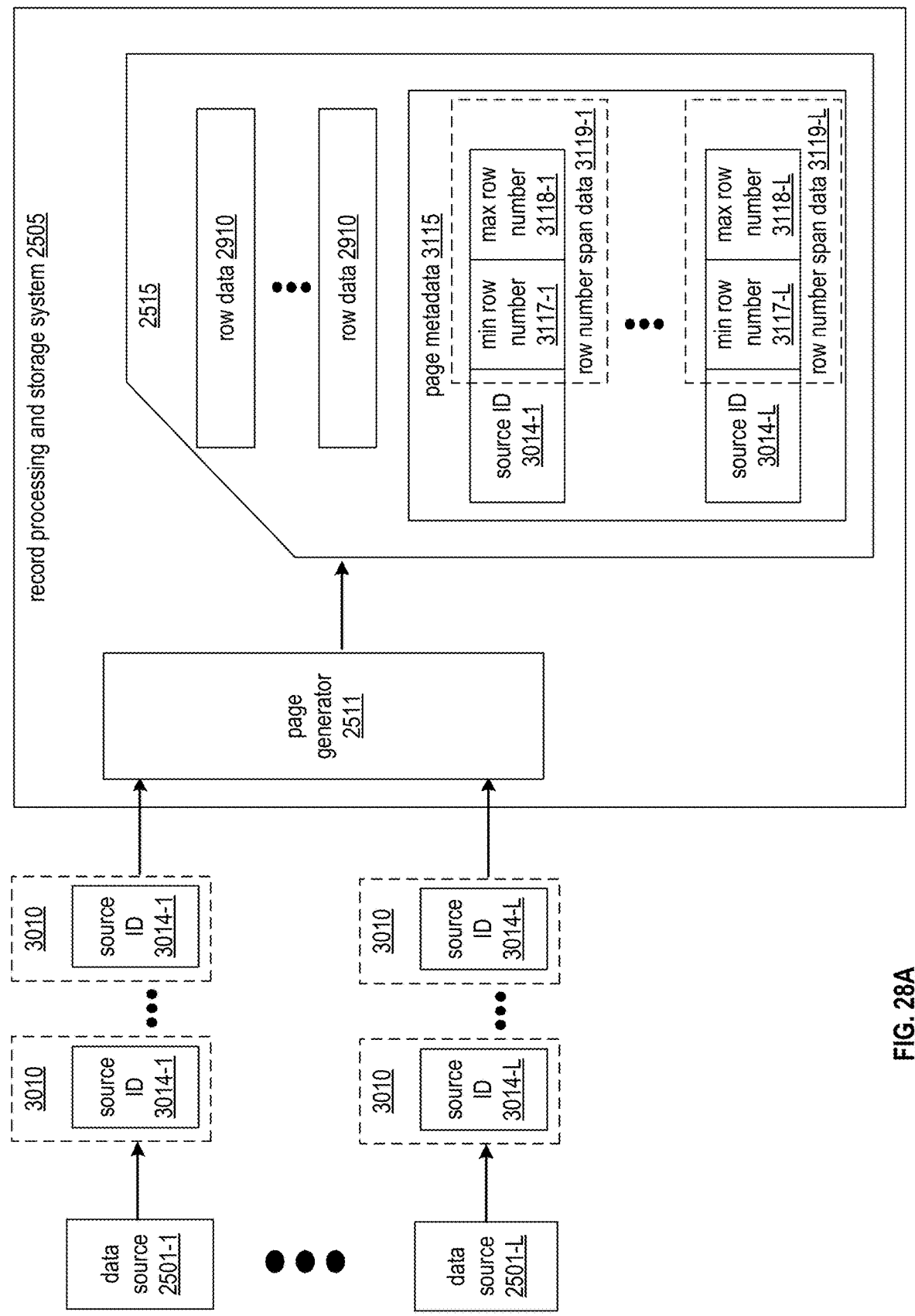
FIG. 28A is a schematic block diagram of an embodiment of a record processing and storage system that generates page metadata from labeled row data in accordance with various embodiments of the present invention.

As illustrated in FIG. 28A, a page generator 2511 can generate pages 2515 from labeled row data 3010 that include one or more row data 2910 as discussed previously. The page generator 2511 can further the utilize information extracted from the corresponding labeled row data 3010 to generate page metadata 3115 for each corresponding page 2515. The page metadata 3115 can be included in the corresponding page 2515, can be stored in conjunction with the corresponding page 2515, and/or can otherwise be mapped to the corresponding page 2515 in page storage system 2506.

The page metadata 3115 can be generated to include row number span data 3119 for each data source whose row data 2910 is included in the corresponding page, as denoted by data source identifiers 3014 of the corresponding labeled row data 3010. Each row number span data 3119 can indicate a span of row numbers 3012, for example, in accordance with the ordering scheme. For example, the row number span data 3119 for each data source 2501 can simply include only a minimum row number 3117 and a maximum row number 3118.

For a given page, the minimum row number 3117 and the maximum row number 3118, per data source identifier 3014, of all rows present in the page can be determined by leveraging the information included in one of more labeled row data 3010 of the given page. When the page is generated, the minimum row number 3117 is set as the lowest valued row number 3012 and/or the most favorably ordered row number 3012 included in the page 2515 for the corresponding data source identifier 3014. When the page is generated, the maximum row number 3118 is set as the highest valued row number 3012 and/or the least favorably ordered row number 3012 included in the page 2515 for the corresponding data source identifier 3014.

As depicted in FIG. 28A, page metadata 3115 for a given page can have up to L row number span data 3119-1-3119-L based on the page generator processing labeled row data from L different data sources 2501-1-2501-L with L different corresponding data source identifiers 3014-1-3014-L. Note that row number span data need not be generated or included for data sources with no row data 2910 in the corresponding page. Note that pages with row data 2910 from only one data source only have one row number span data 3119.

Figure 28B:
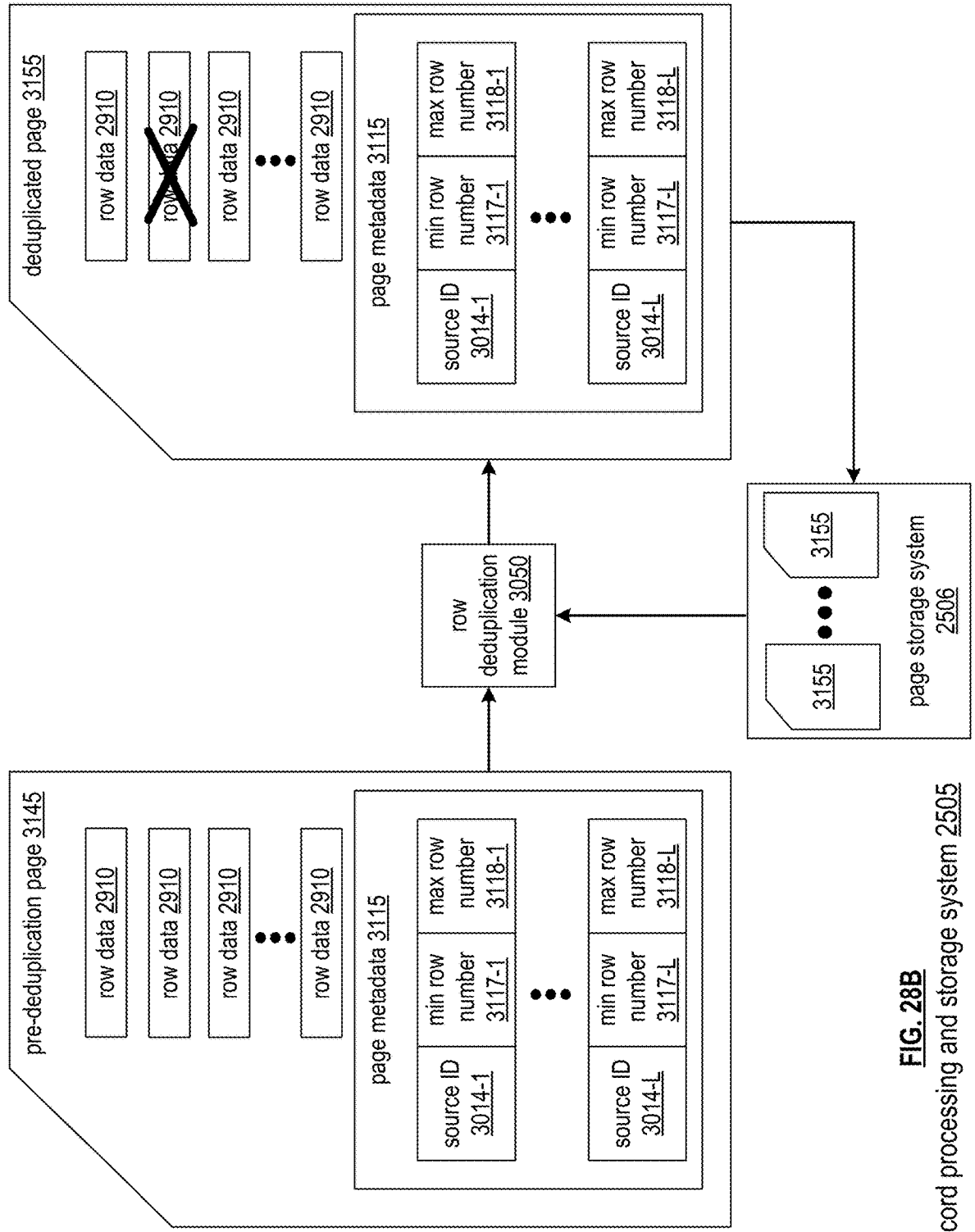
FIG. 28B is a schematic block diagram of an embodiment of a record processing and storage system that implements a row deduplication module in accordance with various embodiments of the present invention.

FIG. 28B illustrates utilizing a row deduplication module 3050 to update a given page 2515 from its original state as a pre-deduplication page 3145 to an updated state as a deduplicated page 3155. The row deduplication module 3050 of FIG. 28B can be utilized to implement the row deduplication module 3050 of FIG. 28A and/or any other embodiments of the row deduplication module 3050 described herein.

A deduplicated page 3155, once generated, can be stored in the page storage system 2506 and/or can otherwise be denoted as deduplicated pages in the page storage system 2506. Note that pre-deduplication pages 3145 can also be stored in the same or different portions of the page storage system 2506, but can be denoted as pages requiring deduplication. For example, page metadata 3115 can indicate whether a given page has undergone deduplication by denoting each page as either a pre-deduplication page 3145 or a deduplicated page 3155.

In some cases, only pages that have been deduplicated as deduplicated pages 3155 are durably stored and/or have their records read in query executions and segment generation. For example, queries are only executed on pages 2515 that have been updated as deduplicated pages 3155. As another example, only pages that have been updated as deduplicated pages 3155 are stored in page storage 2546 of one or more long-term storage 2540. As another example, segments are only generated from pages that have been updated as deduplicated pages 3155, where the conversion page set 2655 includes only deduplicated pages 3155. In some cases, pre-deduplication pages 3145 are only stored in page cache 2512. In some cases, pre-deduplication pages 3145 are stored in page storage system 2506, and are not moved from their location in page storage system 2506 once deduplicated as deduplicated pages 3155 to minimize data movement.

When a new page 2515 is generated and/or initially stored as a pre-deduplication page 3145, the row deduplication module can deduplicate the new page by identifying overlapping row numbers 3012 with other pages 2515. This can be achieved based on comparing the row number span data 3119 of page metadata 3115 of the new page 2515 with the row number span data 3119 in page metadata of other pages 2515, per data source identifier 3014. The identified overlapping row numbers of the new page can be removed, for example, via updates to the new page's metadata 3115, such that the duplicate rows are ignored in the new page, and are not ignored in the older pages. As illustrated in FIG. 28B, at least one record 2422, and/or at least one set of records in particular row data 2910, are removed from the pre-deduplication page 3145 to render the deduplicated page 3155, as denoted by the X over particular row data 2910. Note that this row data 2910 is not necessarily deleted from the page 2515, but is denoted as removed row data that will not be read in page reads to the deduplicated page 3155.

Pages can be deduplicated as they are generated based on comparisons with other, previously deduplicated pages, such as some or all pages being accumulated in a same conversion page set 2655. In such cases, page deduplication can be performed by the page generator 2511 to enable deduplication of pages in conjunction with being generated. Page deduplication can optionally be performed at any later time, for example, prior to the conversion process of the corresponding pages 2515. In some cases, some or all pages 2515 in conversion page set 2655 optionally can be deduplicated in conjunction with the segment generation, for example, where the segment generator 2517 implements the row deduplication module 30550 upon some or all pages in the pages 2515 in conversion page set 2655 via comparisons with other pages in conversion page set 2655. In such cases, the segment generator 2517 can optionally implements the row deduplication module 3050 after determining to initiate the conversion process and/or prior to clustering records 2422 into record groups 2625.

Figure 28C:
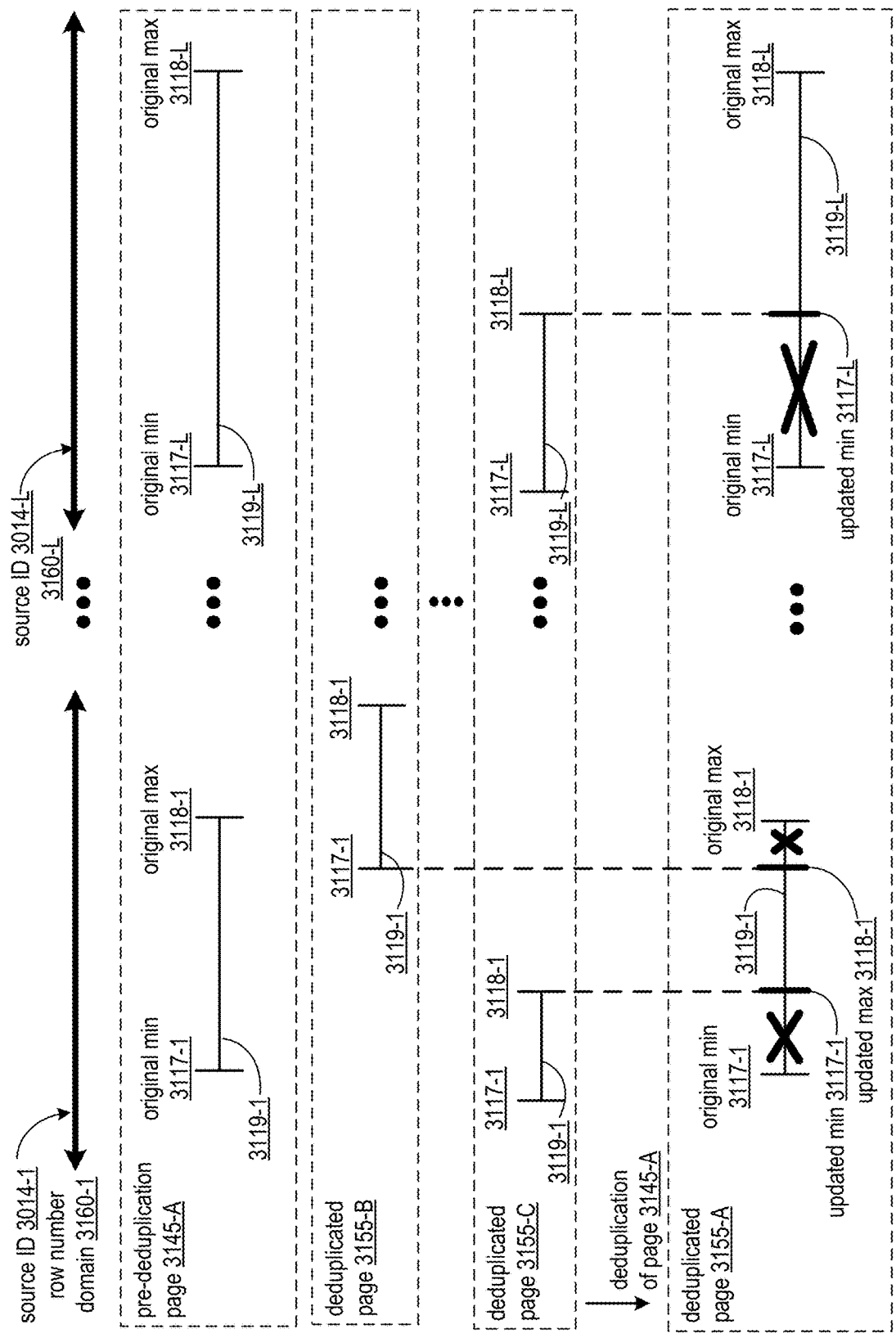
FIG. 28C is an illustration depicting the page deduplication based on page metadata performed by a row deduplication module in accordance with various embodiments of the present invention.

The process of deduplicating a given page 3145 is illustrated in FIG. 28C. FIG. 28C illustrates an example pre-deduplication page 3145-A that is deduplicated to render a deduplicated page 3155-A. The row deduplication module 3050 of FIG. 28C can be utilized to implement the row deduplication module 3050 of FIG. 28A and/or any other embodiments of the row deduplication module 3050 described herein.

As illustrated in FIG. 28C, page 3145-A has row number span data 3119 for some or all data source identifiers 3014-1-3014-L. Each row number span data 3119 is reflected as a span from an original minimum row number 3117 to an original maximum row number 3118. Note that the particular row numbers and/or the number of records included within each span are necessarily known and/or stored in page metadata 3115, as they are not necessary in performing this processed and need not be indicated in the metadata. Each row number span data 3119 therefore simply denotes some continuous interval within an entire row number domain 3160 of the corresponding data source identifier 3014. A possible row number 3012 that is included within particular row number span data 3119 therefore may not have corresponding row data 2910 included in the corresponding page, despite being included within the row number span data 3119. This may often be the case due to data sources generating row numbers 3012 at varying, unknown intervals, for example, based on the row transmittal requirement data only requiring that the row numbers 3012 strictly increase over time.

Other pages 2515, such as one or more deduplicated pages 3155 that have already been deduplicated, can have their minimum row numbers and maximum row numbers compared to the given page 3145-A's corresponding original minimum row number and original maximum row number for corresponding data sources. Note that some of all of these other pages being compared to the given page 3145-A have already been deduplicated. Therefore, some of their minimum row numbers and maximum row numbers of these pages 3155 may correspond to previously updated minimum row numbers and updated maximum row numbers due to the prior deduplication of these pages 3155, while others of their minimum row numbers and maximum row numbers may correspond to original minimum row numbers and original maximum row numbers that didn't need modification in the deduplication these pages 3155.

All pages with row number span data 3119 that overlaps with one or more of page 3145-A's row number span data 3119 can be identified. In this example, a plurality of overlapping deduplicated pages 3155 are identified that include at least deduplicated page 3155-B and deduplicated page 3155-C. Page 3145-A is deduplicated to render deduplicated page 3155-A based on removing portions of row number span data 3119 of Page 3145-A that overlap with the row number span data in this identified plurality of deduplicated pages 3155.

Deduplicated page 3155-B is identified based on having row number span data 3119-1 that overlaps with page 3145-A's row number span data 3119-1. This can be determined based on comparing page 3145-A's minimum row number 3117-1 and/or maximum row number 3118-1 with page 3155-B's minimum row number 3117-1 and/or maximum row number 3118-1. For example, page 3155-B is identified based on determining page 3155-B has a minimum row number 3117-1 that is less than the pre-deduplication page 3145-A's maximum row number 3118-1 and that is greater than the pre-deduplication page 3145-A's minimum row number 3118-1. The interval of row number span data 3119 for data source identifier 3014-1 defined by the span between the minimum row number 3117-1 of page 3155-B and the maximum row number 3118-1 of page 3145-A is removed from page 3145-A in deduplication of page 3145-A. This can include generating updated maximum 3118-1 based on minimum row number 3117-1 of page 3155-B. For example, the updated maximum row number 3118-1 indicates that the row number span data 3119 includes row numbers up to, but not including, minimum row number 3117-1 of page 3155-B. As another example, the updated maximum row number 3118-1 is set as a greatest possible row number 3012 of row number domain 3160 that is strictly less than minimum row number 3117-1 of page 3155-B. As another example, the updated maximum row number 3118-1 is set as a greatest row number 3012 with row data 2910 included in the original page 3145-A that is strictly less than minimum row number 3117-1 of page 3155-B. This updated maximum row number 3118-1 can replace the original maximum row number 3118-1 in the corresponding page metadata 3115 and/or can otherwise be indicated in the corresponding page metadata 3115, where reads to deduplicated page 3155-A are performed based on this updated maximum row number 3118-1.

Deduplicated page 3155-C is identified based on having row number span data 3119-1 that overlaps with page 3145-A's row number span data 3119-1 and based on further having row number span data 3119-L that overlaps with page 3145-A's row number span data 3119-L. The overlap of page 3155-C's row number span data 3119-1 with row number span data 3119-1 of page 3145 can be determined based on comparing page 3145-A's minimum row number 3117-1 and/or maximum row number 3118-1 with page 3155-C's minimum row number 3117-1 and/or maximum row number 3118-1. For example, page 3155-C is identified based on determining page 3155-C has a maximum row number 3118-1 that is greater than the pre-deduplication page 3145-A's minimum row number 3117-1 and that is less than the pre-deduplication page 3145-A's maximum row number 3118-1. The interval of row number span data 3119 for data source identifier 3014-1 defined by the span between the minimum row number 3117-1 of page 3145-A and the maximum row number 3118-1 of page 3155-C is removed from page 3145-A in deduplication of page 3145-A. This can include generating updated minimum row number 3117-1 based on maximum row number 3118-1 of page 3155-C. For example, the updated minimum row number 3117-1 indicates that the row number span data 3119 includes row numbers down to, but not including, maximum row number 3118-1 of page 3155-C. As another example, the updated minimum row number 3117-1 is set as a lowest possible row number 3012 of row number domain 3160 that is strictly greater than maximum row number 3118-1 of page 3155-C. As another example, the updated minimum row number 3117-1 is set as a lowest row number 3012 with row data 2910 included in the original page 3145-A that is strictly greater than maximum row number 3118-1 of page 3155-C. This updated minimum row number 3117-1 can replace the original minimum row number 3117-1 in the corresponding page metadata 3115 and/or can otherwise be indicated in the corresponding page metadata 3115, where reads to deduplicated page 3155-A are performed based on this updated minimum row number 3117-1.

The overlap of page 3155-C's row number span data 3119-L with row number span data 3119-L of page 3145 can be determined in a similar fashion. The interval of row number span data 3119 for data source identifier 3014-L defined by the span between the minimum row number 3117-L of page 3145-A and the maximum row number 3118-L of page 3155-C is similarly removed from page 3145-A in deduplication of page 3145-A. This can include similarly generating updated minimum row number 3117-L based on maximum row number 3118-L of page 3155-C. This updated minimum row number 3117-L can similarly replace the original minimum row number 3117-L in the corresponding page metadata 3115 and/or can otherwise be indicated in the corresponding page metadata 3115, where reads to deduplicated page 3155-A are performed based on this updated minimum row number 3117-L.

Other row number span data 3119 of other data source identifiers can similarly be updated, for example, based on identified overlap with other deduplicated pages 3155. Note that some minimum row numbers 3117 and/or maximum row numbers 3118 may remain unaltered. For example, the deduplicated page 3155-A maintains original maximum row number 3118-L. While not depicted, some entire row number span data 3119 of pre-deduplication page 3145-A for some data source identifiers 3014 can remain unaltered in deduplicated pages 3155-A based on not overlapping with the corresponding row number span data 3119 of any other pages 3155.

As reads are performed on deduplicated pages 3155, only records 2422 of row data 2910 with corresponding row numbers 3012 that fall within the updated row number span data for the corresponding data source identifier 3014 are read. Records 2422 of row data 2910 with corresponding row numbers 3012 that do not fall within the updated row number span data for the corresponding data source identifier 3014 are never read. This can be based on comparing row numbers 3012 with the minimum row number 3117 and maximum row number 3118 resulting from deduplication of the given deduplicated page 3155, whether or original or updated, to determine whether a corresponding record 2422 of corresponding row data 2910 is to be returned in the read or is to be ignored in the read.

Performing this process on all new pages as they are generated ensures that any given row data 2910 is not included in more than one deduplicated page 3155 based on removal of row number span overlap with previously deduplicated pages in this fashion. Performing this process further ensures that any given row data 2910 that is stored will not be removed from all pages in page storage system, as the row number span overlap is not removed from the previously deduplicated pages. This renders no duplication of any records in the deduplicated pages 3155 and in the resulting segments 2424 and further renders no unintentional deletion of records in the deduplicated pages 3155 and in the resulting segments 2424 to guarantee the "exactly once" record storage in deduplicated pages 3155 and in the resulting segments 2424.

Figure 28D:
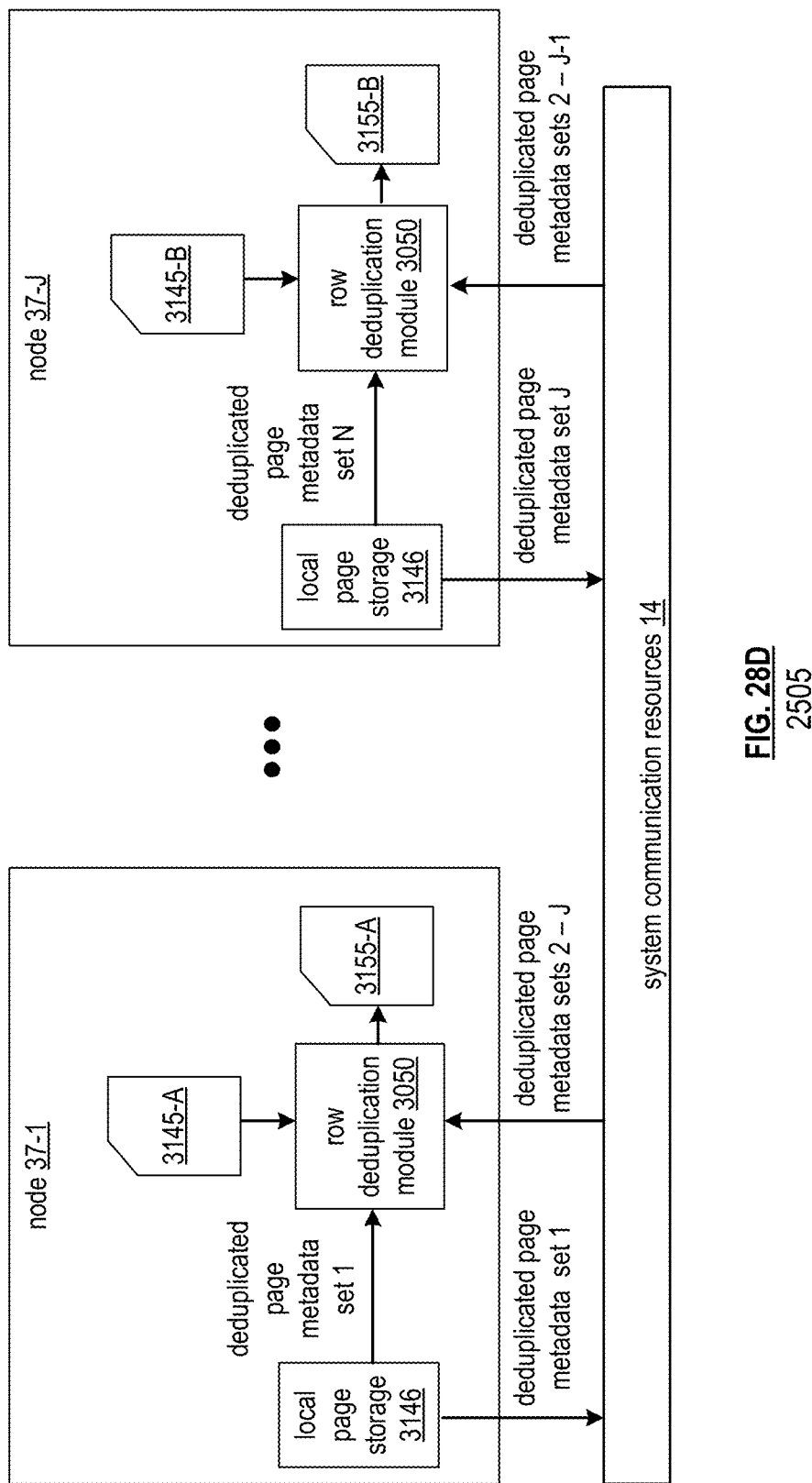
FIG. 28D is an illustration of a record processing and storage system that performs page deduplication via communication between a plurality of nodes in accordance with various embodiments of the present invention.

FIG. 28D illustrates an example embodiment where the row deduplication module 3050 is implemented on individual nodes 37, for example, in conjunction with generation of pages by individual nodes 37 via implementing their own page generators 2511. An individual row deduplication module 3050 of an individual node 37 can be utilized to implement the row deduplication module 3050 of FIG. 28A. The collective set of row deduplication modules 3050 of set of nodes 37-1-37-J can be utilized to implement the row deduplication module 3050 of FIG. 28A.

In some cases, each nodes 37 depicted in FIG. 28D can be utilized to implement a corresponding steam loader module 2510 of FIG. 25B, where each steam loader module 2510 implements its row deduplication module 3050 in conjunction with generation of its pages 2515 via its page generator 2511. In some cases, the set of nodes 37-1-37-J are all included in a same storage cluster. In such cases, local page storage 3146 of a given node 37 can be implemented utilizing the page cache 2512 of the corresponding stream loader module 2510.

In some cases, each nodes 37 depicted in FIG. 28D can be utilized to implement a corresponding long term storage 2540 of FIG. 25B, where each long term storage 2540 implements a row deduplication module 3050 upon pages stored in its page storage 2546, for example, where local page storage 3146 of a given node 37 can be implemented utilizing the page storage 2546 of the corresponding long term storage 2540.

In some cases, the set of nodes 37-1-37-J are all included in a same storage cluster. In such cases, local page storage 3146 of a given node 37 can be implemented utilizing the page cache 2512 of the corresponding stream loader module 2510. The set of nodes 37-1-37-J can otherwise be operable to communicate data with each other and/or store data via common resources, for example, by utilizing system communication resources 14. Local page storage 3146 of each node 37-1-37-J can each be included in page storage system 2506.

As different nodes 37 independently generate and deduplicate pages 2515, their deduplicated pages 3155 can be shared with other nodes 37. In particular, if a set of nodes 37-1-37-J are all receiving and generating pages from row data 2910 of at least one same data source 2501, some level of data passing and/or storage of pages via commonly accessible resources is required across the set of nodes 37-1-37-J. When a given node 37 deduplicates a given page, such as newly generated page 2515, it can to identify page overlaps by performing the necessary metadata comparisons with metadata 3115 of other pages 3155 generated by the given node and also metadata 3115 of other pages 3155 generated by other nodes in the set of nodes.

This can be achieved via a given node storing pages 2515 and/or their corresponding page metadata 3115 in commonly accessible resources of page storage system 2506, where all other nodes in the set of nodes can access the stored pages 2515 and/or corresponding page metadata 3115 generated by the given node via accessing the in commonly accessible resources of page storage system 2506. The system communication resources 14 can be utilized to store pages 2515 and/or their corresponding page metadata 3115 in these common storage resources and/or to retrieve pages 2515 and/or their corresponding page metadata 3115 from these common storage resources. In other cases, nodes can send pages 2515 and/or their corresponding page metadata 3115 to other nodes 37 in the page set directly via communications between the nodes 37 via system communication resources 14. As illustrated in the embodiment of FIG. 28D, because only page metadata 3115 of deduplicated pages is necessary in deduplicated in a given page, only the deduplicated page metadata is shared and/or accessed across the set of nodes in performing their deduplication of pages.

For example, as illustrated in FIG. 28D, a first node 37-1 utilizes its row deduplication module 3050 to perform deduplication of a particular, pre-deduplication page 3145-A to render deduplicated page 3155-A, for example, as discussed in conjunction with FIGS. 28B and 28C. The page metadata 3115 of pre-deduplication page 3145-A is compared with page metadata 3115 in deduplicated page metadata set 1, which can be retrieved and/or accessed in its local page storage 3146, where deduplicated page metadata set 1 corresponds to page metadata 3115 of a set of pages previously generated and/or deduplicated by the node 37-1. The page metadata 3115 of pre-deduplication page 3145-A is also compared with page metadata 3115 in deduplicated page metadata sets 2-J for pages 2515 previously generated by other nodes 37-2-37-J. Once deduplicated page 3155-A is generated from pre-deduplication page 3145-A, it can be stored in local page storage 3146 and/or can have its updated page metadata 3115 sent to other nodes and/or sent to common storage accessible to other nodes in subsequent deduplicate page metadata shared by node 37-1. Note that received deduplicated page metadata sets 2-J can be stored in node 37-1's local page storage 3146 and/or in other memory of node 37-1 to enable node 37-1 to easily access page metadata 3115 included in deduplicated page metadata sets 2-J for deduplication of subsequently processed pages 3145 by row deduplication module 3050.

Other nodes similarly utilize their own row deduplication modules 3050 in this fashion to perform deduplication of pages 3145 based on metadata comparisons with metadata included in the full, shared plurality of page metadata 3115 included in page metadata set 1-J. For example, node 37-J similarly compares page metadata 3115 of pre-duplication page 3145-B with page metadata 3115 in its own deduplicated page metadata set J, and with page metadata 3115 in deduplicated page metadata sets 1-J-1 for pages 2515 previously generated by other nodes 37-1-37-J-1

In some cases, the nodes 37-1-37-J can perform additional coordination to ensure that pages generated within a same time frame by different nodes, whose metadata was not utilized by other nodes 37 to generate their pages in this timeframe, are further deduplicated. In some cases, deduplication is later performed via comparisons of these pages generated within this timeframe. In other cases, coordination and/or scheduling between nodes is facilitated via system communication resources 14 utilized to ensures that this simultaneous deduplication by different nodes 37 is not performed.

As a particular example, page 3145-A of FIG. 28D can correspond to page 3145-A of FIG. 28C, and page 3155-B of FIG. 28D can correspond to page 3155-B of FIG. 28C, where the process of FIG. 28C is performed by the row deduplication module 3050 of node 37-1, and where the process of FIG. 28C includes receiving the page metadata of page 3155-B from node 37-J in a deduplicated page metadata set J based on node 37-J having already generated page 3155-B. In some cases, the process of FIG. 28C includes receiving the page metadata of page 3155-C from local page storage based on node 37-1 having already generated page 3155-C.

In various embodiments, a record processing and storage system includes at least one processor and memory. The memory stores operational instructions that, when executed by the at least one processor, cause the record processing and storage system to receive, from a data source, a plurality of records and a plurality of row numbers corresponding to the plurality of records. A plurality of pages is generated from the plurality of records. Each of the plurality of pages can include a proper subset of the plurality of records. Page metadata is generated for each of the plurality of pages that includes row number span data corresponding to the data source based on a proper subset of the plurality of row numbers corresponding to the proper subset of the plurality of records included in the each of the plurality of pages. A plurality of pairs of pages are identified in the plurality of pages based on having corresponding row number span data for the data source in their page metadata that include a row number span overlap. For each pair in the plurality of pairs of pages, updated row number span data is generated for a first page in the pair by removing the row number span overlap with the row number span data of a second page in the pair from the row number span data of the first page in the pair, and the row number span data of the first page in the each pair is updated as the updated row number span data. A plurality of reads of the plurality of pages are performed based on the row number span data of the plurality of pages. Only ones of the proper subset of the plurality of records of each first page of each pair in the plurality of pairs of pages having corresponding row numbers that are within the updated row number span data are read in the performing of the plurality of reads.

Figure 28E:
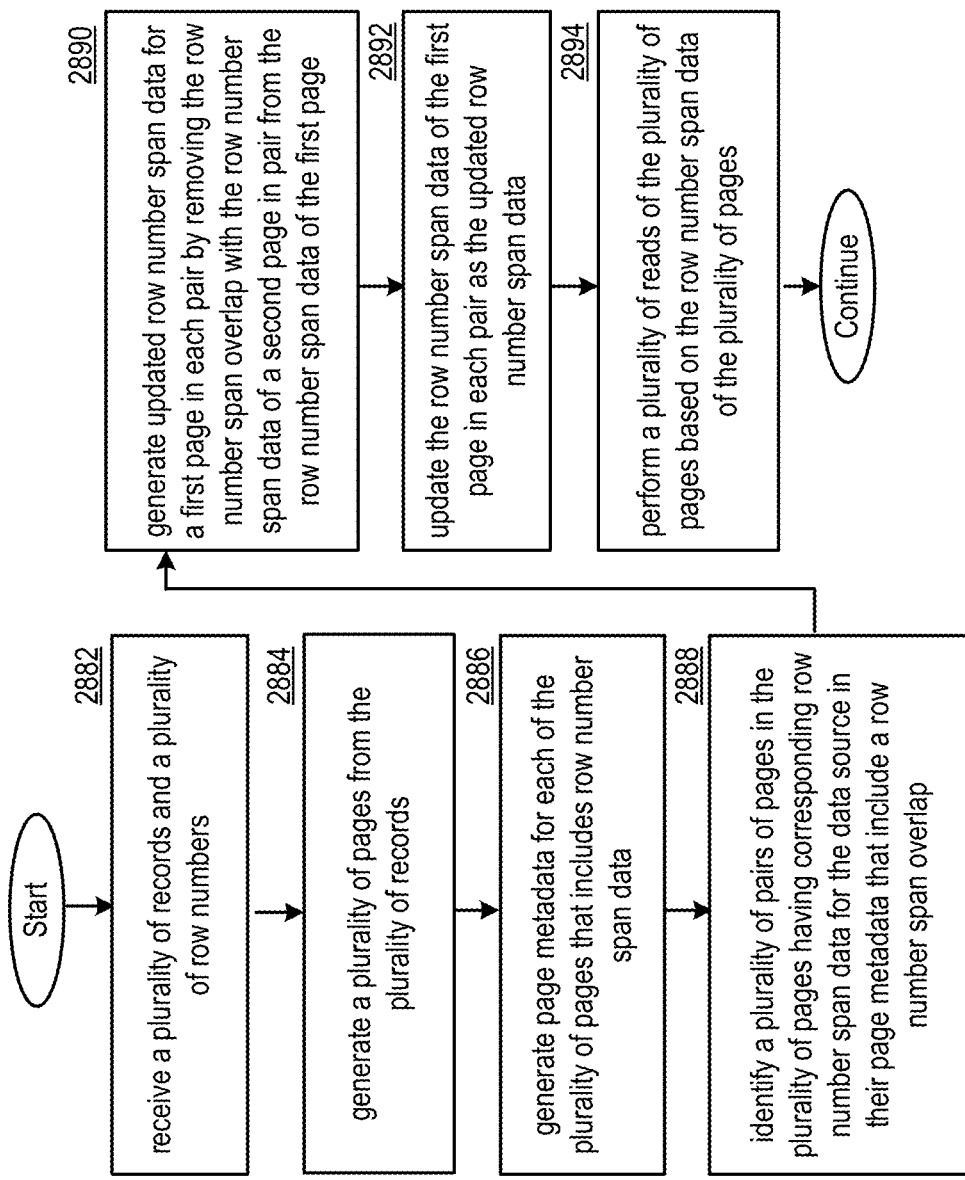
FIG. 28E is a logic diagram illustrating a method of deduplicating pages in accordance with various embodiments of the present invention.

FIG. 28E illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 28E. For example, some or all of the method of FIG. 28E can be performed via the set of nodes 37-1-37-J of FIG. 28D. Some or all of the method of FIG. 28E can be performed by the page generator 2511 and/or the page storage system 2506 of FIG. 25A. Some or all of the method of FIG. 28E can be performed by one or more stream loader modules 2510 of FIG. 25B, independently or in conjunction. Some or all of the method of FIG. 28E can be performed by the row deduplication module 3050 of FIG. 28B, FIG. 28C, and/or FIG. 28D. Some or all of the method of FIG. 28E can be performed by one or more of a plurality of row deduplication modules 3050 implemented by a plurality of nodes 37. Some or all of the steps of FIG. 28E can optionally be performed by any other processing module of the database system 10. Some or all of the steps of FIG. 28E can optionally be performed by one or more data sources 2501, for example, by utilizing the row transmission module 2706, and/or can be performed via communication with one or more data sources 2501. Some or all of the steps of FIG. 28E can be performed to implement some or all of the functionality of the record processing and storage system 2505 of FIG. 25A and/or FIG. 25B. Some or all of the steps of FIG. 28E can be performed to implement some or all of the functionality of the row deduplication module 3050 of FIG. 28B, FIG. 28C, and/or FIG. 28D. Some or all steps of FIG. 28E can be performed by database system 10 in accordance with other embodiments of the database system 10 and/or nodes 37 discussed herein.

Step 2882 includes receiving a plurality of records and a plurality of row numbers. For example, the plurality of records is received from a data source, such as a data source 2501. For example, the plurality of records as records 2422 included in one or more row data 2910 received from the data source over time. The plurality of row numbers can correspond to the plurality of records. Each record, and/or each batch of records in same row data 2910, can be assigned a unique row number by the data source, where each row number is included in a transmission packet and/or otherwise received in conjunction with the corresponding one or more records. In various embodiments, the plurality of records is transmitted by the data source in accordance with a sequence. An ordering of the plurality of row numbers are in accordance with the sequence. For example, the row numbers can be strictly increasing values in accordance with an ordering of the plurality of records sent by the data source. Any records that are retransmitted by the data source multiple times keep their original row number to distinguish multiple instances of these records received by the data source 2501 as duplicated records. The data source can send the row data 2910 as discussed in conjunction with one or more embodiments of FIGS. 27A-27G.

Step 2884 includes generating a plurality of pages from the plurality of records, for example, via page generator 2511. For example, each of the plurality of pages includes a proper subset of the plurality of records. Each received record can be included in exactly one page. However, if a record is received as a duplicated record in multiple transmissions from the data source, each instance of the duplicated record can be included in different ones of the plurality of pages. The plurality of pages can be stored in a page storage system, such as page storage system 2506.

Step 2886 includes generating page metadata for each of the plurality of pages that includes row number span data. The row number span data for each page can indicate and/or can be generated based on a proper subset of the plurality of row numbers that correspond to the proper subset of the plurality of records included in the page. The row number span data can correspond to the data source. For example, where a page that includes records received from multiple different data sources can have separate row number span data in the page metadata corresponding for each of these different data sources. In various embodiments, the row number span data can include the minimum row number and the maximum row number of all row numbers for all records included in the page, such as the minimum row number 3117 and the maximum row number 3118. For example, the row number span data indicates only this minimum row number and this maximum row number, without indicating any other row numbers for other records included in the page that are between minimum row number and this maximum row number. The page metadata of a given page can be included within the given page and/or can be mapped to the given page in the page storage system 2506.

Step 2888 includes identifying a plurality of pairs of pages in the plurality of pages having corresponding row number span data for the data source in their page metadata that include a row number span overlap. Step 2890 includes, for each pair of the plurality of pairs of pages, generating updated row number span data for a first page in each pair by removing the row number span overlap with the row number span data of a second page in pair from the row number span data of the first page in each pair. Step 2892 includes, for each pair of the plurality of pairs of pages, updating the row number span data of the first page in each pair as the updated row number span data generated for each pair in step 2890. For example, steps 2888, 2890, and/or 2892 are performed by utilizing one or more row deduplication modules 3050.

For example, the first page in each given pair can be implemented as a pre-deduplication page 3145 of FIG. 28B and/or FIG. 28C, where the second page in each pair is implemented as a deduplicated page 3155 stored in page storage system 2506, where the second page was previously deduplicated as a first page in a previously processed pair. Note that a same first page can be included in multiple pairs, for example, where the first page in a first pair and a second pair is a same page 3145 such as page 3145-A of FIG. 28C, where the second page in the first pair is a first deduplicated page 3155, such as page 3155-B of FIG. 28C, and where the second page in the second pair is a second deduplicated page 3155, such as page 3155-C of FIG. 28C.

Step 2894 includes performing a plurality of reads of the plurality of pages based on the row number span data of the plurality of pages. In performing the plurality of reads, only ones of the proper subset of the plurality of records of each first page of each pair in the plurality of pairs of pages having corresponding row numbers that are within the updated row number span data are read in the performing of the plurality of reads.

In various embodiments, at least one record in the proper subset of the plurality of records of each first page of each pair in the plurality of pairs of pages are not read in the performing of the plurality of reads based on these records having corresponding row numbers that are not within the updated row number span data of the each first page. For example, these records are skipped over and/or ignored in reading some or all of the plurality of records of the corresponding page based on having row numbers that do not fall within the updated row number span data. In various embodiments, the corresponding row numbers of these ignored records that are not read in the performing of the plurality of reads were within the original row number span data of the each first page prior to being updated as the updated row number span data, for example, based on being included in the corresponding page when the corresponding page was generated in step 2886 and prior to the row deduplication of steps 2888, 2890, and/or 2892.

In various embodiments, one page in each of the plurality of pairs of pages has a minimum row number in the row number span data of its page metadata that is less than the maximum row number in the row number span data of the page metadata for the other page in the each of the plurality of pairs of pages. For example, each of these pairs of pages are identified as having a row number span overlap based on one page's minimum row number being less than the other page's maximum row number.

In various embodiments, generating the updated row number span data includes selecting the first page in each pair based on predetermined criteria. In various embodiments, the predetermined criteria for selecting the first page in each pair that has its row number span data modified is based on determining the page in the pair with a lower minimum row number. For example, the first page can be selected in each pair based on having a lower minimum row number than the other, second page in the pair, where the page with the lower minimum row number has its row number span data updated. In this case, generating the updated row number span data further includes generating an updated maximum row number for the first page based on the minimum row number of the second page in the pair. For example, the updated maximum row number is generated to be equal to or based on a greatest row number of records in the first page that is less than the minimum row number of the second page. The maximum row number of the row number span data for the first page is replaced with the updated maximum row number in generating the updated row number span data. For example, the updated row number span data indicates the updated maximum row number and the same minimum row number as the original row number span data.

In various embodiments, the predetermined criteria for selecting the first page in each pair that has its row number span data modified is based on determining the page in the pair that was generated most recently. For example, the first page in each pair is selected based being a more recently generated page than the other, second page in the pair. In this case, generating the updated row number span data further includes selecting an updated maximum row number for the first page based on a greatest row number of records in the first page that is less than the minimum row number of the second page in the each pair, and/or or selecting an updated minimum row number for the first page based on a lowest row number of records in the first page that is greater than the maximum row number of the second page in the each pair. For example, whether an updated maximum or updated minimum is selected is based on whether the page's upper-end row number overlap with the other page's row number span data or whether the whether the page's lower-end row number overlap with the other page's row number span data. The maximum row number of the row number span data for the first page is replaced with the updated maximum row number in the updated row number span data when an updated maximum row number was generated. The minimum row number of the row number span data for the first page is replaced with the updated minimum row number in the updated row number span data when an updated minimum row number was generated.

In various embodiments, the predetermined criteria for selecting the first page in each pair that has its row number span data modified is based on determining the page with a higher proportion of its pages overlapping, for example, by identifying the page with a larger number of rows. The page with a larger number of rows can be selected as the first page to be modified, for example, as the larger page already has many other rows to be read even if its row number span data is updated. The page with a smaller number of rows can alternatively be selected as the first page to be modified.

In various embodiments, plurality of records includes a set of duplicated records. For example, the plurality of records includes the set of duplicated records based on the data source sending each duplicated record in the set of duplicated records in multiple transmissions. A given duplicated record in the set of duplicated records is included in the first page and the second page of a given one of the plurality of pairs of pages. Performing the plurality of reads includes reading records included in the first page and the second page. Exactly one instance of the given duplicated record is read in the performing of the plurality of reads based on the updated row number span data of the first page. For example, the exactly one instance of the duplicated record is read in the performing of the plurality of reads further based on the duplicated record being assigned a same row number by the data source in each one of its multiple transmissions.

The exactly one instance of the duplicated record is read, for example, based on this assigned row number of the duplicated record not being included in the first page's updated row number span data. For example, this assigned row number of the duplicated record is not included in the first page's updated row number span data based on removal of the overlapping span with the second page that includes this row number of the duplicated record. Thus, the given duplicated record is read from the second page and not the first page. The given duplicated record may have been written to one or more other pages as well, but is similarly not read from these other pages based on their row number span data also being updated to no longer include the row number of the duplicated record. Exactly one instance of the other duplicated records in the set of duplicated records can similarly be read in performing the plurality of reads based on other row number span data having been updated.

In various embodiments, the method includes generating a plurality of segments from a set of records read in the plurality of reads of the plurality of pages. The plurality of pages can include at least one duplicated record, and the set of records included in the plurality of segments are is equivalent to a union distinct of the set of records included in the plurality of pages based on the updated row number span data generated for the plurality of pairs of pages in the plurality of pages. For example, all records are read from the plurality of pages, except for duplicated records which are ignored or skipped over based on the row number span data being updated to updated row number span data for at least some of the plurality of pages that include instances of duplicated records.

In various embodiments, a first subset of the plurality of records are received from the data source in a first time frame. A first subset of the plurality of pages are generated from the first subset of the plurality of records. A second subset of the plurality of records are received from the data source after the first time frame. A new page is generated from the second subset of the plurality of records. A pair of pages in the plurality of pairs of pages is identified that includes the new page and an old page from the first subset of the plurality of pages. The method includes selecting the new page as the first page of the pair of pages based on being generated after the old page. For example, the new page is selected based on the predetermined criteria dictating that newer pages have their row number span data updated. The updated row number span data is generated for the new page based on the new page being selected as the first page.

In various embodiments, a plurality of row confirmation data is transmitted to the data source based on generating the first subset of the plurality of pages. Each row confirmation data is generated based on the proper subset of the plurality of row numbers for the proper subset of the plurality of records included in at least one page of the first subset of the plurality of pages. For example, the row confirmation data is sent as notifications acknowledging the set of row numbers whose records were received and/or included in pages. The row confirmation data can indicate some or all row numbers for records from the data source successfully received and included in the first subset of the plurality of pages. The method can include receiving a duplicated record in the second subset of the plurality of records. For example, a first instance of the duplicated record was transmitted by the data source in the first subset of the plurality of records, and a second instance of the duplicated record was retransmitted by the data source in the second subset of the plurality of records. For example, the duplicated record was retransmitted by the data source based on the data source determining the row number for the duplicated record is not included in the set of row numbers indicated by the row confirmation data and/or by otherwise determining the duplicated record was not successfully received and/or included in a page based on the row confirmation data. The row number of this duplicated record can be included in the row number span data generated for the new page, for example, based on the duplicated record being written to the new page. The row number of the duplicated record is not included in the updated row number span data generated for the new page based on the old page including the duplicated record and having row number span data including the row number of the duplicated record.

In various embodiments, the second subset of the plurality of records are received in a second time frame. A third subset of the plurality of records are received from the data source after the second time frame. A second new page is generated from the third subset of the plurality of records. A second pair of pages in the plurality of pairs of pages is identified that includes the second new page and the new page. The method can further include selecting the second new page as the first page of the pair of pages, for example, based on being generated after the new page. Second updated row number span data is generated for the second new page by removing the row number span overlap with the updated row number span data of the new page from the row number span data of the second new page. For example, the updated row number span data previously generated form the new page in its deduplication with the old page is utilized to dictate the overlap with the second new page because the updated row number span data replaced the new page's original row number span data.

In various embodiments, the records corresponding to any number of different data sources can be received, stored, and deduplicated in a similar fashion as discussed and illustrated in conjunction with FIG. 28E. The method can include receiving, from a second data source, a second plurality of records and a second plurality of row numbers corresponding to the second plurality of records. The plurality of pages is generated from the plurality of records and the second plurality of records. A subset of the plurality of pages can each include at least one record from the plurality of records and at least one record from the second plurality of records. The method can further include generating, for each of the subset of the plurality of pages, second row number span data for the second data source based on a proper subset of the second plurality of row numbers corresponding to the at least one record of the second plurality of records included in the each of the subset of the plurality of pages. For example, the second row number span data includes only a minimum row number and a maximum row number for records of the second data source. The page metadata for each of the subset of the plurality of pages further includes the second row number span data. The method includes identifying a second plurality of pairs of pages in the plurality of pages having corresponding second row number span data in their page metadata that include a row number span overlap. For each pair in the second plurality of pairs of pages, the method includes generating second updated row number span data for a first page in the each pair by removing the row number span overlap with the second row number span data of a second page in the each pair from the second row number span data of the first page in the each pair. The method includes updating the second row number span data of the first page in each pair as the second updated row number span data. In performing the performing of the plurality of reads, only ones the second plurality of records in each first page of each pair in the second plurality of pairs of pages having corresponding row numbers that are within the second updated row number span data are read.

In various embodiments, a particular page is included a first pair of pages in the plurality of pairs of pages and is also included in a second pair of pages of the second plurality of pairs of pages. Updated row number span data, corresponding to the data source, is generated for the page based on the row number span data of the second page in the first pair of pages. Second updated row number span data, corresponding to the second data source, is also generated for the page based on the second row number span data of the second page in the second pair of pages. The second page in the first pair of pages can be the same as or different from the second page in the second pair of pages.

In various embodiments, the method includes receiving, from the data source, a first data source identifier of the data source in conjunction with receiving the plurality of records. The method can further include receiving, from the second data source, a second data source identifier of the second data source in conjunction with receiving the second plurality of records. The row number span data is generated based on row numbers of records received in conjunction with the first data source identifier, and the second row number span data is generated based on row numbers of records received in conjunction with the second data source identifier.

In various embodiments, performing the plurality of reads of the plurality of pages includes performing a first record traversal a first page in a pair of pages in the plurality of pairs of pages. At least one record in the proper subset of the plurality of records of the first page is skipped in the first record traversal of the first page based on the updated row number span data of the first page. Performing the plurality of reads of the plurality of pages can also include performing a second record traversal a second page in the pair of pages in the plurality of pairs of pages. No records in the proper subset of the plurality of records of the second page are skipped in the second record traversal of the second page based on the row number span data of the second page not having been updated. In some cases, at least one record that was read from the second page in performing the plurality of reads of was skipped in the first record traversal of the first page.

In various embodiments, a non-transitory computer readable storage medium includes at least one memory section that stores operational instructions that, when executed by a processing module that includes a processor and a memory, cause the processing module to: receive, from a data source, a plurality of records and a plurality of row numbers corresponding to the plurality of records; generate a plurality of pages from the plurality of records, wherein each of the plurality of pages includes a proper subset of the plurality of records; generating page metadata for each of the plurality of pages that includes row number span data corresponding to the data source based on a proper subset of the plurality of row numbers corresponding to the proper subset of the plurality of records included in the each of the plurality of pages; and identifying a plurality of pairs of pages in the plurality of pages having corresponding row number span data for the data source in their page metadata that include a row number span overlap. The operational instructions, when executed by the processing module, further cause the processing module to generate, for each pair in the plurality of pairs of pages, updated row number span data for a first page in the each pair by removing the row number span overlap with the row number span data of a second page in the each pair from the row number span data of the first page in the each pair; and to update, for each pair in the plurality of pairs of pages, the row number span data of the first page in the each pair as the updated row number span data. The operational instructions, when executed by the processing module, further cause the processing module to perform a plurality of reads of the plurality of pages based on the row number span data of the plurality of pages. Only ones of the proper subset of the plurality of records of each first page of each pair in the plurality of pairs of pages having corresponding row numbers that are within the updated row number span data are read in the performing of the plurality of reads.

Figure 29A:
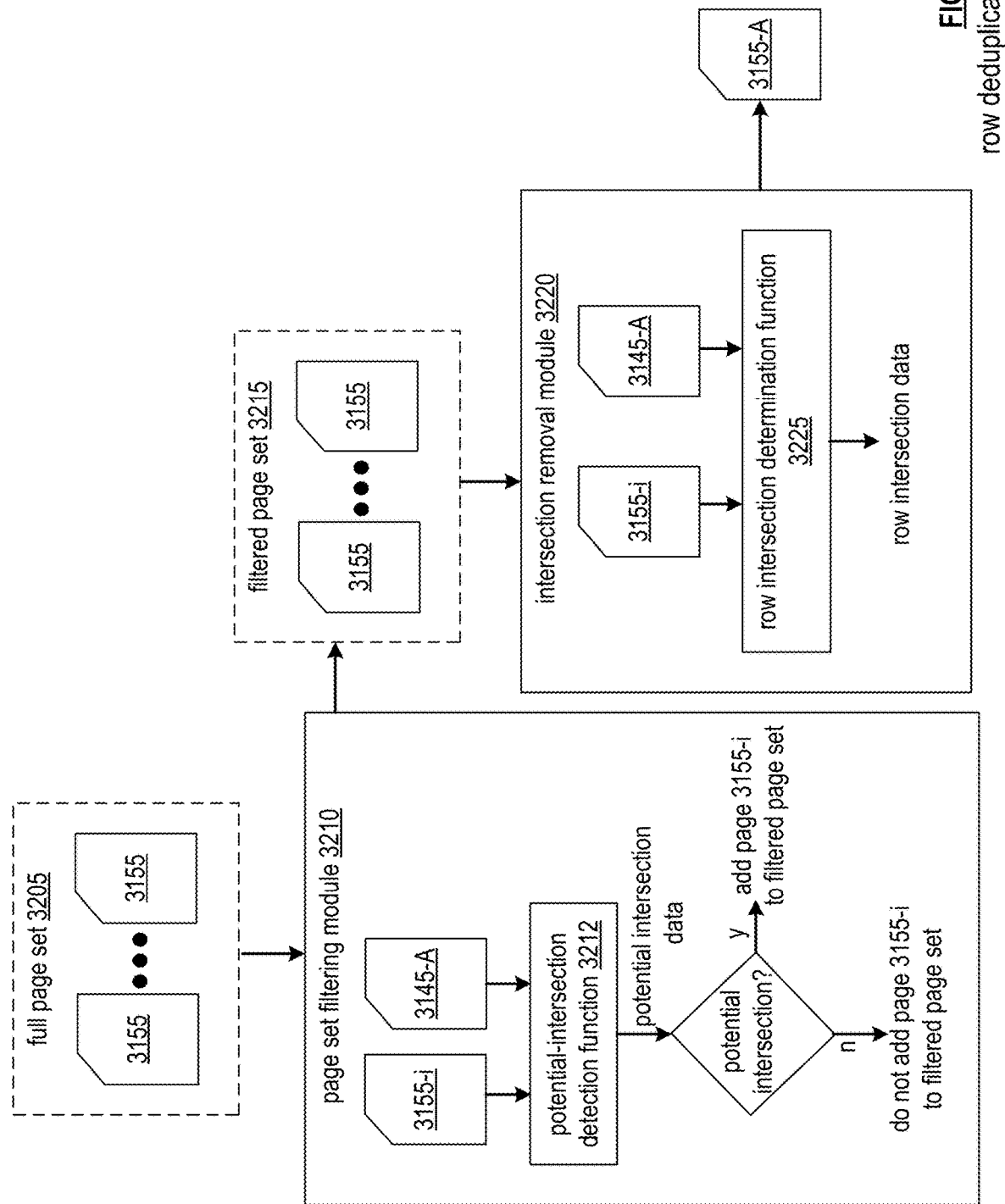
FIG. 29A is a schematic block diagram of an embodiment of a row deduplication module that implements a page set filtering module in accordance with various embodiments of the present invention.
Figure 29B:
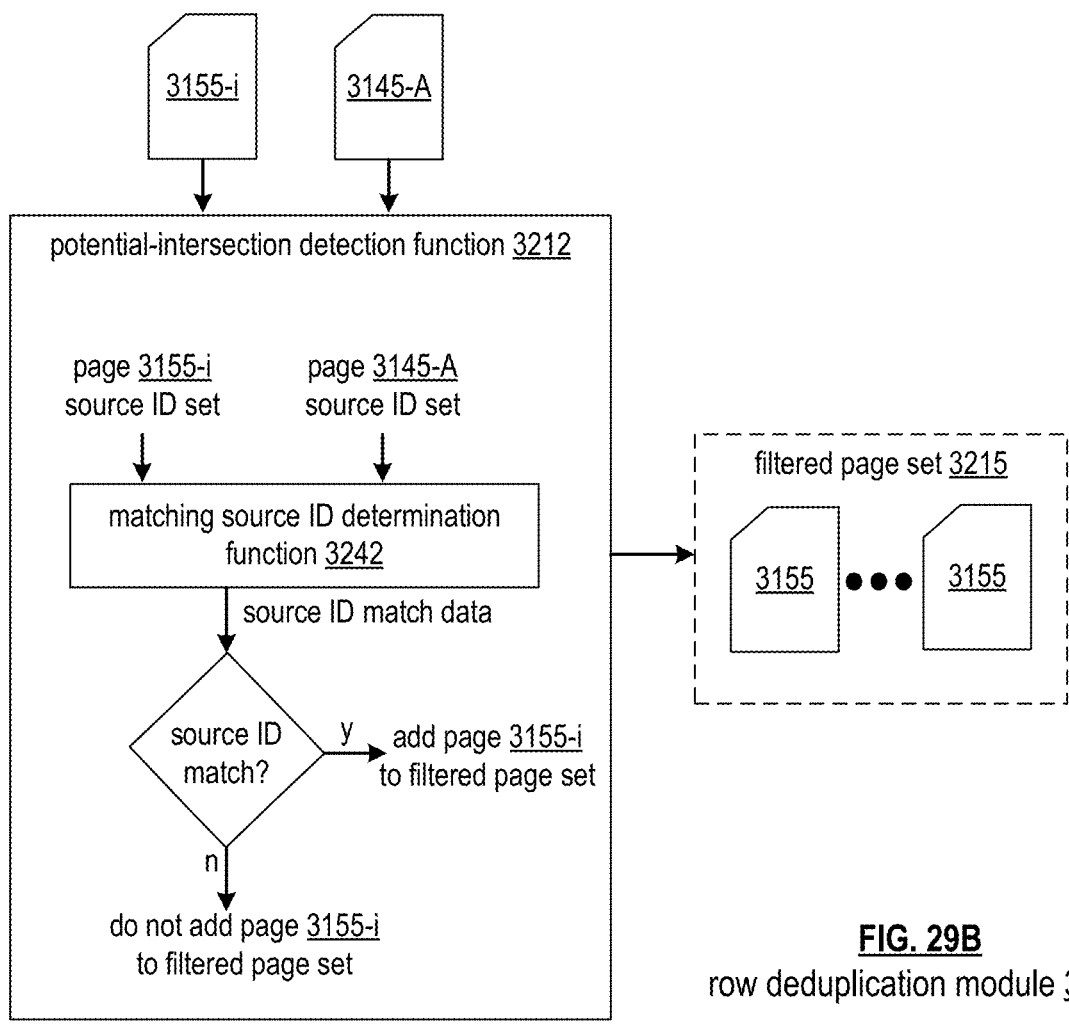
FIG. 29B is a schematic block diagram of an example embodiment a potential intersection detection function implemented by a page set filtering module in accordance with various embodiments of the present invention.

FIGS. 29A-29B illustrates an embodiment of a row deduplication module 3050 that implements a page set filtering module 3210 to reduce the set of pages upon which the comparisons of row number span data 3119 is performed. Some or all features and/or functionality of embodiments of row deduplication module 3050 of FIGS. 29A and 29C can be utilized to implement the row deduplication module 3050 of FIG. 27A, of FIGS. 28A-28D, and/or any other embodiments of row deduplication module 3050 described herein.

While the page deduplication of FIGS. 28A-28D reduces computations via simple metadata comparisons of row number span data 3119, performing these comparisons across all necessary other pages for a given page can still be computationally complex. Additional complexity is added in when deduplication is performed across nodes 37 as discussed in conjunction with FIG. 28D. To further reduce complexity in deduplication, the assumption that row duplication only occurs in infrequent and/or anomalous scenarios can be leveraged to perform a less-computationally intensive first, pre-check comparison to determine whether or not overlap could exist between a pair of pages. A second comparison to identify where the overlap exists is only performed for a given pair of pages if this first pre-check is satisfied. For example, this second comparison includes the comparisons of minimum row numbers 3117 and maximum row numbers 3118 of a pair of row number span data 3119 as discussed in conjunction with FIG. 28C. While performing both the first pre-check comparison and the second comparison to identify overlap would result in higher computation if overlaps occurred frequently, the infrequent occurrence of overlaps and/or the infrequent occurrence of possibility of overlap means that only the less-expensive pre-check is performed in most cases, and the second comparison is performed rarely. This improves the technology of database systems by further increasing the efficiency of page deduplication, which preserves processing resources of the record processing and storage system 2505, thus enabling higher rates of incoming records to be processed into pages to achieve a richer and/or denser set of data in database system 10.

FIG. 29A illustrates an example of deduplicating a given page 3145-A from a plurality of pages 3155 in a full page set 3205. First, a page set filtering module 3210 can be applied perform a first comparison of pages 3155 in the full page set 3205 with the given page 3145-A. This can be achieved via performance of a potential-intersection detection function 3212. Performing the potential-intersection detection function upon a pair of pages can include comparing page metadata 3115 of the pair of pages. The potential-intersection detection function can be performed for each page 3155-i in the full page set to determine potential intersection data for each page 3155-i in the full page set indicating whether there is a potential intersection with each page 3155-i and the given page 3145-A. In some cases, performing the potential-intersection detection function does not include any comparisons of minimum row numbers 3117 or maximum row numbers 3118 of a given pair of pages. An example embodiment of the potential-intersection detection function is discussed in further detail in conjunction with FIG. 29B.

If the potential intersection data indicates a given page 3155 has a potential intersection with page 3145-A, the given page 3155 is included in a filtered page set 3215 identified by the page set filtering module 3210. If the potential intersection data indicates a given page 3155 does not have a potential intersection with page 3145-A, the given page 3155 is not included in a filtered page set 3215 identified by the page set filtering module 3210. The resulting filtered page set 3215 can be a proper subset of the full page set 3205 based on at least one page 3155 of the full page set 3205 having potential intersection data indicating there is no potential intersection with page 3145-A.

An intersection removal module 3220 can be applied to only the pages included in the filtered page set 3215. For each page 3155-i identified in the filtered page set 3215, a row intersection determination function 3225 is utilized to determine row intersection data indicating intersecting rows with page 3145-A. Applying the row intersection determination function 3225 can include performing a second comparison of each page 3155-i and the given page 3145-A. For example, this second comparison can include comparing row number span data 3119 of a given pair of pages to generate the row intersection data identifying whether an overlap is present and/or to further identifying the location of the overlap in the row number span data 3119 of the given page 3145-A, if present. As a particular example, applying the row intersection determination function 3225 can include comparing minimum row numbers 3117 and maximum row numbers 3118 of a given pair of pages in row number span data for each shared data source identifier 3014 of the pair of pages to determine overlapping portions of row number span data 3119 as discussed in conjunction with FIG. 28C. This second comparison of the row intersection determination function 3225 can alternatively utilize other means of identifying row intersections, and can optionally include identifying particular records 2422 that are duplicated in a given page 3155 and in page 3145-A. This can optionally include utilizing different information in labeled row data 3010 and/or in page metadata 3115 to determine the row intersection data.

The intersection removal module 3220 can facilitate removal of records indicated in row intersection data for each page 3155-i from page 3145-A to render deduplicated page 3155-A, for example, as discussed in conjunction with FIG. 28B. For example, the intersection removal module 3220 can be implemented via the updating of row number span data 3119 of page 3145-A, which can include generating an updated minimum row number 3117 and/or and updated maximum row number 3118 for page 3145-A as discussed in conjunction with FIG. 28C.

The computational intensity and/or resource requirements of performing the potential-intersection detection function 3212 for a pair of pages can be strictly less than the computational intensity and/or resource requirements of performing row intersection determination function 3225 for a pair of pages. This is ideal, as only the filtered page set 3215 for a given record need undergo the more computationally intensive row intersection determination function 3225.

Figure 29C:
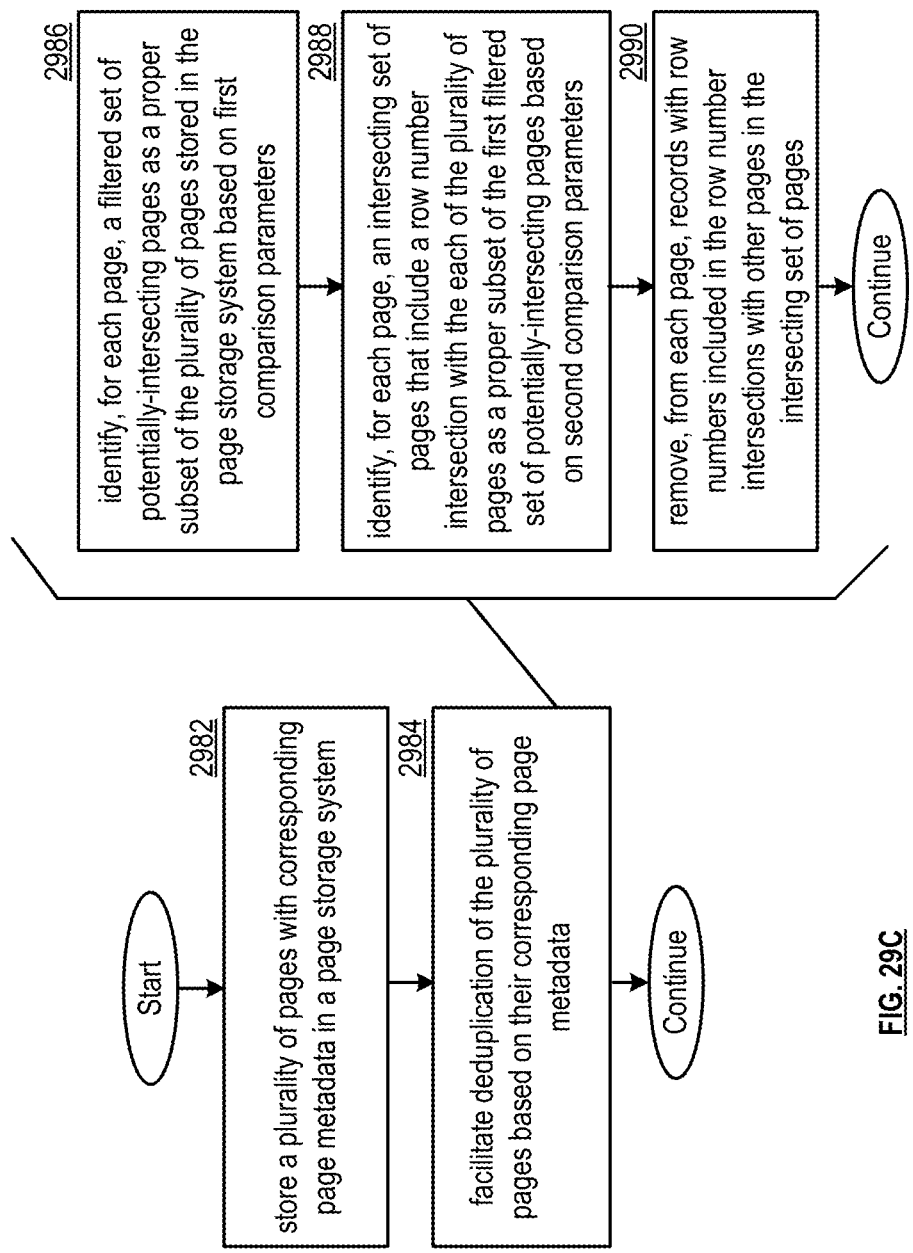
FIG. 29C is a logic diagram illustrating a method of deduplicating pages in accordance with various embodiments of the present invention.

FIG. 29C illustrates an embodiment of a row deduplication module 3050 that utilizes a matching source ID determination function 3242 to implement the potential-intersection detection function 3212 of FIG. 29A. For a given pair of pages, the matching source ID determination function 3242 can be utilized to determine whether the pair of pages share any records from the same data source 2501, where the filtered page set 3215 generated for a given page 3145-A includes only pages 3155 that have at least one record generated by one of the data sources 2501 that generated records included in the given page 3145-A. The set of data source identifiers 3014 with records included in page 3155-i and in page 3145-A can be determined based on data source identifiers 3014 in their respective page metadata 3115.

Other embodiments of the potential-intersection detection function 3212 of FIG. 29A can alternatively or additionally include other types of comparisons, for example, of page metadata 3115 and/or of other attributes of pages 2515. In some cases, filtered sets of potentially-intersecting pages can be tracked over time via row deduplication module 3050 to further simplify the computation required in performing potential-intersection detection function 3212. In such cases, performing potential-intersection detection function 3212 for a full page set 3205 can optionally include accessing previously generated potential-intersection data stored in memory to identify the filtered page set 3215. In some cases pages with particular data source identifiers 3014 can be easily identifiable, for example, via a lookup table maintained by the row deduplication module 3050. In such cases, performing potential-intersection detection function 3212 for a full page set 3205 can optionally include accessing a lookup table of data source identifiers stored in memory to identify the filtered page set 3215. In some cases, performing potential-intersection detection function 3212 includes maintaining and/or accessing other tracked and/or stored data in memory, where generating filtered page set 3215 from a full page set 3205 optionally does not require accessing page metadata of some or all pages 3155 in the full page set 3205 based on instead utilizing this tracked and/or stored data.

FIG. 29C illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 29C. Some or all of the method of FIG. 29C can be performed by the page generator 2511 and/or the page storage system 2506 of FIG. 25A. Some or all of the method of FIG. 29C can be performed by one or more stream loader modules 2510 of FIG. 25B, independently or in conjunction. Some or all of the method of FIG. 29C can be performed by the row deduplication module 3050 of FIG. 28B, FIG. 28C, FIG. 28D, FIG. 29A, and/or FIG. 29B. For example, some or all of the method of FIG. 29C can be performed: by the page set filtering module 3210, for example, by performing the potential-intersection detection function 3212 and/or the matching source ID determination function 3242; and/or by the intersection removal module 3220, for example, by implementing the row intersection determination function 3225. Some or all of the method of FIG. 29C can be performed by one or more of a plurality of row deduplication modules 3050 implemented by a plurality of nodes 37. Some or all of the steps of FIG. 29C can optionally be performed by any other processing module of the database system 10. Some or all of the steps of FIG. 29C can optionally be performed by one or more data sources 2501 and/or can be performed via communication with one or more data sources 2501. Some or all of the steps of FIG. 29C can be performed to implement some or all of the functionality of the record processing and storage system 2505 of FIG. 25A and/or FIG. 25B. Some or all of the steps of FIG. 29C can be performed to implement some or all of the functionality of the row deduplication module 3050 of FIG. 28B, FIG. 28C, FIG. 28D, FIG. 29A, and/or FIG. 29B. Some or all steps of FIG. 29C can be performed by database system 10 in accordance with other embodiments of the database system 10 and/or nodes 37 discussed herein.

Step 2982 includes storing a plurality of pages with corresponding page metadata in a page storage system. The method can further include receiving a plurality of labeled row data from at least on data source and/or generating the plurality of pages from records included in the labeled row data that include page metadata. The page metadata of a given can indicate row number span data for at least one of the plurality of data sources based on row numbers of a set of records included in a given page. For example, the page metadata is generated based on row numbers and/or data source identifiers included in conjunction with the set of records in one or more corresponding labeled row data.

Step 2984 includes facilitating deduplication of the plurality of pages based on their corresponding page metadata. Performing step 2894 can include performing for each of the plurality of pages, step 2986, step 2988, and/or step 2990. In some cases, step 2986, step 2988, and/or step 2990 are performed for a given page upon being generated and/or stored, for example, via comparisons with other pages already stored by the page storage system. In some cases, steps 2986, step 2988, and/or step 2990 can be performed to implement performance of steps 2888, 2890, and/or 2802 of FIG. 28E.

Step 2986 includes identifying, for each page, a filtered set of potentially-intersecting pages as a proper subset of the plurality of pages stored in the page storage system based on first comparison parameters. This can include by comparing, in accordance with the first comparison parameters, page metadata of the each of the plurality of pages with the page metadata of other ones of the plurality of pages stored in the page storage system. In some cases, the first comparison parameters indicate comparison based on data source identifiers included in the page metadata, for example, where the filtered set of potentially-intersecting pages for a given page includes only pages in the plurality of pages stored in the page storage system with at least on data source identifier in their metadata that matches a data source identifier of the given page.

Step 2988 includes identifying, for each page, an intersecting set of pages that include a row number intersection with the each of the plurality of pages as a proper subset of the first filtered set of potentially-intersecting pages based on second comparison parameters. For example, this can include comparing, in accordance with the second comparison parameters, page metadata of the each of the plurality of pages with the page metadata of only ones of the plurality of pages in first filtered set of potentially-intersecting pages. In some cases, this comparison via the second comparison parameters is not performed, for a given page, with on any pages that are not included in the given page's filtered set of potentially-intersecting pages identified in step 2986. In some cases, the first comparison parameters indicate comparison based on row numbers included in the page metadata. In particular, the row number intersection can be determined based on comparing row number span data of pages' page metadata. For example, the row number intersection is determined as the row number overlap discussed in conjunction with FIGS. 28A-28D based on only minimum row numbers and maximum row numbers of pages' page metadata.

Step 2990 includes removing, from each page, records with row numbers included in the row number intersections with other pages in the intersecting set of pages. For example, the row number span data a given page's page metadata, such as a maximum row number and/or minimum row number of the page metadata, can be updated to remove the overlap with row number span data of other pages as discussed in conjunction with FIGS. 28A-28D. In some cases, removal of the records does not include deletion of the corresponding records from storage in the page, but instead includes skipping and/or ignoring of these records during page reads and/or page traversals. The method can further include performing reads to these pages, where any removed records are not returned and/or are not able to be read.

Figure 30A:
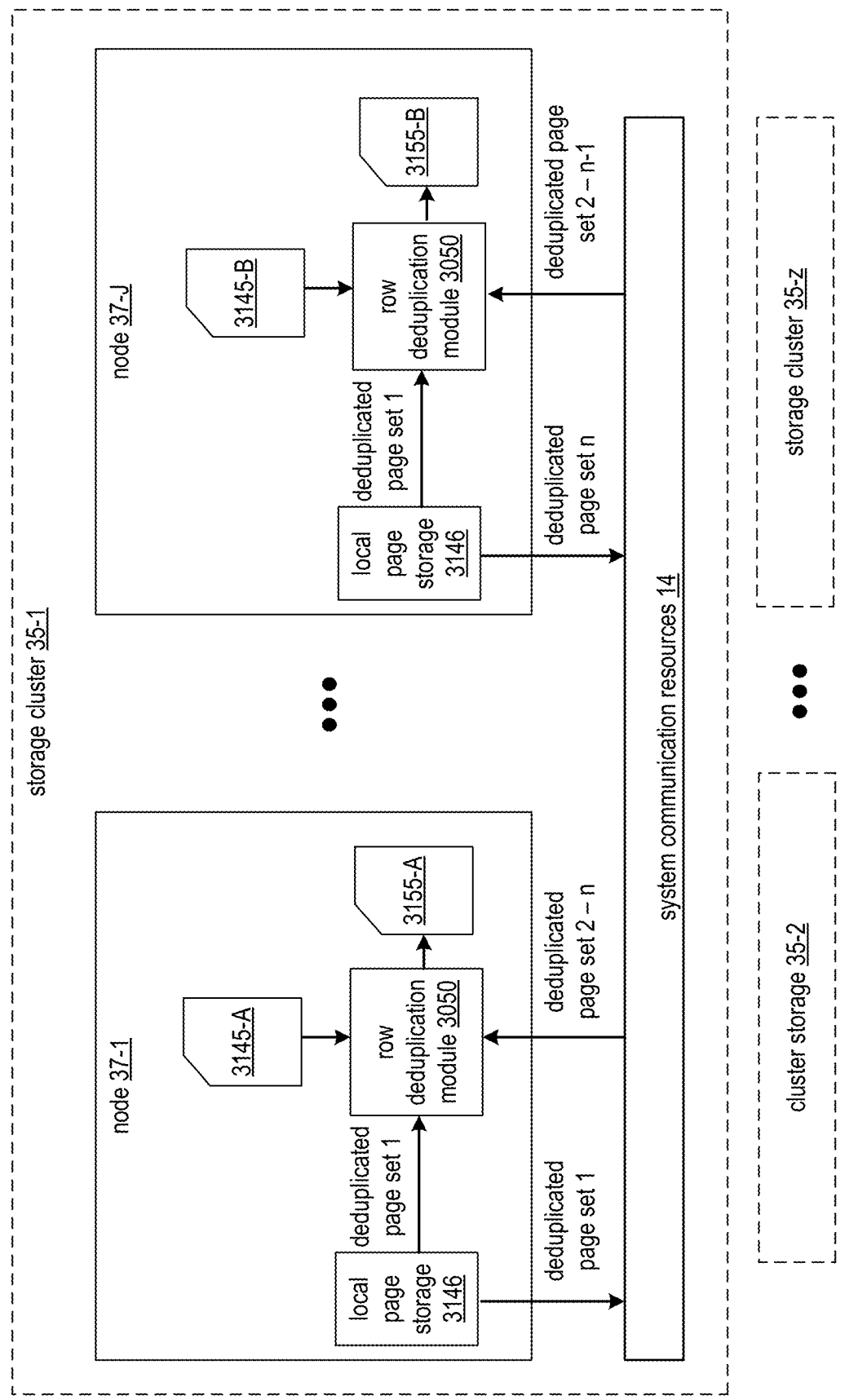
FIG. 30A is a schematic block diagram of an embodiment of a record processing and storage system that performs separate page deduplication for each of a plurality of storage clusters in accordance with various embodiments of the present invention.
Figure 30B:
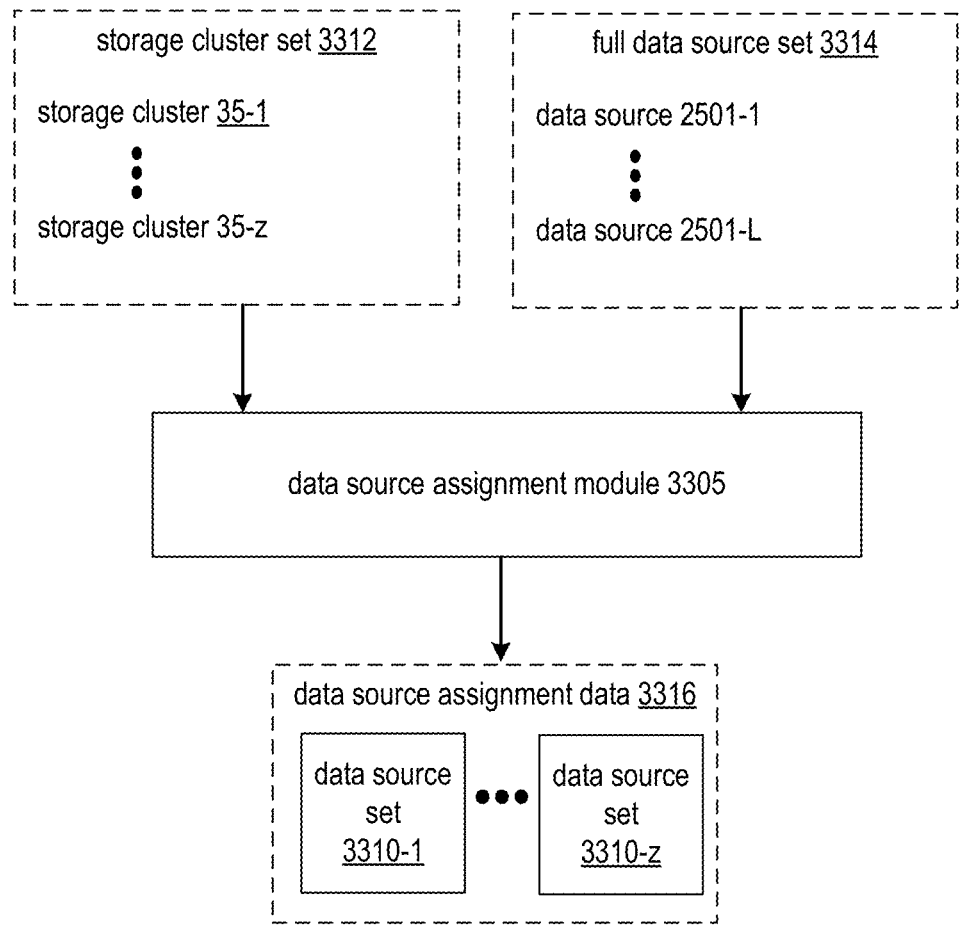
FIG. 30B is a schematic block diagram of an embodiment of a record processing and storage system that implements a data source assignment module in accordance with various embodiments of the present invention.
Figure 30C:
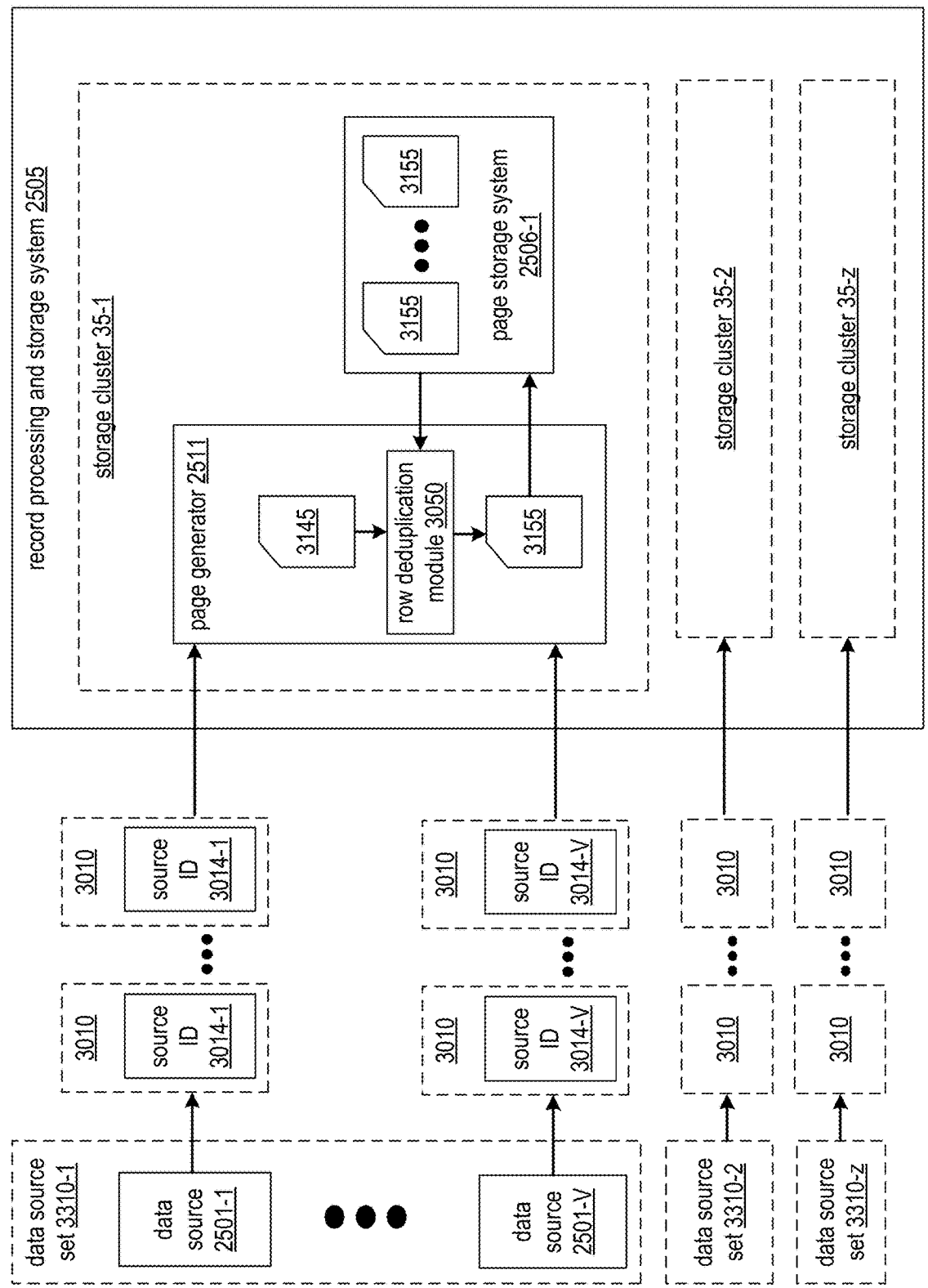
FIG. 30C is a schematic block diagram of an embodiment of a record processing and storage system that receives labeled row data from a plurality of data sources.

FIGS. 30A-30C present embodiments of a record processing and storage system that includes a plurality of storage clusters 35-1-35-z. The plurality of storage clusters 35-1-35-z of FIGS. 30A-30C can be implemented as the plurality of storage clusters 35-1-35-z of FIG. 6. Each of the plurality of storage clusters 35-1-35-z can include a same or different number of nodes 37. For example, each storage cluster 35 can include at least a set of nodes 37-1-37-J corresponding to a number of segments J included in a segment group in accordance with the redundancy storage coding scheme. One or more of the plurality of storage clusters 35 can be implemented via the storage cluster 2535 of FIG. 25B. For example, each storage cluster 35-1-35-z can include and/or communicate with its own designated set of stream loader modules 2510-1-2510-N of FIG. 25B.

Each of the plurality of storage clusters 35-1-35-z can otherwise be implemented via any distinct set of nodes 37 that are operable to communicate data with one another; are operable to share common processing and/or storage resources; and/or are operable to collectively perform page generation, page deduplication, and/or segment generation for the corresponding storage cluster 35 via coordination between some or all of the set of nodes 37 in the corresponding storage cluster 35. In some cases, any pair of nodes 37 in different storage clusters 35 are not operable to communicate data with one another, are not operable to share common processing and/or storage resources; and/or are not operable to collectively perform page generation, page deduplication, and/or segment generation via coordination between the pair of nodes 37.

In some cases, embodiments of the record processing and storage system 2505 described herein, such as the record processing and storage system 2505 of FIGS. 25A and/or 25B, are optionally implemented as one of a plurality of distinct record processing and storage systems 2505 of database system 10, where each record processing and storage system 2505 corresponds to and/or is implemented by processing resources of a corresponding one of a plurality of storage clusters 35-1-35-z. Alternatively or in addition, embodiments of the record processing and storage system 2505 described herein, such as the record processing and storage system 2505 of FIGS. 25A and/or 25B, are implemented via a plurality of distinct record processing and storage systems 2505 of database system 10, where each record processing and storage system 2505 corresponds to and/or is implemented by processing resources of a corresponding one of a plurality of storage clusters 35-1-35-z.

For example, each record processing and storage system 2505 can independently generate pages 2515 from its own set of records 2422 without coordination with other record processing and storage systems 2505 of other storage clusters 35. In such cases, each record processing and storage system 2505 can receive its own distinct set of records 2422, for example, as a distinct set of labeled row data 3010 from one or more data sources 2501. In such cases, each data sources 2501 can be designated to send its records to a particular record processing and storage system 2505 of a particular storage cluster 35. Alternatively, a data sources 2501 can be designated to send its records to a central receiving entity that services all record processing and storage systems 2505 of a storage clusters 35, where the central receiving entity segregates the received records 2422 and/or the received labeled row data 3010 for processing by a particular a particular record processing and storage system 2505 of a particular storage cluster 35. In some cases, a given data source 2501 can optionally have some of its records processed and generated into pages by one record processing and storage system 2505 of one particular storage cluster 35, and can have others ones of its records processed and generated into pages by another record processing and storage system 2505 of another particular storage cluster 35.

As another example, each record processing and storage system 2505 can independently deduplicate pages 2515 based on comparisons performed with only its own set of pages 2515, for example, via communication within its own set of nodes 37-1-37-J as discussed in conjunction with FIG. 28D, and/or without coordination with other record processing and storage systems 2505 of other storage clusters 35. Despite deduplication being handled without coordination across all nodes 37 receiving records and generating pages, deduplication can be performed appropriately to deduplicate all records by designation of each data source 2501's records for processing by exactly one storage cluster 35. This ensures that each storage cluster 35 has all potentially intersecting records in its own set of generated pages. Thus, deduplication by each storage cluster upon only its own set of pages is guaranteed to deduplicate all records across all storage clusters 35-1-35-z of the database system 10. The designation of each data source 2501's records to a particular storage cluster 35 in the set of storage clusters 35-1-35-z is discussed in further detail in conjunction with FIGS. 30B and 30C.

As another example, each record processing and storage system 2505 can independently perform the page conversion process by accumulating and converting its own conversion page set 2655 of its own plurality of generated pages into a plurality of segments 2424, without coordination with other record processing and storage systems 2505 of other storage clusters 35. This can optionally include performing the clustering process to generate record groups 2625 only from records 2422 received and included in pages generated by the corresponding record processing and storage system 2505. Alternatively, despite distinct sets of pages each being generated by, deduplicated within, and/or stored within distinct storage clusters 35, to improve clustering of records in segments, the segment generator 2517 can perform the conversion process from a conversion page set that includes multiple distinct sets of pages from different storage clusters 35 that were separately generated and/or deduplicated.

Query processing system 2502 can optionally generate query execution plans data that includes nodes 37 included in only one storage cluster 35. Query processing system 2502 can optionally generate query execution plans data that includes nodes 37 included across multiple storage clusters 35. For example, despite each storage cluster 35 independently performing page deduplication and/or independently generating segments from its own set of pages, a particular query can be executed via access to pages generated by and/or stored by multiple different storage clusters 35 and/or via access to segments generated by and/or stored by multiple different storage clusters 35.

The embodiments of FIGS. 30A-30C can be utilized to implement separate deduplication of records by resources of each of the plurality of storage clusters 35-1-35-z separately. At scale, it can be unreasonable to facilitate the deduplication between nodes in the fashion discussed in conjunction with FIG. 28D via nodes across different storage clusters. To ensure that records are appropriately deduplicated, constraints can be put in place to ensure that all pages that include a particular data source's records are stored by and/or deduplicated by a set of nodes 37 of the same storage cluster. This simplifies complexity of the deduplication process by localizing the deduplication process to fewer nodes, while still ensuring the deduplication process achieves "exactly once" record reads by guaranteeing the deduplication process is performed across all nodes storing potentially intersecting pages.

In particular, the record processing and storage system 2505 of each storage cluster 35 can receive labeled row data 3010 from a distinct set of data sources 2501 with a distinct set of data source identifiers 3014. The record processing and storage system 2505 of each storage cluster 35 can generate pages from the labeled row data 3010 from this distinct set of data sources 2501 and can further generate page metadata 3115 as discussed in conjunction with FIGS. 28A-28C. The record processing and storage system 2505 of each storage cluster 35 can store its generated pages in its page storage system 2506, which can include the local page storage systems 3146 the corresponding storage cluster 35's set of nodes 37-1-37-J and/or can include other storage accessible by the set of nodes 37-1-37-J, for example, where this page storage system 2506 is not accessible by other nodes 37 in other storage clusters 35.

The record processing and storage system 2505 of each storage cluster 35 can deduplicate each generated page, for example, by converting the original version of a given page 2515 as a pre-deduplication page 3145 to a deduplicated page 3155 via comparisons of metadata 3115 of the pre-deduplication page 3145 with metadata of other deduplicated pages 3155 as discussed in conjunction with FIGS. 28A-28C and/or in conjunction with FIGS. 29A-29B. In particular, a given node 37 of a particular storage cluster can deduplicate a given page 3145 based on metadata of other deduplicated pages 3155 generated by some or all nodes 37 included in the same storage cluster 35, for example, as discussed in conjunction with FIG. 28D. However, a given node 37 of a particular storage cluster only utilizes metadata of other deduplicated pages 3155 generated by some or all nodes 37 included in the same storage cluster 35 but does not utilize metadata of other deduplicated pages 3155 generated by some or all nodes 37 included in different storage clusters 35.

This can be achieved via designation of each data source 2501 to exactly one storage cluster. This guarantees that, for a given page 3145 generated by a given record processing and storage system 2505 of a given storage cluster 35, all potentially intersecting pages generated across all storage clusters are localized to the same given storage cluster 35. This improves the technology of database systems by guaranteeing deduplication and thus guaranteeing all records are read from pages and/or resulting segments in query executions exactly once to guarantee query correctness. This further improves the technology of database systems by reducing the coordination required across the database system to attain these "exactly once" reads of records across all storage clusters 35 in the database system. In particular, rather than requiring the sharing of page metadata between the vast number of nodes 37 in the database system to achieve deduplication, page metadata sharing is localized to distinct groups of smaller numbers of nodes. In this fashion, smaller numbers of page metadata are required to be compared to a given page by a given node. Furthermore, a given page's metadata is shared with a smaller number of nodes rather than all nodes in the database system 10. This localized deduplication reduces the data sharing and computational complexity of page deduplication to reduce processing resources required to perform page deduplication to improve database efficiency. This reduction of processing resources for page deduplication enables more processing resources to be utilized to enable receiving and processing of higher rates of incoming records for storage to achieve a denser and/or richer database system 10.

As illustrated in FIG. 30B, the record processing and storage system 2505 and/or another at least one processing module of the database system 10 can implement a data source assignment module to generate data source assignment data 3316. The data source assignment module 3305 can generate the data source assignment data 3316 map each of a set of data sources 2501-1-2501-L in a full data source set 3314 that send records 2422 for storage in the database system 10 to a corresponding one of a plurality of storage clusters 35-1-35-$z$ in a storage cluster set 3312 of the database system 10. This results in a plurality of data source sets 3310-1-3310-$z$, where each data source sets 3310 corresponds to one of the storage clusters 35-1-35-$z$. Each data source set 3310 can include a distinct subset of data sources 2501 from the full data source set 3314. The plurality of data source sets 3310-1-3310-$z$ can be mutually exclusive and/or collectively exhaustive with respect to the full data source set 3314.

The data source assignment module 3305 can be operable to segregate the full data source set 3314 into the plurality of data source sets 3310-1-3310-$z$ of the data source assignment data 3316 based on mapping parameters which can be: received by the data source assignment module 3305; configured via user input; accessed by the data source assignment module 3305 from storage in memory; automatically generated by the data source assignment module 3305; and/or otherwise determined by the data source assignment module 3305.

These mapping parameters can dictate that the full data source set 3314 be segregated into the plurality of data source sets 3310-1-3310-$z$ based on: including an equal number of similar number of data sources 2501 in each data source set 3310; determining a record size of records sent by each data source and/or a record transmission rate of each data source and generating the plurality of data source sets 3310-1-3310-$z$ to receive incoming records at a same or similar incoming data rate based on these determined record sizes and/or determined record transmission rates; determining a storage capacity and/or resource availability of each of the plurality of storage clusters 35 and assigning generating the plurality of data source sets 3310-1-3310-$z$ to have corresponding incoming data rates that are exactly and/or substantially proportional to and/or otherwise based on the storage capacity and/or resource availability of each of the plurality of storage clusters 35; determining duplicated record rates of records received from different data sources over time and generating the plurality of data source sets 3310-1-3310-$z$ to have same and/or similar duplicated record rates and/or to be otherwise based on the determined duplicated record rates; determining and/or tracking a level of clustering and/or clustering metrics attained for records of different data sources 2501 in previous conversions processes of pages into segments and generating the plurality of data source sets 3310-1-3310-$z$ based on the determined and/or tracked level of clustering and/or clustering metrics; and/or based on other mapping parameters.

The data source assignment module 3305 can optionally change the data source sets 3310-1-3310-$z$ over time by generating one or more updated data source assignment data 3316 reassigning some or all data sources 3314 to different storage clusters 35 from previous data source assignment data 3316. For example, these changes to the data source sets 3310-1-3310-$z$ can be determined based on: the set of storage clusters in the storage cluster set 3312 changing; the set data sources in the full data source set 3314 changing; changes in record size and/or record schema of one or more data sources 2501; changes in record transmission rate of one or more data sources 2501; changes in storage capacity, resource availability, and/or resource health of one or more storage clusters 35; changes in clustering levels achieved in subsequent conversion processes for records of one or more data sources 2501; changes in duplication rate of records sent by one or more data sources 2501; changes of other metrics relating to the mapping parameters utilized to generate the data source sets 3310-1-3310-z; and/or another determination.

In some cases, such assignment changes can be implemented to ensure pages will not need to be deduplicated across multiple storage clusters. This can include determining a segment generator 2517 of particular storage cluster 35, and/or a segment generator 2517 across some or all storage clusters 35, has recently converted and/or has recently initiated the conversion process of pages into segments. For example, a given storage cluster may begin to receive records from a given data source based on these assignment changes, where no pages upon any other storage cluster currently include records of this new data source when the assignment change is implemented. This can be based on another storage cluster to which the given data source was previously assigned having converted and/or being in the process of converting all of its pages that include the records of the given data source. This enables deduplication to be performed appropriately, while also enabling updates to the data source assignment data 3316 to be implemented as appropriate over time.

FIG. 30C illustrates an embodiment of a record processing and storage system 2505 that implements separate page generators 2511 for each of a plurality of storage clusters 35-1-35-z. Each page generator 2511 of each storage clusters 35 only generates pages 2515 from labeled row data 3010 with data source identifiers 3014 corresponding to data sources 2501 assigned to a corresponding data source set 3310, for example, in accordance with the data source assignment data 3316 generated by the data source assignment module 3305 of FIG. 30B.

For example, storage cluster 35-1 processes all labeled row data 3010 generated by data sources 2501 in a corresponding data source set 2501-1, which includes at least a data sources 2501-1 and a data source 2501-V. Each data source in each data source set 3310-1-3310-z generates and transmits labeled row data 3010, for example, as discussed in conjunction with FIGS. 27A-27H. In particular, each labeled row data 3010 can be generated to include a corresponding data source identifier 3014 for the corresponding data source 2501 as discussed previously.

Each data source 2501 can optionally route its labeled row data 3010 labeled row data 3010 to a corresponding storage cluster 35, for example, by sending its labeled row data 3010 to a corresponding computing device of the utilized to implement the corresponding page generator 2511 and/or utilized to route incoming data to the corresponding page generator 2511. In such cases, the record processing and storage system 2505 can optionally transmit some or all of data source assignment data 3316 to each data source 2501 and/or otherwise indicate which storage cluster 35 their labeled row data 3010 is to be routed based on the data source assignment data 3316. Alternatively, data sources 2501 can send their labeled row data 3010 to a common receiving module of the record processing and storage system 2505, where this common receiving module utilizes the data source identifiers 3014 included in the labeled row data 3010 to route the labeled row data 3010 for processing by the appropriate page generator 2511 of the appropriate storage cluster 35 in accordance with the data source assignment data 3316.

Each page generator 2511 of each storage cluster 35 stores deduplicated pages 3155 in its own distinct storage resources, for example, corresponding to its own distinct page storage system 2506 that is separate from page storage systems 2506 of other storage clusters 35. Each page generator 2511 implements its own row deduplication module to deduplicate new, pre-deduplication pages 3145 based on comparisons with its own set of previously generated pages 3155 by its own page generator 2511, for example, via access to these previously generated pages 3155 in its own page storage system 2506. For example, each row deduplication module 3050 of each storage cluster 35 is implemented via some or all of the features and/or functionality of embodiments of row deduplication module 3050 of FIGS. 28A-28D and/or of FIGS. 29A-29B.

Figure 30D:
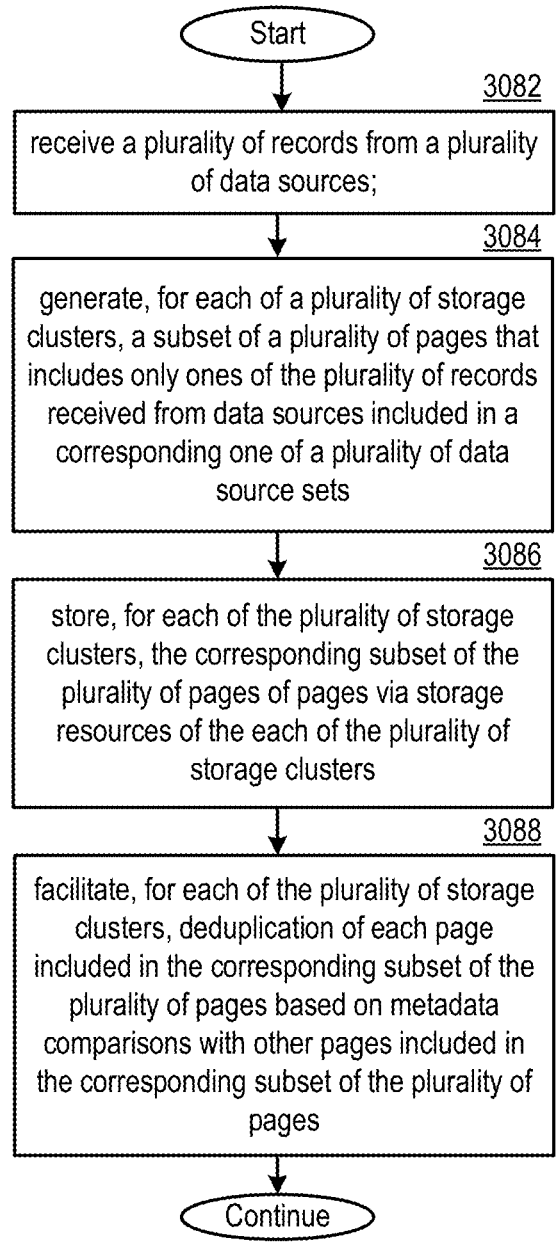
FIG. 30D is a logic diagram illustrating a method of deduplicating pages in accordance with various embodiments of the present invention.

FIG. 30D illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 30D. Some or all of the method of FIG. 30D can be performed by the page generator 2511 and/or the page storage system 2506 of FIG. 25A. Some or all of the method of FIG. 30D can be performed by one or more stream loader modules 2510 of FIG. 25B, independently or in conjunction. Some or all of the method of FIG. 30D can be performed by the row deduplication module 3050 of FIG. 28B, FIG. 28C, FIG. 28D, FIG. 29A, FIG. 29B, FIG. 30A, and/or FIG. 30C. Some or all of the method of FIG. 29C can be performed by one or more of a plurality of row deduplication modules 3050 implemented by a plurality of nodes 37. Some or all of the method of FIG. 29C can be performed by computing devices 18 included in a particular storage cluster 35, where different computing devices 18 included in different storage cluster 35 can independently perform some or all of the steps of FIG. 29C without coordination between storage clusters 35. Some or all of the method of FIG. 30D can be performed by the data source assignment module 3305 of FIG. 30B. Some or all of the steps of FIG. 30D can optionally be performed by any other processing module of the database system 10. Some or all of the steps of FIG. 30D can optionally be performed by one or more data sources 2501 and/or can be performed via communication with one or more data sources 2501. Some or all of the steps of FIG. 30D can be performed to implement some or all of the functionality of the record processing and storage system 2505 of FIG. 25A and/or FIG. 25B. Some or all of the steps of FIG. 30D can be performed to implement some or all of the functionality of the row deduplication module 3050 of FIG. 28B, FIG. 28C, FIG. 28D, FIG. 29A, FIG. 29B, FIG. 30A, and/or FIG. 30C. Some or all steps of FIG. 30D can be performed by database system 10 in accordance with other embodiments of the database system 10 and/or nodes 37 discussed herein.

Step 3082 includes receiving a plurality of records from a plurality of data sources. For example, some or all of the plurality of records are received as row data and/or labeled row data generated by some or all of the plurality of data sources. Step 3084 includes generating, for each of a plurality of storage clusters, a subset of a plurality of pages that includes only ones of the plurality of records received from data sources included in a corresponding one of the plurality of data source sets. A plurality of subsets of the plurality of pages corresponding to the plurality of storage clusters are generated. The plurality of subsets can be mutually exclusive and collectively exhaustive with respect to the plurality of pages generated by the record processing and storage system. Each subset can be generated by distinct processing resources, for example, where only computing devices 18 included in a particular storage cluster 35 generate pages from data sources included in a corresponding one of the plurality of data source sets. In such cases, processing resources of different storage clusters 35 optionally receive only ones of the plurality of records generated by the data sources in the corresponding data source set. Alternatively, a common set of processing resources, such as a set of computing devices 18 across multiple storage clusters 35, can generate pages included in multiple different subsets by ensuring each page includes only records from data sources in the same data source set.

The plurality of data source sets can be indicated by data source assignment data that maps each data source to a particular storage cluster in a plurality of storage clusters. In some cases, the method further includes generating this data source assignment data by segregating a plurality of data sources into a plurality of data source sets mapped to a corresponding plurality of storage clusters of the record processing and storage system. In some cases, generating the data source assignment data includes generating data sources sets with the same or relatively equal numbers of data sources; generating data sources sets attaining relatively equal data input rates for each storage cluster based on determining data transmission rates of each data source; generating data sources sets to attain data rates proportional to storage resource capacity and/or ingress resource availability of the different storage clusters; and/or generating data sources sets in accordance with other criteria based on the data sources 2501 and/or based on the storage clusters 35. Alternatively, this data source assignment data can be retrieved from memory, received via user input, and/or otherwise determined. The plurality of data source sets can be mutually exclusive and collectively exhaustive with respect to the full plurality of data sources. In some cases, the method further includes sending the determined data source assignment data to the plurality of data sources. In such cases, a given data source can route their records to one or more computing devices 18 of a particular storage cluster 35 based on determining assignment to the particular storage cluster 35 in the received data source assignment data.

Step 3086 includes storing, for each of the plurality of storage clusters, the corresponding subset of the plurality of pages of pages via storage resources of the each of the plurality of storage clusters. This can render storage of the plurality of pages in the record processing and storage system. The storage resources of the each of the plurality of storage clusters can be mutually exclusive with respect to storage resources across all of the plurality of storage clusters, where each storage cluster has distinct storage resources. For example, the storage resources of a given storage cluster are implemented by utilizing memory drives and/or cache memory of one or more one or more nodes 37 of one or more computing devices 18 of the given storage cluster.

Step 3088 includes facilitating for each of the plurality of storage clusters, deduplication of each page included in the corresponding subset of the plurality of pages based on metadata comparisons with other pages included in the corresponding subset of the plurality of pages. This can render deduplicating the entire plurality of pages by the record processing and storage system. Deduplication of each page included in a given storage cluster can include only comparing the page to other pages in the same storage cluster 35, and not comparing the page to pages in other storage clusters 35.

The method can further include, for each storage cluster, facilitating reads to the pages after deduplication in step 3088. These can facilitate execution of queries by utilizing deduplicated records stored in pages. The method can further include, for each storage cluster, generating a plurality of segments from its plurality of pages after deduplication in step 3088. In some cases, each of the plurality of segments are all in the same storage cluster that stored the corresponding plurality of pages. In other cases, some segments are sent to and/or stored by other storage clusters.

FIGS. 31A-31E present embodiments of a record processing and storage system 2505 that generates pages 2515 via a plurality of processing core resources 48. The plurality of processing core resources 48 utilized to implement page generator 2511 can be utilized to implement the page generator 2511 of FIG. 25A, the page generator 2511 of each stream loader module 2510 of FIG. 25B, the plurality if processing core resources 48 of the page generator 2511 of FIG. 25C, and/or any other embodiment of page generator 2511 discussed herein. The plurality of processing core resources 48-1-48-W of page generator 2511 can be implemented by utilizing some or all processing core resources 48 of one or more nodes 37 and/or of one or more computing devices 18. The plurality of processing core resources 48-1-48-W can be implemented utilizing one or more processing core resources 48 of the node 37 of FIG. 13. In some cases, the plurality of processing core resources 48-1-48-W are each implemented by a single stream loader module 2510. In some cases, each stream loader module 2510 includes and utilizes its own subset of the plurality of processing core resources 48-1-48-W, for example, where each subset of the plurality of processing core resources 48-1-48-W is included in one or more nodes 37 utilized to implement the corresponding stream loader module 2510. Some or all features and/or functionality of embodiments of the record processing and storage system 2505 of FIGS. 31A-31E can be utilized to implement the record processing and storage system 2505 of FIG. 25A, FIG. 25B, FIG. 25C, and/or any other embodiment of record processing and storage system 2505 described herein.

Individual processing core resources 48 on one or more nodes can each be responsible for building pages 2515 from batches of received records. For example, processing core resources 48 process batches of records, such as the set of records 2422 included in one or more labeled row data 3010 received from one or more data sources, as discussed previously in conjunction with FIG. 25C. Ideally, work is balanced such that all processing core resources 48 are maximizing utilization at any given time without waiting for additional batches to be processed, and without having a large queue of its own batches waiting to be processed while other processor core resources 48 aren't working.

However, batches of records can vary in size, for example, based on different labeled row data 3010 having different numbers of records, based on different records 2422 having different numbers of columns, and/or based on different records including columns of different sized data types. Furthermore, particular processing core resources 48 may also be responsible for additional types of tasks, such as generating segments from pages and/or performing other functionality performed by the record processing and storage system 2505 described herein.

For at least these reasons, the processing time required for a given processing core resource 48 to process different batches of records can vary and/or can be unpredictable. Therefore, it can be unideal for labeled row data 3010 to be assigned to particular processing core resources 48, as the desired balancing and maximization of utilization may not be achieved. In particular, if batches of records were assigned to processing core resource 48 in accordance with a data dependent scheme, for example, where different types of records and/or records from different data sources are assigned to different processing core resources 48, then it could be possible for processing core resource 48 to be oversubscribed relative to others when data bias exists. If batches of records were assigned to processing core resource 48 in a non-data dependent manner, for example, based on a round robin scheme, based on minimum pending queue length, or another non-data dependent manner, then the unknown complexity of the total pending queue and/or the unknowable but ever-changing load on each processing core resource 48 itself, means that faster elements could still require being artificially stalled behind slower ones.

Figure 31A:
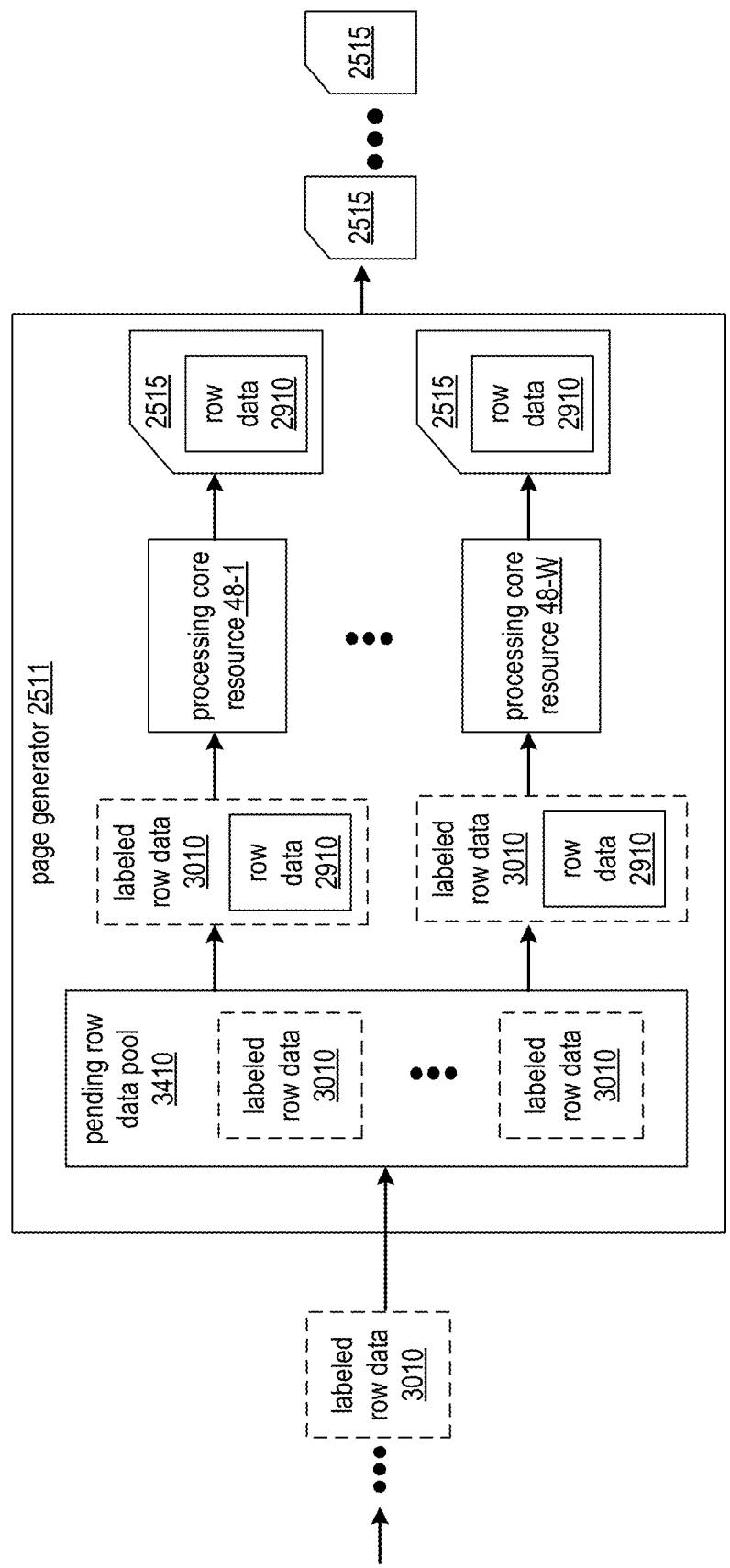
FIG. 31A is a schematic block diagram of an embodiment of a page generator that utilizes a plurality of processing core resources to generate pages in accordance with various embodiments of the present invention.

FIGS. 31A-31E present embodiments to more effectively balance and/or maximize utilization of the processing core resources 48-1-48-W. Batches of records can be logically placed, in order per stream source, into a logical pool. For example, as illustrated in FIG. 31A, a pending row data pool 3410 includes a plurality of labeled row data 3010 received from one or more data sources that are pending processing into pages 2511 by the page generator 2511.

Processing core resources 48 can each extract batches from this pool for processing as they finish processing other batches, finish performing other tasks, and/or otherwise have the capacity to process new batches. In this manner, a slow processing core resource 48, such as a processing core resource 48 currently processing a particularly large batch of records, currently processing a batch of records that takes long time to process, and/or currently performing other tasks, doesn't take on additional work that would otherwise be completable via another processing core resources 48. This improves the technology of database systems by improving the efficiency and utilization of resources during data ingress. This further improves the technology of database systems by increasing the rate at which incoming records can processed into pages 2511, enables greater rates of records to be received and processed for storage, allowing for a richer and/or denser database system 10.

Furthermore, processing core resources 48 can each extract batches in accordance with an ordering of the batches, for example, based on a most favorably ordered batch number of the batches in the pending row data pool 3410. This mechanism of retrieving batches for processing preserves the ordering of the batches, as batches will begin their processing by the page generator 2511 in accordance with their respective ordering. This mitigates how out-of-order batch processing will be completed. This preserving of the batch ordering can further improve the technology of database systems by reducing the delay in communication of row confirmation data 3030 with data sources 2501 based on initiating processing of records in order. This preserving of the batch ordering can alternatively or additionally further improve the technology of database systems by improving the efficiency of the deduplication process because: fewer records may require retransmission when delay in communication of row confirmation data 3030 to data sources is minimized; and/or records requiring deduplication can be received and processed within shorter time intervals, which can decrease the number of pages required for comparison in deduplicating each page in some embodiments of the row deduplication module 3050 to improve efficiency of the row deduplication module 3050.

Each labeled row data 3010 included in the pending row data pool 3410 of FIGS. 31A-31E can include a plurality of records 2422 and can further include a corresponding batch number 3412. For example, each labeled row data 3010 is implemented as the labeled row data 3010 discussed in conjunction with FIG. 27B, where the corresponding row data 2910 includes a plurality of records 2422, and where the batch number described in conjunction with FIGS. 31A-31E is implemented by the row number 3012 assigned to set of records 2422 in the labeled row data 3010. As another example, each labeled row data 3010 is implemented as the labeled row data 3010 discussed in conjunction with FIG. 27D, where the batch number described in conjunction with FIGS. 31A-31E is implemented by the batch number 3412 of the labeled row data 3010 of FIG. 27D, and where records in the corresponding row data 2910 include their own row numbers 3012.

Each labeled row data 3010 of FIGS. 31A-31E can be generated by and received from a data source 2501, for example, as discussed in conjunction with FIG. 27A. In such cases, the corresponding batch numbers can correspond to the corresponding row data 2910, where the batch number optionally remains the same for row data 2910 that is retransmitted by the data source 2501. This can be ideal to ensure that retransmitted data is prioritized and/or processed before other data that may have been transmitted before this retransmitted data and/or received by the record processing and storage system 2505 before this retransmitted data.

In other embodiments, the labeled row data 3010 of FIGS. 31A-31E can alternatively be generated by the record processing and storage system 2505 from one or more row data 2910 of one or more labeled row data 3010 received, for example, in succession and/or within a same time interval, from a same data source 2501 and/or from multiple different data sources. In such cases, the batch number 3412 of the labeled row data 3010 of FIGS. 31A-31E can optionally be generated by the record processing and storage system 2505, for example, in accordance with an ordering that the corresponding one or more corresponding row data 2910 included in this labeled row data 3010 was received. This can be ideal in maintaining an ordering of batches received across different data sources 2501 because the row numbers 3012 and/or batch numbers 3412 generated by each data source may not be correlated.

The batch number 3412 for each labeled row data 3010 of FIGS. 31A-31E can be generated by the data source and/or by the record processing and storage system 2505 in accordance with an ordering scheme, such as the strictly increasing ordering scheme discussed in conjunction with the examples of FIGS. 27A-27H. In cases where the batch number 3412 for each labeled row data 3010 of FIGS. 31A-31E is generated by the record processing and storage system 2505, the ordering scheme can be a function of when the corresponding row data is received by the record processing and storage system 2505, for example, where each subsequently received row data 2910 is assigned a strictly increasing batch number 3412 from all previously received row data 2910. In some cases, subsequently received row data 2910 is receives from different ones of a set of data sources 2501 over time, and each subsequently received row data 2910 is assigned a strictly increasing batch number 3412 from all previously received row data 2910, regardless of which one of a plurality of data sources 2501 sent the corresponding row data 2910.

The pending row data pool 3410 can be implemented via one or more memory resources accessible by the page generator 2511. In some cases, the pending row data pool 3410 is implemented utilizing the queue reader 2559 of FIG. 25B, where the pending row data pool 3410 is optionally shared and/or accessible by each page generator 2511 of each stream loader module 2510 of FIG. 25B. The pending row data pool 3410 can be implemented as a sorted list of labeled row data 3010 by batch number 3412. For example, the confirmation-pending row list 3020 can be implemented as and/or based on a queue and/or priority queue that is populated with labeled row data 3010 as it is received. The ordering of the labeled row data 3010 is in accordance with the ordering scheme utilized to generate the batch numbers 3412. For example, a highest priority labeled row data 3010 and/or first labeled row data 3010 in the pending row data pool 3410 at a given time corresponds to the labeled row data 3010 with the most favorably ordered batch number 3412, such as a lowest batch number 3412 in embodiments where batch number 3412 are generated as strictly increasing values. The pending row data pool 3410 can otherwise have an ordering of labeled row data 3010 by the order in which the labeled row data 3010 was generated by a corresponding data source 2501 and/or by the order in which the labeled row data 3010 was generated and/or received by the record processing and storage system 2505.

Each processing core resource 48 can independently retrieve and process labeled row data 3010 from the pending row data pool 3410 over time, for example, in parallel with the processing of other labeled row data 3010 by other processing core resources 48 and/or without coordination with the other processing core resources 48. In particular, each processing core resource 48 can retrieve and/or access the labeled row data 3010 a most favorably ordered batch number 3412 for processing in response to completing processing of a previously retrieved labeled row data 3010 and/or in response to otherwise becoming available to process a new labeled row data 3010.

As described herein, each retrieval and processing of a given labeled row data 3010 from pending row data pool 3410 can be performed by a processing core resource 48 within a particular time slice, where the processing core resource 48 retrieves and processes a plurality of labeled row data 3010 over time within a plurality of sequential time slices. Different time slices can be varying lengths of time based on how long it takes to process the given labeled row data 3010. Note that in certain time slices of the plurality of sequential time slices, the corresponding processing core resource 48 can be instead performing other tasks, such as participating in generation of segments from pages to implement some or all functionality of segment generator 2517. Over time, each other processing core resource 48 retrieves and processes other labeled row data 3010 from pending row data pool 3410 and/or perform other tasks in their own pluralities of sequential time slices, which can be overlapping and/or can have non-synchronized time slices of same or different lengths due to each processing core resource 48 independently processing their retrieved labeled row data 3010 without coordination. Over time, each processing core resource 48 retrieves and processing their own, distinct subset of a plurality of labeled row data 3010 that was included in the pending row data pool 3410 to generate their own distinct subset of pages in a plurality of pages generated across all processing core resource 48-1-48-W.

The processing of each given labeled row data 3010 by a single processing core resource 48 can include: generating a portion of a page 2515 from the row data 2910 in the given labeled row data 3010; generating one or more entire pages 2515 from the row data 2910 in the given labeled row data 3010; generating page metadata 3115 for a page 2515 generated from the given labeled row data 3010 based on the batch number 3412, one or more row numbers 3012, and/or one or more data source identifiers 3014 included in the given labeled row data 3010, for example, as discussed in conjunction with FIG. 30A; performing some of all of the deduplication of a page 2515 generated from the given labeled row data 3010 as discussed in conjunction with FIGS. 28A-28D and/or 29A-29B; generating and/or facilitating sending of row confirmation data 3030 based on the batch number 3412, one or more row numbers 3012, and/or one or more data source identifiers 3014 included in the given labeled row data 3010, for example, as discussed in conjunction with FIGS. 27A-27F; generating index data 2516 for a page 2515 generated from the given labeled row data 3010; facilitating storage of a page 2515 generated from the given labeled row data 3010 in page cache 2512, one or more page storage 2546, and/or other memory of page storage system 2506; performing compression of data values for one or more records included in row data 2910 of the given labeled row data 3010; performing validation of one or more records included in row data 2910 of the given labeled row data 3010; and/or performing other processing of labeled row data 3010 for generation and/or storage of corresponding pages 2515.

While not depicted in FIG. 31A, the pending row data pool 3410 can optionally include separate ordered queues and/or otherwise separate pools of data for each corresponding data source identifier 3014 based on their corresponding batch numbers 3412. In such cases, processing core resources can extract the most favorably ordered labeled row data 3010 of a selected data source identifier 3014. The data source identifier 3014 can be selected by a processing core resources based on being assigned to the processing core resource 48, based on the processing core resource determining data source identifiers 3014 for each retrieval in accordance with a round robin approach, based on the processing core resource determining a data source identifiers 3014 with a largest corresponding queue and/or a least-recently received most favorably ordered labeled row data 3010, and/or based on another determination. A given processing core resource 48 can retrieve labeled row data 3010 of the same and/or different data source identifier 3014 in sequential ones of its time slices over time based on a determined ordering of the data source identifier 3014 and/or based on independently determining the data source identifier 3014 of a given time slice given the current state of the pending row data pool 3410.

FIGS. 31B-31E illustrate an example embodiment of the processing of labeled row data 3010 by different processing core resources 48-1 of page generator 2511 over time. The functionality of page generator 2511 as illustrated in the example of FIGS. 31B-31E can be utilized to implement the page generator 2511 of FIG. 31A and/or any other embodiments of page generator 2511 described herein.

Figure 31B:
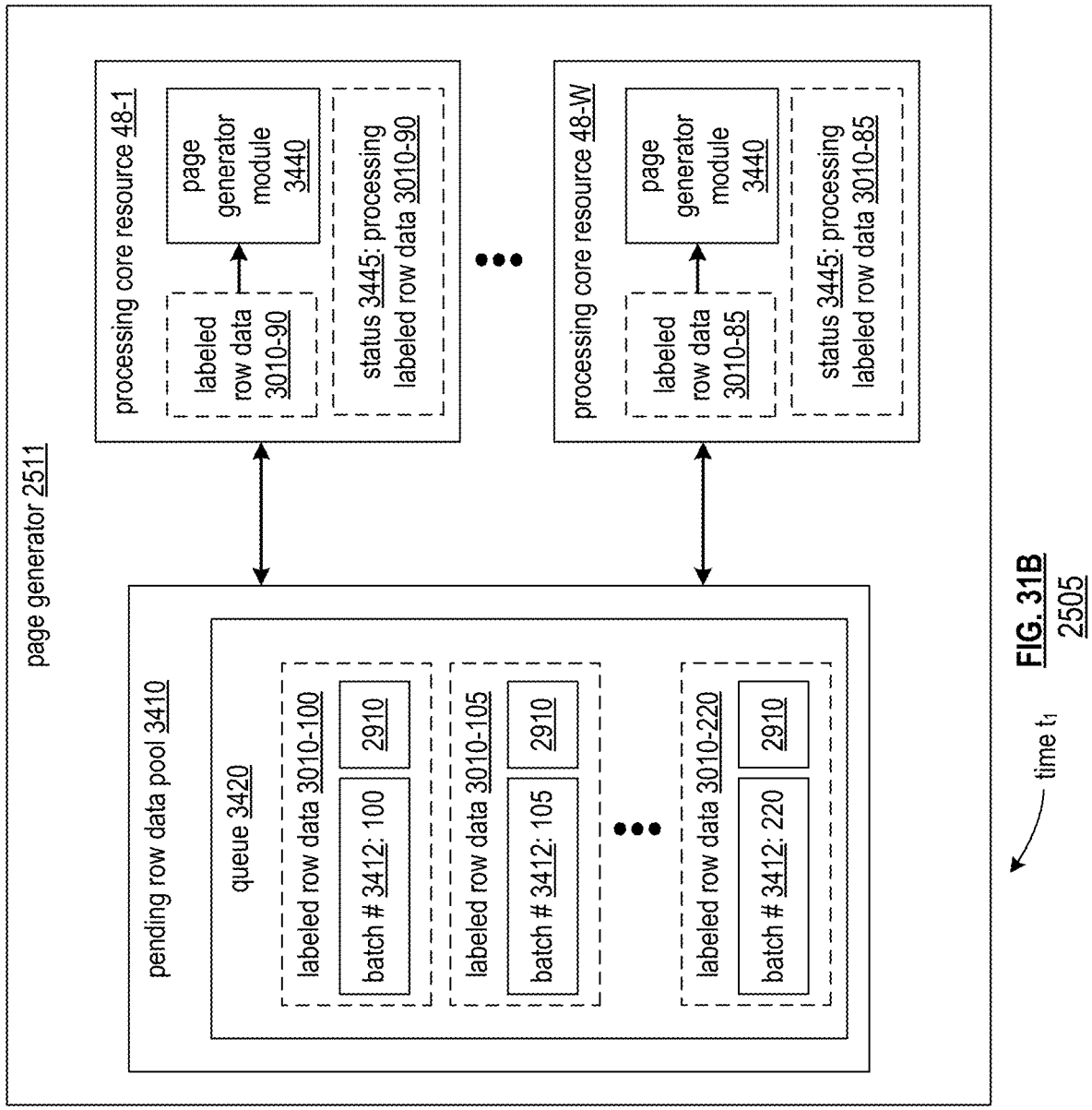
FIGS. 31B-31E are schematic block diagrams illustrating an example embodiment of generating pages via a plurality of processing core resources over time in accordance with various embodiments of the present invention.

FIG. 31B illustrates the state of the page generator 2511 at a first time $t_1$. Processing core resource 48-1 is currently processing labeled row data 3010-90 that was previously retrieved from pending row data pool 3410 via its own page generator module 3440, as denoted by its status 3445 illustrated in FIG. 31B. Processing core resource 48-W is currently processing another labeled row data 3010-85 that was previously retrieved from pending row data pool 3410 via its own page generator module 3440, as denoted by its status 3445 illustrated in FIG. 31B. Each page generator module 3440 can be implemented via processing resources of the corresponding processing core resource 48. Status 3445 can be stored and/or determined by the corresponding processing core resource 48. Alternatively, status 3445 is depicted in FIGS. 31B-31E to denote the current status of the corresponding processing core resource 48 for the purpose of illustrating the functionality of page generator 2511, and does not correspond to a value or information stored by the corresponding processing core resource 48.

A queue 3420 of pending row data pool 3410 includes labeled row data 3010-100, 3010-105, and 3010-220. The labeled row data 3010 of FIG. 31B are denoted 3010-85, 3010-90, 3010-100, 3010-105, and 3010-220 based on having corresponding batch numbers 3412 with values 85, 90, 100, 105, and 220, respectively. In some cases, these batch numbers 3412 can optionally correspond to the row numbers 3012 of corresponding labeled row data 3010 sent by a data source 2501 in the example of FIGS. 27F-27H.

The queue is ordered by batch number 3412 in accordance with the ordering scheme. In this case, the most favorably ordered batch number 3412 corresponds to a lowest batch number 3412. Thus at time $t_1$, labeled row data 3010-100 is ordered first in the queue, and will be retrieved by the next available processing core resource 48. Note that labeled row data 3010-85 and labeled row data 3010-90 were previously retrieved based on having more favorable batch numbers than the other batch numbers in the pending row data pool 3410.

Figure 31C:
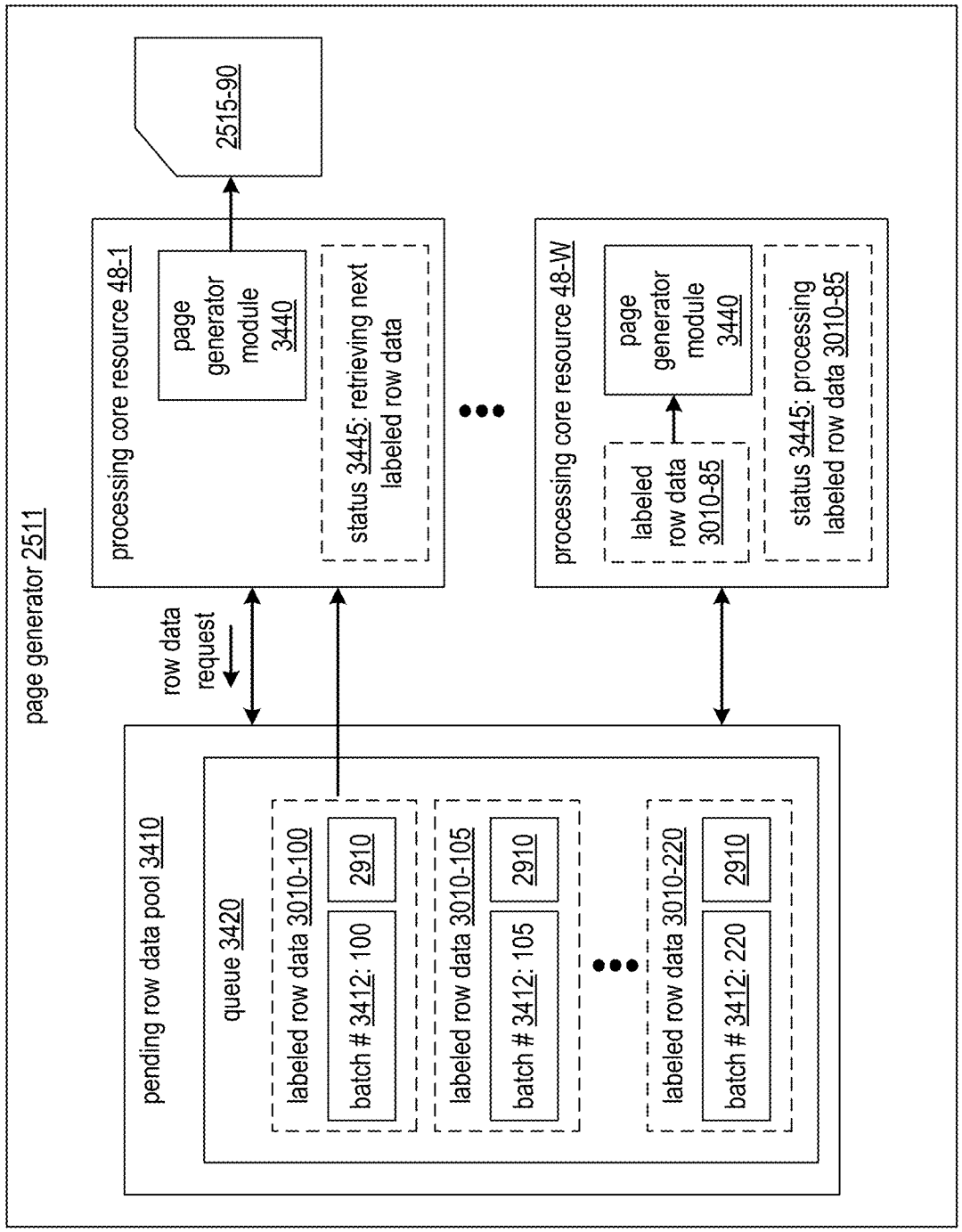

FIG. 31C illustrates the state of the page generator 2511 at a second time $t_2$ that is after time $t_1$. At time $t_2$, processing core resource 48-1 has finished processing labeled row data 3010-90 via its page generator module 3440. For example, a page 2515-90 was generated to include labeled row data 3010-90 and/or optionally one or more previously received and processed labeled row data 3010. Based on competing processing of labeled row data 3010-90, status 3445 of processing core resource 48-1 has changed to include retrieving of the next labeled row data. Thus, processing core resource 48-1 can generate a row data request to pending row data pool 3410 and/or can otherwise access and/or retrieve a most favorably ordered labeled row data 3010 in queue 3420. Labeled row data 3010-100 is therefore retrieved for pending row data pool 3410 processing by processing core resource 48-1 based on being the most favorably ordered labeled row data 3010 in queue 3420 at this time. For example, no other processing core resources 48-2-48-W changed status between time $t_1$ and time $t_2$, or otherwise did not become available to process new labeled row data between time $t_1$ and time $t_2$.

Figure 31D:
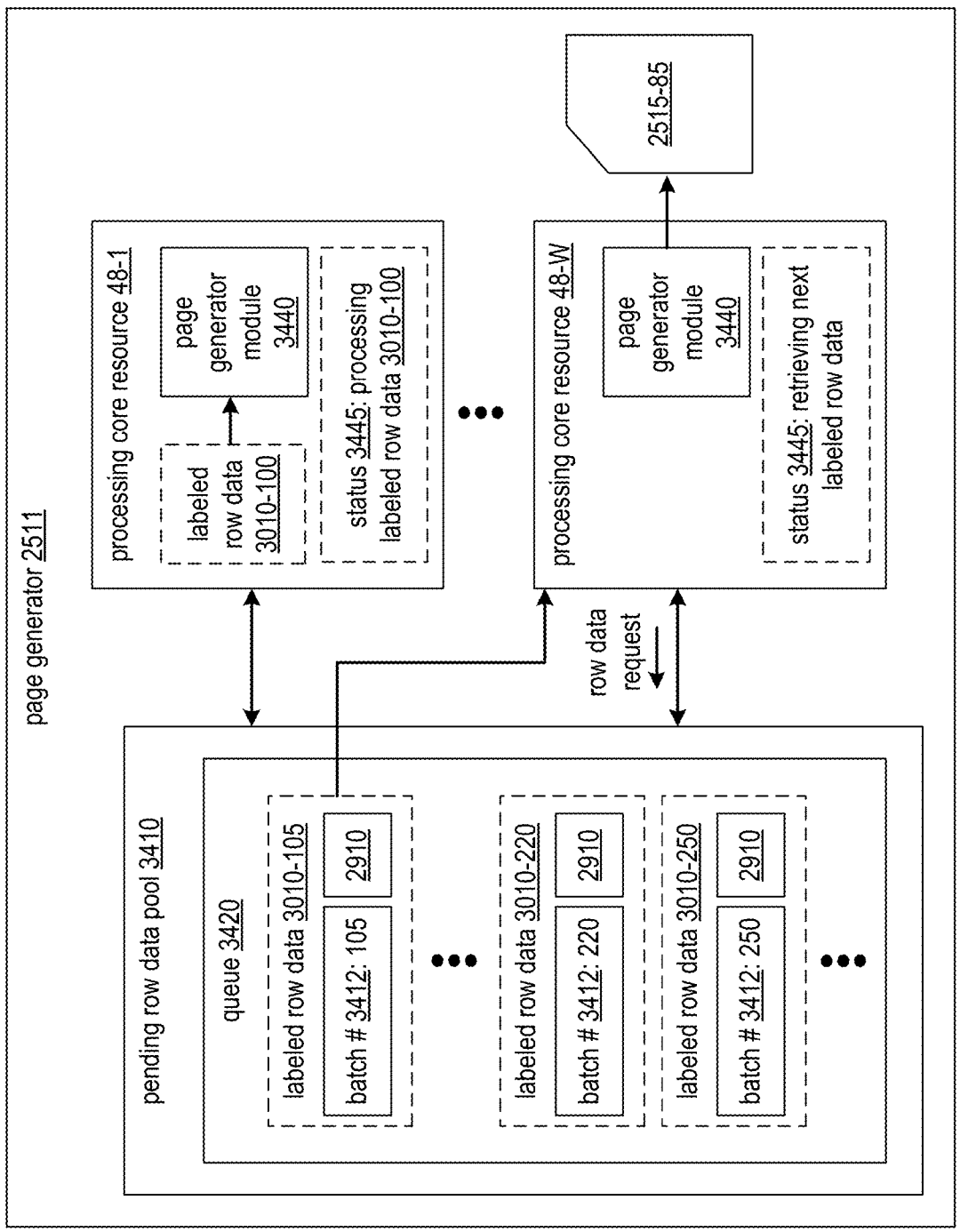

FIG. 31D illustrates the state of the page generator 2511 at a third time $t_3$ that is after time $t_2$. At time $t_3$, processing core resource 48-W has finished processing labeled row data 3010-85 via its page generator module 3440. For example, a page 2515-85 was generated to include labeled row data 3010-85 and/or optionally one or more previously received and processed labeled row data 3010. Note that processing core resource 48-W retrieved labeled row data 3010-85 before processing core resource 48-1 retrieved labeled row data 3010-90 based on labeled row data 3010-85 being more favorably ordered than labeled row data 3010-90, but processing core resource 48-W finished its processing of labeled row data 3010-85 after processing core resource 48-1 finished its processing of labeled row data 3010-90. For example, labeled row data 3010-85 may have included more records 2422, may have had a greater data size, and/or may have required lengthier and/or complex processing than 3010-90. As another example, processing core resource 48-W may have been processing more slowly or less efficiently than processing core resource 48-1.

Based on competing processing of labeled row data 3010-95, status 3445 of processing core resource 48-W has changed to include retrieving of the next labeled row data. Thus, processing core resource 48-W can generate a row data request to pending row data pool 3410 and/or can otherwise access and/or retrieve a most favorably ordered labeled row data 3010 in queue 3420. Labeled row data 3010-105 is therefore retrieved for pending row data pool 3410 processing by processing core resource 48-W based on being the most favorably ordered labeled row data 3010 in queue 3420 at this time. For example, no other processing core resources 48-1-48-W-1 changed status between time $t_2$ and time $t_3$, or otherwise did not become available to process new labeled row data between time $t_2$ and time $t_3$.

Note that the queue 3420 was also updated between time $t_2$ and time $t_3$ to include at least additional labeled row data 3010-250 based on corresponding additional row data 2910 being received by the record processing and storage system 2505 and thus being added to the pending row data pool 3410 between time $t_2$ and time $t_3$. This additional labeled row data, including labeled row data 3010-250, is less favorably ordered than the labeled row data 3010 that was already in queue 3420 based on their batch numbers being less favorably ordered than the batch numbers of all other labeled row data already included in the pending row data pool 3410 prior to time $t_2$. For example, these batch numbers are less favorably ordered based on the corresponding labeled row data 3010 having been generated after and/or received after the other labeled row data already included in the pending row data pool 3410 prior to time $t_2$.

In other periods of time, new labeled row data 3010 can be optionally ordered before other labeled row data already included in the queue 3420 based on having a more favorably ordered batch number than this labeled row data already included in the queue 3420. This new labeled row data will thus be processed before this other labeled row data in such embodiments. For example, this new labeled row data 3010 has a more favorably ordered batch number than other labeled row data already included in the queue 3420 based on being retransmitted labeled row data 3010 with a same, old batch number 3412 due to not being confirmed in row confirmation data 3030 for its prior one or more transmissions as discussed in conjunction with FIG. 27A-27H.

Figure 31E:
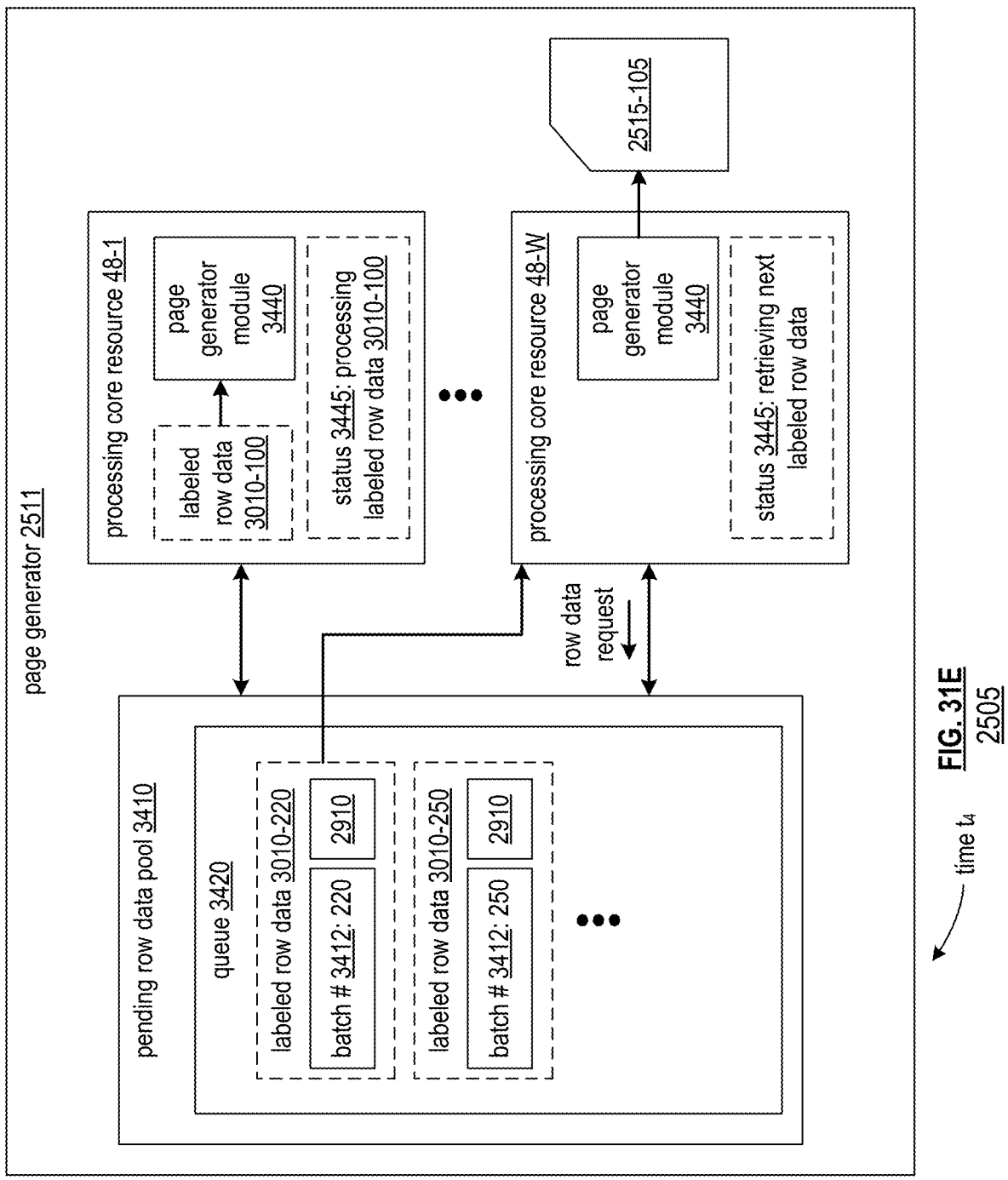

FIG. 31E illustrates the state of the page generator 2511 at a fourth time $t_4$ that is after time $t_3$. At time $t_4$, processing core resource 48-W has finished processing labeled row data 3010-105 via its page generator module 3440. For example, a page 2515-105 was generated and/or partially generated to include labeled row data 3010-105. Based on competing processing of labeled row data 3010-105, status 3445 of processing core resource 48-W has changed to include retrieving of the next labeled row data. Thus, processing core resource 48-W can generate a row data request to pending row data pool 3410 and/or can otherwise access and/or retrieve a most favorably ordered labeled row data 3010 in queue 3420. Labeled row data 3010-220 is therefore retrieved for pending row data pool 3410 processing by processing core resource 48-W based on being the most favorably ordered labeled row data 3010 in queue 3420 at this time. For example, other labeled row data 3010 included between labeled row data 3010-105 and labeled row data 3010-220 in the ordering of the queue 3420 at time $t_3$ were each retrieved by other ones of the processing core resource 48 of the page generator 2511 between time $t_3$ and $t_4$ based on being more favorably ordered than 3010-220 and based on these other processing core resources 48 having become available to process labeled row data. However, in this example, processing core resource 48-1 has not retrieved any other labeled row data 3010 for processing between time $t_3$ and $t_4$ based on still processing labeled row data 3010-100 at time $t_4$.

Additional labeled row data 3010 can be received and added to the pending data pool over 3410 time, and can each be similarly processed by a processing core resource 48 based on becoming available. Each labeled row data 3010 of a plurality of labeled row data in pending row data pool 3410 over time can thus have their processing initiated at times ordered in accordance with the ordering dictated by their batch numbers 3412. However, differences in processing time for different labeled row data 3010 can cause the processing of the each of the plurality of labeled row data to end in accordance with a different ordering. This different ordering over time can be only slightly different from and/or can be sufficiently similar to the ordering dictated by batch numbers 3412, based on the processing being initiated in accordance with the ordering dictated by batch numbers 3412.

Figure 31F:
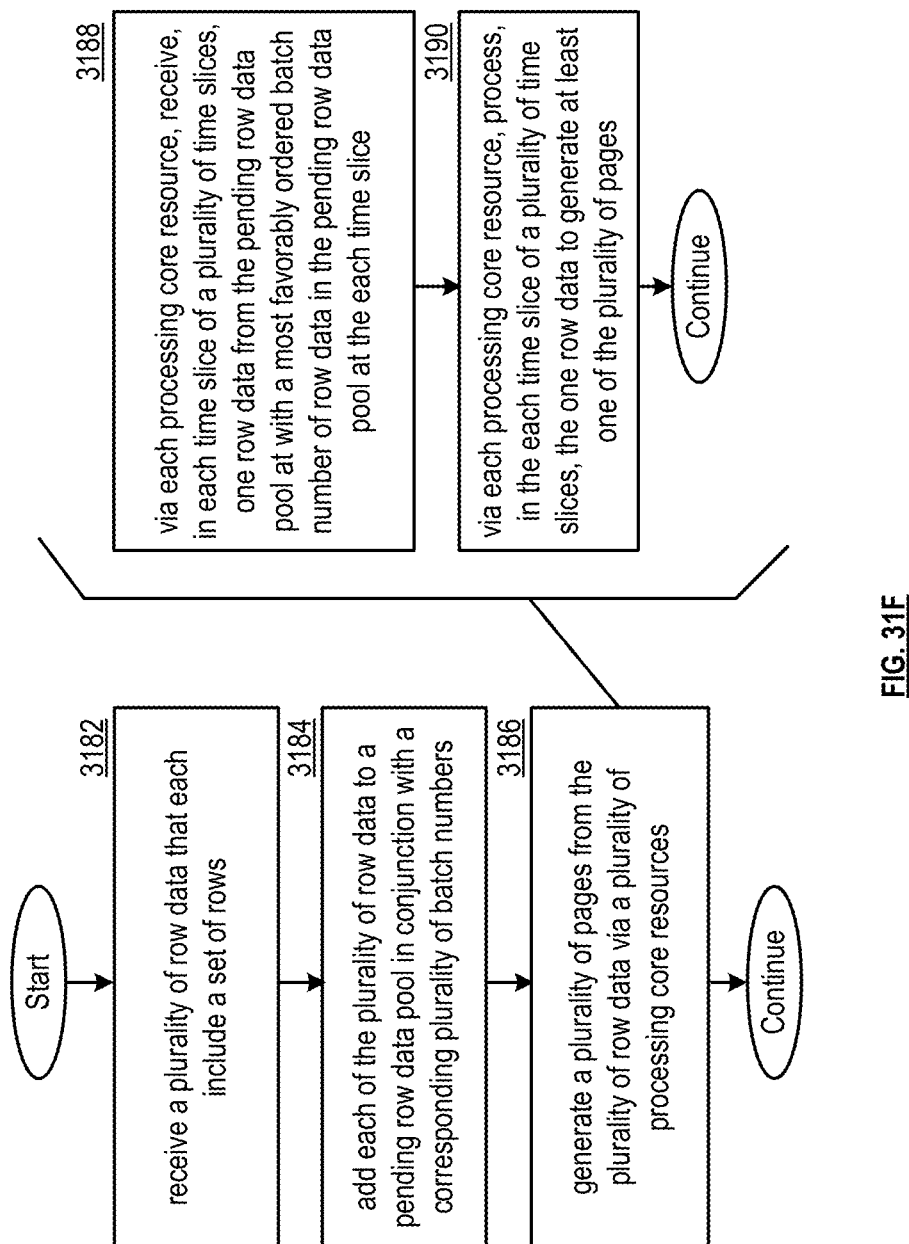
FIG. 31F is a logic diagram illustrating a method of generating pages in accordance with various embodiments of the present invention.

FIG. 31F illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 31F. As another example, one or more nodes 37 can each utilize a plurality of processing core resources 48, where each of the plurality of processing core resources 48 of a given node 37 can independently perform some or all of the steps of 31F in parallel, without coordination with other ones of the plurality of processing core resources 48. Some or all of the method of FIG. 31F can be performed by the page generator 2511 and/or the page storage system 2506 of FIG. 25A. Some or all of the method of FIG. 31F can be performed by one or more stream loader modules 2510 of FIG. 25B, independently or in conjunction. Some or all of the method of FIG. 31F can be performed by the page generator of 2511 of FIGS. 31A-31F, for example, by utilizing the plurality of processing core resources 48-1-48W and/or by utilizing the pending row data pool 3410. Some or all of the steps of FIG. 31F can optionally be performed by any other processing module of the database system 10. Some or all of the steps of FIG. 31F can optionally be performed by one or more data sources 2501 and/or can be performed via communication with one or more data sources 2501. Some or all of the steps of FIG. 31F can be performed to implement some or all of the functionality of the record processing and storage system 2505 of FIG. 25A and/or FIG. 25B. Some or all of the steps of FIG. 31F can be performed to implement some or all of the functionality of the page generator 2511 of FIGS. 31A-31F. Some or all steps of FIG. 31F can be performed by database system 10 in accordance with other embodiments of the database system 10 and/or nodes 37 discussed herein.

Step 3182 includes receiving a plurality of row data. Each row data can include a set of rows. The plurality of row data can be received from one or more data sources 2501 over time. Step 3184 includes adding each of the plurality of row data to a pending row data pool in conjunction with a corresponding plurality of batch numbers. In some cases, each batch number is received with each row data in labeled row data generated by a corresponding data source that sent the labeled row data. In such cases, the batch numbers can be generated by each data source 2501 in accordance with an ordering of the corresponding row data, for example, where the batch number is implemented as row number 3012 and/or is based on a row number 3012 included in the corresponding row data. For example, batch numbers can strictly increase for each subsequently generated row data by the corresponding data source. Alternatively, the batch numbers are assigned to each row number as they are received. In such cases, the batch numbers can be generated in accordance with an ordering that the corresponding row data is received from one or more data sources. For example, batch numbers can strictly increase for each subsequently received row data. In such cases, batch numbers can optionally increase across all labeled row data received from multiple data sources based on the ordering of receipt, regardless of data source that sent the data.

Step 3186 includes generating a plurality of pages from the plurality of row data via a plurality of processing core resources. Each processing core resource in the plurality of processing core resources can process a corresponding subset of the plurality of pages, independently from and/or in parallel with processing of other subsets of the plurality of pages via other ones of the plurality of processing core resources. Each processing core resource can process its corresponding subset of the plurality of pages over time by performing step 3188 and/or step 3190.

Step 3188 includes via each processing core resource, receiving, in each time slice of a plurality of time slices, one row data from the pending row data pool at with a most favorably ordered batch number of row data in the pending row data pool at each time slice. Step 3188 can be performed based on completing processing of a previously retrieved row data in a previous time slice of the plurality of time slices and/or based on otherwise based on becoming available to process new row data.

Step 3190 includes, via each processing core resource, processing, in each time slice of a plurality of time slices, the one row data to generate at least one of the plurality of pages. In some cases each processing resource can further store each page once completing generation of each page. Each page can be generated to include a single row data and/or to include multiple row data. Pages including multiple row data can optionally include one or more row data from multiple different data sources 2501. In some cases, processing the one row data further includes storing the corresponding at least one of the plurality of pages in a page storage system 2506 and/or writing the one row data to a page storage system 2506 as a portion of or the entirety of a corresponding page.

Steps 3188 and 3190 can be repeated by each processing core resource over time for each subsequent time slice. Note that the length of time slices can be different and independent for each of the processing core resources based on independently processing their retrieved row data in differing time frames. Different row data can be processed in different lengths of time based on including different numbers of rows and/or different lengths of data based on having fields with different data types and/or fields with variable-length data types.

As an example of one processing core resource repeating steps 3188 and 3190, a particular processing core resource can retrieve, in a first time slice, one row data from the pending row data pool with a most favorably ordered batch number of row data in the pending row data pool at the first time slice. For example, the processing core resource retrieves the one row data at the first time slice based on completing processing of a previously retrieved row data in an immediately previous time slice. The particular processing core resource can then process the one row data in the first time slice to generate at least a portion of at least one of the plurality of pages. The particular processing core resource can then retrieve, at a second time slice after the first time slice, another row data from the pending row data pool with a most favorably ordered batch number of row data in the pending row data pool at the second time. For example, the processing core resource retrieves the one row data at the first time slice based on completing processing of the one row data, where the second time slice begins immediately after the first time slice elapses as a result of completing processing of the one row data. The particular processing core resource can then process the other row data in the second time slice to generate at least a portion of the same or different at least one of the plurality of pages. The one row data and the other row data can be included in the same pages or can be included in different pages.

This process can repeat for subsequent time slices. Note that one or more other processing core resources may have retrieved and/or processed other row data after the one row data is retrieved and before the second row data is retrieved. These other row data can each have been retrieved by the other processing core resources after the one row data based on having batch numbers that are less favorably ordered than the batch number of the one row data. These other row data can each have been retrieved by the other processing core resources before the other row data based on having batch numbers that are more favorably ordered than the batch number of the other row data.

Figure 32A:
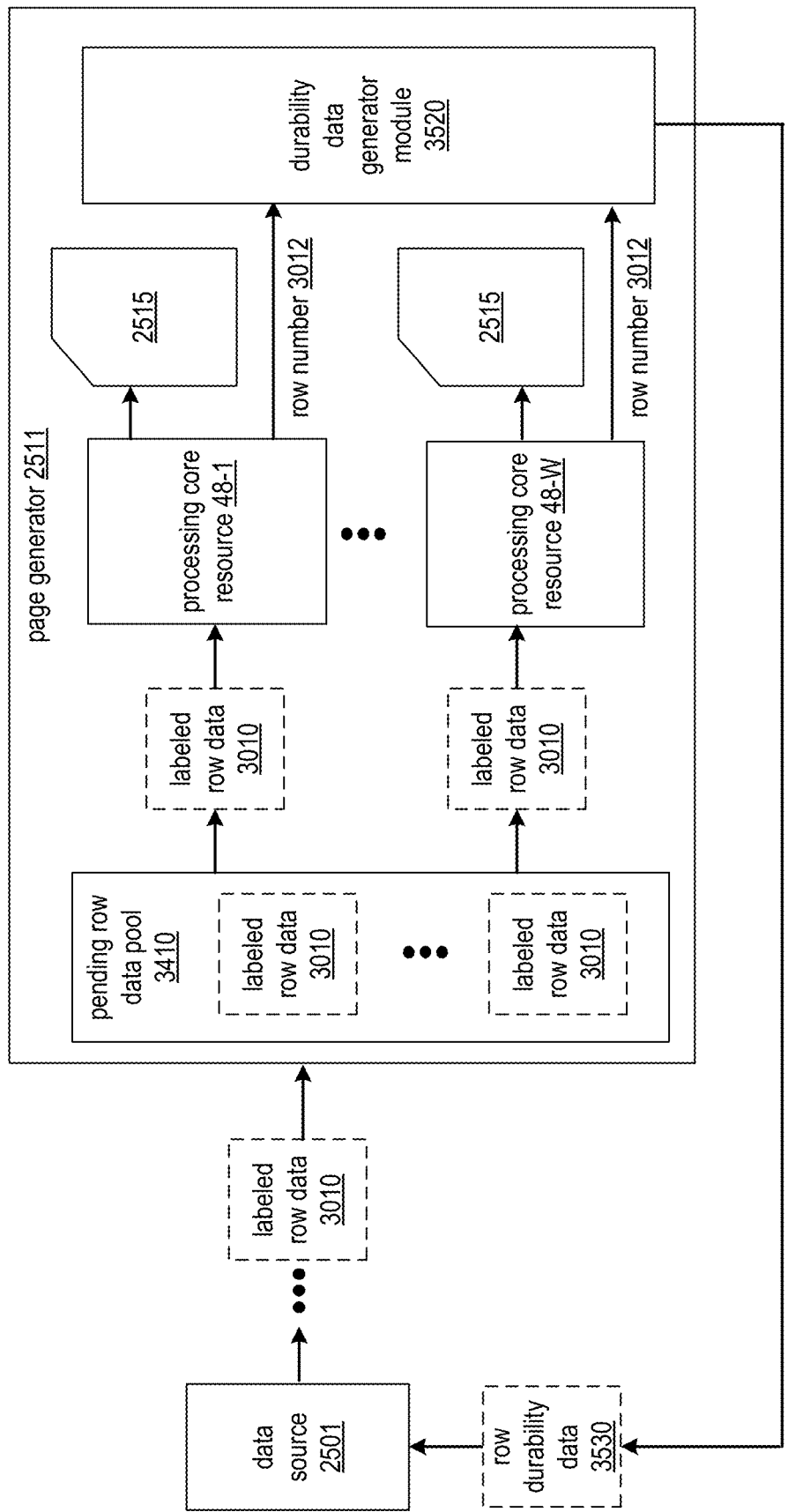
FIG. 32A is a schematic block diagram of an embodiment of a page generator that implements durability data generator module to communicate row durability data to a data source in accordance with various embodiments of the present invention.
Figure 32B:
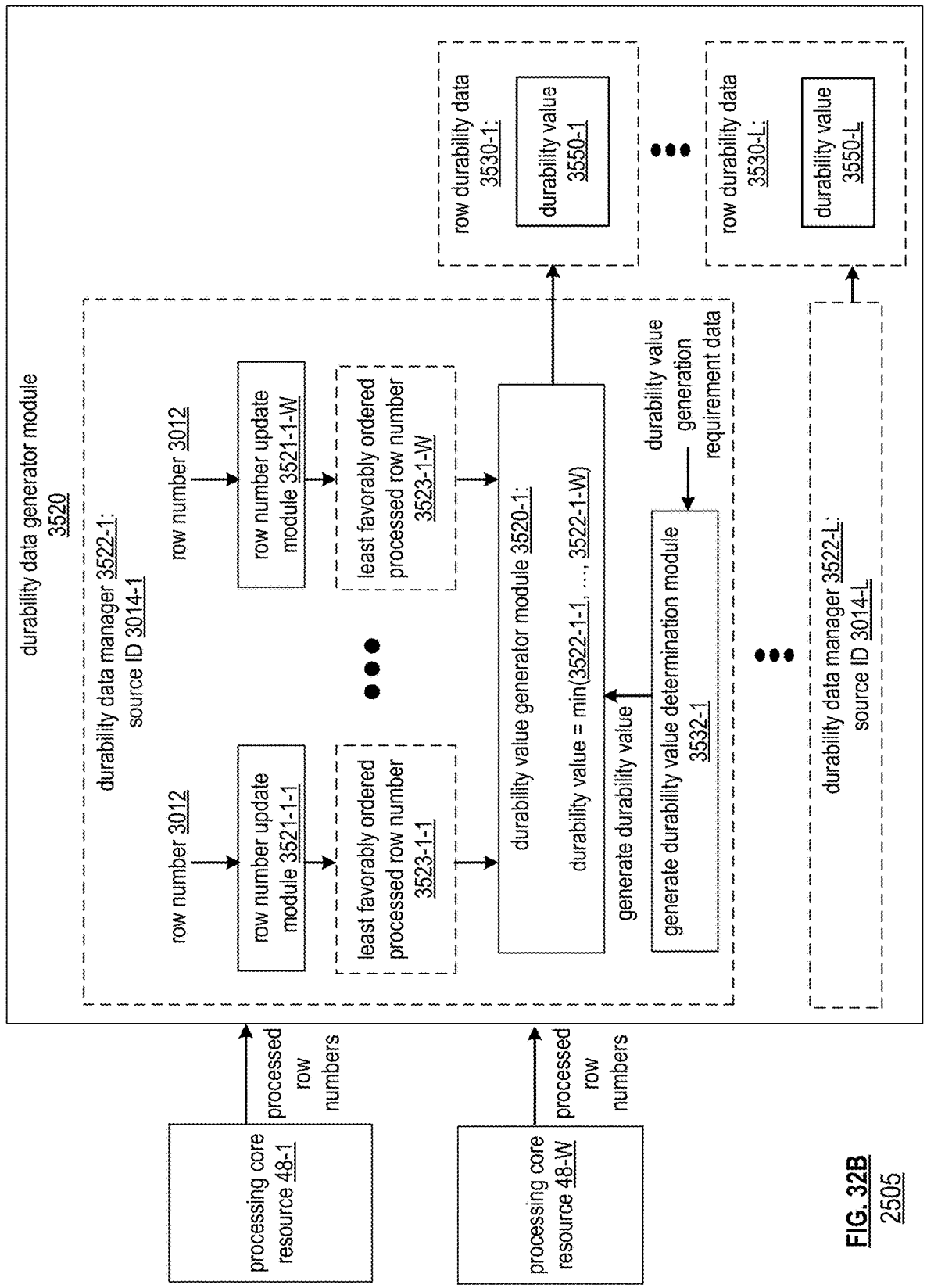
FIG. 32B is a schematic block diagram of an embodiment of a durability data generator module in accordance with various embodiments of the present invention.

FIGS. 32A-32B illustrate embodiments of a record processing and storage system 2505 that includes a page generator 2511 that implements a durability data generator module 3520. The record processing and storage system 2505 of FIGS. 32A-32B can be operable to maintain and/or communicate a durability horizon during parallelized processing of row data 2910 by page generator 2511, such as the processing of row data 2910 over time via the plurality of processing core resources 48-1-48-W as illustrated in FIG. 25C. Some or all features and/or functionality of embodiments of page generator 2511 of FIGS. 32A-32B can be utilized to implement the page generator 2511 of FIG. 25A, of FIG. 25B, and/or any other embodiment of page generator 2511 described herein. Some or all features and/or functionality of embodiments of record processing and storage system 2505 of FIGS. 32A-32B can be utilized to implement the record processing and storage system 2505 of FIG. 25A, of FIG. 25B, and/or any other embodiment of record processing and storage system 2505 described herein.

At any given point in time, there is a record in a given record stream that is considered durable, for example, based on being durably stored by the record processing and storage system 2505 in a page 2515 in accordance with requirements for durable storage discussed previously. Alternatively or in addition, the record is considered durable based on: being received by the record processing and storage system 2505; being included in a page 2515 generated by the record processing and storage system 2505, deduplicated by the record processing and storage system 2505, and/or stored by the record processing and storage system 2505; and/or being confirmed by the record processing and storage system 2505, for example, as discussed in conjunction with FIG. 27A. This record is part of some batch of records in some labeled row data 3010 processed by the page generator 2511, and can represent a "durability horizon" for the corresponding record stream.

A guaranteed durability horizon can be determined for each data source as their batches are processed in parallel by different processing core resources 48-1-48-W over time. This guaranteed durability horizon can correspond to a baseline durability value that can be computed via a simple integer comparison. The guaranteed durability horizon for any given data source 2501 can be maintained across all processing core resources 48 based on evaluating the minimum known horizon for all processing core resources 48 that is not greater than a known pending value. For example, this baseline durability value can indicate a particular row number of a particular corresponding record and/or of particular corresponding row data 2910 of this guaranteed durability horizon. A guaranteed durability horizon can be maintained for each data source 2501-1-2501-L.

This guaranteed durability horizon can be indicated as row durability data 3530 generated by a durability data generator module 3520 of FIG. 32A. This row durability data 3530 is generated by and/or maintained by the durability data generator module 3520 based on row numbers 3012 whose corresponding records 2422 and/or corresponding row data 2910 were processed by a processing core resource 48. For example, these row numbers 3012 are determined based on being indicated in and/or extracted from the labeled row data 3010 processed by a processing core resource 48. In particular, the corresponding page generator 2511 of FIG. 32A can be implemented to perform some or all functionality of the page generator 2511 of FIGS. 31A-31E, and the computing of this guaranteed durability horizon can leverage the in-order initiating of processing of labeled row data 3010 by the plurality of processing core resources 48-1-48-W as described in conjunction with FIGS. 31A-31E to determine and/or communicate a conservative, baseline durability value of row durability data 3530. The computing of this guaranteed durability horizon can further leverage the ordering scheme utilized by data sources 2501 to generate row numbers 3012 as discussed in conjunction with FIGS. 27A-27H.

These row numbers 3012 can indicate corresponding row data 2910. These row numbers 3012 can be implemented as the row numbers 3012 of labeled row data 3010 indicating a single record 2422, for example, implemented as the row numbers 3012 in embodiments of labeled row data 3010 of FIG. 27B and/or 27D. These row numbers 3012 can alternatively or additionally implemented as the row numbers 3012 of labeled row data 3010 indicating a set of multiple records 2422, for example, implemented as the row numbers 3012 in the embodiments of labeled row data 3010 of FIG. 27C and/or implemented as the batch numbers 3412 in the embodiments of labeled row data 3010 of FIG. 27D and/or FIGS. 31A-31E.

The row durability data 3530 indicating this guaranteed durability horizon can be sent to a corresponding data source 2501 and/or can be sent to another computing device associated with the corresponding data source 2501. For example, the data source 2501 and/or the associated computing device can display the received row durability data 3530 to a user and/or administrator associated with the data source 2501. As another example, the data source 2501 and/or the associated computing device can display the received row durability data 3530 to a user and/or administrator associated with the data source 2501.

The row durability data 3530 can indicate that the record, or set of multiple records, whose row number 3012 is indicated by a durability value of row durability data 3530 is durable. The row durability data 3530 can further indicate that all other records sent by the corresponding data source 2501 whose row numbers that are more favorably ordered than the durability value of row durability data 3530 are durable. For example, the row durability data 3530 can indicate that these records with row numbers that are more favorably ordered than the durability value are all available for access in query executions and/or will always be accessed and/or represented in future query executions by the database system 10 as appropriate based on being durably stored by database system 10. In some cases, only a subset of these other records of the corresponding data source 2501 whose row numbers were also confirmed in row confirmation data 3030 of FIG. 27A are guaranteed to be durable, where records with row numbers that are more favorably ordered than the durability value not guaranteed to be durable if they were not yet indicated in row confirmation data 3030 received from the record processing and storage system 2505.

Alternatively or in addition, the row durability data 3530 can be received in conjunction with the row confirmation data 3030 of FIG. 27A and/or can be included in the row confirmation data 3030 of FIG. 27A. Alternatively or in addition, the row durability data 3530 can be utilized to implement some or all of the row confirmation data 3030 of FIG. 27A, for example, where records with a row number indicated by a durability value of row durability data 3530 are considered confirmed by the record processing and storage system 2505; where some or all records with a row number more favorably ordered than the durability value of row durability data 3530 are considered confirmed by the record processing and storage system 2505; where the confirmation-pending row list 3020 is updated based on the durability value of row durability data 3530; and/or where the tracked transmission starting point indicator is updated based on the durability value of row durability data 3530, for example, to indicate most favorably ordered row data in confirmation-pending row list 3020 that is also less favorable than the durability value of row durability data 3530.

Note that because the durability value of row durability data 3530 is a conservatively determined value, some records sent by the corresponding data source 2501 with corresponding row numbers 3012 that are less favorably ordered than the durability value of row durability data 3530 may also be durable when the row durability data 3530 is generated. However, the corresponding data source 2501 cannot determine which additional records with less favorably ordered row numbers 3012 may be durable until subsequent row durability data 3530 is received with a new durability value. For example, these additional records are later guaranteed to be durable based on being more favorably ordered than the new durability value in subsequently received row durability data 3530.

In some embodiments, each row durability data 3530 can be represented as, or otherwise indicate, a (data source identifier, row number) pair. In particular, the row number 3012 for each given data source 2501's row durability data 3530 generated over time is ever advancing as rows received from the data source 2501 are stored over time. In sending each row durability data 3530 back to the corresponding data source 2501, the latest row received that is guaranteed durable is indicated to the data source 2501.

The accuracy and/or dependability of row durability data 3530 can be dependent upon the data source 2501 providing a totally ordered stream of rows with strictly increasing row numbers, for example, as discussed in conjunction with FIGS. 27A-27H. For example, all rows with row numbers prior to the row number indicated row durability data 3530 can be guaranteed to be durably stored, given that data source 2501 provided a totally ordered stream of rows.

Practically managing the task of generating accurate row durability data 3530 can be a challenge. Because processing of rows is highly parallelized, the straight-forward sequence of row numbers muddied by the fact that subsequent rows are not necessarily handled by the same receiving thread within a loader, as discussed in conjunction with FIGS. 31A-31F. At high rates, the ability to determine the row durability data 3530 is imperative, but should not be expensive either computationally, or in storage/memory cost.

FIG. 32B illustrates an example embodiment of the durability data generator module 3520 of FIG. 32A that presents a first approach to generating row durability data 3530. A plurality of durability data managers 3522-1-3522-1 can be implemented by the durability data generator module 3520 to generate and/or maintain a plurality of row durability data 3530-1-3530-L, where each durability data generator module 3520 and each row durability data 3530-1-3530-L corresponds to one of the data sources 2501-1-2501-L. For example, row durability data 3530 can be separately generated based on data source identifiers 3014 associated with each row number 3012 in the labeled row data 3010 and/or otherwise based on the data source 2501 from which the corresponding row data 2910 was received.

Each durability data manager 3522 can receive and/or determine processed row numbers 3012 over time as the corresponding labeled row data 3010 is processed by a processing core resources 48. For each processing core resource 48-1-48-W, one of a corresponding set of row number update modules 3521-1-3521-W determined and/or maintains a least favorably ordered processed row number 3523-1-3523-W over time. As illustrated in FIG. 32A, row number update module 3521-1-1 generates a least favorably ordered processed row number 3523-1-1 based on maintaining the least favorably ordered processed row number 3523 generated by processing core resource 48-1 for records associated with data source identifier 3014-1, and row number update module 3521-1-W generates a least favorably ordered processed row number 3523-1-W based on maintaining the least favorably ordered processed row number 3523 generated by processing core resource 48-W for records associated with data source identifier 3014-1. While not depicted, a row number update module 3521-2-3 would similarly generate a least favorably ordered processed row number 3523-2-3 based on maintaining the least favorably ordered processed row number 3523 generated by processing core resource 48-3 for records associated with data source identifier 3014-2. Thus, L×W most-recently processed row numbers 3523 can be maintained, where each least favorably ordered processed row number corresponds to one data source identifier 3014 and further corresponds to one processing core resource 48.

In some cases, each processing core resource 48 can optionally implement its own row number update module 3521 as it processes labeled row data 3010 to maintain the least favorably ordered processed row number 3523 for each data source 2501-1-2501-L. For example, processing core resource 48-1 implements the set of L row number update modules 3521-1-1-3521-L-1.

Each least favorably ordered processed row number 3523 can correspond to a least favorably ordered row number, in accordance with the ordering scheme, for the corresponding data source identifier 3014 whose corresponding row data 2910 that has been made durable by and/or has been otherwise processed by the corresponding processing core resource 48. For example, in embodiments where the ordering scheme corresponds to strictly increasing valued row numbers, the least favorably ordered processed row number 3523 can correspond to a maximum row number that has been made durable by and/or has been otherwise processed by the corresponding processing core resource 48. As new row data 2910 is made durable and/or is processed by a particular processing core resource 48, the least favorably ordered processed row number 3523 for the particular processing core resource 48 and for the corresponding data source identifier 3014 can be updated to reflect this the row number 3012 of this row data 2910 if this row number 3012 is less favorably ordered than the current value of the corresponding least favorably ordered processed row number 3523.

In some or all cases, the least favorably ordered processed row number 3523 can correspond to a most-recently processed row number 3523. For example, this can be the case if row numbers 3012 strictly adhere to their ordering for processing by processing core resource 48 over time, for example, based on being implemented as the batch numbers 3412 of FIGS. 31A-31E and/or based on processing core resources 48 retrieving labeled row data 3010 from the pending row data pool 3410 as discussed in conjunction with FIGS. 31A-31E. In such cases, as new row data 2910 is made durable and/or is processed by a particular processing core resource 48, the least favorably ordered processed row number 3523 for the particular processing core resource 48 and for the corresponding data source identifier 3014 can be updated to reflect this the row number 3012 of this row data 2910, for example, automatically based on being most recently processed.

A durability data generator module 3520 of each durability data manager can generate the durability value 3550 of the row durability data for the corresponding data source identifier 3014. In the example embodiment depicted in FIG. 32B, the durability value 3550 for the corresponding data source identifier 3014 at a given time is calculated as the most favorably ordered row number of the set of least favorably ordered processed row number 3523-1-3523-L for the given data source identifier 3014 at the given time. In particular, in cases where the ordering scheme corresponds to strictly increasing row numbers over time, the durability value 3550 for the corresponding data source identifier 3014 at a given time is calculated as the minimum of the set of least favorably ordered processed row number 3523-1-3523-L for the given data source identifier 3014.

In some cases a generate durability value determination module 3532 can be implemented for each durability data manager 3522-1-3522-L. The generate durability value determination module 3532 can indicate when to generate a new durability value and/or can trigger the generating of a new durability value as an instruction and/or interrupt. The generate durability value determination module 3532 can determine when to generate updated durability values over time for a corresponding data source 2501 based on durability value generation requirement data.

The durability value generation requirement data can be automatically generated, can be received, can be configured via user input, can be configured and/or received by a corresponding data source, can be accessed from memory, and/or can otherwise be determined by the durability data generator module. The durability value generation requirement data can indicate: a schedule for generating durability values over time; a predetermined time interval for generating durability values over time; an instruction to generate a new durability value as soon as possible; an instruction to generate new durability values based on one, all, or at least a predetermined number of processing core resources 48-1-48-W having their least favorably ordered processed row numbers 3523 for the data source since the last durability value was updated; and/or based on another determination.

In some cases, row durability data 3530 is generated for different data sources 2501 at different times and/or at different frequencies, for example, based on the different data sources 2501 configuring or otherwise having different durability value generation requirement data. In other cases, row durability data 3530 is generated for some or all data sources 2501-1-2501-L at a same time, for example, based on at different times and/or at different frequencies, for example, based on implementing a common generate durability value determination module 3532 across some or all data sources 2501-1-2501-L and/or based on some or all data sources 2501-1-2501-L having same durability value generation requirement data.

Figure 32C:
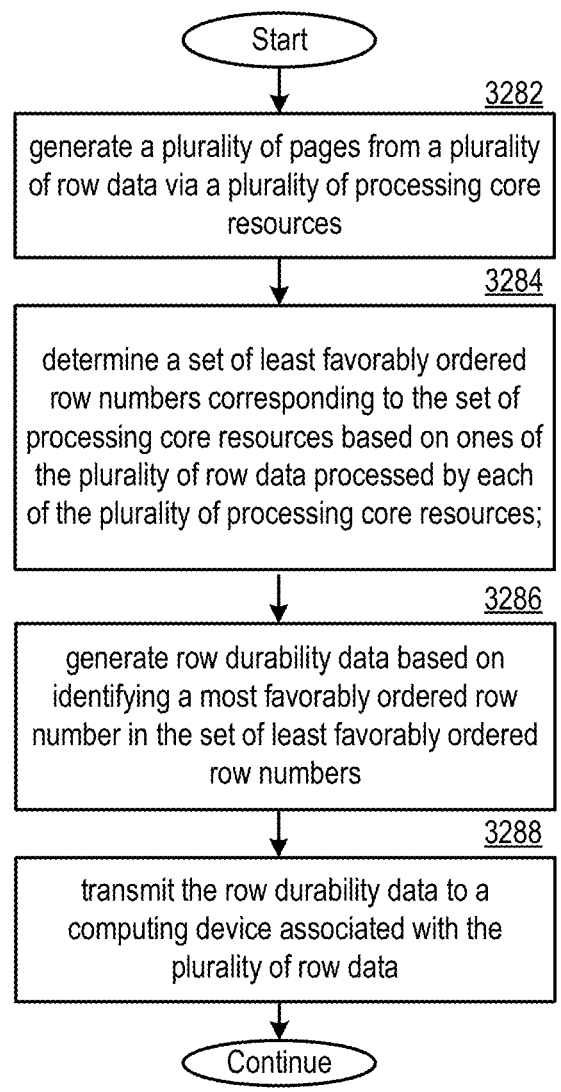
FIG. 32C is a logic diagram illustrating a method of generating row durability data in accordance with various embodiments of the present invention.

FIG. 32C illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 32C. As another example, one or more nodes 37 can each utilize a plurality of processing core resources 48, where each of the plurality of processing core resources 48 of a given node 37 can independently perform some or all of the steps of 32C in parallel, without coordination with other ones of the plurality of processing core resources 48. Some or all of the method of FIG. 32C can be performed by the page generator 2511 and/or the page storage system 2506 of FIG. 25A. Some or all of the method of FIG. 32C can be performed by one or more stream loader modules 2510 of FIG. 25B, independently or in conjunction. Some or all of the method of FIG. 32C can be performed by the page generator of 2511 of FIGS. 31A-31F and/or of FIG. 32A, for example, by utilizing the plurality of processing core resources 48-1-48W, by utilizing the pending row data pool 3410, and/or by utilizing the durability data generator module 3520. Some or all of the method of 32C can be performed by the durability data generator module 3520 of FIG. 32B, for example, by implementing at least one row number update module 3521, by implementing at least one generate durability value determination module 3532, and/or by implementing at least one durability data generator module 3520. Some or all of the steps of FIG. 32C can optionally be performed by any other processing module of the database system 10. Some or all of the steps of FIG. 32C can optionally be performed by one or more data sources 2501 and/or can be performed via communication with one or more data sources 2501. Some or all of the steps of FIG. 32C can be performed to implement some or all of the functionality of the record processing and storage system 2505 of FIG. 25A and/or FIG. 25B. Some or all of the steps of FIG. 32C can be performed to implement some or all of the functionality of the durability data generator module 3520 of FIGS. 32A-32B. Some or all steps of FIG. 32C can be performed by database system 10 in accordance with other embodiments of the database system 10 and/or nodes 37 discussed herein.

Step 3282 includes generating a plurality of pages from a plurality of row data via a plurality of processing core resources. Each processing core resource in the plurality of processing core resources can process a corresponding subset of the plurality of pages, independently from and in parallel with processing of other subsets of the plurality of pages via other ones of the plurality of processing core resources. Performing step 3282 can include performing of steps 3188 and/or 3190 by each of the plurality of processing core resources over time in a plurality of time slices. Performing step 3282 can include storing the plurality of pages in a page storage system 2506.

Step 3284 includes determining a set of least favorably ordered row numbers corresponding to the set of processing core resources based on ones of the plurality of row data processed by each of the plurality of processing core resources. For example, if row numbers are strictly increasing over time, the least favorably ordered row number for each processing core resource can correspond to the greatest row number processed by each processing core resources. In some cases, the least favorably ordered row number for each processing core resource can correspond to the least favorably ordered processed row number processed by each processing core resource. In some cases, the least favorably ordered row number for each processing core resource can be based on and/or implemented as a least favorably ordered batch number of FIGS. 31A-31F. In some cases, the least favorably ordered row number for each processing core resource can be based on and/or implemented as a row number included in the labeled row data generated by and received from data sources. The least favorably ordered row number for each processing core resource can be updated over time as new row data is processed for each processing core resource. In some cases, the least favorably ordered row number for each processing core resource corresponds only to row data that have been stored in a page storage system 2506 and/or corresponds to row data that is determined to have been durably stored due to the processing of the row data by a corresponding processing core resource.

Step 3286 includes generate row durability data based on identifying a most favorably ordered row number in the set of least favorably ordered row numbers. For example, if row numbers are strictly increasing over time, the most favorably ordered row number for each processing core resource can correspond to the lowest row number processed by each processing core resources. The row durability data can include this most favorably ordered row number to indicate that all row data with row numbers that are more favorably ordered than or equal to this row number have been processed into pages and/or are durably stored by the page storage system 2506. In some cases, one or more row data with row numbers that are less favorably ordered than the most favorably ordered row number in the row durability data, such as one or more least one row data with greater row numbers than the row number indicated in the row durability data, have also been processed into pages and/or is durably stored by the page storage system 2506.

In some cases, the method further includes determining to generate row durability data, where step 3286 is performed based on determining to generate row durability data. Determining to generate the row durability data can be based on durability value generation requirement data, for example, that is received, generated via user input, and/or stored in memory. Determining to generate the row durability data can alternatively or additionally be based on: a predetermined schedule, predetermined intervals, receiving a request from an end user and/or a data source; in response to one or more of the most-recently processed row numbers being updated since the last row durability data was generated; in response to a predetermined number of the most-recently processed row numbers being updated since the last row durability data was generated; in response to all of the most-recently processed row numbers being updated since the last row durability data was generated; in response to a predetermined number of row data being processed by a particular processing core resource and/or across all processing core resources since the since the last row durability data was generated, and/or based on other determined information.

FIGS. 33A-33D illustrate another embodiment of a record processing and storage system 2505 that includes a page generator 2511 that implements a durability data generator module 3520, and presents a second approach to generating row durability data 3530 that is different from the approach presented in FIGS. 32B-32C. The record processing and storage system 2505 of FIGS. 33A-33D can be operable to maintain and/or communicate a durability horizon as row durability data 3530 in a same or similar fashion as illustrated and discussed in conjunction with FIG. 32A. This row durability data 3530 can be computed during parallelized processing of row data 2910 by page generator 2511, such as the processing of row data 2910 over time via the plurality of processing core resources 48-1-48-W as illustrated in FIG. 25C. Some or all features and/or functionality of embodiments of page generator 2511 of FIGS. 33A-33D can be utilized to implement the page generator 2511 of FIG. 25A, of FIG. 25B, of FIG. 32A, and/or any other embodiment of page generator 2511 described herein. Some or all features and/or functionality of embodiments of record processing and storage system 2505 of FIGS. 33A-33D can be utilized to implement the record processing and storage system 2505 of FIG. 25A, of FIG. 25B, of FIG. 32A, and/or any other embodiment of record processing and storage system 2505 described herein.

As discussed in conjunction with FIGS. 32A-32C, a guaranteed durability horizon can be determined for each data source as their batches are processed in parallel by different processing core resources 48-1-48-W over time, and a guaranteed durability horizon can be generated as row durability data 3530 for some or all data source 2501-1-2501-L over time as pages are generated.

Ideally, parallel threads work independently without the coordination that may be required to update the durability horizon as pages generated by different parallel threads are durably stored. A very cheap approach can include to track intervals of individual pages, but doing so requires that there not be "holes" in the intervals so that we can simply compute minimum row numbers and maximum row numbers. However, allowing each parallelized processing core resource 48 to operate independently can yield row durability data to be computed incorrectly.

As used herein, a "hole" in an interval of rows of a given page 2515 corresponds to at least one row number that falls between the minimum row number 3117 and maximum row number 3118 of the page's row number span data 3119 for a given data source 2501 that has corresponding row data 2910 that was received from the given data source 250, but is not included in the given page 2515. Thus, a page 2515 with no holes corresponds to a page that includes, for each of the page's row number span data 3119-1-3119-L, every row data 2910 with corresponding row numbers 3012 that were received by the corresponding one of the set of data sources 2501-1-2501-L.

Similarly, a "hole" in an interval of rows across a page set of one or more pages 2515 corresponds to at least one row number that falls within a page set interval of the page set of one or more pages that that has corresponding row data 2910 that was received from the given data source 2501, but is not included in any pages 2515 of the set of multiple pages. The page set interval is defined by the smallest of minimum row numbers 3117 across all of the row number span data 3119 of the multiple pages, and by the largest of maximum row numbers 3118 across all of the row number span data 3119 of the one or more pages of the page's row number span data 3119 for a given data source 2501. Thus, a page set of one or more pages with no holes corresponds to a page set that includes, for each of a set of page set intervals corresponding to the set of data sources 2501-1-2501-L, every row data 2910 with corresponding row numbers 3012 that were received by the corresponding one of the set of sources 2501-1-2501-L in exactly one of the pages in the page set.

These holes can present problems in generating durability data correctly: simply utilizing the maximum row number 3118 for a given page as row durability data 3530 does not constitute accurate row durability data 3530 if the page has a hole, because the corresponding row data 2910 is thus not guaranteed to be durably stored even if the page is durably stored. However, if work is distributed across the processing core resources 48-1-48-W, for example, as illustrated in FIGS. 31A-31F, a page 2515 generated by a given processing core resources 48 may have a hole.

For example, a given batch of rows with a row number that falls in between the row numbers of a pair of row data being processed by a first processing core resource 48 for inclusion in a first page is processed by a second processing core resource 48 for inclusion in a second page, for example, based on the first of the pair of row data still being processed by first processing core resource when the second processing core resource is available to process a new batch of rows. The first page would thus have a hole based on this batch of rows being included instead in the second page. If row durability data was generated to indicate the maximum row number 3118 of the first page based on the first page being durably stored, but the second page was not yet durably stored, this row durability data would be incorrect, as the row numbers for the given batch of rows are more favorably ordered than the maximum row number 3118 of the row durability data, but are not yet durably stored.

To ensure the durability horizon of row durability data 3530 is correctly computed with minimal coordination between processing core resources 48-1-48-W, the durability horizon can be generated for an entire "page set" of one or more pages generated by multiple parallel threads that is durably stored in a single atomic transaction. In particular, by ensuring that the page set as a whole includes no holes, and by only computing new row durability data when the page set as a whole is stored durably in a same transaction, the row durability data is guaranteed to be correct, even if individual pages in the page set include their own holes.

Figure 33A:
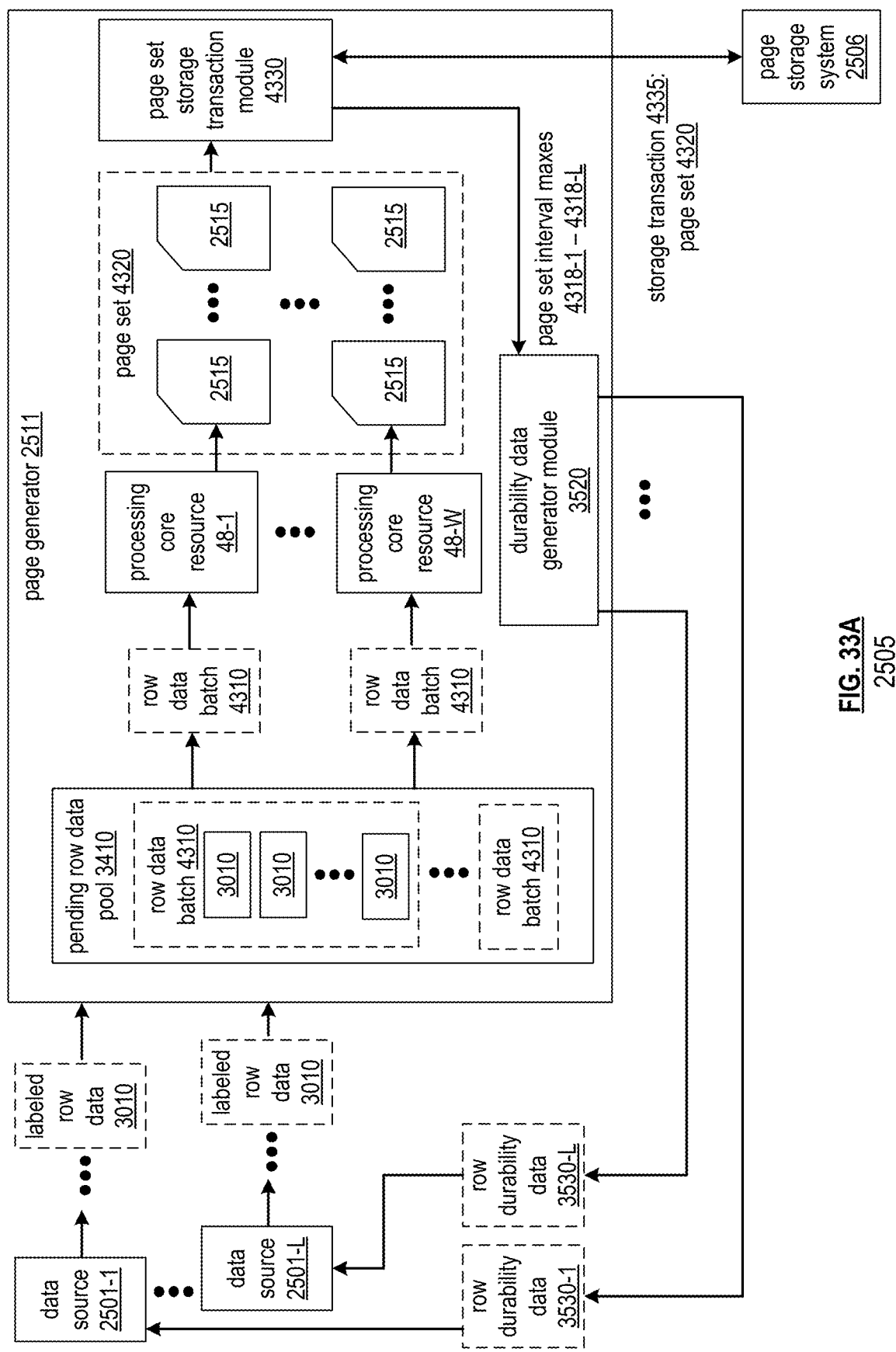
FIG. 33A is a schematic block diagram of an embodiment of a page generator that implements a page set storage transaction module to perform storage transactions for sets of pages in accordance with various embodiments of the present invention.

This mechanism of computing row durability data 3530 improves database systems by ensuring that row durability data 3530 can be computed correctly and/or dependably, while also enabling pages to be generated more efficiently in parallel and/or otherwise allowing individual pages to be generated with "holes" in their intervals. The dependability of the row durability data 3530 ensures that data sources 2501 are informed with correct information, allowing data sources 2501 to be confident that all rows with more favorable row numbers than that indicated in row durability data 3530 are guaranteed to be durably stored, and further ensures that query results are guaranteed to be correct by reflecting all rows guaranteed to be stored durably by row durability data 3530. Furthermore, in embodiments where the row durability data is further utilized for row deduplication, for example, as discussed in conjunction with FIGS. 34A-34B, the dependability of the row durability data also improves database system by ensuring rows are deduplicated correctly, which ensure exactly once presence of rows in the database system to guarantee query correctness Such an embodiment of computing row durability data 3530 for entire pages sets of one or more pages that are durably stored in atomic transactions is illustrated in FIG. 33A. A set of parallel threads, such as processing core resources 48-1-48-W, can generate pages in parallel from batches of rows received from one or more sources. Rather than always assigning particular sources to particular processing core resources 48, batches of rows can be delegated to available threads via a coordinator as they are received, via the mechanism described in conjunction with FIGS. 31A-31F, and/or via any other means to balance work across set of processing core resources 48-1-48-W.

A page set 4320 that includes one or more pages generated by some or all processing core resources 48-1-48-W can be durably stored via a single, atomic storage transaction 4335, where durably storing the page set 4320 optionally includes replicating each page in the set of pages, deduplicating rows in each page of the set of pages, and/or sending each page in the set of pages to a storage system for storage, such as one or more long term storage 2540 of a storage cluster 2535 and/or other storage resources of page storage system 2506. Note that durably storing the pages via storage transaction 4335 can optionally include storing different pages 2515 of the page set 4320 in different locations, for example, where a first page 2515 of the page set 4320 is stored via a first long term storage 2540 of the storage cluster 2535, and where a second page 2515 of the page set 4320 is stored via a second long term storage 2540 of the storage cluster 2535.

As depicted in FIG. 33A, this storage transaction 4335 can be achieved via a page set storage transaction module 4330, which can be implemented via one or more computing devices 18, system communication resources 14, and/or via or other processing resources and/or communication resources accessible by the page generator 2511. The page set storage transaction module 4330 can communicates with the page storage system to complete the storage transaction 4335, for example, where the storage transaction is deemed complete when confirmation data is received from the page storage system 2506 indicating pages 2515 in the page set 4320 were successfully stored and/or when all pages 2515 in the page set 4320 are otherwise determined to be durably stored by the page storage system 2506

Based on the page set 4320 being durably stored, the row durability data 3530 for one or more data sources 2501-1-2501-L with rows included in the page set 4320 can be determined by evaluating the page set 4320 as a whole. In particular, The row durability data 3530 for each data source 2501 can be determined as a page set interval maximum 4318 of the page set 4320, which can be determined based on the row number intervals for the corresponding data source 2501 across all pages in the page set and the knowledge that no "holes" exist across batches in the page set as a whole. Each page set interval maximum 4318 for can be sent back to the corresponding data source 2501 as row durability data 3530.

Some embodiments of the record processing and storage system 2505 can include multiple page set storage transaction modules 4330 and/or multiple durability data generator modules 3520, for example, where each stream loader module 2510 includes its own page set storage transaction module 4330 and/or its own durability data generator module 3520 to durably store pages generated by its page generator 2511 and/or to generate and transmit row durability data based on durably storing pages generated by its page generator 2511.

Figure 33B:
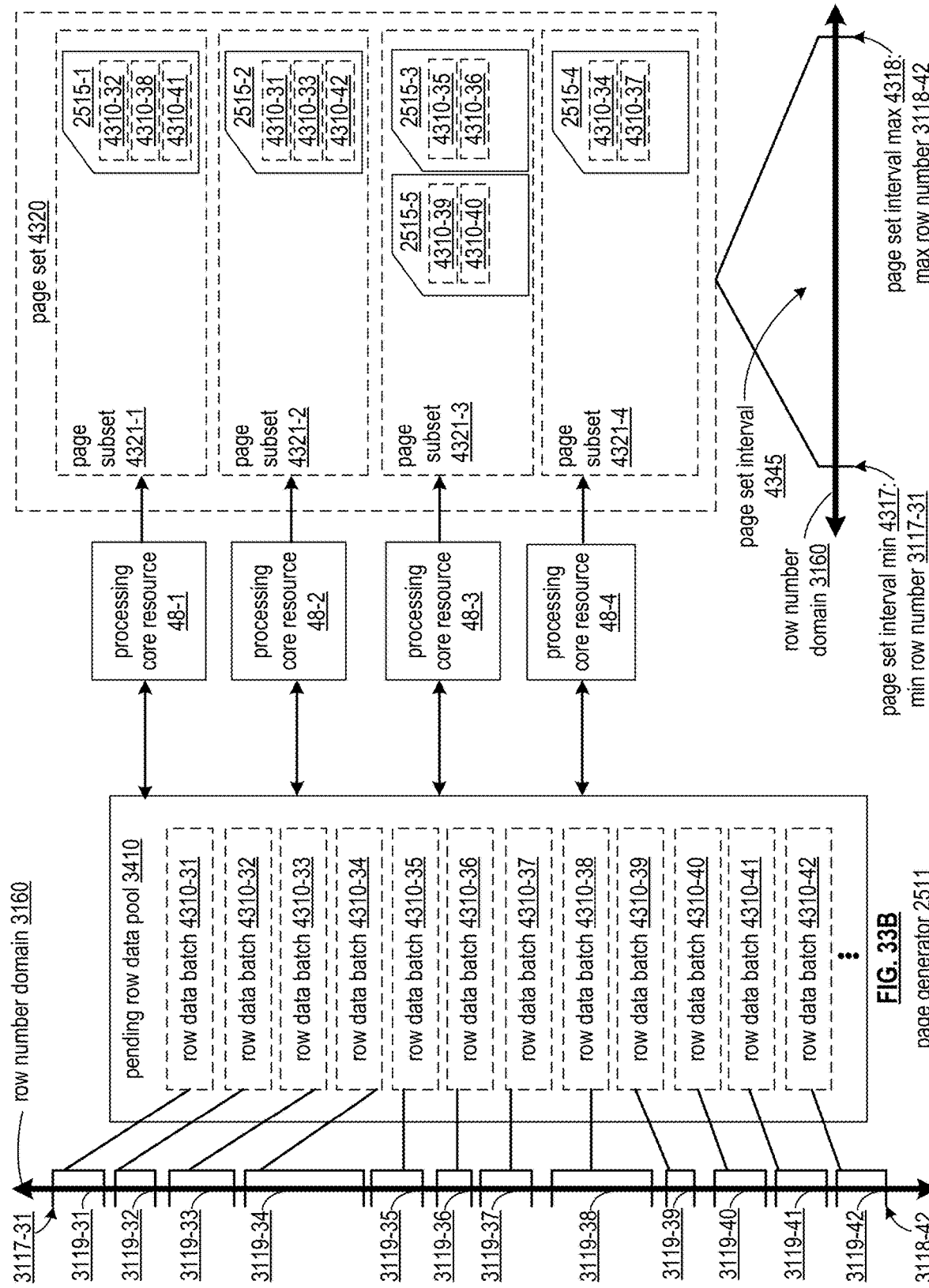
FIG. 33B illustrates an example embodiment of a page set interval of a page set generated by a page generator.

FIG. 33B illustrates an example of a page set 4320 that was generated from a plurality of row data batches 4310-31-4310-42 via a set of processing core resources 48-1-48-4. Note that this illustration serves as an example, and other embodiments can utilize any number of processing core resources, such as a number of processing core resources that is a power of two.

For the purposes of example, the row data batches 4310-31-4310-42 includes rows from a same data source 2501, and are numbered to indicate an ordering of the row data batches. For example, row data batches have corresponding batch numbers 31-42, or any other strictly increasing batch numbers. Each row data batch 4310 can include a set of one or more consecutive row data 2910, which are deemed "consecutive" based on including row data with no holes, such as a set of row data received in order from a data source and/or a set of consecutive row data in a list of row data ordered by row number. In particular, row data batch 4310-31 includes a first set of one or more consecutive row data 2910 from the data source 2501, where row data batch 4310-32 includes a second set of one or more consecutive row data 2910 from the data source 2501 that is consecutively after the first set of one or more consecutive row data 2910, and so one, where row data batch 4310-42 includes a final set of one or more consecutive row data 2910 from the data source 2501 that is consecutively after a penultimate set of one or more consecutive row data 2910 of row data batch 4310-41. The pending row data pool 3410 of other embodiments can include row data batches from multiple different data sources, with their respective ordering optionally interwoven with the ordering of row data batches 4310-31-4310-42.

The row data batches 4310 of FIG. 33B can implement labeled row data 3010 of FIG. 27C and/or FIG. 27D. In some cases, the row data batches 4310 are generated by the record processing and storage system 2505 from sets of row data 2910 received from data sources 2501 as a set of labeled row data 3010 of FIG. 27A for inclusion in the pending row data pool 3410.

The set of row numbers of each row data batch 4310 can dictate row number span data 3119 for each row data batch 4310 of the corresponding data source's row number domain 3160. These row number span data 3119 can be guaranteed to have no holes based on including a set of consecutive row data 2910 from the data source 2501. Furthermore, the plurality of row number span data 3119-31-3119-42 of the set of row data batches 4310-31-4310-42 can be guaranteed to have no holes based on each row data batch 4310 including rows that are consecutively after rows of the prior row data batch 4310 when ordered by batch number. Thus, the set of row data batches can collectively span from the minimum row number 3117-31 of row number span data 3119-31 to the maximum row number 3118-42 of row number span data 3119-42. Note that the small gaps depicted between neighboring ones of the row number span data 3119 in FIG. 33B are guaranteed not to include any row numbers with row data.

The set of processing core resources 48-1-48-4 can be implemented as the set of processing core resources 48-1-48-W, and can each retrieve batches of rows for inclusion in their respective pages in a same or similar fashion as discussed in conjunction with FIGS. 31A-31F, where the plurality of row data batches 4310 are implemented as the plurality of labeled row data 3010 of FIGS. 31A-31F. Each processing core resources 48 can otherwise generate its own page subset 4321, where the set of page subsets 4321-1-4321-W included in a given page set 4320 can each include zero or more pages generated by the corresponding processing core resource 48 from a subset of row data batches of the pending row data pool 3410 that were processed by the corresponding processing core resource 48. As illustrated in this example, a given processing core resources 48 may "skip" some row data batches 4310 in the ordering based on other given processing core resources retrieving and generating pages from these row data batches 4310, which can thus induce holes in some or all pages for one or more data sources 2501.

Note that while the pages 2515 are depicted to include a small number of row number batches, much larger number of row data batches 4310, which can include many rows, can be included in some or all pages 2515. Furthermore, while the page subsets 4321-1-4321-4 are depicted to include a small number of pages, much larger number of pages 2515 can be included in some or all page subsets 4321 of a given page set 4320. Different page sets 4320 generated and stored over time can include the same different numbers of row data batches and/or the same or different number of pages in some or all page subsets 4321 and/or within the page sets 4320 as a whole.

Some individual pages 2515 of the page set 4320 may include holes. For example, page 2515-4 includes a hole, corresponding to the row numbers of row data batches 4310-35 and 4310-36. However, the page set 4320 as a whole does not include any holes based on all of its included row data batches 4310 including consecutive sets of rows from the data source 2501. In embodiments where row data batches 4310 of some or all data sources 2501-1-2501-L are included in pages generated by the set of processing core resources 48-1-48-W, some individual pages 2515 of a given page set 4320 may include holes for its row number span data 3119 of one or more data sources, but the given page set 4320 as a whole is guaranteed to not include any holes based on, for each given data source 2501, the union of its included row data batches 4310 for the given data source including only consecutive row data.

Note that the plurality of row data batches 4310-31-4310-42 can correspond to all of the row data batches that were included in the pending row data pool 3410 at a given time, and/or can correspond to a proper subset of all of the row data row data batches included in the pending row data pool 3410 with the most favorable row numbers and/or batch numbers that are thus retrieved for processing into pages first. Note that prior to all of the plurality of pages in page set 4320 being generated, additional row data batches 4310 may have been added to the pending row data pool 3410, for example, where the pending row data pool 3410 is continually populated as row data is continued to be received in a stream from one or more sources.

As pages pending storage are accumulated for possible inclusion in a next page set 4320 that will be stored, the page set storage transaction module 4330 and/or other processing resources of the record processing and storage system 2505 can determine when to durably store this next page set 4320. This can include determining that a sufficient number of pages are included in the page set based on a size threshold and/or page number threshold and/or determining that a threshold amount of time has passed since durable storage of the last page set.

Determining to store a given page set 4320 can further include selecting which pages that have been generated by processing core resources 48-1-48-W that are pending durable storage should be included in this next page set 4320. This can include selecting ones of these pending pages for inclusion in the page set 4320 in a manner that guarantees that the resulting page set 4320 does not include any holes, and/or to further guarantee that there are no holes from a most previously generated page set. This selection of pages for inclusion in a given page set 4320 can include and/or be based on: including all pages generated by all processing core resources since a most recently generated page set 4320 was generated in the present page set 4320; evaluating batch numbers for batches that have completed processing and/or that are included in a page to ensure that there are no holes, for example, due to a processing core resource slowly processing an older batch and/or to otherwise ensure that all of the batches for each source in the page set are consecutive; comparing a row number of a row data batch 4310 included in a page of the page set 4320 to the row durability data 3530 generated for a most previously generated page set 4320; selecting only a proper subset of pages generated by the processing core resources since a most recently generated page set 4320 for inclusion in the present page by not including at least one page generated by one processing core resource based on this at least one page including a first row data batch 4310 of a given data source 2501 with a batch number and/or row number that is less favorably ordered than the batch number and/or row number of a second row data batch 4310 of the given data source 2501 that is still being processed by another processing core resource, despite having been retrieved for its processing prior to the first row batch; and/or utilizing another mechanism to ensure that the pages included in page set 4320 induce no holes upon page set 4320. Pages not selected for inclusion in a given page set can be included in a next page set automatically and/or can be similarly evaluated for their inclusion in the next page set.

In this example, this hole-free span of the row numbers in the page set is illustrated as page set interval 4345 of the page set 4320, denoting the span of row numbers whose row data is included in exactly one page of the page set 4320. Based on the pages 2515-1-2515-5 included in the page set 4320 collectively include all row data batches 4310-31-4310-42, and thus include only consecutive row data, the page set interval 4345 is guaranteed to have no holes for the corresponding data source. Because the most favorably ordered row data batch 4310-31 has minimum row number 3117-31, this minimum row number 3117-31 corresponds to a page set interval minimum 4317, denoting the minimum row number of the page set 4320 as a whole for the corresponding data source 2501. Similarly, because the least favorably ordered row data batch 4310-42 has maximum row number 3117-42, this maximum row number 3117-42 corresponds to a page set interval maximum 4318, denoting the maximum row number of the page set 4320 as a whole for the corresponding data source 2501.

This page set interval maximum 4318 can be selected as and/or included in the row durability data 3530 of this page set. For page sets that include row data of multiple data sources 2501-1-2501-L, a set of L corresponding page set interval maximums can be determined for a set of L corresponding page set intervals 4345, and a set of L row durability data 3530 can thus be determined for the page set 4320, where each row durability data 3530 of the given page set 4320 denotes the page set interval maximum 4318 for a corresponding one of the set of data sources 2501-1-2501-L, and is transmitted to this corresponding one of the set of data sources 2501-1-2501-L once the page set is durably stored via the single storage transaction 4335.

Figure 33C:
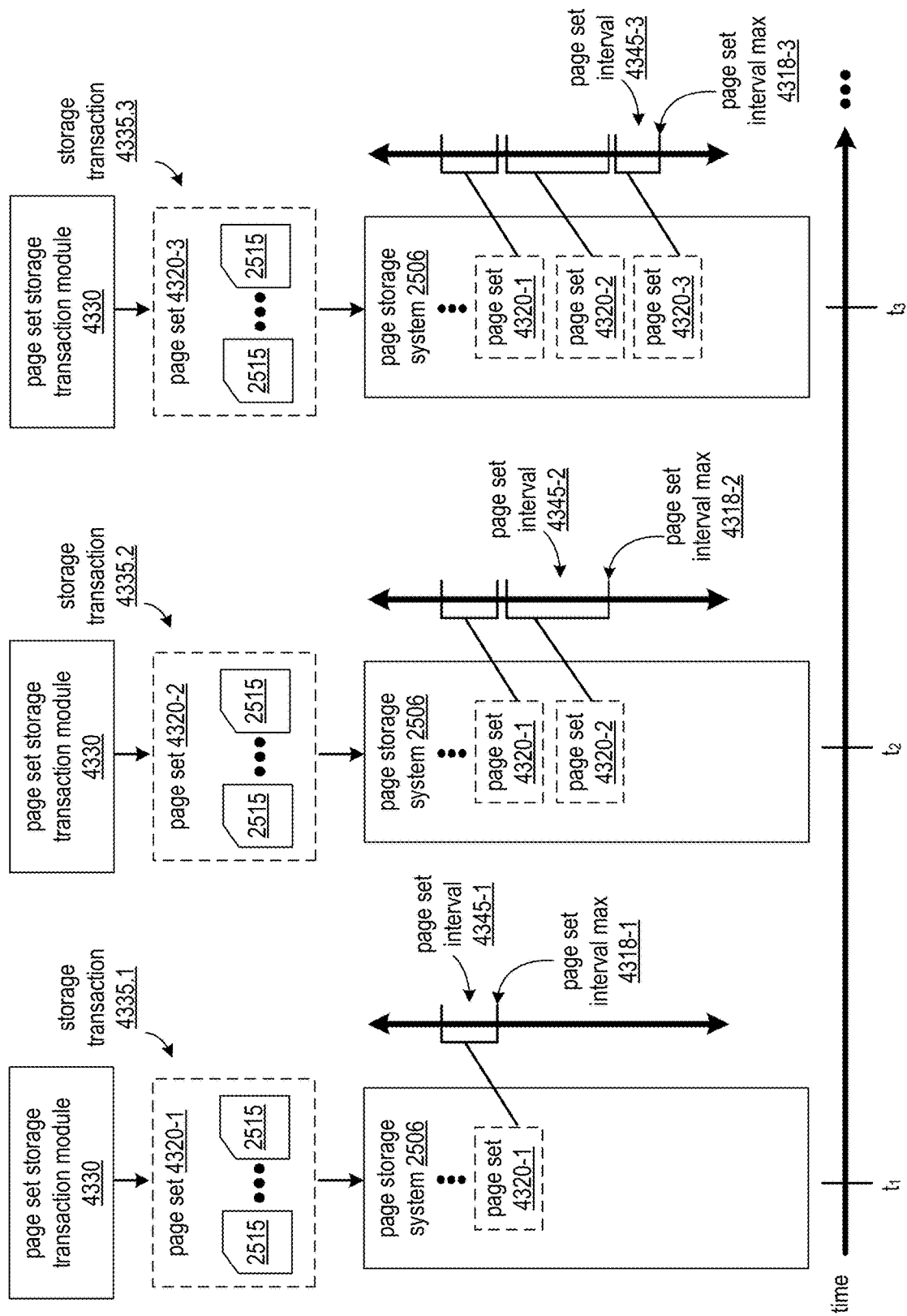
FIG. 33C illustrates operation of a page set storage transaction module over time in accordance with various embodiments of the present invention.
Figure 33D:
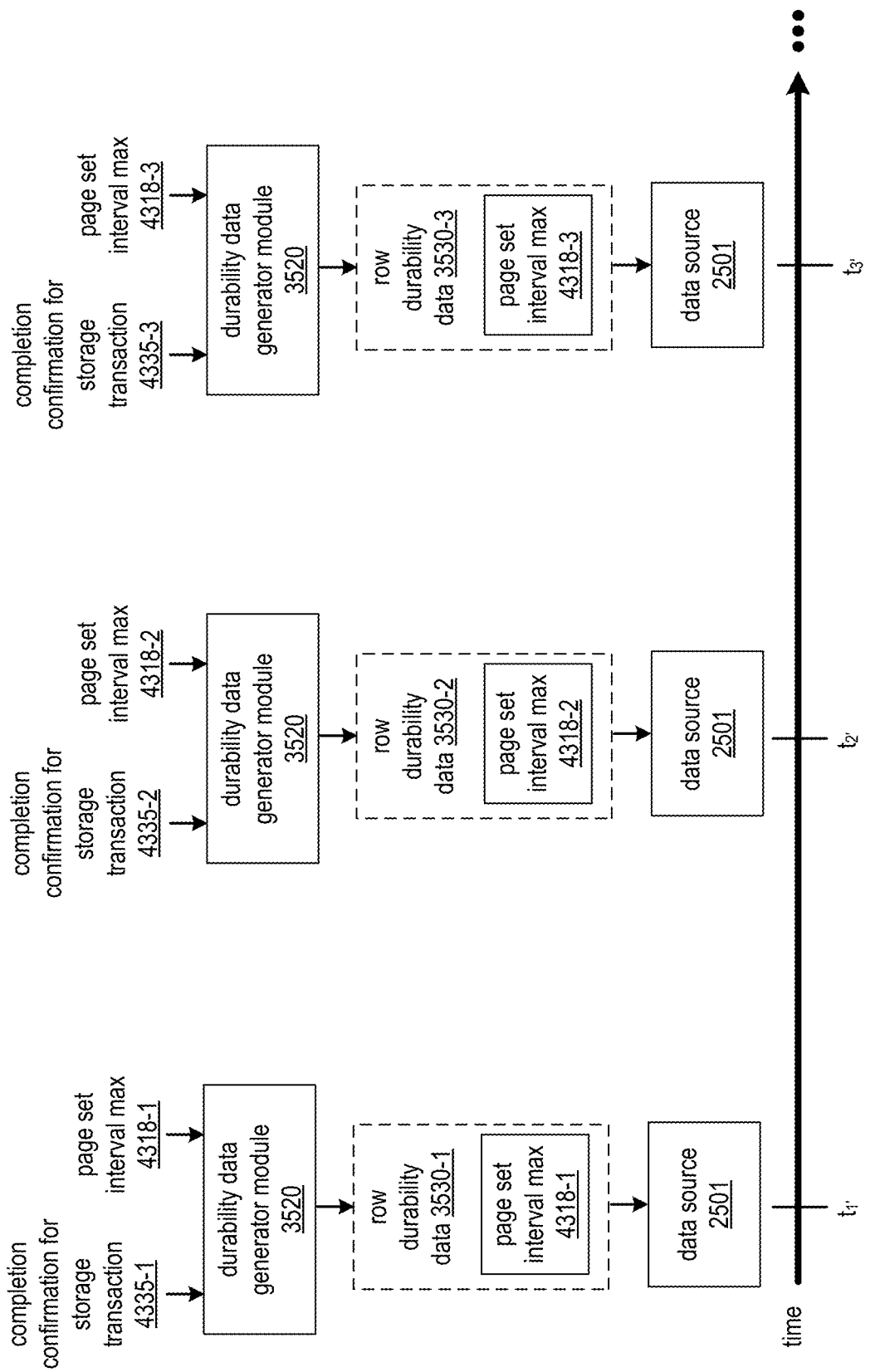
FIG. 33D illustrates operation of a durability data generator module over time in accordance with various embodiments of the present invention.

FIG. 33C depicts a timeline illustrating storage transactions via the page set storage transaction module 4330 for a set of consecutively generated page sets 4320-1, 4320-2, and 4320-3 generated over time by the plurality of processing core resources 48-1-48-W. FIG. 33D depicts a timeline over the same timespan illustrating generation and transmission of row durability data for the consecutively generated page sets 4320-1, 4320-2, and 4320-3.

Time $t_1$ of FIG. 33C corresponds to a time when the first page set 4320-1 was durably stored. This first page set 4320-1 is generated that includes a first plurality of pages with a first page set interval 4345-1 of a given data source 2501 that has a first page set interval max 4318-1 of the given data source 2501, and is guaranteed to include no holes. While not depicted, the first page set 4320-1 can also have other page set intervals 4345 for other data sources 2501, which can each also be guaranteed to have no holes. This first page set 4320-1 is durably stored at time $t_1$ in the page storage system 2506 via a first storage transaction 4335-1 by the page set storage transaction module 4330.

Time $t_{1'}$ of FIG. 33D is shortly after time $t_1$ of FIG. 33C and corresponds to a time when first row durability data 3530-1 is generated and transmitted in response to the first page set 4320-1 being durably stored at time $t_1$. For example, a completion confirmation for storage transaction 4335-1 is received from the page set storage transaction module 4330 once the page set storage transaction module 4330 determines that durable storage of the page set 4320-1 is complete, and the row durability data 3530-1 is generated based on receiving this completion confirmation. This row durability data 3530-1 indicates that at time $t_{1'}$, the first page set interval max 4318-1 is the durability horizon for the given data source 2501, indicating that all row data for the given data source with row numbers prior to and/or otherwise more favorably ordered than the row number 3012 of first page set interval max 4318-1 are also durably stored. While not depicted, other row durability data 3530 for the other data sources 2501 can be generated and transmitted at time $t_{1'}$ based on durable storage of the first page set 4320-1 to indicate the page set interval maximums of the other page set intervals 4345 of the first page set 4320-1 for the other data sources 2501.

Similarly, time $t_2$ of FIG. 33C corresponds to a time when the second page set 4320-2 was durably stored. The second page set 4320-2 is generated that includes a second plurality of pages with a second page set interval 4345-2 of the given data source 2501 that has a second page set interval max 4318-2 of the given data source 2501, and is guaranteed to include no holes. Furthermore, the union of the second page set interval 4345-2 and the first page set interval 4345-1 can be guaranteed to have no holes based on all row data received from the given data source 2501 that falls between the minimum row number of the first page set interval 4345-1 and the maximum row number of the second page set interval 4345-2 being included in either the first page set or the second page set. While not depicted, the second page set 4320-2 can also have other page set intervals 4345 for other data sources 2501, which can also can each also be guaranteed to have no holes themselves, and which can further be guaranteed to have holes in union with the page intervals of the corresponding sources from the first page set 4320-1.

This second page set 4320-2 is durably stored at time $t_2$ in the page storage system 2506 via a first storage transaction 4335-1 by the page set storage transaction module 4330.

Time $t_{2'}$ of FIG. 33D is shortly after time $t_2$ and corresponds to a time when second row durability data 3530-2 is generated and transmitted in response to the second page set 4320-2 being durably stored at time $t_2$. For example, a completion confirmation for storage transaction 4335-2 is received from the page set storage transaction module 4330 once the page set storage transaction module 4330 determines that durable storage of the page set 4320-2 is complete, and the row durability data 3530-2 is generated based on receiving this completion confirmation. This row durability data 3530-2 indicates that at time $t_{2'}$, the second page set interval max 4318-2 is the new durability horizon for the given data source 2501, indicating that all row data for the given data source with row numbers prior to and/or otherwise more favorably ordered than the row number 3012 of second page set interval max 4318-2 are also durably stored. While not depicted, other row durability data 3530 for the other data sources 2501 can be generated and transmitted at time $t_{2'}$ based on durable storage of the second page set 4320-2 to indicate the page set interval maximums of the other page set intervals 4345 of the second page set 4320-2 for the other data sources 2501.

Similarly, time $t_3$ of FIG. 33C corresponds to a time when the third page set 4320-3 was durably stored. The third page set 4320-3 is generated that includes a third plurality of pages with a third page set interval 4345-3 of the given data source 2501 that has a third page set interval max 4318-3 of the given data source 2501, and is guaranteed to include no holes. Furthermore, the union of the third page set interval 4345-3 with the second page set interval 4345-2 and the first page set interval 4345-1 can be guaranteed to have no holes based on all row data received from the given data source 2501 that falls between the minimum row number of the first page set interval 4345-1 and the maximum row number of the third page set interval 4345-3 being included in either the first page set, the second page set, or the second page set. While not depicted, the third page set 4320-3 can also have other page set intervals 4345 for other data sources 2501, which can also can each also be guaranteed to have no holes themselves, and which can further be guaranteed to have no holes in union with the page intervals of the corresponding sources from the first page set 4320-1 and the second page set 4320-2. This third page set 4320-3 is durably stored at time $t_3$ in the page storage system 2506 via a first storage transaction 4335-1 by the page set storage transaction module 4330.

Time $t_{3'}$ of FIG. 33D is shortly after time $t_3$ and corresponds to a time when second row durability data 3530-3 is generated and transmitted in response to the second page set 4320-3 being durably stored at time $t_3$. For example, a completion confirmation for storage transaction 4335-3 is received from the page set storage transaction module 4330 once the page set storage transaction module 4330 determines that durable storage of the page set 4320-3 is complete, and the row durability data 3530-3 is generated based on receiving this completion confirmation. This row durability data 3530-3 indicates that at time $t_{3'}$, the third page set interval max 4318-3 is the new durability horizon for the given data source 2501, indicating that all row data for the given data source with row numbers prior to and/or otherwise more favorably ordered than the row number 3012 of third page set interval max 4318-3 are also durably stored. While not depicted, other row durability data 3530 for the other data sources 2501 can be generated and transmitted at time $t_{3'}$ based on durable storage of the second page set 4320-3 to indicate the page set interval maximums of the other page set intervals 4345 of the third page set 4320-3 for the other data sources 2501.

Note that a given conversion page set 2655 of FIG. 26A may include several of these page sets 4320 durably stored over time. For example, a same conversion page set 2655 can include all of the page sets 4320-1, 4320-2, and 4320-3. In particular, the span of time employed between page conversion processes of FIGS. 26A-26B to accumulate a large number of pages for optional clustering can be lengthy as discussed previously, while the span of time between each transaction used to store these smaller page sets 4320 may be much shorter. A given conversion page set 2655 of FIG. 26A can optionally include multiple page sets 4320 that were durably stored in corresponding storage transactions by different stream loader modules 2510.

Figure 33E:
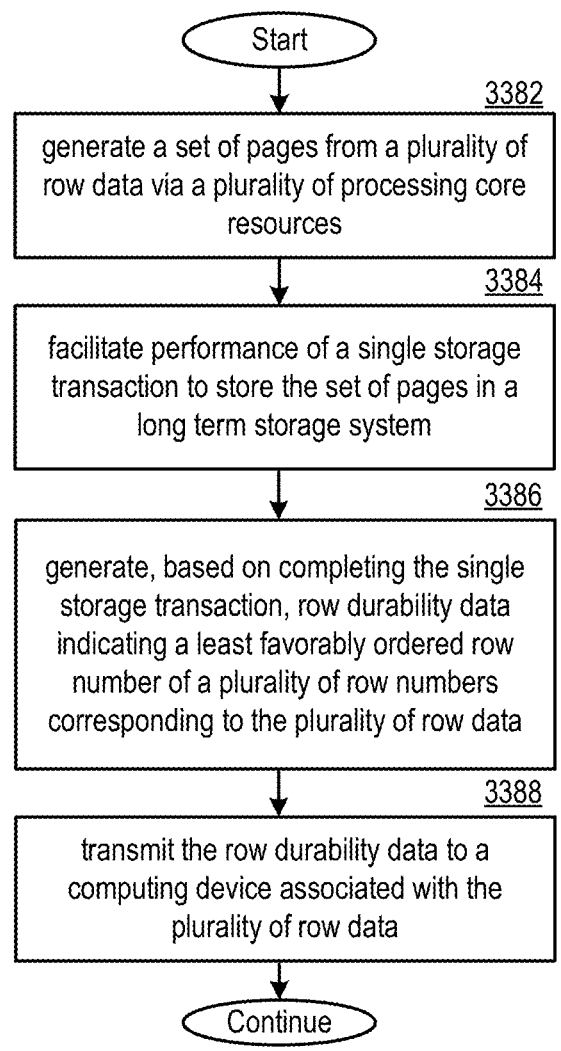
FIG. 33E is a logic diagram illustrating a method of generating row durability data in accordance with various embodiments of the present invention.

FIG. 33E presents a method for execution by the record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 33E. As another example, one or more nodes 37 can each utilize a plurality of processing core resources 48, where each of the plurality of processing core resources 48 of a given node 37 can independently perform some or all of the steps of 33E in parallel, without coordination with other ones of the plurality of processing core resources 48. Some or all of the method of FIG. 33E can be performed by the page generator 2511 and/or the page storage system 2506 of FIG. 25A. Some or all of the method of FIG. 33E can be performed by one or more stream loader modules 2510 of FIG. 25B, independently or in conjunction. Some or all of the method of FIG. 33E can be performed by the page generator of 2511 of FIGS. 31A-31F, of FIG. 32A, and/or of FIGS. 33A-33B, for example, by utilizing the plurality of processing core resources 48-1-48W, by utilizing the pending row data pool 3410, by utilizing the page set storage transaction module 4330, and/or by utilizing the durability data generator module 3520. Some or all of the steps of FIG. 34D can optionally be performed by any other processing module of the database system 10. Some or all of the steps of FIG. 34D can optionally be performed by any other processing module of the database system 10. Some or all of the steps of FIG. 33E can optionally be performed by one or more data sources 2501 and/or can be performed via communication with one or more data sources 2501. Some or all of the steps of FIG. 33E can be performed to implement some or all of the functionality of the record processing and storage system 2505 of FIG. 25A and/or FIG. 25B. Some or all of the steps of FIG. 34D can be performed to implement some or all of the functionality of the page generator 2511 of FIGS. 32A-32B, FIG. 33A, FIG. 33D, and/or FIG. 34C. Some or all of the steps of FIG. 33E can be performed in conjunction with some or all steps of FIG. 31F and/or FIG. 32C. Some or all steps of FIG. 33E can be performed by database system 10 in accordance with other embodiments of the database system 10 and/or nodes 37 discussed herein.

Step 3382 includes generating a set of pages from a plurality of row data via a plurality of processing core resources. In some embodiments, some or all processing core resources in the plurality of processing core resources can each generate a corresponding subset of the set of pages, independently from and in parallel with processing of other subsets of the set of pages via other ones of the plurality of processing core resources. This can include performing some or all of step 3186 of FIG. 31F.

The set of pages includes zero, one, or more pages generated by each of the processing core resources, such as all pages generated by the plurality of processing core resource since generation of another, prior set of pages. For example, the set of pages can be implemented as a page set 4320 of FIGS. 33A-33D.

The set of pages can be generated to include some or all records 2422 of the plurality of row data. For example, the plurality of row data can be implemented as a plurality of labeled row data 3010 received from one or more data sources 2501, where the plurality of row data has a corresponding plurality of row numbers generated by data sources 2501. The set of pages can be guaranteed to have no holes in its plurality of included row data, for example, based on employing the scheme discussed in conjunction with FIGS. 33A-33B. In particular, for a page set interval defined by a minimum row number and a maximum row number included in the set of pages, the set of pages can be guaranteed to include all of row data received by the page generator 2511 with row numbers that fall within this page set interval.

In various embodiments, the method further includes selecting the set of pages from a plurality of pages generated by the plurality of processing core resources, for example, based on the pages included in the set of pages having a contiguous plurality of corresponding row number intervals. In such cases, at least one page that was generated by the plurality of processing core resources, but was not yet durably stored, is not included in the page set based on inducing an interval hole in the set of pages if included and/or based on interfering with the guarantee to include all of row data received by the page generator 2511 with row numbers that fall within the page set interval of the set of pages.

In various embodiments, the method further includes determining this page set interval 4345 by identifying the minimum row number and a maximum row number as a page set interval minimum 4317 and page set interval maximum 4318, respectively. In some embodiments, this page set interval is determined based on a plurality of row number span data 3119 of the plurality of pages included in the set of pages, such as a plurality of row number minimums 3117 and row number maximums 3118 of the plurality of pages included in the set of pages. For example, the minimum row number of the page set interval corresponds to a smallest, or most favorably ordered, one of the plurality of row number minimums 3117 of the plurality of row number span data 3119 corresponding to the plurality of pages included in the set of pages, and/or the maximum row number of the page set interval corresponds to a greatest, or least favorably ordered, one of the plurality of row number maximums 3118 of the plurality of row number span data 3119 corresponding to the plurality of pages included in the set of pages.

Step 3384 includes facilitating performance of a single storage transaction to store the set of pages. This can include sending the set of pages to a long term storage system, such as one or more long term storage 2540 of one or more storage clusters 2535. Alternatively, the set of pages can be stored in other memory of the page storage system 2506. The single storage transaction can be implemented to atomically commit all of a plurality of pages included in the set of pages together.

Step 3384 can optionally include durably storing the set of pages. For example, prior to performing the single storage transaction, the set of pages are deduplicated and/or replicated for storage. For example, some or all functionality of row deduplication module 3050 can be implemented to perform deduplication of the set of pages prior to storage. In particular, each pages in the set of pages can be deduplicated from other pages in the set of pages, where at least one duplicate row is removed from one page in the set of pages based on being included in another page of the set of pages. Alternatively or in addition, the set of pages can be deduplicated from prior sets of pages that are already durably stored, where at least one duplicate row is removed from one or more pages in the set of pages based on being included in another page of a previously generated set of pages that was previously durably stored via a previous single transaction.

Step 3386 includes generating, based on completing the single storage transaction, row durability data indicating a least favorably ordered row number of a plurality of row numbers corresponding to the plurality of row data. For example, the row durability data indicates a maximum row number of all row numbers included in the set of pages, such as the page set interval maximum 4318 of the page set interval 4345 determined for the set of pages. Step 3388 includes transmitting the row durability data to a computing device associated with the plurality of row data. This can include performing step 3288 of FIG. 32C.

In various embodiments, after performing some or all of steps 3382-3388, the method can further include generating a second set of pages from another plurality of row data via the plurality of processing core resources. For example, some or all processing core resource in the plurality of processing core resources can again generate a corresponding subset of the second plurality of pages, independently from and in parallel with processing of other subsets of the second set of pages via other ones of the plurality of processing core resources. The other plurality of row data can have corresponding row numbers that are strictly greater than, and/or less favorably ordered than, all row numbers included in the set of pages generated in step 3382, for example, based on: being less favorably ordered in the queue 3420 than the plurality of row data; based on being transmitted by and/or received from a data source after the plurality of row data; and/or based on at least one records included in the second plurality of row data with row numbers that are not strictly greater than and/or less favorably ordered than, all row numbers included in the set of pages being deduplicated and removed from inclusion in the second set of pages. These at least one records can be identified and removed from inclusion in the second set of pages based on determining the row numbers of these at least one records overlap with the page set interval 4345, based on determining the row numbers of these at least one records are less than and/or more favorably ordered than the page set interval maximum 4318 of the page set interval 4345, and/or based on determining the row numbers of these at least one records compare unfavorably to the row durability data generated in step 3386.

In various embodiments, the method can further include facilitating performance of a second single storage transaction to store the second set of pages in the long term storage system. A second page set interval can be identified based on a second plurality of row number intervals of the second set of pages, where a most favorably ordered row number of the second page set interval is more favorable than the least favorably ordered row number of the page set interval. Updated row durability data can be generated in response to completing the single storage transaction based on a least favorably ordered row number of the second page set interval and/or a least favorably ordered row number included in the pages of the second page set. This updated row durability data can be transmitted to the computing device.

In various embodiments, the set of pages are further generated from a second plurality of row data via the plurality of processing core resources. The plurality of row data is associated with a first source, and the second plurality of row data is associated with a second source that is different from the first source. For example, at least one page in the set of pages includes both records from the first plurality of row data as well as records from the second plurality of row data. The method can further include generating, based on completing the single storage transaction, second row durability data indicating a least favorably ordered row number of a second plurality of row numbers corresponding to the second plurality of row data. The method can further include transmitting the second row durability data to a second computing device associated with the second plurality of row data and/or the second source.

In various embodiments, the row durability data is stored in local memory alternatively or in addition to being transmitted to the computing device. For example, the row durability data is stored to replace the most previously generated row durability data in the local memory, where the records storage and processing system 2505 maintains the current row durability data for one or more sources based on updating locally accessible row durability data as more rows with less and less favorably ordered row numbers are received and durably stored in pages over time.

In such cases, this row durability data can be accessed in local memory by the row deduplication module 3050 and/or an incoming row filtering module. In particular, in conjunction with generating a set of pages via step 3382, the records in the set of pages can be deduplicated from records included in previous sets of pages that were previously durably stored based on comparing row numbers of row data in the plurality of row data to the most recent row durability data generated via durability data generator module 3520 for a most previously generated set of pages that was most previously durably stored via a most previous single transaction.

Figure 34A:
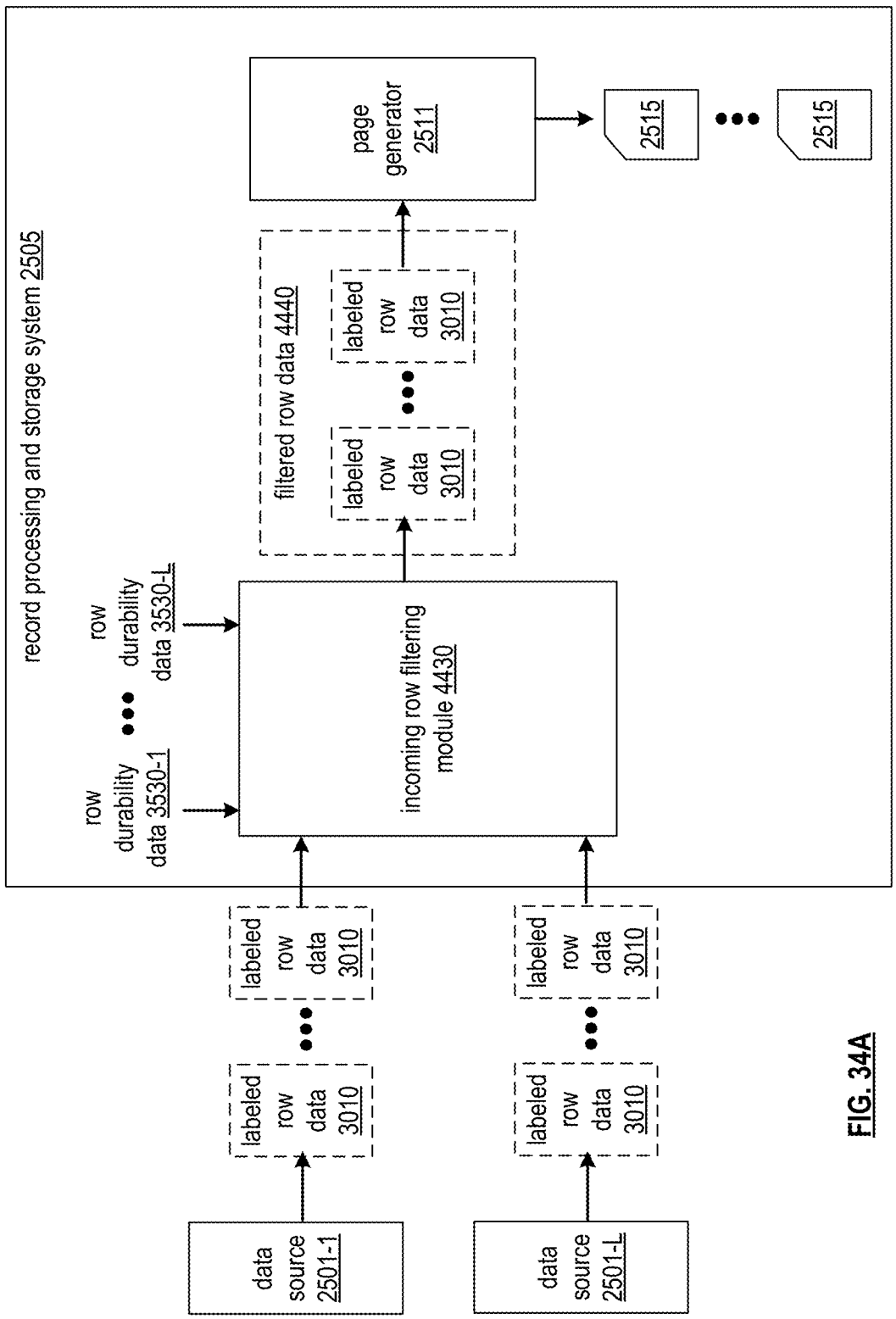
FIG. 34A is a schematic block diagram of an embodiment of a record processing and storage system that implements an incoming row filtering module in accordance with various embodiments of the present invention.
Figure 34B:
FIG. 34B is a schematic block diagram illustrating an example embodiment of a record processing and storage system that implements an incoming row filtering module.
Figure 34C:
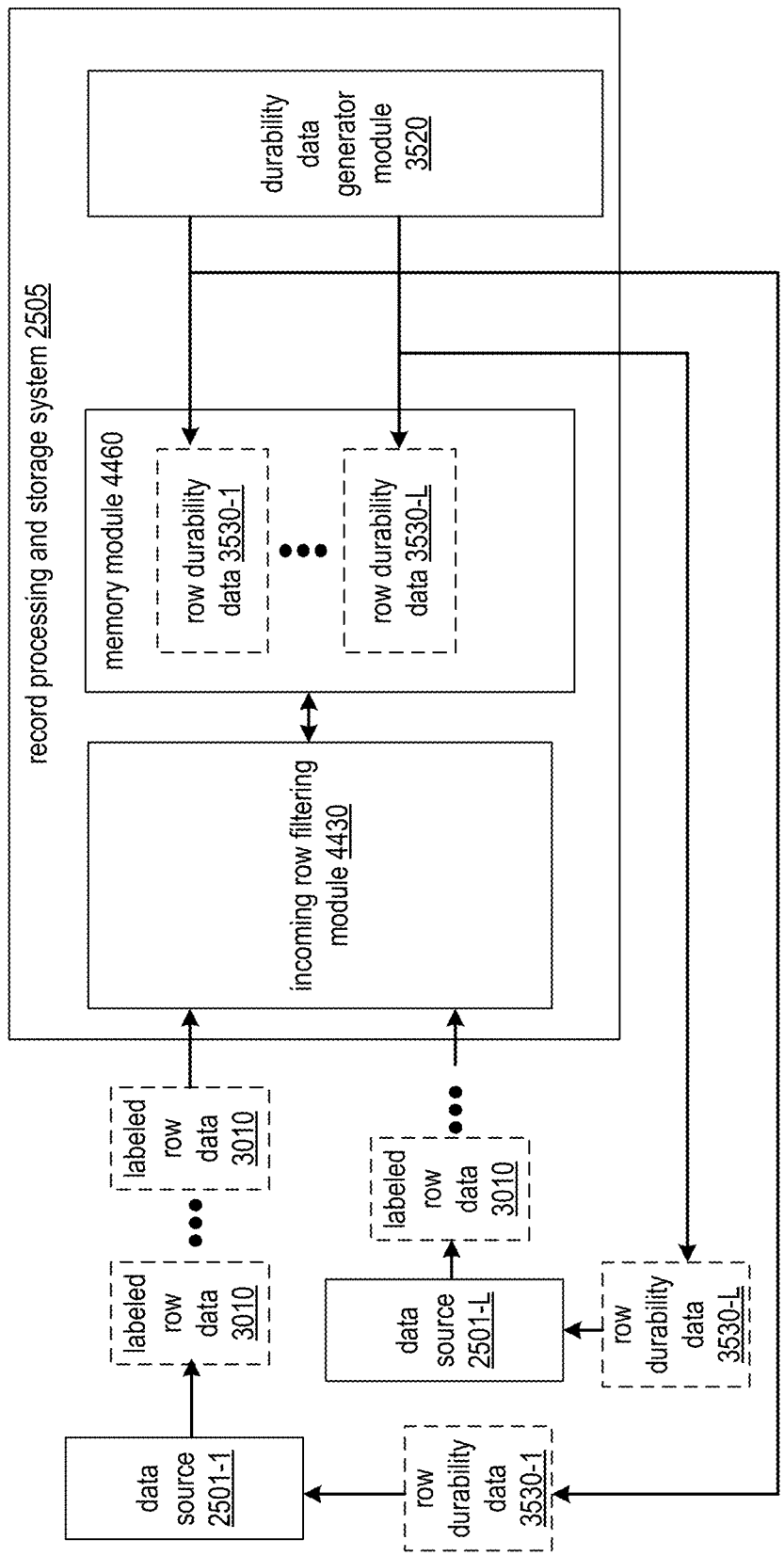
FIG. 34C is a schematic block diagram illustrating an example embodiment of a record processing and storage system that implements an incoming row filtering module in conjunction with a durability data generator module.

Such embodiments are illustrated in FIGS. 34A-34C, which present embodiments of a record processing and storage system 2505 that implements an incoming row filtering module 4430 to deduplicate incoming rows from one or more data sources 2501 based on the most-recently updated row durability data generated via durability data generator module 3520 for the corresponding one or more data sources 2501. The record processing and storage system 2505 of FIGS. 34A-34C can be operable to maintain a durability horizon as row durability data 3530, which can be generated as discussed in conjunction with FIGS. 32A-32C, as discussed in conjunction with FIGS. 33A-33D, and/or via a different algorithm and/or mechanism. This row durability data 3530 can be computed during parallelized processing of row data 2910 by page generator 2511, such as the processing of row data 2910 over time via the plurality of processing core resources 48-1-48-W as illustrated in FIG. 25C. Some or all features and/or functionality of embodiments of record processing and storage system 2505 of FIGS. 34A-34C can be utilized to implement the record processing and storage system 2505 of FIG. 25A, of FIG. 25B, of FIGS. 32A-32C, of FIGS. 33A-33D, and/or any other embodiment of record processing and storage system 2505 described herein.

Other database systems achieve deduplication via populating a dictionary with entries, that need to be cleared/removed to prevent it from growing in an unbounded manner. This can be unideal, as deduplication is only guaranteed up to the last update of the dictionary. Deduplication can instead be achieved indefinitely by leveraging the system requirement that data sources' row numbers must always increase as discussed in conjunction with FIGS. 27A-27H, where only the durability horizon for each source is maintained, for example, as an inexpensive 128 bit (data source identifier, row number) pair and/or via another small data type that indicates the durability row data 3530 for each corresponding data source 2510.

This improves the technology of database systems by enabling deduplication of incoming records that may have been previously stored at any prior time, rather than within a given time period to better guarantee query correctness by ensuring all records are represented exactly once due to not being inadvertently duplicated in durable storage. This also improves the technology of database systems by enabling this deduplication over indefinite periods of time by improving the required storage resources, as only the most current row durability data of each source need be stored. This further improves the technology of database systems by enabling some or all deduplication to be achieved via an inexpensive integer comparison of row numbers of incoming rows and/or rows that have not yet been durably stored with the single row number included in the row durability data 3530 of the corresponding source.

As illustrated in FIG. 34A, as row data is received as labeled row data 3010 and/or is pending processing in pending row data pool 3410, their respective row numbers 3012 can be compared to the maximum row number indicated in the most recent row durability data for the corresponding data source 2501 via an incoming row filtering module 4430 to filter out any incoming and/or pending rows with row numbers that are: less than or equal to; more favorably ordered than; and/or that otherwise compare unfavorably to the maximum row number indicated in the most recent row durability data for their corresponding data source 2501 from being included in pages 2515 and/or from being durably stored, as this would resulting in these incoming and/or pending rows being duplicated. This results in filtered row data 4440 that only includes only labeled row data 3010 with row numbers 3012 that are: strictly greater than; less favorably ordered than, and/or that otherwise compare favorably to the maximum row number indicated in the most recent row durability data for their corresponding data source 2501, where only the rows in filtered row data 4440 are included in pages 2515 and/or are stored, for example, as discussed in conjunction with FIGS. 33A-33D.

The incoming row filtering module 4430 can optionally be implemented via the row deduplication module 3050 of FIGS. 28A-28D, FIGS. 29A-29B, and/or FIGS. 30A-30C and/or can be implemented via one or more computing devices 18 and/or other processing resources of the record processing and storage system 2505. In some embodiments, the filtering performed by the incoming row filtering module 4430 to generate the filtered row data 4440 based on comparisons of row numbers with row durability data 3530 can correspond to a first stage of the deduplication process performed by the row deduplication module 3050. In such cases, deduplication of pages with other pages that have not yet been durably stored is then performed, for example, as discussed in conjunction with FIGS. 28A-28D, FIGS. 29A-29B, and/or FIGS. 30A-30C.

For example, the incoming row filtering module 4430 first filters some labeled row data 3010 to generate filtered row data 4440, and only this filtered row data 4440 is included in and/or retrieved from pending row data pool 3410 by processing core resources 48 for inclusion in pages 2515 as discussed in conjunction with FIG. 25C and/or FIGS. 31A-31C, where the resulting pages 2515 are then further deduplicated by row deduplication module 3050 to identify and remove at least one other row data 2910 from at least one of these pages 2515 as discussed in in conjunction with FIGS. 28A-28D, FIGS. 29A-29B, and/or FIGS. 30A-30C. As a particular example, the incoming row filtering module 4430 first filters for each given page set 4320 generated as discussed in conjunction with FIGS. 33A-33D, and only this filtered row data 4440 is included in and/or retrieved from pending row data pool 3410 by processing core resources 48 for inclusion in a given page set 4320. As all of the row numbers in the given page set must compare favorably to the previously generated row durability data in guaranteeing that the prior page set included no holes, the resulting pages 2515 in the given page set 4320 may have its own duplicates that were not filtered by incoming row filtering module 4430, and thus must be further deduplicated from other pages in the given page set 4320 by row deduplication module 3050 to ensure no rows in a given page set 4320 are duplicated in multiple pages of this page set 4320.

FIG. 34B illustrates a particular example filtered row data generated by an incoming row filtering module 4430 from steams of labeled row data 3010 received from two different data sources 2501-1 and 2501-2 with a source identifiers of 13 and 37, respectively. In this example, the most recently generated row durability data 3530-1 for data source 2501-1 indicates a row number 3012 with the value 288, and the most recently generated row durability data 3530-2 for data source 2501-2 indicates a row number 3012 with the value 1114. For example, row durability data 3530-1 and row durability data 3530-2 were generated for a most previously generated page set based on this page set 4320 having a page set interval maximum 4318 with a row number value of 288 for the first data source 2501-1 and based on this page set 4320 having a page set interval maximum 4318 with a row number value of 1114 for the second data source 2501-2.

For example, the labeled row data 3010 of data source 2501-1 with row numbers 274 and 275 were retransmitted by the data source 2501-1 and the labeled row data 3010 of data source 2501-2 with row numbers 1113 and 1114 were retransmitted by the data source 2501-2. For example, this labeled row data 3010 was retransmitted based on: the data sources determining to retransmit these rows as discussed in conjunction with FIG. 27A-27H; the data sources 2501-1 and 2501-2 not having yet received and/or processed the row durability data 3530 that was transmitted to these indicating that data sources as discussed in conjunction with FIGS. 32A-32C and/or 33A-33D indicating the row numbers 3012 with the values 288 and 1114, respectively, and/or the data sources otherwise not being aware that these row numbers were already received and/or durably stored.

The incoming row filtering module 4430 compares the row number 3012 of each incoming labeled row data 3010 with the row number 3012 included in the row durability data 3530 for the same data source. For example, the row durability data 3530 indicating a same source identifier as each given labeled row data 3010 is first identified, and the row number 3012 of this given labeled row data 3010 is compared with the row number 3012 of the row durability data 3530. As row numbers generated by the data sources over time in this example are strictly increasing as discussed previously, only the incoming labeled row data 3010 with row numbers that are strictly greater than the row numbers indicated in the row durability data 3530 for the corresponding data source 2501 are included in the filtered row data, as any labeled row data 3010 with row numbers that are less than or equal to the row number of the corresponding row durability data 3530 are guaranteed to be durably stored already. In this example, the labeled row data 3010 of data source 2501-1 with row numbers 274 and 275 that were retransmitted by the data source 2501-1 and the labeled row data 3010 of data source 2501-2 with row numbers 1113 and 1114 that were retransmitted by the data source 2501-2 are thus filtered out based on being less than or equal to the row numbers in the row durability data for the data source 2501-1 and the data source 2501-2, respectively.

FIG. 34C illustrates the maintaining of row durability data by record storage and processing system 2505. The record processing and storage system can facilitate storage of, retrieval of, and/or updating of row durability data 3530 generated by a durability data generator module 3520, such as the durability data generator module 3520 of FIGS. 32A-32C and/or the durability data generator module 3520 of FIGS. 33A-33D. Alternatively or in addition to sending each row durability data 3530 to the corresponding data source 2501 as new row durability data 3530 is generated over time, the durability data generator module 3520 can maintain row durability data 3530 in local storage as new row durability data 3530 is generated over time.

When new row durability data is generated by the durability data generator module 3520 for a given data source, the durability data generator module 3520 can write to a memory module 4460 that is accessible by the incoming row filtering module to store the row durability data 3530. This can include replacing the currently stored version of row durability data 3530 for the given data source with the new row durability data 3530 for the given data source that was just generated by the durability data generator module 3520, as the old row durability data 3530 for the given source is no longer necessary. Thus, at any given time, exactly one row durability data 3530 is stored for each data source 2501, corresponding to the most recently generated row durability data 3530 for each data source 2501. At this given time, the row number value of this most recently generated row durability data 3530 currently stored in the memory module 4460 is retrieved by incoming row filtering module 4430 and/or is utilized to incoming labeled row data as discussed in conjunction with FIGS. 34A and 34B. The incoming row filtering module 4430 thus performs its filtering of row data over time based on incrementally increasing the baseline row number that incoming row data must be greater than over time as row durability data 3530 is updated over time based on more and more pages being durably stored from row data received over time.

Some embodiments of the record processing and storage system 2505 can include multiple incoming row filtering modules 4430, for example, where each stream loader module 2510 includes its own incoming row filtering module 4430 to filter its own incoming rows before it generates pages via its page generator 2511. In such cases, the row durability data 3530 utilized by the incoming row filtering module 4430 of a given stream loader module 2510 can correspond to the most recent row durability data 3530 generated by the given stream loader module 2510, where each stream loader module 2510 only tracks its own row durability data 3530, accessing and updating the row durability data maintained in its own memory module 4460. Alternatively, the row durability data 3530 utilized by the incoming row filtering module 4430 of a given stream loader module 2510 can correspond to the most recent row durability data 3530 generated across all stream loader modules 2510-1-2510-N, where the stream loader modules 2510 track and/or access row durability data 3530 in in consensus state in the in storage layer, where the row durability data across all stream loader modules 2510-1-2510-N is updated via a consensus protocol mediated across this set of stream loader modules 2510-1-2510-N, and/or where the row durability data is maintained and updated in shared memory, such as a memory module 4460 accessible by all stream loader modules 2510-1-2510-N, enabling each given stream loader module 2510-1-2510-N to retrieve the most recent row durability data from this shared memory to perform the necessary comparisons via its incoming row filtering module 4440, and/or by enabling each given stream loader module 2510-1-2510-N to update the row durability data with its most recently generated row durability data for use by its own incoming row filtering module and/or by incoming row filtering modules of other stream loader modules.

In some embodiments, the incoming row filtering module 4430 is alternatively or additionally implemented by data sources 2501 to determine whether or not to retransmit their labeled row data 3010, for example, as discussed in conjunction with FIG. 34C. In particular as each data source 2501 receives row durability data 3530 over time from the record processing and storage system, it only retransmits rows that are pending confirmation that have row numbers 3010 that are strictly greater than, or that otherwise compare favorably to, the row number of the row durability data 3530, and filters out or otherwise does not retransmit rows that have row numbers 3010 that are less than or equal to the row number of the most recent row durability data 3530.

In various embodiments, a record processing and storage system includes at least one processor and memory. The memory stores operational instructions that, when executed by the at least one processor, cause the record processing and storage system to receive a plurality of row data associated with a first data source. A subset of row data from the plurality of row data that includes only ones of the plurality of row data that compare favorably to maintained row durability data is identified. At least one page is generated from ones of the plurality of row data included in the subset of row data. The at least one page is stored in long term storage, and updated row durability data is generated based on storing the at least one page in long term storage. The maintained row durability data is updated to indicate the updated row durability data.

Figure 34D:
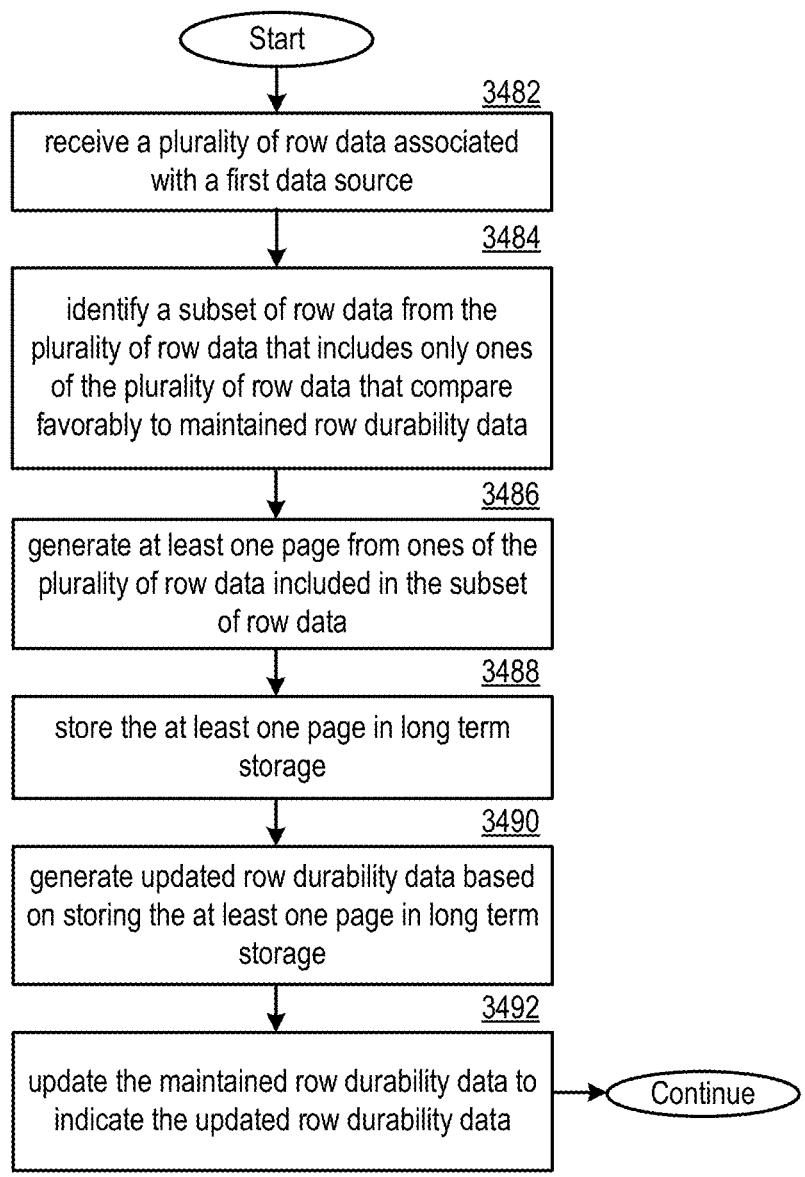
FIG. 34D is a logic diagram illustrating a method of filtering incoming row data in accordance with various embodiments of the present invention.

FIG. 34D illustrates a method for execution by a record processing and storage system 2505. For example, the database system 10 can utilize at least one processing module of one or more nodes 37 of one or more computing devices 18, where the one or more nodes execute operational instructions stored in memory accessible by the one or more nodes, and where the execution of the operational instructions causes the one or more nodes 37 to execute, independently or in conjunction, the steps of FIG. 34D. As another example, one or more nodes 37 can each utilize a plurality of processing core resources 48, where each of the plurality of processing core resources 48 of a given node 37 can independently perform some or all of the steps of 34D in parallel, without coordination with other ones of the plurality of processing core resources 48. Some or all of the method of FIG. 34D can be performed by the page generator 2511 and/or the page storage system 2506 of FIG. 25A. Some or all of the method of FIG. 34D can be performed by one or more stream loader modules 2510 of FIG. 25B, independently or in conjunction. Some or all of the method of FIG. 34D can be performed by the page generator of 2511 of FIGS. 31A-31F, of FIG. 32A, and/or of FIGS. 33A-33B, for example, by utilizing the plurality of processing core resources 48-1-48W, by utilizing the pending row data pool 3410, and/or by utilizing the durability data generator module 3520. Some or all of the method of FIG. 34D can be performed by the durability data generator module 3520 of FIG. 32B, FIG. 33A, FIG. 33D, and/or FIG. 34C. Some or all of the steps of FIG. 34D can optionally be performed by any other processing module of the database system 10. Some or all of the method of FIG. 34D can be performed by the incoming row filtering module 4430 of FIGS. 34A-34C. Some or all of the steps of FIG. 34D can optionally be performed by any other processing module of the database system 10. Some or all of the steps of FIG. 34D can optionally be performed by one or more data sources 2501 and/or can be performed via communication with one or more data sources 2501. Some or all of the steps of FIG. 34D can be performed to implement some or all of the functionality of the record processing and storage system 2505 of FIG. 25A and/or FIG. 25B. Some or all of the steps of FIG. 34D can be performed to implement some or all of the functionality of the durability data generator module 3520 of FIGS. 32A-32B, FIG. 33A, FIG. 33D, and/or FIG. 34C. Some or all of the steps of FIG. 33E can be performed in conjunction with some or all steps of FIG. 31F, FIG. 32C, and/or FIG. 33E. Some or all steps of FIG. 34D can be performed by database system 10 in accordance with other embodiments of the database system 10 and/or nodes 37 discussed herein.

Step 3482 includes receiving a plurality of row data associated with a first data source. Step 3484 includes identifying a subset of row data from the plurality of row data that includes only ones of the plurality of row data that compare favorably to maintained row durability data. For example, the subset of row data is a proper subset of the plurality of row data, where at least one row data of the plurality of row data is filtered from the plurality of row data and not included in the subset of row data based on comparing unfavorably to the maintained row durability data.

Step 3486 includes generating at least one page from ones of the plurality of row data included in the subset of row data. For example, any filtered row data that comparing unfavorably to the maintained row durability data is not included in the at least one page, where only ones of the plurality of row data that are included in the identified subset of row data are included in the at least one page. In various embodiments, the first plurality of row data is generated via a plurality of processing core resources, where each processing core resource in the plurality of processing core resources generate a corresponding subset of the set of pages, independently from and in parallel with processing of other subsets of the set of pages via other ones of the plurality of processing core resources. This can include performing some or all of step 3186 of FIG. 31F.

Step 3488 includes storing the at least one page in long term storage. Performing step 3488 can include durably storing the at least one page, where the at least one page has its records deduplicated and/or the at least one page is replicated. For example, the at least one page is a page set 4320, and/or performing step 3488 includes performing the single transaction of step 3384. Alternatively the at least one page can be stored in other memory of page storage system 2506.

Step 3490 includes generating updated row durability data indicating a least favorably ordered row number of a plurality of row numbers corresponding to the subset of row data based on storing the at least one page in long term storage. For example, the updated row durability data indicates the page set interval maximum 4318 of a page set 4320 implementing the at least one page. As another example, the updated row durability data indicates the durability value 3550 generated as discussed in conjunction with FIGS. 32A-32C. As another example, the updated row durability data indicates a least favorably ordered row number of the subset of rows included in the at least one page.

Step 3492 includes updating the maintained row durability data to indicate the least favorably ordered row number of the updated row durability data. For example, the maintained row durability data indicates previous row durability data generated via previous performance of steps 3482-3490 for at least one previously stored page. Steps 3482-3490 can be repeated over time, where the maintained row durability data is updated via each performance of step 3492 as new pages are generated and durably stored to always reflect the most recently generated row durability data, and where this most recently generated row durability data of the maintained row durability data is utilized in each performance of step 3484.

As an example of this repetition, in various embodiments, the method further includes receiving a second plurality of row data associated with the first data source after updating the maintained row durability data. A second subset of row data is selected from the second plurality of row data by identifying ones of the second plurality of row data that compare favorably to the least favorably ordered row number of the maintained row durability data. At least one second page is generated from ones of the second plurality of row data included in the second subset of row data. The at least one second page is stored in long term storage. Further updated row durability data indicating a second least favorably ordered row number of a second plurality of row numbers corresponding to the second subset of row data is generated based on storing the at least one second page in long term storage. The maintained row durability data is further updated to indicate the second least favorably ordered row number of the further updated row durability data.

In various embodiments, the row durability data can be maintained for multiple data sources as their corresponding row data is received and utilized to generate and durably store pages. For example, in various embodiments, the updated row durability data corresponds to the first data source. The method can further include receiving a second plurality of row data associated with a second data source, and identifying a second subset of row data from the second plurality of row data that includes only ones of the second plurality of row data that compare favorably to second maintained row durability data corresponding to the second data source. The at least one page is further generated from ones of the second plurality of row data included in the subset of row data. For example, a page of the at least one page includes records from the plurality of row data and records from the second plurality of row data. The method can further include storing the at least one page in long term storage, and generating second updated row durability data indicating a second least favorably ordered row number of a second plurality of row numbers corresponding to the second subset of row data based on storing the at least one page in long term storage. The second maintained row durability data can indicate the second least favorably ordered row number of the second updated row durability data.

In various embodiments, a non-transitory computer readable storage medium includes at least one memory section that stores operational instructions that, when executed by a processing module that includes a processor and a memory, cause the processing module to: receive a plurality of row data associated with a first data source; identify a subset of row data from the plurality of row data that includes only ones of the plurality of row data that compare favorably to maintained row durability data; generate at least one page from ones of the plurality of row data included in the subset of row data; store the at least one page in long term storage; generate updated row durability data based on storing the at least one page in long term storage; and/or update the maintained row durability data to indicate the updated row durability data.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, a set of memory locations within a memory device or a memory section. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by a record processing and storage system, comprising:
receiving a plurality of row data associated with a first data source, wherein each of the plurality of row data includes at least one corresponding record of a dataset;
identifying a subset of row data from the plurality of row data that includes only ones of the plurality of row data that compare favorably to maintained row durability data based on a plurality of row numbers corresponding to the subset of row data comparing favorably to a row number indicated in the maintained row durability data;
generating at least one page that includes corresponding records included in the ones of the plurality of row data included in the subset of row data based on writing the corresponding records included in the ones of the plurality of row data to a page storage system;
storing the at least one page in long term storage;
identifying a least favorably ordered row number of the plurality of row numbers corresponding to the subset of row data;
generating updated row durability data indicating the least favorably ordered row number of the plurality of row numbers corresponding to the subset of row data based on storing the at least one page in long term storage; and
updating the maintained row durability data to indicate the least favorably ordered row number of the updated row durability data as the row number indicated in the maintained row durability data.

2. The method of claim 1, wherein the plurality of row data is processed via a plurality of processing core resources, wherein each processing core resource in the plurality of processing core resources generate a corresponding subset of a set of pages, independently from and in parallel with processing of other subsets of the set of pages via other ones of the plurality of processing core resources.

3. The method of claim 1, further comprising:
receiving a second plurality of row data associated with the first data source after updating the maintained row durability data;
selecting a second subset of row data from the second plurality of row data by identifying ones of the second plurality of row data that compare favorably to the least favorably ordered row number of the maintained row durability data; and
generating at least one second page from ones of the second plurality of row data included in the second subset of row data.

4. The method of claim 3, further comprising:
storing the at least one second page in long term storage.

5. The method of claim 4, further comprising:
generating further updated row durability data indicating a second least favorably ordered row number of a second plurality of row numbers corresponding to the second subset of row data based on storing the at least one second page in long term storage; and
further updating the maintained row durability data to indicate the second least favorably ordered row number of the further updated row durability data.

6. The method of claim 1, wherein the method includes deduplicating at least one of the plurality of row data included in multiple ones of a set of pages that include the at least one page.

7. The method of claim 6, wherein deduplicating the at least one of the plurality of row data includes comparing a first row number interval of one page in the set of pages to row number interval of at least one other page.

8. The method of claim 1, wherein the updated row durability data corresponds to the first data source, and wherein the method further comprises:
receiving a second plurality of row data associated with a second data source;
identifying a second subset of row data from the second plurality of row data that includes only ones of the second plurality of row data that compare favorably to second row durability data corresponding to the second data source, wherein the at least one page is further generated from ones of the second plurality of row data included in the subset of row data; and
storing the at least one page in long term storage.

9. The method of claim 8, further comprising:
generating second maintained row durability data indicating a second least favorably ordered row number of a second plurality of row numbers corresponding to the second subset of row data based on storing the at least one page in long term storage; and
updating the second maintained row durability data to indicate the second least favorably ordered row number of the second maintained row durability data.

10. The method of claim 1, further comprising transmitting the updated row durability data to a computing device associated with the first data source.

11. A record processing and storage system includes:
at least one processor; and
a memory that stores operational instructions that, when executed by the at least one processor, cause the record processing and storage system to perform operations that include:
receiving a plurality of row data associated with a first data source, wherein each of the plurality of row data includes at least one corresponding record of a dataset;
identifying a subset of row data from the plurality of row data that includes only ones of the plurality of row data that compare favorably to maintained row durability data based on a plurality of row numbers corresponding to the subset of row data comparing favorably to a row number indicated in the maintained row durability data;
generating at least one page that includes corresponding records included in the ones of the plurality of row data included in the subset of row data based on writing the corresponding records included in the ones of the plurality of row data to a page storage system;
storing the at least one page in long term storage;
identifying a least favorably ordered row number of the plurality of row numbers corresponding to the subset of row data;
generating updated row durability data indicating the least favorably ordered row number of the plurality of row numbers corresponding to the subset of row data based on storing the at least one page in long term storage; and
updating the maintained row durability data to indicate the least favorably ordered row number of the updated row durability data as the row number indicated in the maintained row durability data.

12. The record processing and storage system of claim 11, wherein the plurality of row data is processed via a plurality of processing core resources, wherein each processing core resource in the plurality of processing core resources generate a corresponding subset of a set of pages, independently from and in parallel with processing of other subsets of the set of pages via other ones of the plurality of processing core resources.

13. The record processing and storage system of claim 11, wherein the operations further include:
   receiving a second plurality of row data associated with the first data source after updating the maintained row durability data;
   selecting a second subset of row data from the second plurality of row data by identifying ones of the second plurality of row data that compare favorably to the least favorably ordered row number of the maintained row durability data; and
   generating at least one second page from ones of the second plurality of row data included in the second subset of row data.

14. The record processing and storage system of claim 13, wherein the operations further include:
   storing the at least one second page in long term storage.

15. The record processing and storage system of claim 14, wherein the operations further include:
   generating further updated row durability data indicating a second least favorably ordered row number of a second plurality of row numbers corresponding to the second subset of row data based on storing the at least one second page in long term storage; and
   further updating the maintained row durability data to indicate the second least favorably ordered row number of the further updated row durability data.

16. The record processing and storage system of claim 11, wherein the operations further include:
   deduplicating at least one of the plurality of row data included in multiple ones of a set of pages that include the at least one page.

17. The record processing and storage system of claim 16, wherein deduplicating the at least one of the plurality of row data includes comparing a first row number interval of one page in the set of pages to row number interval of at least one other page.

18. The record processing and storage system of claim 11, wherein the updated row durability data corresponds to the first data source, and wherein the operations include:
   receiving a second plurality of row data associated with a second data source;
   identifying a second subset of row data from the second plurality of row data that includes only ones of the second plurality of row data that compare favorably to second row durability data corresponding to the second data source, wherein the at least one page is further generated from ones of the second plurality of row data included in the subset of row data; and
   storing the at least one page in long term storage.

19. The record processing and storage system of claim 18, wherein the operations further include:
   generating second maintained row durability data indicating a second least favorably ordered row number of a second plurality of row numbers corresponding to the second subset of row data based on storing the at least one page in long term storage; and
   updating the second maintained row durability data to indicate the second least favorably ordered row number of the second maintained row durability data.

20. A non-transitory computer readable storage medium comprises:
   at least one memory section that stores operational instructions that, when executed by a processing module that includes a processor and a memory, causes the processing module to perform operation that include:
      receiving a plurality of row data associated with a first data source, wherein each of the plurality of row data includes at least one corresponding record of a dataset;
      identifying a subset of row data from the plurality of row data that includes only ones of the plurality of row data that compare favorably to maintained row durability data based on a plurality of row numbers corresponding to the subset of row data comparing favorably to a row number indicated in the maintained row durability data;
      generating at least one page that includes corresponding records included in the ones of the plurality of row data included in the subset of row data based on writing the corresponding records included in the ones of the plurality of row data to a page storage system;
      storing the at least one page in long term storage;
      identifying a least favorably ordered row number of the plurality of row numbers corresponding to the subset of row data;
      generating updated row durability data indicating the least favorably ordered row number of the plurality of row numbers corresponding to the subset of row data based on storing the at least one page in long term storage; and
      updating the maintained row durability data to indicate the least favorably ordered row number of the updated row durability data as the row number indicated in the maintained row durability data.

* * * * *